(12) United States Patent
Tsukuba

(10) Patent No.: US 11,368,720 B2
(45) Date of Patent: Jun. 21, 2022

(54) IMAGE PROCESSING APPARATUS AND METHOD

(71) Applicant: SONY CORPORATION, Tokyo (JP)

(72) Inventor: Takeshi Tsukuba, Chiba (JP)

(73) Assignee: SONY CORPORATION, Tokyo (JP)

( * ) Notice: Subject to any disclaimer, the term of this patent is extended or adjusted under 35 U.S.C. 154(b) by 98 days.

(21) Appl. No.: 16/099,371

(22) PCT Filed: Apr. 28, 2017

(86) PCT No.: PCT/JP2017/016987
§ 371 (c)(1),
(2) Date: Nov. 6, 2018

(87) PCT Pub. No.: WO2017/195666
PCT Pub. Date: Nov. 16, 2017

(65) Prior Publication Data
US 2020/0322633 A1    Oct. 8, 2020

(30) Foreign Application Priority Data

May 13, 2016  (JP) .............................. JP2016-097171
Sep. 30, 2016  (JP) .............................. JP2016-193686

(51) Int. Cl.
*H04N 19/61*  (2014.01)
*H04N 19/547*  (2014.01)
*H04N 19/18*  (2014.01)

(52) U.S. Cl.
CPC ............. *H04N 19/61* (2014.11); *H04N 19/18* (2014.11); *H04N 19/547* (2014.11)

(58) Field of Classification Search
None
See application file for complete search history.

(56) References Cited

U.S. PATENT DOCUMENTS

| 2002/0136300 | A1* | 9/2002 | Bruls | H04N 19/177 375/240.12 |
| 2003/0093452 | A1* | 5/2003 | Zhou | G06F 17/147 708/520 |

(Continued)

FOREIGN PATENT DOCUMENTS

| CN | 103765893 A | 4/2014 | |
| EP | 2902918 A1 * | 8/2015 | .......... H04N 19/124 |

(Continued)

OTHER PUBLICATIONS

Jul. 12, 2019, European Search Report issued for related EP Application No. 17796027.5.

(Continued)

*Primary Examiner* — Stefan Gadomski
(74) *Attorney, Agent, or Firm* — Paratus Law Group, PLLC

(57) ABSTRACT

The present disclosure relates to image processing apparatus and method that can suppress an increase in a load of encoding and decoding. One or both a predetermined upper limit and a predetermined lower limit are used to clip transformation coefficients obtained by applying a transformation process to a predicted residual that is a difference between an image and a predicted image of the image. In addition, one or both a predetermined upper limit and a predetermined lower limit are used to clip transformation coefficients that are subjected to an inverse transformation process to obtain a predicted residual that is a difference between an image and a predicted image of the image. The present disclosure can be applied to, for example, an image processing apparatus, an image encoding apparatus, an image decoding apparatus, and the like.

4 Claims, 91 Drawing Sheets

(56) References Cited

U.S. PATENT DOCUMENTS

| | | | | |
|---|---|---|---|---|
| 2004/0258151 | A1* | 12/2004 | Spampinato | H04N 19/68 375/240.03 |
| 2004/0258156 | A1* | 12/2004 | Chujoh | H04N 19/134 375/240.16 |
| 2005/0281332 | A1* | 12/2005 | Lai | H04N 19/18 375/240.03 |
| 2006/0002468 | A1* | 1/2006 | Zhou | H04N 19/117 375/240.12 |
| 2012/0063691 | A1* | 3/2012 | Yu | H04N 19/147 382/233 |
| 2013/0034149 | A1* | 2/2013 | Karuchula | H04N 19/61 375/240.03 |
| 2015/0181235 | A1* | 6/2015 | Alshina | H04N 19/44 375/240.18 |
| 2015/0264362 | A1* | 9/2015 | Joshi | H04N 19/115 375/240.18 |
| 2015/0264400 | A1* | 9/2015 | Chong | H04N 19/42 375/240.18 |
| 2016/0173811 | A1* | 6/2016 | Oh | H04N 19/70 725/116 |
| 2016/0198175 | A1* | 7/2016 | Shima | H04N 19/172 375/240.12 |
| 2016/0212438 | A1* | 7/2016 | Andersson | H04N 19/12 |
| 2017/0318301 | A1* | 11/2017 | Li | H04N 19/126 |
| 2018/0302640 | A1* | 10/2018 | Li | H04N 19/17 |

FOREIGN PATENT DOCUMENTS

| | | | | |
|---|---|---|---|---|
| GB | 2521685 A | * | 7/2015 | H04N 19/91 |
| WO | WO 2012/157541 A1 | | 11/2012 | |
| WO | WO 2013/002619 A | | 1/2013 | |
| WO | WO-2013019342 A1 | * | 2/2013 | H04N 19/134 |
| WO | WO 2014/167297 A1 | | 10/2014 | |
| WO | WO 2015/179010 A2 | | 11/2015 | |
| WO | WO 2017/191782 A1 | | 11/2017 | |

OTHER PUBLICATIONS

Apr. 2, 2019, European Search Report issued for related EP Application No. 17796027.5.

Shibahara et al., CE7: Mode Dependent 2-step Transform for Intra Coding, Joint Collaborative Team on Video Coding (JCT-VC) of ITU-T SG16 WP3 and ISO/IEC JTC1/SC29/WG11, Jul. 14-22, 2011, pp. 1-8, 6th Meeting: Torino, IT.

Zhao et al., TU-level non-separable secondary transform, Joint Video Exploration Team (JVET) of ITU-T SG 16 WP 3 and ISO/IEC JTC 1/SC 29/WG 11, Feb. 20-26, 2016, pp. 1-5, 2nd Meeting: San Diego, USA.

Chen et al., Algorithm Description of Joint Exploration Test Model 2, Joint Video Exploration Team (JVET) of ITU-T SG 16 WP 3 and ISO/IEC JTC 1/SC 29/WG 11, Feb. 20-26, 2016, pp. 1-30, 2nd Meeting: San Diego, USA.

Chen et al., Algorithm Description of Joint Exploration Test Model 2, Joint Video Exploration Team (JVET) of ITU-T SG 16 WP 3 and ISO/IEC JTC 1/SC 29/WG 11, Feb. 20-26, 2016, pp. 1-30, $2^{nd}$ Meeting: San Diego.

Ted Hsieh et al., Clipping for Cross Component Prediction and Adaptive Colour Transform, Joint Collaborative Team on Video Coding (JCT-VC) of ITU-T SG 16 WP 3 and ISO/IEC JTC 1/SC 29/WG 11, Feb. 10-18, 2015, pp. 1-6, $20^{th}$ Meeting: Geneva, Switzerland.

Kiran Misra et al., AHG18: On Supporting Higher Bit Depth With Transform Skip Only Changes, Joint Collaborative Team on Video Coding (JCT-VC) of ITU-T SG 16 WP 3 and ISO/IEC JTC 1/SC 29/WG 11, Oct. 23-Nov. 1, 2013, pp. 1-5, $15^{th}$ Meeting: Geneva, CH.

Chen et al., Algorithm Description of Joint Exploration Test Model 1, Joint Video Exploration Team (JVET) of ITU-T SG 16 WP 3 and ISO/IEC JTC 1/SC 29/WG 11, Feb. 20-26, 2016, pp. i-28, 2nd Meeting: San Diego, USA.

\* cited by examiner

| Operation | NSST(max case:class=7, m=0) | NSST(min case:class=6, m=0) |
|---|---|---|
| Coeff$^T$=R・Coeff_P$^T$ | 928 * 2$^{15}$ | 607 * 2$^{15}$ |
| Coeff + 128 | 30408832 | 19890304 |
| Coeff >> 8 | 118784 >= 2$^{15}$ | 77696 >= 2$^{15}$ |
| Coeff_P$^T$=R$^T$・Coeff_IQ$^T$ | 928 * 2$^{15}$ | 607 * 2$^{15}$ |
| Coeff_P + 128 | 30408832 | 19890304 |
| Coeff_P >> 8 | 118784 >= 2$^{15}$ | 77696 >= 2$^{15}$ |

F I G. 2 5

A

| Num. of operation | NON-SEPARABLE SECONDARY TRANSFORMATION | SEPARABLE SECONDARY TRANSFORMATION |
|---|---|---|
| MULTIPLICATION | 16*16=256 | 2*16*4=128 |
| ADDITION | 15*16=240 | 1*16*4=64 |

B

| | NON-SEPARABLE SECONDARY TRANSFORMATION (PER TRANSFORMATION) | SEPARABLE SECONDARY TRANSFORMATION (PER TRANSFORMATION) |
|---|---|---|
| # of coeffs | 16*16=256 | 2*8*4=64 |
| # of memory size (8-BIT PRECISION) | 256 Bytes | 64 Bytes (REDUCED BY 75%) |

```
1: numElm = 2**N           # THE NUMBER OF ELEMENTS (N>0)
2: numOp = N               # THE NUMBER OF OPERATIONS
3: permList = zeros([numOp, numElm])  # INITIALIZATION OF ARRAY
4: for s in range(N):      # for( s = 0;s<N;s++)
5:     numElmInGroup = 2**(s+1)
6:     numGroup = numElm
7:     for cls in range(numGroup):    # for( cls = 0;cls<numGroup;cls++)
8:         offset = numElmInGroup * cls
9:         for n in range(numElmInGroup):  # for( n = 0; n<numElmInGroup;n++)
10:            idx = n + offset
11:            if n < (numInGroup/2) + offset:  # left class
12:                if idx % 2 == 0:             # even
13:                    permList[ s ][ idx ] = idx
14:                else:                         # odd
15:                    permList[ s ][ idx ] = idx + (numElmInGroup/2) - 1
16:            else:                             # n>= offset, right class
17:                if idx % 2==0:                # even
18:                    permList[ s ][ idx ] = idx - (numElmInGroup/2) + 1
19:                else:                         # odd
20:                    permList[ s ][ idx ] = idx
```

FIG. 40

$\delta_1 = \begin{pmatrix} 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 & 27 & 28 & 29 & 30 & 31 \\ 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 & 27 & 28 & 29 & 30 & 31 \end{pmatrix}$ $\delta_2 = \begin{pmatrix} 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 & 27 & 28 & 29 & 30 & 31 \\ 0 & 2 & 1 & 3 & 4 & 6 & 5 & 7 & 8 & 10 & 9 & 11 & 12 & 14 & 13 & 15 & 16 & 18 & 17 & 19 & 20 & 22 & 21 & 23 & 24 & 26 & 25 & 27 & 28 & 30 & 29 & 31 \end{pmatrix}$ $\delta_3 = \begin{pmatrix} 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 & 27 & 28 & 29 & 30 & 31 \\ 0 & 4 & 2 & 6 & 1 & 5 & 3 & 7 & 8 & 12 & 10 & 14 & 9 & 13 & 11 & 15 & 16 & 20 & 18 & 22 & 17 & 21 & 19 & 23 & 24 & 28 & 26 & 30 & 25 & 29 & 27 & 31 \end{pmatrix}$ $\delta_4 = \begin{pmatrix} 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 & 27 & 28 & 29 & 30 & 31 \\ 0 & 8 & 2 & 10 & 4 & 12 & 6 & 14 & 1 & 9 & 3 & 11 & 5 & 13 & 7 & 15 & 16 & 24 & 18 & 26 & 20 & 28 & 22 & 30 & 17 & 25 & 19 & 27 & 21 & 29 & 23 & 31 \end{pmatrix}$ $\delta_5 = \begin{pmatrix} 0 & 1 & 2 & 3 & 4 & 5 & 6 & 7 & 8 & 9 & 10 & 11 & 12 & 13 & 14 & 15 & 16 & 17 & 18 & 19 & 20 & 21 & 22 & 23 & 24 & 25 & 26 & 27 & 28 & 29 & 30 & 31 \\ 0 & 16 & 2 & 18 & 4 & 20 & 6 & 22 & 8 & 24 & 10 & 26 & 12 & 28 & 14 & 30 & 1 & 17 & 3 & 19 & 5 & 21 & 7 & 23 & 9 & 25 & 11 & 27 & 13 & 29 & 15 & 31 \end{pmatrix}$

| Num. of operation | NON-SEPARABLE 64-POINTS HyGT | SEPARABLE 64-POINTS HyGT |
|---|---|---|
| MULTIPLICATION | 64*64=4096 | 2*64*6=768 |
| ADDITION | 63*64=4032 | 1*64*6=384 |

B

| | NON-SEPARABLE 64-POINTS HyGT (PER TRANSFORMATION) | SEPARABLE 64-POINTS HyGT (PER TRANSFORMATION) |
|---|---|---|
| # of coeffs | 64*64=4096 | 2*10*6=120 |
| # of memory size (8-BIT PRECISION) | 4096 Bytes | 120 Bytes (REDUCED BY APPROXIMATELY 97%) |

FIG. 63

| | | |
|---|---|---|
| atmvp_flag(atmvp_enabled_flag) | u(1) | |
| log2_sub_pu_tmvp_size | u(3) | |
| obmc_enabled_flag(renamed_from_obmc_flag) | u(1) | ⎫ |
| if(obmc_flag) { | | ⎬ OBMC |
|   obmc_blk_size | ue(v) | ⎭ |
| } | | |
| use_imv(imv_enabled_flag) | u(1) | |
| fruc_merge_mode_enabled_flag(renamed) | u(1) | ⎫ |
| if(fruc_merge_mode_enabled_flag) { | | ⎪ |
|   fruc_refine_filter | ue(v) | ⎬ FRUC |
|   fruc_refine_range_in_pixel | ue(v) | ⎪ |
|   fruc_small_blk_refine_depth | ue(v) | ⎭ |
| } | | |
| illumination_comp_enabled_flag | u(1) | |
| use_alf_flag(alf_enabled_flag) | u(1) | |
| use_intra_emt(intra_amt_enabled_flag) | u(1) | ⎫ AMT |
| use_inter_emt(inter_amt_enabled_flag) | u(1) | ⎭ |
| sdt_enabled_flag | u(1) | } SDT |
| intra_4tap_filter_enabled_flag | u(1) | |
| intra_boundary_filter_enabled_flag | u(1) | |
| cross_component_prediction_enabled_flag (lm_chroma_enabled_flag) | u(1) | |
| bio_enabled_flag | u(1) | |
| pdpc_enabled_flag | u(1) | |
| nsst_enabled_flag | u(1) | |
| affine_enabled_flag | u(1) | |
| rsaf_enabled_flag | u(1) | |
| sps_extension_present_flag | u(1) | |
| if(sps_extension_present_flag) { | | |
|   sps_range_extension_flag | u(1) | |
|   sps_multilayer_extension_flag | u(1) | |
|   sps_3d_extension_flag | u(1) | |
|   sps_scc_extension_flag | u(1) | |
|   sps_extension_4bits | u(4) | |
| } | | |
| if(sps_range_extension_flag) | | |
|   sps_range_extension() | | |
| if(sps_multilayer_extension_flag) | | |
|   sps_multilayer_extension() /* specified in Annex F */ | | |
| if(sps_3d_extension_flag) | | |
|   sps_3d_extension() /* specified in Annex I*/ | | |
| if(sps_scc_extension_flag) | | |
|   sps_scc_extension() | | |
| if(sps_extension_4bits) | | |
|   while(more_rbsp_data()) | | |
|     sps_extension_data_flag | u(1) | |
| rbsp_trailing_bits() | | |
| } | | |

FIG. 64

| | Descriptor |
|---|---|
| residual_coding(x0, y0, log2TBWSize, log2TBHSize, cIdx) { | |
| if(transform_skip_enabled_flag && !cu_transquant_bypass_flag && (log2TrafoSize <= Log2MaxTransformSkipSize)) | |
|   transform_skip_flag[x0][y0][cIdx] | ae(v) |
| ... | |
| if(sdt_enabled_flag) { | |
|   SDTAvailableFlag = sdt_enabled_flag && is Inter<br>    (isLuma && log2TBHSize == log2TBHSize) &&<br>    (log2TBWidth <= log2MaxSDTWidth) &&<br>    (log2TBWidth >= log2MinSDTWidth) &&<br>    (!transform_skip_flag[x0][y0][cIdx]) &&<br>    (!cu_transquant_bypass_flag) | |
|   if(SDTAvailableFlag)<br>    sdt_flag[x0][y0][cIdx] | ae(v) |
| } | |
| last_sig_coeff_x_prefix | ae(v) |
| last_sig_coeff_y_prefix | ae(v) |
| if(last_sig_coeff_x_prefix > 3) | |
|   last_sig_coeff_x_suffix | ae(v) |
| if(last_sig_coeff_y_prefix > 3) | |
|   last_sig_coeff_y_suffix | ae(v) |
| lastScanPos = 16 | |
| lastSubBlock = (1 << (log2TrafoSize-2)) * (1 << (log2TrafoSize-2)) - 1 | |
| do { | |
|   if(lastScanPos == 0) { | |
|     lastScanPos = 16 | |
|     lastSubBlock-- | |
|   } | |
|   lastScanPos-- | |
|   xS = ScanOrder[log2TrafoSize-2][scanIdx][lastSubBlock][0] | |
|   yS = ScanOrder[log2TrafoSize-2][scanIdx][lastSubBlock][1] | |
|   xC = (xS << 2) + ScanOrder[2][scanIdx][lastScanPos][0] | |
|   yC = (yS << 2) + ScanOrder[2][scanIdx][lastScanPos][1] | |
| } while((xC != LastSignificantCoeffX) || (yC != LastSignificantCoeffY)) | |
| ... | |

FIG. 65

| | |
|---|---|
| atmvp_flag(atmvp_enabled_flag) | u(1) |
| log2_sub_pu_tmvp_size | u(3) |
| obmc_enabled_flag(renamed_from_obmc_flag) | u(1) |
| if(obmc_flag) { | |
|   obmc_blk_size | ue(v) |
| } | |
| use_imv(imv_enabled_flag) | u(1) |
| fruc_merge_mode_enabled_flag(renamed) | u(1) |
| if(fruc_merge_mode_enabled_flag) { | |
|   fruc_refine_filter | ue(v) |
|   fruc_refine_range_in_pixel | ue(v) |
|   fruc_small_blk_refine_depth | ue(v) |
| } | |
| illumination_comp_enabled_flag | u(1) |
| use_alf_flag(alf_enabled_flag) | u(1) |
| use_intra_emt(intra_amt_enabled_flag) | u(1) |
| use_inter_emt(inter_amt_enabled_flag) | u(1) |
| intra_sdt_enabled_flag | u(1) |
| inter_sdt_enabled_flag | u(1) |
| intra_4tap_filter_enabled_flag | u(1) |
| intra_boundary_filter_enabled_flag | u(1) |
| cross_component_prediction_enabled_flag (lm_chroma_enabled_flag) | u(1) |
| bio_enabled_flag | u(1) |
| pdpc_enabled_flag | u(1) |
| nsst_enabled_flag | u(1) |
| affine_enabled_flag | u(1) |
| rsaf_enabled_flag | u(1) |
| sps_extension_present_flag | u(1) |
| if(sps_extension_present_flag) { | |
|   sps_range_extension_flag | u(1) |
|   sps_multilayer_extension_flag | u(1) |
|   sps_3d_extension_flag | u(1) |
|   sps_scc_extension_flag | u(1) |
|   sps_extension_4bits | u(4) |
| } | |
| if(sps_range_extension_flag) | |
|   sps_range_extension() | |
| if(sps_multilayer_extension_flag) | |
|   sps_multilayer_extension() /* specified in Annex F */ | |
| if(sps_3d_extension_flag) | |
|   sps_3d_extension() /* specified in Annex I */ | |
| if(sps_scc_extension_flag) | |
|   sps_scc_extension() | |
| if(sps_extension_4bits) | |
|   while(more_rbsp_data()) | |
|     sps_extension_data_flag | u(1) |
| rbsp_trailing_bits() | |
| } | |

Groupings: OBMC, FRUC, AMT, SDT

FIG. 66

F I G . 8 2
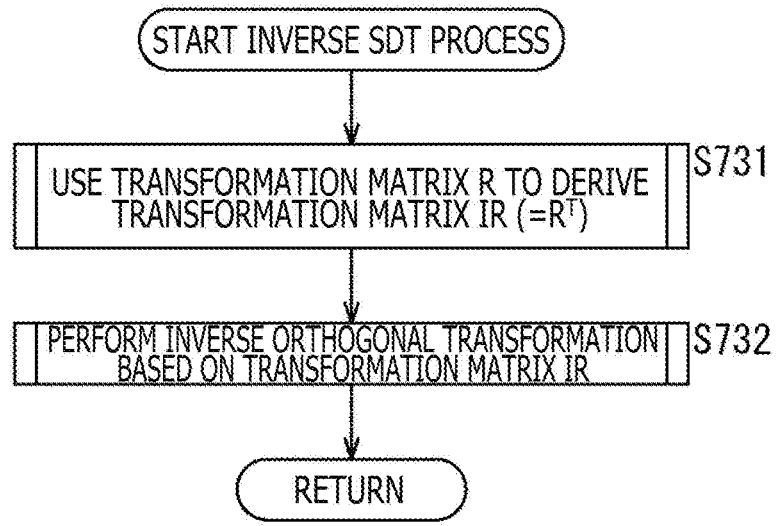

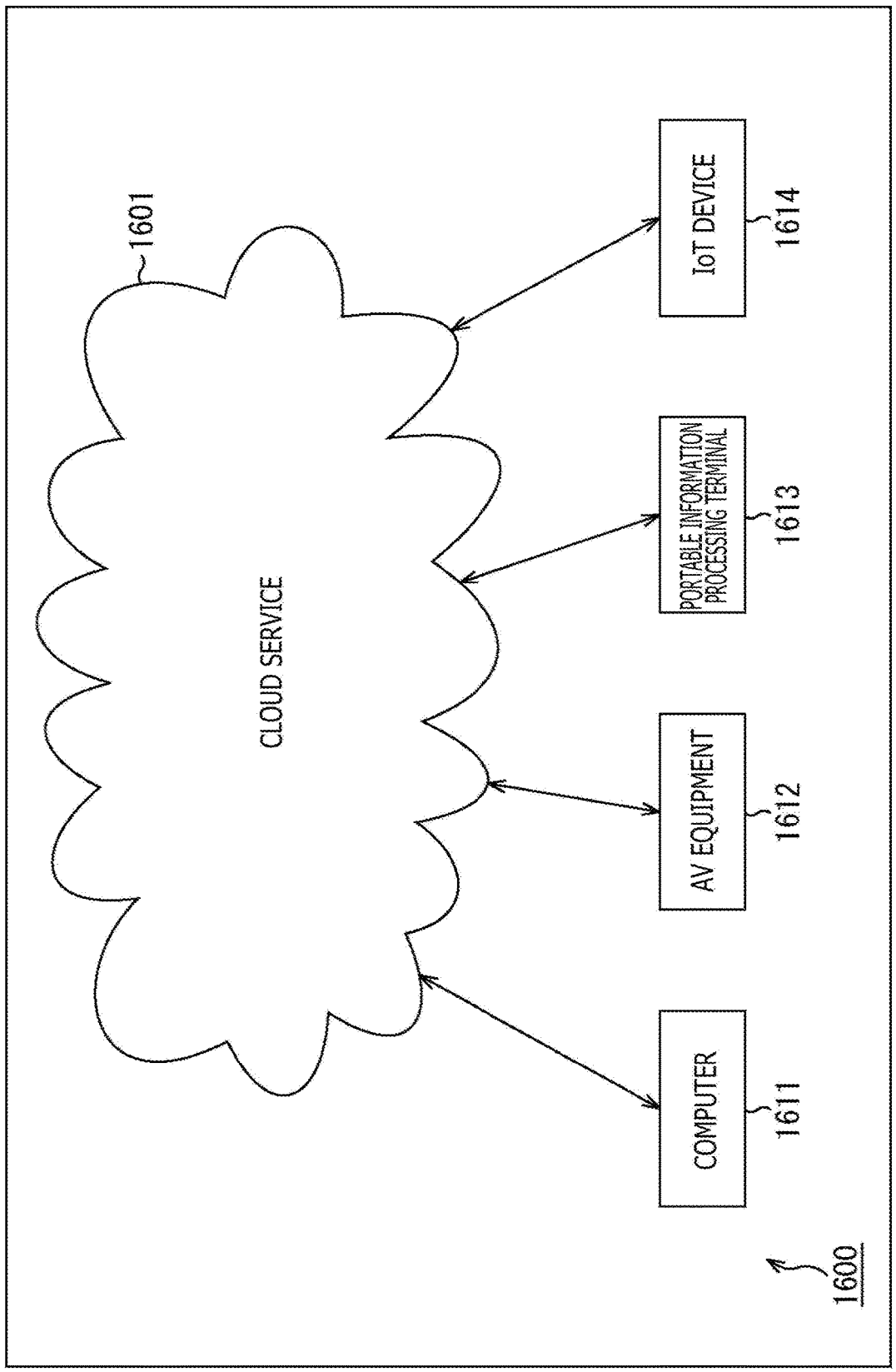

IMAGE PROCESSING APPARATUS AND METHOD

CROSS REFERENCE TO PRIOR APPLICATION

This application is a National Stage Patent Application of PCT International Patent Application No. PCT/JP2017/016987 (filed on Apr. 28, 2017) under 35 U.S.C. § 371, which claims priority to Japanese Patent Application Nos. 2016-097171 (filed on May 13, 2016) and 2016-193686 (filed on Sep. 30, 2016), which are all hereby incorporated by reference in their entirety.

TECHNICAL FIELD

The present disclosure relates to image processing apparatus and method, and particularly, to image processing apparatus and method that can suppress an increase in the load of encoding and decoding.

BACKGROUND ART

In the past, a technique is disclosed in image encoding, in which after a primary transformation is applied to a predicted residual that is a difference between an image and a predicated image of the image, a secondary transformation is further applied to each 4×4 sub-block in a transformation block in order to increase the energy compaction (concentrate transformation coefficients in a low-frequency region) (for example, see NPL 1). In NPL 1, it is also disclosed that a secondary transformation identifier indicating which secondary transformation is to be applied is signaled for each CU.

Furthermore, a technique is disclosed in an encoder, in which because the calculation complexity is large in deciding which secondary transformation is to be applied for each CU described in NPL 1 based on RDO (Rate-Distortion Optimization), a secondary transformation flag indicating whether to apply the secondary transformation is signaled for each transformation block (for example, see NPL 2). It is also disclosed in NPL 2 that the secondary transformation identifier indicating which secondary transformation is to be applied is derived based on a primary transformation identifier and an intra prediction mode.

CITATION LIST

Non Patent Literature

[NPL 1]
Jianle Chen, Elena Alshina, Gary J. Sullivan, Jens-Rainer Ohm, Jill Boyce, "Algorithm Description of Joint Exploration Test Model 2," JVET-B1001_v3, Joint Video Exploration Team (JVET) of ITU-TSG 16 WP 3 and ISO/IEC JTC 1/SC 29/WG 11 2nd Meeting: San Diego, USA, 20-26 Feb. 2016

[NPL 2]
X. Zhao, A. Said, V. Seregin, M. Karczewicz, J. Chen, R. Joshi, "TU-level non-separable secondary transform," JVET-B0059, Joint Video Exploration Team (JVET) of ITU-T SG 16 WP 3 and ISO/IEC JTC 1/SC 29/WG 11 2nd Meeting: San Diego, USA, 20-26 Feb. 2016

SUMMARY

Technical Problem

In the methods described in NPL 1 and NPL 2, the precision of the elements of each matrix of the second transformation is approximated at 9-bit precision. However, if the secondary transformation or inverse secondary transformation is executed at the precision, the dynamic range of each signal after the secondary transformation or the inverse secondary transformation may exceed 16 bits, and this may increase the capacity necessary for an intermediate buffer that temporarily stores computation results after the secondary transformation or the inverse secondary transformation.

The present disclosure has been made in view of the circumstances, and the present disclosure enables to suppress an increase in the load of encoding and decoding.

Solution to Problem

An image processing apparatus according to a first aspect of the present technique is an image processing apparatus including a clip processing section that uses one or both a predetermined upper limit and a predetermined lower limit to clip transformation coefficients obtained by applying a transformation process to a predicted residual that is a difference between an image and a predicted image of the image.

The image processing apparatus can further include: a primary transformation section that performs a primary transformation that is a transformation process for the predicted residual; and a secondary transformation section that performs a secondary transformation that is a transformation process for primary transformation coefficients obtained by the primary transformation of the predicted residual performed by the primary transformation section, in which the clip processing section can be configured to clip secondary transformation coefficients obtained by the secondary transformation of the primary transformation coefficients performed by the secondary transformation section.

The image processing apparatus can further include: a rasterization section that transforms the transformation coefficients into a one-dimensional vector; a matrix computation section that performs matrix computation of the one-dimensional vector; a scaling section that scales the one-dimensional vector subjected to the matrix computation; and a matrix formation section that forms a matrix of the scaled one-dimensional vector, in which the clip processing section can be configured to clip the one-dimensional vector scaled by the scaling section, and the matrix formation section can be configured to form a matrix of the one-dimensional vector clipped by the clip processing section.

An image processing method according to the first aspect of the present technique is an image processing method including using one or both a predetermined upper limit and a predetermined lower limit to clip transformation coefficients obtained by applying a transformation process to a predicted residual that is a difference between an image and a predicted image of the image.

An image processing apparatus according to a second aspect of the present technique is an image processing apparatus including a clip processing section that uses one or both a predetermined upper limit and a predetermined lower limit to clip transformation coefficients that are subjected to an inverse transformation process to obtain a predicted residual that is a difference between an image and a predicted image of the image.

An image processing method according to the second aspect of the present technique is an image processing method including using one or both a predetermined upper limit and a predetermined lower limit to clip transformation coefficients that are subjected to an inverse transformation process to obtain a predicted residual that is a difference between an image and a predicted image of the image.

An image processing apparatus according to a third aspect of the present technique is an image processing apparatus including a transformation section that derives a matrix product of a row vector $X_0$ with $2^N$ elements (N is a natural number) and an orthogonal matrix R including N $2^N \times 2^N$ orthogonal matrices $T_i$ (i=1, 2, ..., N) to transform the row vector $X_0$ into a row vector $X_n$ with $2^N$ elements.

The orthogonal matrix $T_i$ can include a matrix product $(P_i^T \cdot F_i \cdot P_i)$ of a transposed matrix $P_i^T$ of an ith permutation matrix $P_i$, an ith orthogonal matrix $F_i$, and the ith permutation matrix $P_i$.

The transformation section can derive a matrix product $X_i$ of the ith orthogonal matrix $T_i$ and a transposed matrix $X_{i-1}^T$ of an (i−1)th (i>0) row vector $X_{i-1}$.

The orthogonal matrix $F_i$ can be a sparse matrix, where $2^{N-1}$ 2×2 rotation matrices different from each other are provided as diagonal components, and other elements are 0.

The permutation matrix $P_i$ can be a matrix derived by partitioning elements into N−i+1 subsets including $2^i$ elements in a forward direction, setting an element group on a left half of each subset j as a first class, setting an element group on a right half as a second class, and switching an odd-numbered element K of the first class with an even-numbered element M to the right of a corresponding odd-numbered element L of the second class.

The N can be 4 or 6.

An image processing method according to the third aspect of the present technique is an image processing method including deriving a matrix product of a row vector $X_0$ with $2^N$ elements (N is a natural number) and an orthogonal matrix R including N $2^N \times 2^N$ orthogonal matrices $T_i$ (i=1, 2, ..., N) to transform the row vector $X_0$ into a row vector $X_n$ with $2^N$ elements.

An image processing apparatus according to a fourth aspect of the present technique is an image processing apparatus including an inverse transformation section that derives a matrix product of a row vector $X_0$ with $2^N$ elements (N is a natural number) and an orthogonal matrix IR that is an inverse matrix of an orthogonal matrix R including N $2^N \times 2^N$ orthogonal matrices $T_i$ (i=1, 2, ..., N) to perform an inverse transformation of the row vector $X_0$ into a row vector $X_n$ with $2^N$ elements.

The orthogonal matrix IR can include a transposed matrix $T_i^T$ of the orthogonal matrix $T_i$, and the orthogonal matrix $T_i^T$ can include a matrix product $(P_i^T \cdot F_i^T \cdot P_i)$ of a transposed matrix $P_i^T$ of an ith permutation matrix $P_i$, a transposed matrix $F_i^T$ of an ith orthogonal matrix $F_i$, and the ith permutation matrix $P_i$.

The inverse transformation section can derive a matrix product $X_i$ of the transposed matrix $T_i^T$ of the ith orthogonal matrix $T_i$ and a transposed matrix $X_{i-1}^T$ of an (i−1)th (i>0) row vector $X_{i-1}$.

The orthogonal matrix $F_i$ can be a sparse matrix, where $2^{N-1}$ 2×2 rotation matrices different from each other are provided as diagonal components, and other elements are 0.

The permutation matrix $P_i$ can be a matrix derived by partitioning elements into N−i+1 subsets including $2^i$ elements in a forward direction, setting an element group on a left half of each subset j as a first class, setting an element group on a right half as a second class, and switching an odd-numbered element K of the first class with an even-numbered element M to the right of a corresponding odd-numbered element L of the second class.

The N can be 4 or 6.

An image processing method according to a fourth aspect of the present invention is an image processing method including deriving a matrix product of a row vector $X_0$ with $2^N$ elements (N is a natural number) and an orthogonal matrix IR that is an inverse matrix of an orthogonal matrix R including N $2^N \times 2^N$ orthogonal matrices $T_i$ (i=1, 2, ..., N) to perform an inverse transformation of the row vector $X_0$ into a row vector $X_n$ with $2^N$ elements.

In the image processing apparatus and method according to the first aspect of the present technique, one or both a predetermined upper limit and a predetermined lower limit are used to clip transformation coefficients obtained by applying a transformation process to a predicted residual that is a difference between an image and a predicted image of the image.

In the image processing apparatus and method according to the second aspect of the present technique, one or both a predetermined upper limit and a predetermined lower limit are used to clip transformation coefficients that are subjected to an inverse transformation process to obtain a predicted residual that is a difference between an image and a predicted image of the image.

In the image processing apparatus and method according to the third aspect of the present technique, a matrix product of a row vector X0 with 2N elements (N is a natural number) and an orthogonal matrix R including N 2N×2N orthogonal matrices $T_i$ (i=1, 2, ..., N) is derived to transform the row vector X0 into a row vector Xn with 2N elements.

In the image processing apparatus and method according to the fourth aspect of the present technique, a matrix product of a row vector X0 with 2N elements (N is a natural number) and an orthogonal matrix IR that is an inverse matrix of an orthogonal matrix R including N 2N×2N orthogonal matrices $T_i$ (i=1, 2, ..., N) is derived to perform an inverse transformation of the row vector X0 into a row vector Xn with 2N elements.

Advantageous Effects of Invention

According to the present disclosure, an image can be processed. Particularly, an increase in the load of encoding and decoding can be suppressed.

BRIEF DESCRIPTION OF DRAWINGS

FIG. 5 is a diagram illustrating an example of a matrix of a secondary transformation.

FIG. 6 is a diagram illustrating an example of a dynamic range in the secondary transformation.

FIG. 25 is a diagram illustrating an example of the dynamic range in the secondary transformation.

FIG. 39 is a diagram illustrating an example of a permutation δi pseudo code.

FIG. 40 is a diagram illustrating an example of permutation δi in a case of 32-points HyGT.

FIG. 41 is a diagram describing an example of a situation of the permutation δi in the case of the 32-points HyGT.

FIG. 43 is a diagram illustrating an example of the permutation δi in a case of 64-points HyGT.

FIG. 48 is a diagram describing comparison results of separable 64-points HyGT and non-separable 64-points HyGT.

FIG. 63 is a diagram illustrating an example of syntax of a sequence parameter set.

FIG. 64 is a diagram illustrating an example of syntax of Residual Coding.

FIG. 65 is a diagram illustrating an example of syntax of a sequence parameter set.

FIG. 66 is a diagram illustrating an example of syntax of Residual Coding.

FIG. 82 is a flow chart describing an example of a flow of an inverse SDT process.

FIG. 91 is a block diagram illustrating an example of a schematic configuration of a network system.

DESCRIPTION OF EMBODIMENTS

Hereinafter, modes for carrying out the present disclosure (hereinafter, referred to as embodiments) will be described. Note that the embodiments will be described in the following order.
1. First Embodiment (Clip of Transformation Coefficients)
2. Second Embodiment (Control of Amount of Bit Shift in Norm Normalization)
3. Third Embodiment (Decomposition of Matrix Computation)
4. Fourth Embodiment (Another Expression of 16-Points HyGT)
5. Fifth Embodiment ($2^N$-Points HyGT)
6. Sixth Embodiment (64-Points HyGT)
7. Seventh Embodiment (Block Partitioning)
8. Eighth Embodiment (Selection of Sub-Block)
9. Ninth Embodiment (Application to SDT)
10. Tenth Embodiment (Etc.)

1. First Embodiment

<Block Partitioning>

An encoding process is executed based on a processing unit called a macroblock in a known image encoding system, such as MPEG2 (Moving Picture Experts Group 2 (ISO/IEC 13818-2)) and MPEG-4 Part10 (Advanced Video Coding, hereinafter referred to as AVC). The macroblock is a block in a uniform size of 16×16 pixels. On the other hand, the encoding process is executed based on a processing unit (encoding unit) called a CU (Coding Unit) in HEVC (High Efficiency Video Coding). The CU is a block in a variable size formed by recursively partitioning an LCU (Largest Coding Unit) that is a largest encoding unit. The largest selectable size of the CU is 64×64 pixels. The smallest selectable size of the CU is 8×8 pixels. The CU in the smallest size is called an SCU (Smallest Coding Unit). Note that the largest size of the CU is not limited to 64×64 pixels, and the block size may be larger, such as 128×128 pixels and 256×256 pixels.

In this way, as a result of adopting the CU in a variable size, the image quality and the encoding efficiency can be adaptively adjusted in the HEVC according to the content of the image. A prediction process for prediction encoding is executed based on a processing unit (prediction unit) called a PU (Prediction Unit). The PU is formed by using one of some partitioning patterns to partition the CU. In addition, the PU includes processing units (prediction blocks) called PBs (Prediction Blocks) for each luminance (Y) and color difference (Cb, Cr). Furthermore, an orthogonal transformation process is executed based on a processing unit (transformation unit) called a TU (Transform Unit). The TU is formed by partitioning the CU or the PU up to a certain depth. In addition, the TU includes processing units (transformation blocks) called TBs (Transform Blocks) for each luminance (Y) and color difference (Cb, Cr).

<Recursive Partitioning of Blocks>

Figure 1:
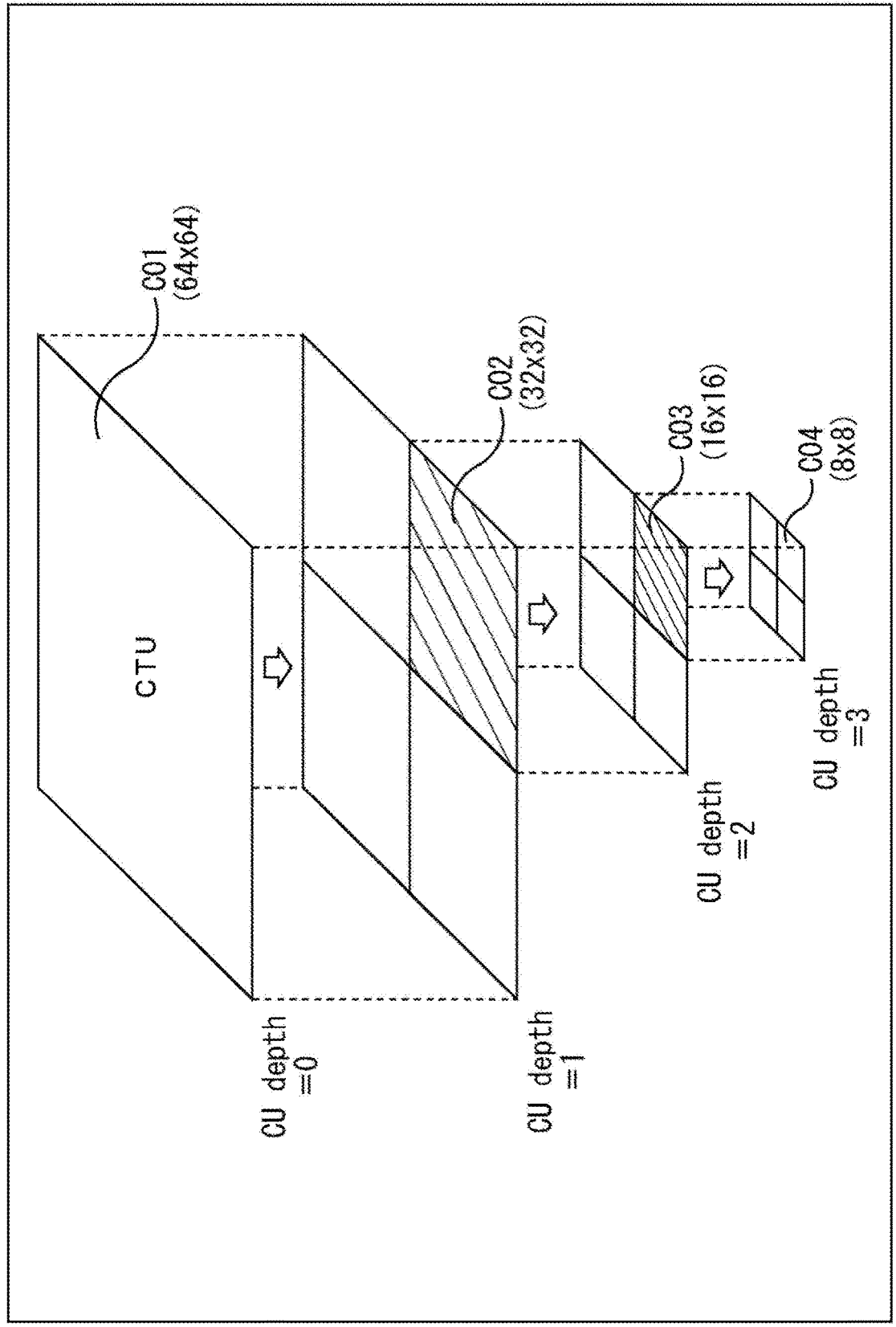
FIG. 1 is an explanatory diagram for describing an overview of recursive block partitioning regarding CU.

FIG. 1 is an explanatory diagram for describing an overview of recursive block partitioning regarding the CU in the HEVC. The block partitioning of the CU is performed by recursively repeating the partitioning of one block into four (=2×2) sub-blocks, and as a result, a tree structure in a quad-tree shape is formed. One quad-tree as a whole is called a CTB (Coding Tree Block), and a logical unit corresponding to the CTB is called a CTU (Coding Tree Unit).

In the upper part of FIG. 1, an example of C01 as a CU in a size of 64×64 pixels is illustrated. The depth of partitioning of C01 is equal to zero. This indicates that C01 is a root of the CTU and is equivalent to the LCU. The LCU size can be designated by a parameter encoded in an SPS (Sequence Parameter Set) or a PPS (Picture Parameter Set). C02 as a CU is one of the four CUs partitioned from C01 and has a size of 32×32 pixels. The depth of partitioning of C02 is equal to 1. C03 as a CU is one of the four CUs partitioned from C02 and has a size of 16×16 pixels. The depth of partitioning of C03 is equal to 2. C04 as a CU is one of the four CUs partitioned from C03 and has a size of 8×8 pixels. The depth of partitioning of C04 is equal to 3. In this way, the CU can be formed by recursively partitioning the image to be encoded. The depth of partitioning is variable. For example, a CU in a larger size (that is, with a smaller depth) can be set for a flat image region such as a blue sky. On the other hand, a CU in a smaller size (that is, with a larger depth) can be set for a sharp image region including a large number of edges. In addition, each of the set CUs serves as a processing unit of the encoding process.

<Setting of PU for CU>

Figure 2:
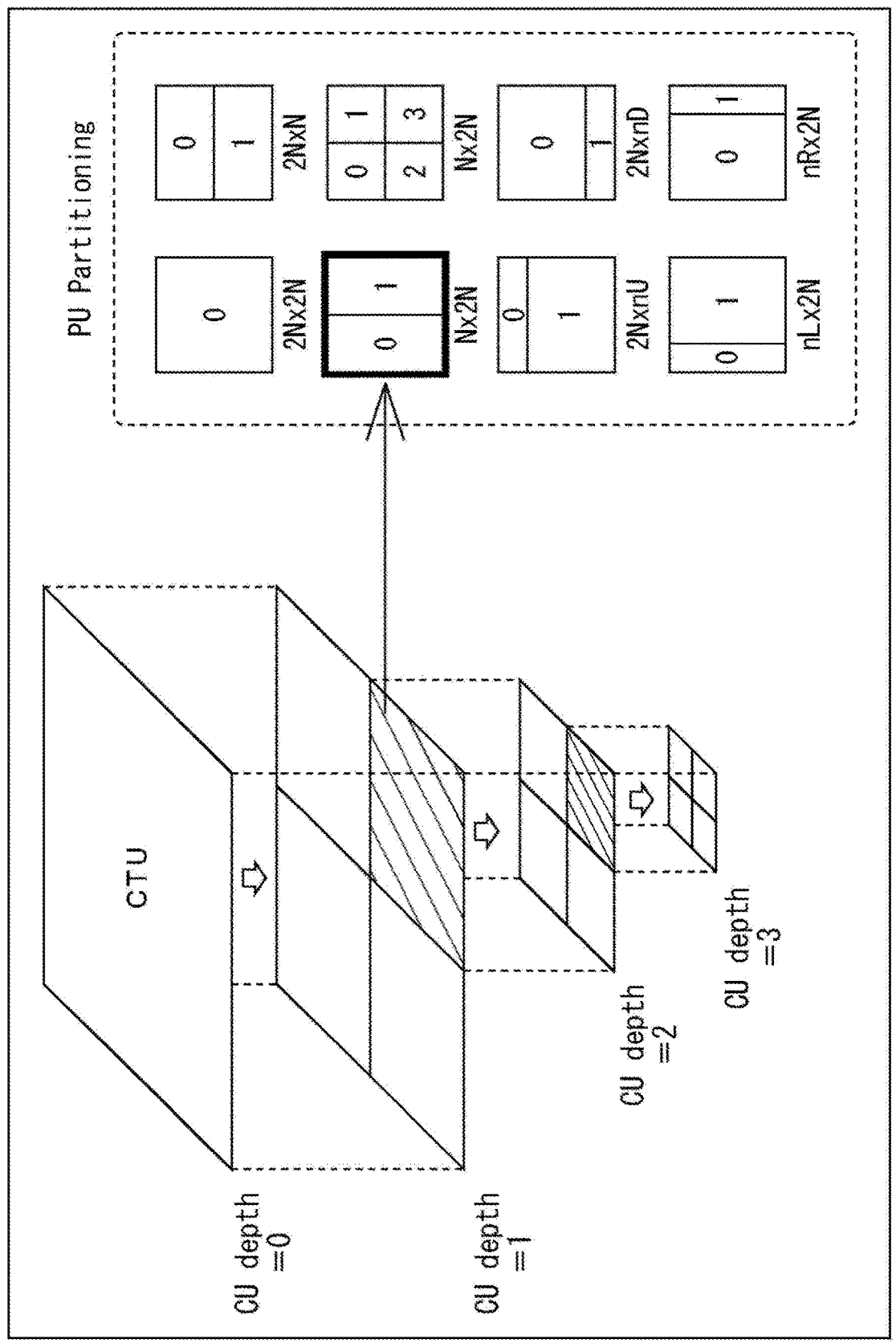
FIG. 2 is an explanatory diagram for describing setting of PU for the CU illustrated in FIG. 1.

The PU is a processing unit of the prediction process including intra prediction and inter prediction. The PU is formed by using one of some partitioning patterns to partition the CU. FIG. 2 is an explanatory diagram for describing the setting of the PU for the CU illustrated in FIG. 1. Eight types of partitioning patterns are illustrated on the right of FIG. 2 including 2N×2N, 2N×N, N×2N, N×N, 2N×nU, 2N×nD, nL×2N, and nR×2N. Two types of partitioning patterns, that is, 2N×2N and N×N, can be selected in the intra prediction (N×N can be selected only for SCU). On the other hand, all of the eight types of partitioning patterns can be selected in the inter prediction in a case where asymmetric motion partitioning is validated.

<Setting of TU for CU>

Figure 3:
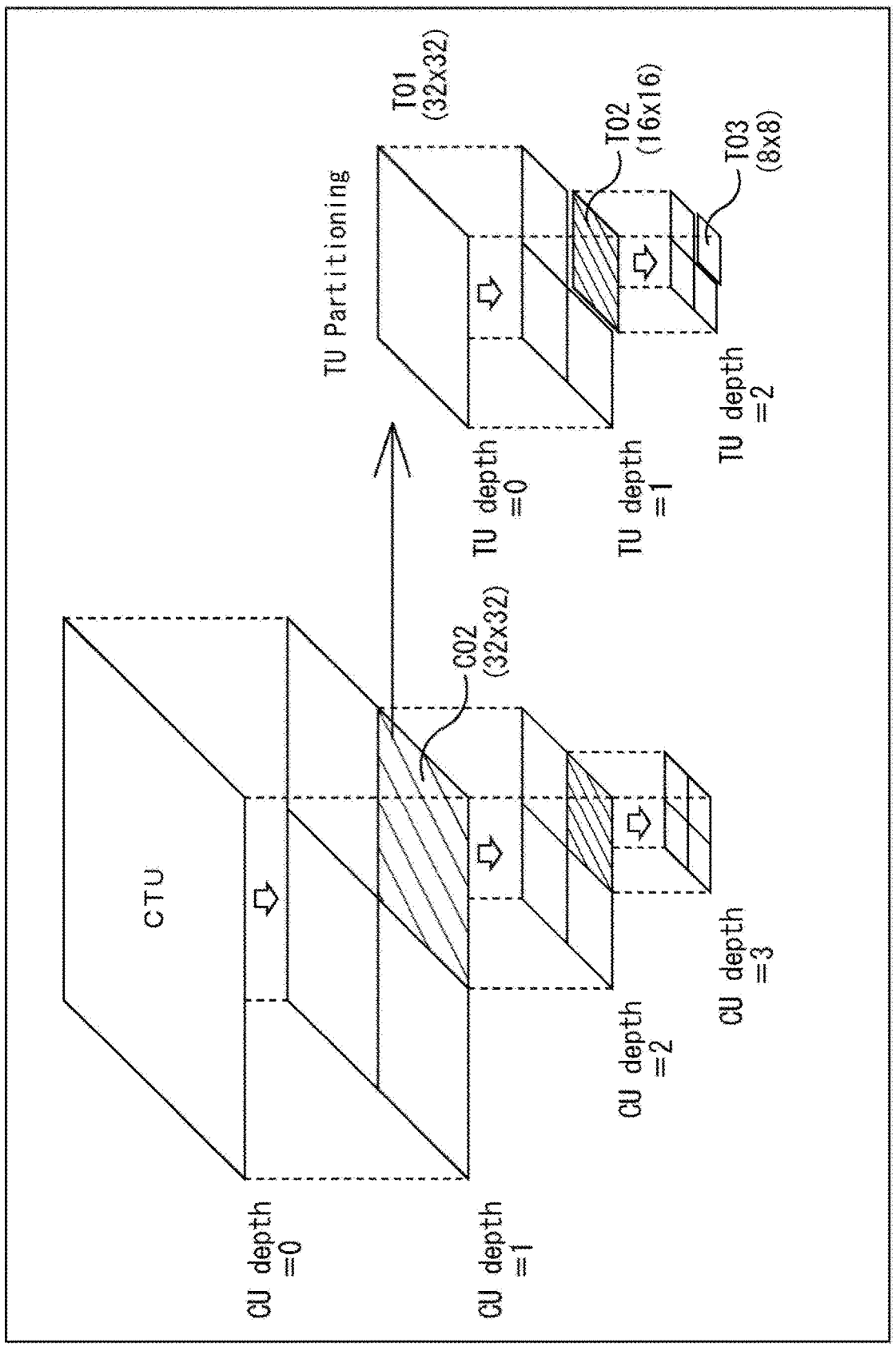
FIG. 3 is an explanatory diagram for describing setting of TU for the CU illustrated in FIG. 1.

The TU is a processing unit of the orthogonal transformation process. The TU is formed by partitioning the CU (for intra CU, each PU in the CU) up to a certain depth. FIG. 3 is an explanatory diagram for describing the setting of the TU for the CU illustrated in FIG. 2. One or more TUs that can be set for C02 are illustrated on the right of FIG. 3. For example, T01 as a TU has a size of 32×32 pixels, and the depth of the TU partitioning is equal to zero. T02 as a TU has a size of 16×16 pixels, and the depth of the TU partitioning is equal to 1. T03 as a TU has a size of 8×8 pixels, and the depth of the TU partitioning is equal to 2.

What kind of block partitioning is to be performed to set the blocks, such as the CU, the PU, and the TU, in the image is typically decided based on comparison of the costs that affect the encoding efficiency. For example, an encoder compares the costs between one CU with 2M×2M pixels and four CUs with M×M pixels, and if the encoding efficiency in setting four CUs with M×M pixels is higher, the encoder decides to partition the CU with 2M×2M pixels into four CUs with M×M pixels.

<Scan Order of CU and PU>

Figure 4:
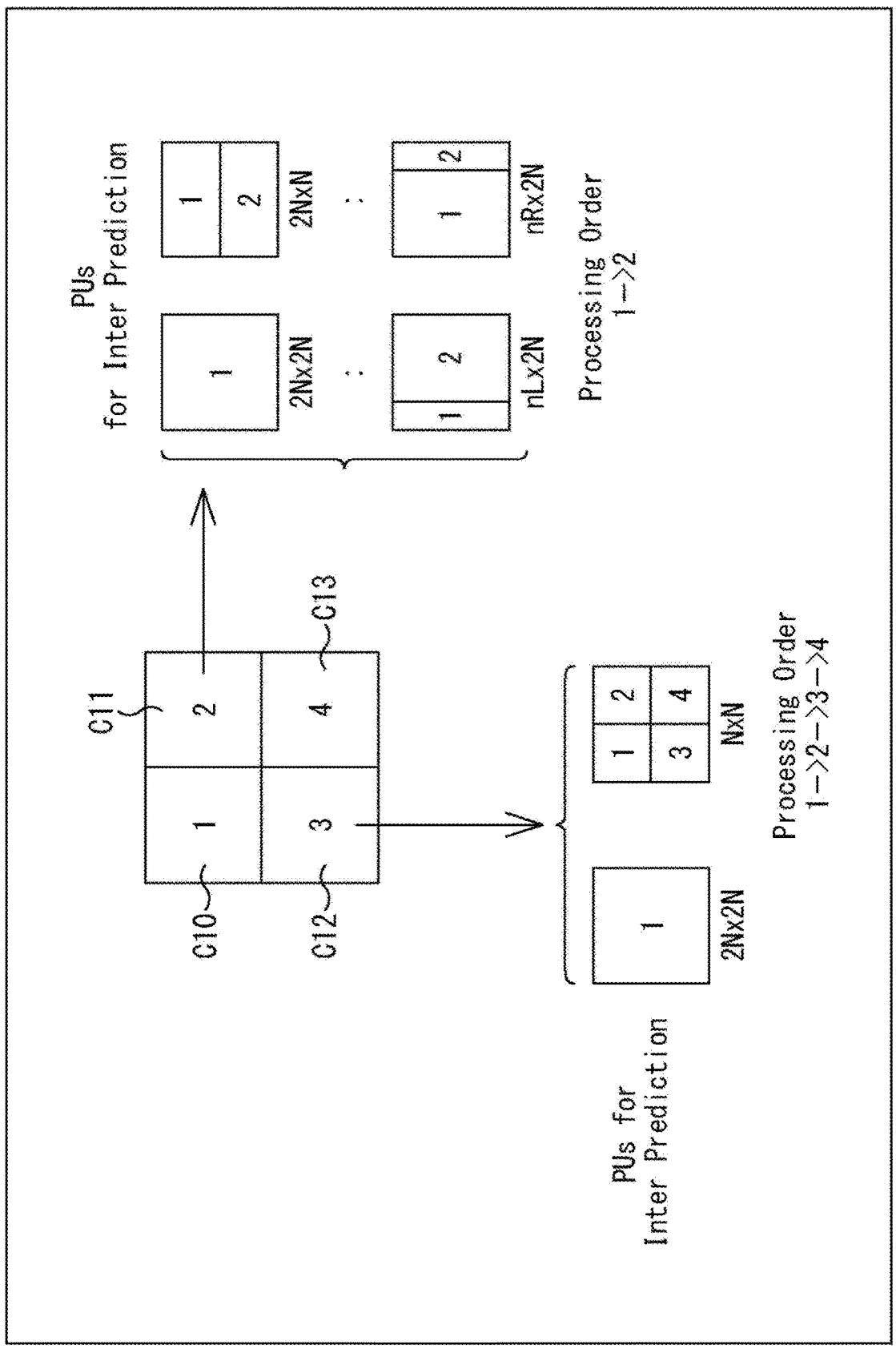
FIG. 4 is an explanatory diagram for describing a scan order of the CU/PU.

In encoding of an image, the CTBs (or LCUs) set in a grid pattern in the image (or slice or tile) are scanned in a raster scan order. In one CTB, the CUs are scanned from left to right and from top to bottom in the quad-tree. In processing of a current block, information of upper and left adjacent blocks is used as input information. FIG. 4 is an explanatory diagram for describing scanning orders of CUs and PUs. C10, C11, C12, and C13 as four CUs that can be included in one CTB are illustrated on the upper left of FIG. 4. The number in the frame of each CU expresses the processing order. The encoding process is executed in the order of C10 as a CU on the upper left, C11 as a CU on the upper right, C12 as a CU on the lower left, and C13 as a CU on the lower right. One or more PUs for inter prediction that can be set for C11 as a CU are illustrated on the right of FIG. 4. One or more PUs for intra prediction that can be set for C12 as a CU are illustrated at the bottom of FIG. 4. As indicated by the numbers in the frames of the PUs, the PUs are also scanned from left to right and from top to bottom.

In the following description, a "block" will be used as a partial region or a processing unit of an image (picture) in some cases (not a block of processing section). The "block" in this case indicates an arbitrary partial region in the picture, and the size, the shape, the characteristics, and the like are not limited. That is, the "block" in this case includes, for example, an arbitrary partial region (processing unit), such as TU, TB, PU, PB, SCU, CU, LCU (CTB), sub-block, macroblock, tile, and slice.

<Dynamic Range of Transformation Coefficients>

In NPL 1, a technique is disclosed in image encoding, in which after a primary transformation is applied to a predicted residual that is a difference between an image and a predicted image of the image, a secondary transformation is further applied to each sub-block in a transformation block in order to increase the energy compaction (concentrate transformation coefficients in a low-frequency region). In NPL1, it is also disclosed that a secondary transformation identifier indicating which secondary transformation is to be applied is signaled for each CU.

In NPL 2, a technique is disclosed in an encoder, in which because the calculation complexity is large in deciding which secondary transformation is to be applied for each CU described in NPL 1 based on RDO (Rate-Distortion Optimization), a secondary transformation flag indicating the secondary transformation to be applied is signaled for each transformation block. In NPL 2, it is also disclosed that a secondary transformation identifier indicating which secondary transformation is to be applied is derived based on a primary transformation identifier and an intra prediction mode.

However, in the methods described in NPL 1 and NPL 2, the precision of elements of each matrix of the secondary transformation is approximated at 9-bit precision. When a secondary transformation or an inverse secondary transformation is executed at this precision, the dynamic range of each signal after the secondary transformation or the inverse secondary transformation may exceed 16 bits. Therefore, there may be an increase in the load of encoding and decoding, such as an increase in the capacity necessary for an intermediate buffer for temporarily storing computation results after the secondary transformation or the inverse secondary transformation.

For example, the secondary transformation can be expressed as in the following Formula (1).

$$Y = T \cdot X^T \qquad (1)$$

In Formula (1), T denotes a matrix of 16×16, and X denotes 1×16 one-dimensional vector. The range of value of each element of X is [−A, A−1]

In this case, an upper limit MaxVal of the dynamic range of each element of Y in Formula (1) is expressed as in the following Formula (2).

[Math. 1]

$$\mathrm{MaxVal} = \max_r \{\Sigma_i |T_{r,i}|\} \cdot A \qquad 2)$$

In Formula (2), r denotes a row vector, and i denotes an ith element of the row vector r. That is, focusing on a certain row vector r of the matrix T, the row vector r with the largest sum of absolute values of all elements of the row vector and with the largest upper limit of the range of X is the upper limit of the dynamic range of Formula (1). Similarly, the lower limit is −MaxVal.

Figure 5:
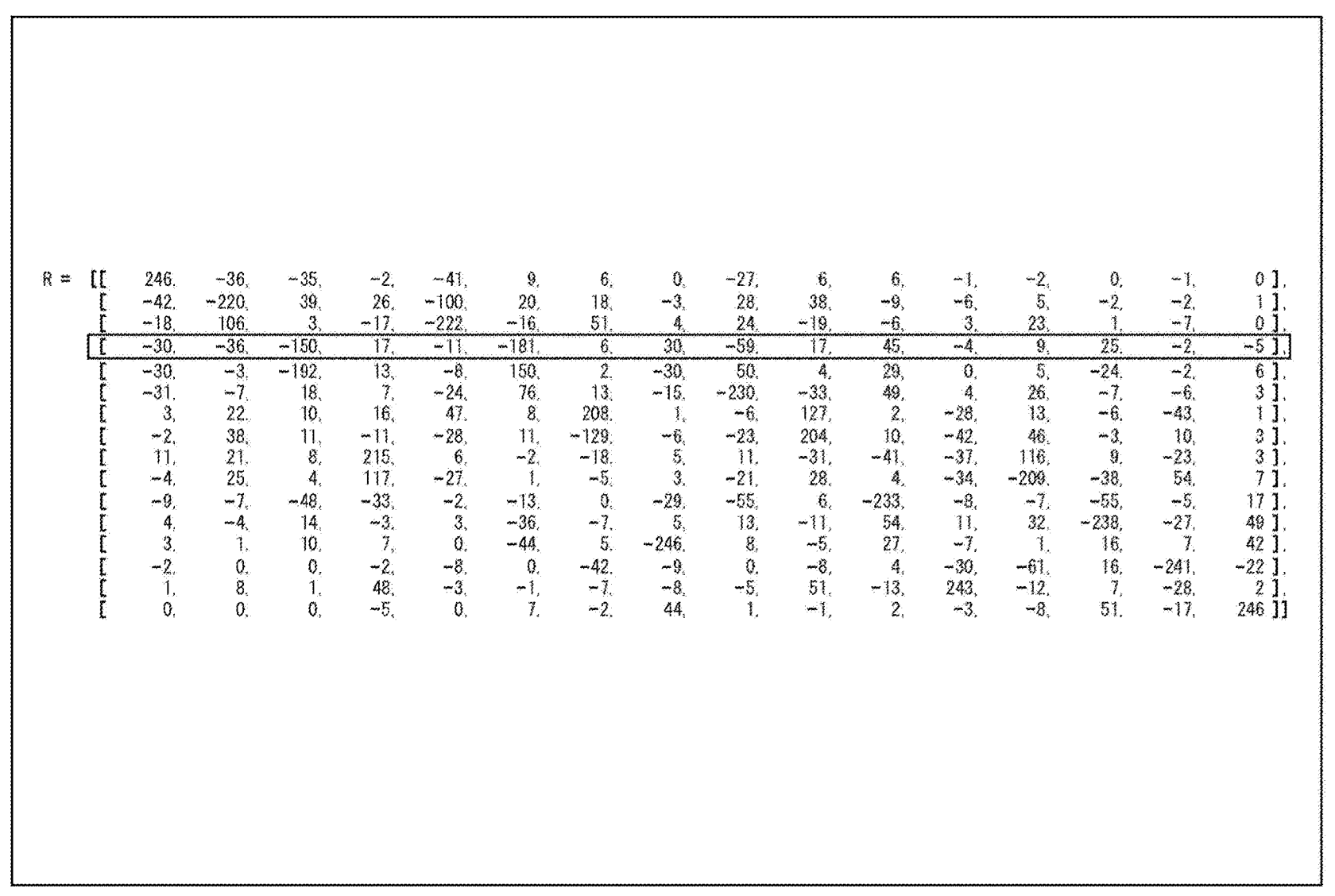

For example, it is assumed that a matrix R as illustrated in FIG. 5 is used for the matrix computation performed in the secondary transformation. In this case, the sum of absolute values of all elements in the row vector r of R is the largest at r=3 (row vector surrounded by a rectangle in FIG. 5). At this time, the sum of absolute values is 627 as indicated in the following Formula (3).

[Math. 2]

$$\max_r \{\Sigma_i |T_{r,i}|\} = 627 \qquad (3)$$

The dynamic range in the secondary transformation according to the method described in NPL 1 is as in a table illustrated in FIG. 6. As illustrated in the table, the coefficients after the operation (norm normalization) of Coeff>>8 or Coeff_P>>8 may exceed $2^{15}$.

In this way, when the dynamic range exceeds 16 bits, the intermediate buffer size of 16 bits is insufficient. Therefore, the size needs to be 32 bits, and this may increase the cost. In this way, there may be an increase in the load of encoding and decoding in the methods described in NPL 1 and NPL 2.

<Clip of Transformation Coefficients>

Therefore, one or both a predetermined upper limit and a predetermined lower limit are used to clip the transformation coefficients. In this way, the increase in the dynamic range width of the transformation coefficients can be suppressed, and the increase in the load of encoding and decoding can be suppressed.

<Image Encoding Apparatus>

Figure 7:
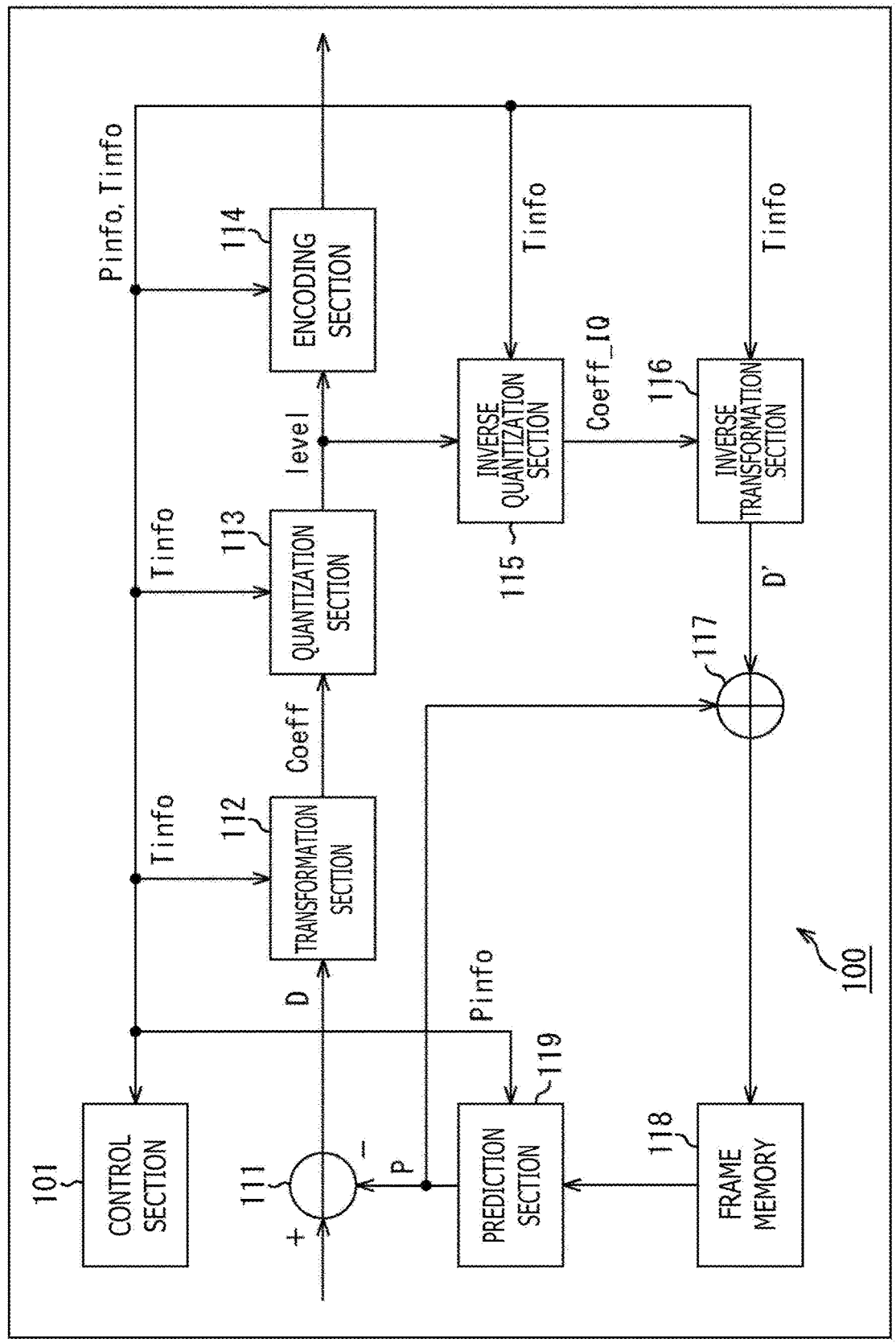
FIG. 7 is a block diagram illustrating a main configuration example of an image encoding apparatus.

FIG. 7 is a block diagram illustrating an example of a configuration of an image encoding apparatus according to an aspect of the image processing apparatus of the present technique. An image encoding apparatus 100 illustrated in FIG. 7 is an apparatus that encodes a predicted residual between an image and a predicted image of the image as in the AVC and the HEVC. For example, the image encoding apparatus 100 is provided with the technique proposed in the HEVC and the technique proposed in the JVET (Joint Video Exploration Team).

Note that FIG. 7 illustrates main processing sections, flows of data, and the like, and FIG. 7 may not illustrate everything. That is, the image encoding apparatus 100 may include a processing section not illustrated as a block in FIG. 7 and may include a flow of process or data not indicated by an arrow or the like in FIG. 7.

As illustrated in FIG. 7, the image encoding apparatus 100 includes a control section 101, a computation section 111, a transformation section 112, a quantization section 113, an encoding section 114, an inverse quantization section 115, an inverse transformation section 116, a computation section 117, a frame memory 118, and a prediction section 119.

Based on the block size of the processing unit designated from the outside or designated in advance, the control unit 101 partitions a moving image input to the image encoding apparatus 100 into blocks of the processing unit (such as CUs, PUs, and transformation blocks (TBs)) and supplies an image I corresponding to the partitioned blocks to the computation section 111. The control section 101 also decides encoding parameters (such as header information Hinfo, prediction mode information Pinfo, and transformation information Tinfo) to be supplied to each block based on, for example, ROD (Rate-Distortion Optimization). The decided encoding parameters are supplied to each block.

The header information Hinfo includes, for example, information, such as a video parameter set (VPS), a sequence parameter set (SPS), a picture parameter set (PPS), and a slice header (SH). For example, the header information Hinfo includes information defining an image size (width PicWidth, height PicHeight), a bit width (luminance bitDepthY, color difference bitDepthC), a maximum value MaxCUSize/a minimum value MinCUSize of the CU size, a maximum value MaxTBSize/a minimum value MinTBSize of the transformation block size, a maximum value MaxTSSize of a transformation skip block (also referred to as maximum transformation skip block size), an on/off flag of each encoding tool (also referred to as valid flag), and the like. Obviously, the content of the header information Hinfo is arbitrary, and any information other than the examples described above may be included in the header information.

The prediction mode information Pinfo includes, for example, a PU size PUSize that is information indicating the PU size (predicted block size) of the PU to be processed, intra prediction mode information IPinfo that is information regarding the intra prediction mode of the block to be processed (for example, prev_intra_luma_pred_flag, mpm_idx, rem_intra_pred_mode, and the like in JCTVC-W1005, 7.3.8.5 Coding Unit syntax), motion prediction information MVinfo that is information regarding the motion prediction of the block to be processed (for example, merge_idx, merge_flag, inter_pred_idc, ref_idx_LX, mvp_lX_flag, X={0,1}, mvd, and the like in JCTVC-W1005, 7.3.8.6 Prediction Unit Syntax), and the like. Obviously, the content of the prediction mode information Pinfo is arbitrary, and any information other than the examples described above may be included in the prediction mode information Pinfo.

The transformation information Tinfo includes, for example, the following information.

A block size TBSize (or also referred to as logarithm log 2TBSize of TBSize with 2 as a base, or transformation block size) is information indicating the block size of the transformation block to be processed.

A secondary transformation identifier (st_idx) is an identifier (for example, see JVET-B1001, 2.5.2 Secondary Transforms, also called nsst_idx, rot_idx in JEM2) indicating which secondary transformation or inverse secondary transformation (also referred to as secondary transformation (inverse)) is to be applied in the target data unit. In other words, the secondary transformation identifier is information regarding the content of the secondary transformation (inverse) in the target data unit.

For example, the secondary transformation identifier st_idx is an identifier designating the matrix of the secondary transformation (inverse) in a case where the value is greater than 0. In other words, the secondary transformation identifier st_idx indicates to execute the secondary transformation (inverse) in this case. In addition, for example, the secondary transformation identifier st_idx indicates to skip the secondary transformation (inverse) in the case where the value is 0.

A scan identifier (scanIdx) is information regarding the scan method. A quantization parameter (qp) is information indicating the quantization parameter used for the quantization (inverse) in the target data unit. A quantization matrix (scaling_matrix) is information indicating the quantization matrix used for the quantization (inverse) in the target data unit (for example, JCTVC-W1005, 7.3.4 Scaling list data syntax).

Obviously, the content of the transformation information Tinfo is arbitrary, and any information other than the examples described above may be included in the transformation information Tinfo.

The header information Hinfo is supplied to, for example, each block. The prediction mode information Pinfo is supplied to, for example, the encoding section 114 and the prediction section 119. The transmission information Tinfo is supplied to, for example, the transformation section 112, the quantization section 113, the encoding section 114, the inverse quantization section 115, and the inverse transformation section 116.

The computation section 111 subtracts a predicted image P supplied from the prediction section 119 from the image I corresponding to the blocks of the input processing unit as indicated in Formula (4) to obtain a predicted residual D and supplies the predicted residual D to the transformation section 112.

$$D = I - P \tag{4}$$

The transformation section 112 applies a transformation process to the predicted residual D supplied from the computation section 111 based on the transformation information Tinfo supplied from the control section 101 to derive transformation coefficients Coeff. The transformation section 112 supplies the transformation coefficients Coeff to the quantization section 113.

The quantization section 113 scales (quantizes) the transformation coefficients Coeff supplied from the transformation section 112 based on the transformation information Tinfo supplied from the control section 101. That is, the quantization section 113 quantizes the transformation coefficients Coeff subjected to the transformation process. The quantization section 113 supplies the quantized transformation coefficients obtained by the quantization, that is, a quantized transformation coefficient level "level," to the encoding section 114 and the inverse quantization section 115.

The encoding section 114 uses a predetermined method to encode the quantized transformation coefficient level "level" and the like supplied from the quantization section 113. For example, the encoding section 114 transforms the encoding parameters (such as the header information Hinfo, the prediction mode information Pinfo supplied from the control section 101, and the transformation information Tinfo) and the quantized transformation coefficient level "level" supplied from the quantization section 113 into syntax values of each syntax element according to the definition of the syntax table and encodes (for example, arithmetic coding) the syntax values to generate bit strings (encoded data).

The encoding section 114 also derives residual information RInfo from the quantized transformation coefficient level "level" and encodes the residual information RInfo to generate bit strings (encoded data).

The residual information RInfo includes, for example, a last non-zero coefficient X coordinate (last_sig_coeff_x_pos), a last non-zero coefficient Y coordinate (last_sig_coeff_y_pos), a sub-clock non-zero coefficient presence/absence flag (coded_sub_block_flag), a non-zero coefficient presence/absence flag (sig_coeff_flag), a GR1 flag (gr1_flag) that is flag information indicating whether the level of the non-zero coefficient is greater than 1, a GR2 flag (gr2_flag) that is flag information indicating whether the level of the non-zero coefficient is greater than 2, a sign code (sign_flag) that is a code indicating positive or negative of the non-zero coefficient, a non-zero coefficient remaining level (coeff_abs_level_remaining) that is information indicating the remaining level of the non-zero coefficient, and the like (for example, see 7.3.8.11 Residual Coding syntax of JCTV C-W1005). Obviously, the content of the residual information RInfo is arbitrary, and any information other than the examples described above may be included in the residual information RInfo.

The encoding section 114 multiplexes the bit strings (encoded data) of the encoded syntax elements and outputs a bitstream, for example.

The inverse quantization section 115 scales (inverse quantization) the value of the quantized transformation coefficient level "level" supplied from the quantization section 113 based on the transformation information Tinfo supplied from the control section 101 and derives transformation coefficients Coeff_IQ after the inverse quantization. The inverse quantization section 115 supplies the transformation coefficients Coeff_IQ to the inverse transformation section 116. The inverse quantization performed by the inverse quantization section 115 is an opposite process of the quantization performed by the quantization section 113, and the process is similar to inverse quantization performed by an image decoding apparatus described later. Therefore, the inverse quantization will be described later in the description regarding the image decoding apparatus.

The inverse transformation section 116 applies an inverse transformation to the transformation coefficients Coeff_IQ supplied from the inverse quantization section 115 based on the transformation information Tinfo supplied from the control section 101 and derives a predicted residual D'. The inverse transformation section 116 supplies the predicted residual D' to the computation section 117. The inverse transformation performed by the inverse transformation section 116 is an opposite process of the transformation performed by the transformation section 112, and the process is similar to the invers transformation performed by the image decoding apparatus described later. Therefore, the inverse transformation will be described later in the description regarding the image decoding apparatus.

The computation section 117 adds the predicted residual D' supplied from the inverse transformation section 116 and the predicated image P (predicted signal) corresponding to the predicted residual D' supplied from the prediction section 119 as in the following Formula (5) to derive a local decoded image Rec. The computation section 117 supplies the local decoded image Rec to the frame memory 118.

$$Rec=D'+P \qquad (5)$$

The frame memory 118 uses the local decoded image Rec supplied from the computation section 117 to reconstruct the picture-based decoded image and stores the decoded image in a buffer of the frame memory 118. The frame memory 118 reads, as a reference image, the decoded image designated by the prediction section 119 from the buffer and supplies the reference image to the prediction section 119. The frame memory 118 may also store, in the buffer of the frame memory 118, the header information Hinfo, the prediction mode information Pinfo, the transformation information Tinfo, and the like regarding the generation of the decoded image.

The prediction section 119 acquires, as a reference image, the decoded image designated by the prediction mode information PInfo and stored in the frame memory 118 and uses the reference image to generate the predicted image P based on the prediction method designated by the prediction mode information Pinfo. The prediction section 119 supplies the generated predicted image P to the computation section 111 and the computation section 117.

The image encoding apparatus 100 is provided with a clip processing section that uses one of a predetermined upper limit and a predetermined lower limit to clip transformation coefficients obtained by applying a transformation process to a predicted residual that is a difference between an image and a predicted image of the image. That is, the transformation section 112 uses one or both the predetermined upper limit and the predetermined lower limit to clip the transformation coefficients obtained by applying the transformation process to the predicted residual that is the difference between the image and the predicted image of the image.

<Transformation Section>

Figure 8:
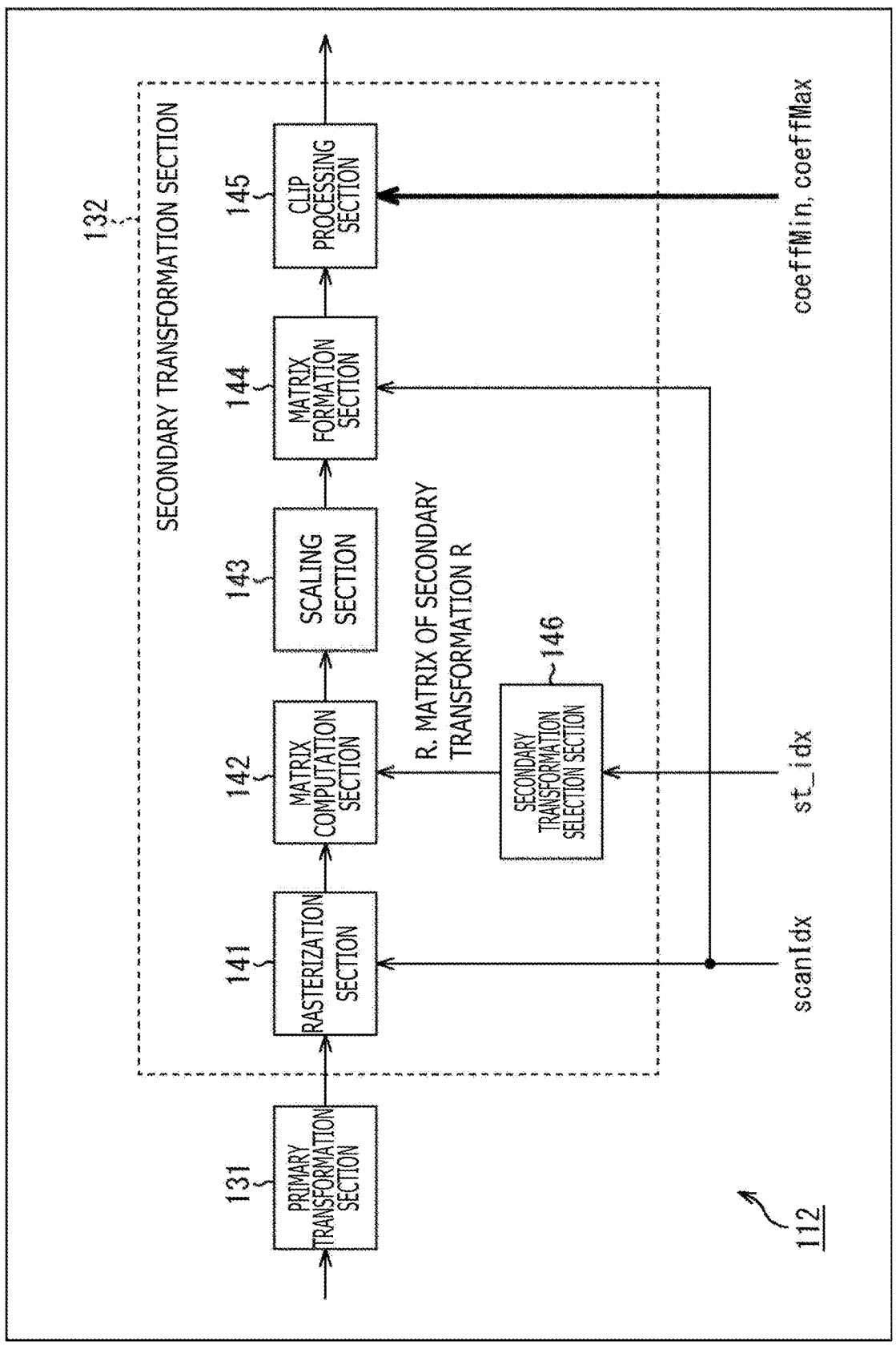
FIG. 8 is a block diagram illustrating a main configuration example of a transformation section.

FIG. 8 is a block diagram illustrating a main configuration example of the transformation section 112. In FIG. 8, the transformation section 112 includes a primary transformation section 131 and a secondary transformation section 132.

The primary transformation section 131 applies, for example, a primary transformation, such as an orthogonal transformation, to the predicted residual D supplied from the computation section 111 and derives transformation coefficients Coeff_P (also referred to as primary transformation coefficients) after the primary transformation corresponding to the predicted residual D. That is, the primary transformation section 131 transforms the predicted residual D into the primary transformation coefficients Coeff_P. The primary transformation section 131 supplies the derived primary transformation coefficients Coeff_P to the secondary transformation section 132.

The secondary transformation section 132 performs a secondary transformation that is a transformation process of transforming the primary transformation coefficients Coeff_P supplied from the primary transformation section 131 into a one-dimensional vector, performing matrix computation of the one-dimensional vector, scaling the one-dimensional vector subjected to the matrix computation, and forming a matrix of the scaled one-dimensional vector.

The secondary transformation section 132 performs the secondary transformation of the primary transformation coefficients Coeff_P based on the secondary transformation identifier st_idx that is information regarding the content of the secondary transformation and the scan identifier scanIdx that is information regarding the scan method of the transformation coefficients and derives transformation coefficients Coeff (also referred to as secondary transformation coefficients) after the secondary transformation. That is, the secondary transformation section 132 transforms the primary transformation coefficients Coeff_P into the secondary transformation coefficients Coeff.

As illustrated in FIG. 8, the secondary transformation section 132 includes a rasterization section 141, a matrix computation section 142, a scaling section 143, a matrix formation section 144, a clip processing section 145, and a secondary transformation selection section 146.

Based on the scan method of the transformation coefficients designated by the scan identifier scanIdx, the rasterization section 141 transforms the primary transformation coefficients Coeff_P supplied from the primary transformation section 131 into a 1×16-dimensional vector $X_{1d}$ for each sub-block (4×4 sub-block). The rasterization section 141 supplies the obtained vector $X_{1d}$ to the matrix computation section 142.

The secondary transformation selection section 146 reads, from an internal memory (not illustrated) of the secondary transformation selection section 146, the matrix R of the secondary transformation designated by the secondary transformation identifier st_idx and supplies the matrix R to the matrix computation section 142. For example, the secondary transformation selection section 146 reads, as the secondary transformation, the 16×16 matrix R illustrated in FIG. 5 when the secondary transformation identifier st_idx is a certain value and supplies the matrix R to the matrix computation section 142.

Note that the secondary transformation selection section 146 may select the secondary transformation R according to the secondary transformation identifier st_idx and the intra prediction mode information IPinfo (for example, prediction mode number). The secondary transformation selection section 146 may also select the transformation R according to the motion prediction information MVinfo, in place of the intra prediction mode information IPinfo, and the secondary transformation identifier st_idx.

The matrix computation section 142 uses the one-dimensional vector $X_{1d}$ and the matrix of the secondary transformation R to perform matrix computation as indicated in the following Formula (6) and supplies a result $Y_{1d}$ of the matrix computation to the scaling section 143. Here, an operator "T" represents an operation of a transposed matrix.

$$Y_{1d}{}^T = R \cdot X_{1d} \qquad (6)$$

The scaling section 143 performs bit shift computation of N (N is a natural number) bits as indicated in the following Formula (7) to normalize the norm of the signal $Y_{1d}$ supplied from the matrix computation section 142 and obtains a signal $Z_{1d}$ after the bit shift.

$$Z_{1d} = (Y_{1d}) \gg N \qquad (7)$$

Note that a value $1 \ll (N-1)$ as an offset may be added to each element of the signal $Z_{1d}$ before the shift computation of N bits as in the following Formula (8).

$$Z_{1d} = (Y_{1d} + ((N-1) \ll 1) \cdot E) \gg N \qquad (8)$$

Note that in Formula (8), E denotes a 1×16-dimensional vector in which the values of all the elements are 1. For example, the matrix of the secondary transformation R illustrated in FIG. 5 is a matrix subjected to 8-bit scaling, and the value of N used by the scaling section 143 to normalize the norm is 8. In a case where the matrix R of the secondary transformation is subjected to N-bit scaling, the amount of bit shift of the norm normalization is generally N bits. The scaling section 143 supplies the signal $Z_{1d}$ obtained in this way to the matrix formation section 144.

The matrix formation section 144 transforms the 1×16 dimensional vector $Z_{1d}$ after the norm normalization into a 4×4 matrix based on the scan method designated by the scan identifier scanIdx. The matrix formation section 144 supplies the obtained transformation coefficients Coeff to the clip processing section 145.

The clip processing section 145 receives the transformation coefficients Coeff of the 4×4 matrix and a maximum value CoeffMax and a minimum value CoeffMin of the transformation coefficients. The clip processing section 145 uses the maximum value CoeffMax and the minimum value CoeffMin of the transformation coefficients as in the following Formula (9) to apply a clip process to each element Coeff(i,j) (i=0 . . . 3, j=0 . . . 3) of the transformation coefficients Coeff of the 4×4 matrix supplied from the matrix formation section 144.

$$\text{Coeff}(i,j) = \text{Clip3}(\text{CoeffMin}, \text{CoeffMax}, \text{Coeff}(i,j)) \qquad (9)$$

Here, an operator Clip3 (Xmin, Xmax, X) is a clip process of returning a value of Xmin in a case where an input value X is smaller than Xmin, returning Xmax in a case where the input value X is greater than Xmax, and returning the input value X in the other cases. Clip3 can also be expressed as in the following Formula (10) by using Min (x,y) and Max(x,y).

$$\text{Clip3}(X\text{min}, X\text{max}, X) = \text{Min}(X\text{min}, \text{Max}(X\text{max}, X)) = \text{Max}(X\text{max}, \text{Min}(X\text{min}, X)) \qquad (10)$$

Note that it is desirable that the values of the maximum value CoeffMax and the minimum value CoeffMin of the transformation coefficients be as follows at 16-bit precision.

$$\text{CoeffMax} = 2^{15} - 1 = 32767$$

$$\text{CoeffMin} = -2^{15} = -32768$$

Note that the precision of the maximum value CoeffMax and the minimum value CoeffMin of the transformation coefficients is not limited to the 16-bit precision, and in general, the precision may be an integer multiple (M times (M>=1)) of 8 bits. In this case, the maximum value CoeffMax of the transformation coefficients is set to a value of 8*M−1, and the minimum value CoeffMin is set to −8*M.

$$\text{CoeffMax} = 8*M - 1$$

$$\text{CoeffMin} = -8*M$$

In addition, the maximum value CoeffMax and the minimum value CoeffMin of the transformation coefficients may be derived by the following Formulas (11) to (13) based on a bit depth BitDepth of the input signal and an extended computation precision flag extend_precision_processing_flag notified by the parameter set (such as SPS/PPS).

$$\text{MaxLog2} TrDynamicRange == \qquad (11)$$
$$\text{extended\_precision\_processing\_flag ? Max (15, } BitDepth + 6):15$$

$$Coeff\text{Max} = (1 \ll \text{MaxLog2} TrDynamicRange) - 1 \qquad (12)$$

$$Coeff\text{Min} = -1 \ll \text{MaxLog2} TrDynamicRnage) \qquad (13)$$

Here, the extended computation precision flag indicates to extend the precision of the transformation coefficients in a case where the value of the flag is 1 and indicates not to extend the precision of the transformation coefficients in a case where the value of the flag is 0. In the case where the value of the extended computation precision flag is 1 in Formula (11), a value of a sum of the bit depth BitDepth of the input signal and 6 is compared with 15, and the greater one is set as a variable MaxLog2TrDynamicRange.

For example, in a case where the bit depth BitDepth of the input signal is 10, the value of the variable MaxLog2-TrDnyamicRnage is 16. In the case of this example, the maximum value CoeffMax and the minimum value CoeffMin of the transformation coefficients are the following values according to Formula (12) and Formula (13). In this case, the precision of the transformation coefficients is 17 bits.

CoeffMax=(1<<16)−1=65535

CoeffMin=(−1<<16)=−65536

Similarly, in a case where the bit depth BitDepth of the input signal is 12, the value of the variable MaxLog2-TrDynamicRange is 22. In the case of this example, the maximum value CoeffMax and the minimum value CoeffMin of the transformation coefficients are the following values according to Formula (12) and Formula (13). In this case, the precision of the transformation coefficients is 23 bits.

CoeffMax=(1<<2)−1=4194303

CoeffMin=−(1<<22)=−4194304

In a case where the value of the extended computation precision flag is 0 in Formula (11), the value of the variable MaxLog2TrDynamicRange is set to 15. In this case, the maximum value CoeffMax and the minimum value CoeffMin of the transformation coefficients are the following values according to Formula (12) and Formula (13).

CoeffMax=(1<<15)−1=32767

CoeffMin=−(1<<15)=−32768

In this way, according to Formulas (11) to (13), the maximum value CoeffMax and the maximum value CoeffMin of the transformation coefficients can be decided based on the bit depth of the input signal and the extended computation precision flag. Particularly, in the case where the bit depth of the input signal is large (for example, 16 bits), the computation precision is insufficient when the precision of the transformation coefficients is 16 bits, and the encoding efficiency is reduced. Therefore, it is preferable to be able to control the computation precision of the transformation coefficients according to the bit depth of the input signal as described above.

The clip processing section 145 supplies, as secondary transformation coefficients, the transformation coefficients Coeff after the clip process to the quantization section 113.

That is, the clip processing section 145 applies the clip process to the secondary transformation coefficients Coeff, and the values are restricted to the range of the predetermined maximum value and minimum value. Therefore, the dynamic range width of the transformation coefficients can be suppressed within the predetermined range (for example, 16 bits), and the increase in the load of encoding can be suppressed. As a result, the increase in the size of the intermediate buffer that stores the transformation coefficients can be suppressed, and the increase in the cost can be suppressed.

<Flow of Image Encoding Process>

Next, examples of flows of processes executed by the image encoding apparatus 100 will be described. First, an example of a flow of an image encoding process will be described with reference to a flow chart of FIG. 9.

Once the image encoding process is started, the control section 101 executes an encoding control process to perform operations, such as partitioning the blocks and setting the encoding parameters, in step 3101.

In step S102, the prediction section 119 executes a prediction process to generate a predicted image in an optimal prediction mode or the like. For example, in the prediction process, the prediction section 119 performs intra prediction to generate a prediction image in an optimal intra prediction mode or the like, performs inter prediction to generate a predicted image in an optimal inter prediction mode or the like, and selects the optimal prediction mode from the modes based on a cost function value or the like.

In step S103, the computation section 111 computes the difference between the input image and the predicted image in the optimal mode selected in the prediction process of step S102. That is, the computation section 111 generates the predicted residual D between the input image and the predicted image. The amount of data of the predicted residual D obtained in this way is reduced compared to the original image data. Therefore, the amount of data can be compressed compared to the case where the image is encoded without change.

In step S104, the transformation section 112 applies a transformation process to the predicted residual D generated in the process of step S103 to derive the transformation coefficients Coeff. The details of the process of step S104 will be described later.

In step S105, the quantization section 113 quantizes the transformation coefficients Coeff obtained in the process of step S104 by performing an operation, such as using the quantization parameters calculated by the control section 101, and derives the quantized transformation coefficient level "level."

In step S106, the inverse quantization section 115 performs inverse quantization of the quantized transformation coefficient level "level" generated in the process of step S105 based on characteristics corresponding to the characteristics of the quantization in step S105 and derives the transformation coefficients Coeff_IQ.

In step S107, the inverse transformation section 116 uses a method corresponding to the transformation process of step S104 to perform an inverse transformation of the transformation coefficients Coeff_IQ obtained in the process of step S106 and derives the predicted residual D'. Note that the inverse transformation process is an opposite process of the transformation process of step S104, and the process is executed just like an inverse transformation process executed in an image decoding process described later. Therefore, the inverse transformation process will be described in the description of the decoding side.

In step S108, the computation section 117 adds the predicted image obtained in the prediction process of step S102 to the predicted residual D' derived in the process of step S107 to generate a locally decoded image.

In step S109, the frame memory 118 stores the locally decoded image obtained in the process of step S108.

In step S110, the encoding section 114 encodes the quantized transformation coefficient level "level" obtained in the process of step S105. For example, the encoding section 114 uses arithmetic coding or the like to encode the quantized transformation coefficient level "level" that is information regarding the image and generates encoded data. In this case, the encoding section 114 also encodes various encoding parameters (header information Hinfo, prediction mode information Pinfo, transformation information Tinfo). The encoding section 114 further derives the residual information RInfo from the quantized transformation coefficient level "level" and encodes the residual information RInfo. The encoding section 114 groups together the generated encoded data of various types of information and outputs a bitstream to the outside of the image encoding apparatus 100. The bitstream is transmitted to the decoding side through, for example, a transmission path or a recording medium.

Once the process of step S110 is finished, the image encoding process ends.

Note that the processing units of the processes are arbitrary and may not be the same. Therefore, the processes of the steps can be appropriately executed in parallel with processes of other steps or the like, or the processes can be executed by switching the processing order.

<Flow of Transformation Process>

Next, an example of a flow of the transformation process executed in step S104 of FIG. 9 will be described with reference to a flow chart of FIG. 10.

Once the transformation process is started, the primary transformation section 131 applies the primary transformation to the predicted residual D based on a primary transformation identifier pt_idx to derive the primary transformation coefficients Coeff_P in step S121.

In step S122, the secondary transformation section 132 determines whether the secondary transformation identifier st_idx indicates to apply the secondary transformation (st_idx>0). If the secondary transformation section 132 determines that the secondary transformation identifier st_idx is 0 (secondary transformation identifier st_idx indicates to skip the secondary transformation), the secondary transformation (process of steps S123 to S130) is skipped. The transformation process ends, and the process returns to FIG. 9. That is, the secondary transformation section 132 supplies the primary transformation coefficients Coeff_P as primary transformation coefficients Coeff_P to the quantization section 113.

In addition, if the secondary transformation section 132 determines that the secondary transformation identifier st_idx is greater than 0 (secondary transformation identifier st_idx indicates to execute the secondary transformation) in step S122, the process proceeds to step S123. The secondary transformation is executed in the process of steps S123 to S130.

In step S123, the secondary transformation selection section 146 selects the secondary transformation R designated by the secondary transformation identifier st_idx.

In step S124, the secondary transformation section 132 partitions the transformation block to be processed into sub-blocks and selects an unprocessed sub-block.

In step S125, the rasterization section 141 transforms the primary transformation coefficients Coeff_P into the 1×16-dimensional vector $X_{1d}$ based on the scan method designated by the scan identifier scanIdx.

In step S126, the matrix computation section 142 computes a matrix product of the vector $X_{1d}$ and the secondary transformation R to obtain the vector $Y_{1d}$.

In step S127, the scaling section 143 normalizes the norm of the vector $Y_{1d}$ to obtain the vector $Z_{1d}$.

In step S128, the matrix formation section 144 transforms the vector $Z_{1d}$ into a 4×4 matrix based on the scan method designated by the scan identifier scanIdx and obtains the secondary transformation coefficients Coeff of the sub-block to be processed.

In step S129, the clip processing section 145 uses the maximum value CoeffMax and the minimum value CoeffMin to apply the clip process to each element of the input secondary transformation coefficients Coeff of the sub-block to be processed. The secondary transformation coefficients Coeff are supplied to the quantization section 113.

In step S130, the secondary transformation section 132 determines whether all the sub-blocks of the transformation block to be processed are processed. If the secondary transformation section 132 determines that there is an unprocessed sub-block, the process returns to step S124, and the subsequent process is repeated. That is, each process of steps S124 to S130 (secondary transformation) is applied to each sub-block of the transformation block to be processed. If the secondary transformation section 132 determines that all the sub-blocks are processed (secondary transformation of all the sub-block is performed) in step S130, the transformation process ends, and the process returns to FIG. 9.

Note that in the transformation process, the processing order of the steps may be switched, or the details of the process may be changed within a possible range. For example, if it is determined that the secondary transformation identifier st_Idx is 0 in step S123, a 16×16 identity matrix may be selected as the secondary transformation R to execute each process of steps S124 to S130. In addition, the clip process of step S129 may be applied to the vector $Z_{1d}$ after the norm normalization of the vector $Y_{1d}$ derived in step S127, and then the process of matrix formation of step S128 may be executed.

As a result of the execution of each process, the dynamic range width of the transformation coefficients can be suppressed within a predetermined range (for example, 16 bits). That is, the increase in the load of encoding can be suppressed. In addition, this can suppress the increase in the size of the intermediate buffer that stores the transformation coefficients, and the increase in the cost can be suppressed.

<Image Decoding Apparatus>

Figure 11:
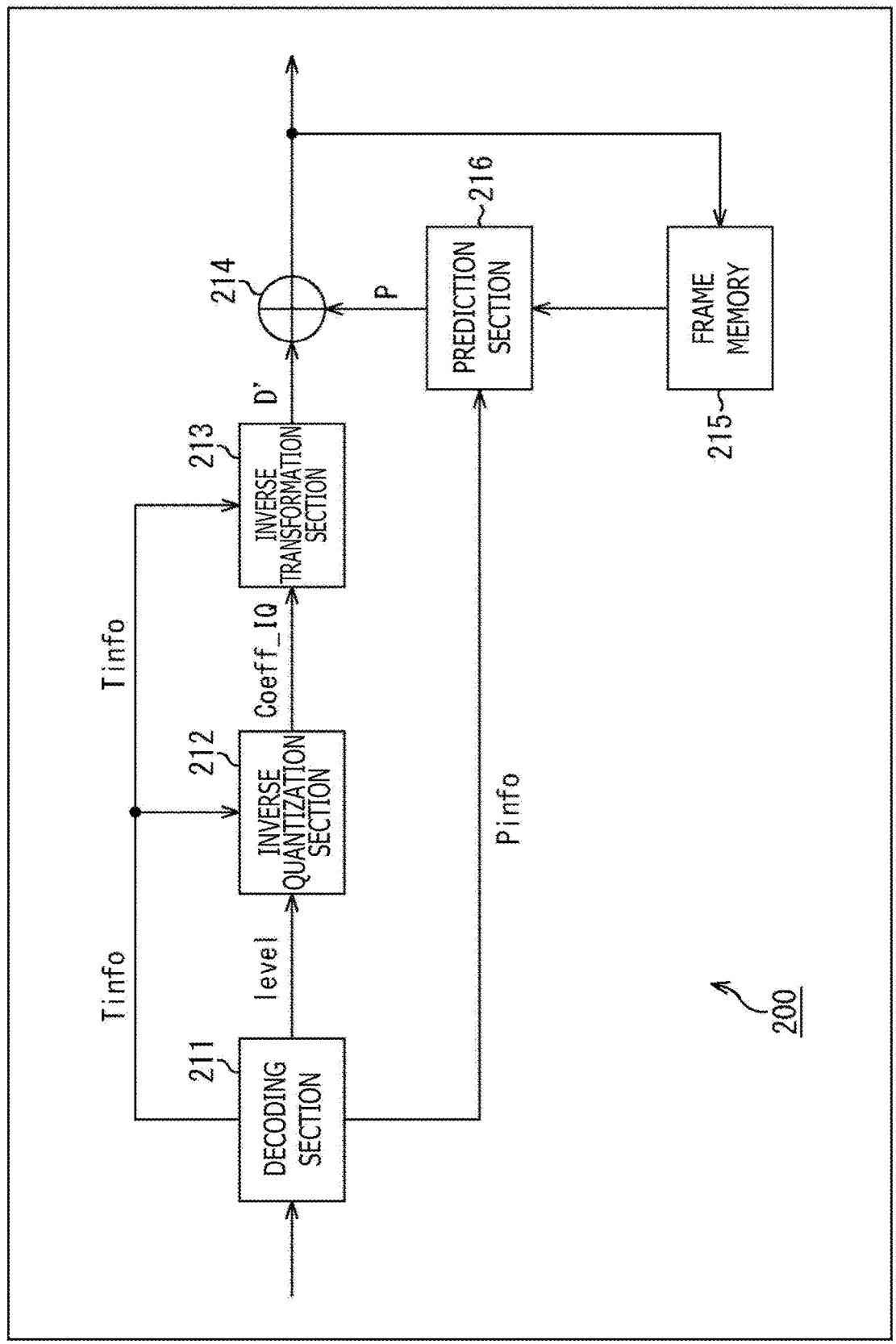
FIG. 11 is a block diagram illustrating a main configuration example of an image decoding apparatus.

Next, decoding of the encoded data encoded as described above will be described. FIG. 11 is a block diagram illustrating an example of a configuration of an image decoding apparatus as an aspect of the image processing apparatus according to the present technique. An image decoding apparatus 200 illustrated in FIG. 11 is an image decoding apparatus corresponding to the image encoding apparatus 100 of FIG. 7 and is configured to use a decoding method corresponding to the encoding method of the image encoding apparatus 100 to decode the encoded data (bitstream) generated by the image encoding apparatus 100. For example, the image decoding apparatus 200 is provided with the technique proposed in the HEVC and the technique proposed in the JVET.

Note that FIG. 11 illustrates main processing sections, flows of data, and the like, and FIG. 11 may not illustrate everything. That is, the image decoding apparatus 200 may include a processing section not illustrated as a block in FIG. 11 and may include a process or a flow of data not indicated by an arrow or the like in FIG. 11.

As illustrated in FIG. 11, the image decoding apparatus 200 includes a decoding section 211, an inverse quantization section 212, an inverse transformation section 213, a computation section 214, a frame memory 215, and a prediction section 216. The encoded data generated by the image encoding apparatus 100 or the like is supplied as, for example, a bitstream or the like to the image decoding apparatus 200 through, for example, a transmission medium, a recording medium, or the like.

The decoding section 211 uses a predetermined decoding method corresponding to the encoding method to decode the supplied encoded data. For example, the decoding section 211 decodes the syntax value of each syntax element from the bit string of the supplied encoded data (bitstream) according to the definition of the syntax table. The syntax element includes, for example, information, such as the header information Hinfo, the prediction mode information Pinfo, the transformation information Tinfo, and the residual information Rinfo.

The decoding section 211 refers to the residual information Rinfo to derive the quantized transformation coefficient level "level" of each coefficient position in each transformation block. The decoding section 211 supplies the prediction mode information Pinfo, the quantized transformation coefficient level "level," and the transformation information Tinfo obtained by the decoding to each block. For example, the decoding section 211 supplies the prediction mode information Pinfo to the prediction section 216, supplies the quantized transformation coefficient level "level" to the inverse quantization section 212, and supplies the transformation information Tinfo to the inverse quantization section 212 and the inverse transformation section 213.

The inverse quantization section 212 scales (inverse quantization) the value of the quantized transformation coefficient level "level" supplied from the decoding section 211 based on the transformation information Tinfo supplied from the decoding section 211 and derives the transformation coefficients Coeff_IQ after the inverse quantization. The inverse quantization is an opposite process of the quantization performed by the quantization section 113 (FIG. 7) of the image encoding apparatus 100. Note that the inverse quantization section 115 (FIG. 7) executes inverse quantization similar to the inverse quantization of the inverse quantization section 212. The inverse quantization section 212 supplies the obtained transformation coefficients Coeff_IQ to the inverse transformation section 213.

The inverse transformation section 213 performs inverse transformation of the transformation coefficients Coeff_IQ supplied from the inverse quantization section 212 based on the transformation information Tinfo supplied from the decoding section 211 and derives the predicted residual D'. The inverse transformation is an opposite process of the transformation process executed by the transformation section 112 (FIG. 7) of the image encoding apparatus 100. Note that the inverse transformation section 116 performs inverse transformation similar to the inverse transformation of the inverse transformation section 213. The details of the inverse transformation will be described later. The inverse transformation section 213 supplies the obtained predicted residual D' to the computation section 214.

The computation section 214 adds the predicted residual D' supplied from the inverse transformation section 213 and the predicted image P (predicted signal) corresponding to the predicted residual D' as indicated in the following Formula (14) and derives the local decoded image Rec. The computation section 214 uses the obtained local decoded image Rec to reconstruct the picture-based decoded image and outputs the obtained decoded image to the outside of the image decoding apparatus 200. The computation section 214 also supplies the local decoded image Rec to the frame memory 215.

$$Rec = D' + P \qquad (14)$$

The frame memory 215 uses the local decoded image Rec supplied from the computation section 214 to reconstruct the picture-based decoded image and stores the decoded image in a buffer of the frame memory 215. The frame memory 215 reads, as a reference image, the decoded image designated by the prediction mode information Pinfo of the prediction section 216 from the buffer and supplies the reference image to the prediction section 216. The frame memory 215 may also store the header information Hinfo, the prediction mode information Pinfo, the transformation information Tinfo, and the like regarding the generation of the decoded image in the buffer of the frame memory 215.

The prediction section 216 acquires, as a reference image, the decoded image stored in the frame memory 215 designated by the prediction mode information PInfo supplied from the decoding section 211 and uses the reference image to generate the predicted image P based on the prediction method designated by the prediction mode information Pinfo. The prediction section 216 supplies the generated predicted image P to the computation section 214.

The image decoding apparatus 200 is provided with a clip processing section that uses one or both the predetermined upper limit and the predetermined lower limit to clip the transformation coefficients subjected to the inverse transformation process to obtain the predicted residual that is the difference between the image and the predicted image of the image. That is, the inverse transformation section 213 uses one or both the predetermined upper limit and the predetermined lower limit to clip the transformation coefficients subjected to the inverse transformation process to obtain the predicted residual that is the difference between the image and the predicted image of the image.

<Inverse Transformation Section>

Figure 12:
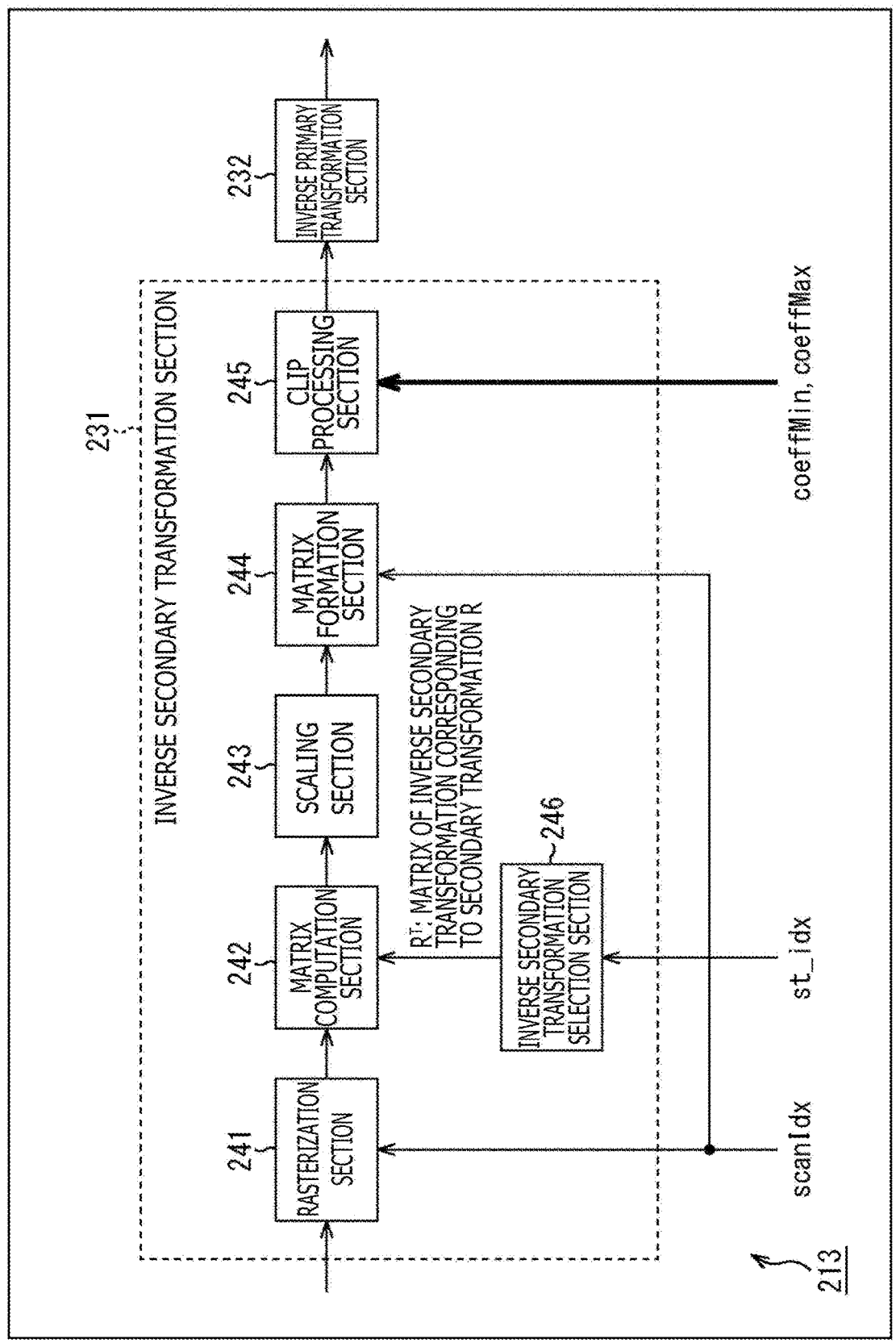
FIG. 12 is a block diagram illustrating a main configuration example of an inverse transformation section.

FIG. 12 is a block diagram illustrating a main configuration example of the inverse transformation section 213 of FIG. 11. As illustrated in FIG. 12, the inverse transformation section 213 includes an inverse secondary transformation section 231 and an inverse primary transformation section 232.

The inverse secondary transformation section 231 performs an inverse secondary transformation that is a transformation process of transforming, into a one-dimensional vector, the transformation coefficients Coeff_IQ supplied from the inverse quantization section 212, that is, the transformation coefficients Coeff_IQ (also referred to as secondary transformation coefficients) obtained by decoding and applying inverse quantization to the encoded data, performing matrix computation of the one-dimensional vector, scaling the one-dimensional vector subjected to the matrix computation, and forming a vector of the scaled one-dimensional vector.

The inverse secondary transformation section 231 applies an inverse secondary transformation to the secondary transformation coefficients Coeff_IQ based on the secondary transformation identifier st_idx that is information regarding the content of the secondary information and the scan identifier scanIdx that is information regarding the scan method of the transformation coefficients and derives transformation coefficients Coeff_IS (also referred to as primary transformation coefficients) after the inverse secondary transformation. That is, the inverse secondary transformation section 231 transforms the secondary transformation coefficients Coeff_IQ into the primary transformation coefficients Coeff_IS. The inverse secondary transformation section 231 supplies the primary transformation coefficients Coeff_IS to the inverse primary transformation section 232.

Note that the details of the inverse secondary transformation section 231 will be described later.

The inverse primary transformation section 232 applies, for example, an inverse primary transformation, such as an inverse orthogonal transformation, to the primary transformation coefficients Coeff_IS supplied from the inverse secondary transformation section 231 and derives the predicted residuals D'. That is, the inverse primary transformation section 232 transforms the primary transformation coefficients Coeff_IS into the predicted residual D'. The inverse primary transformation section 232 supplies the derived predicted residual D' to the computation section 214.

Next, the inverse secondary transformation section 231 will be described. As illustrated in FIG. 12, the inverse secondary transformation section 231 includes a rasterization section 241, a matrix computation section 242, a scaling section 243, a matrix formation section 244, a clip processing section 245, and an inverse secondary transformation selection section 246.

Based on the scan method of the transformation coefficients designated by the scan identifier scanIdx supplied from the decoding section 211, the rasterization section 241 transforms the transformation coefficients Coeff_IQ supplied from the inverse quantization section 212 into the 1×16-dimensional vector $X_{1d}$ for each sub-block (4×4 sub-block). The rasterization section 241 supplies the obtained vector $X_{1d}$ to the matrix computation section 242.

The inverse secondary transformation selection section 246 reads, from an internal memory (not illustrated) of the inverse secondary transformation selection section 246, a matrix IR $(=R^T)$ of the inverse secondary transformation designated by the secondary transformation identifier st_idx that is information regarding the content of the secondary transformation supplied from the decoding section 211 and supplies the matrix IR to the matrix computation section 242. For example, when the secondary transformation identifier st_idx is a certain value, the inverse secondary transformation selection section 246 reads a transposed matrix $R^T$ of the 16×16 matrix R illustrated in FIG. 5 as a matrix IR of the inverse secondary transformation and supplies the transposed matrix $R^T$ to the matrix computation section 242.

Note that the inverse secondary transformation selection section 246 may select the inverse secondary transformation IR $(=R^T)$ according to, for example, the secondary transformation identifier st_idx or the intra prediction mode information IPinfo (for example, intra prediction mode number) supplied from the decoding section 211. In addition, the inverse transformation IR may be selected according to the motion prediction information MVinfo, in place of the intra prediction mode information IPinfo, and the secondary transformation identifier st_idx.

For each sub-block (4×4 sub-block), the matrix computation section 242 uses the 1×16-dimensional vector $X_{1d}$ and the matrix of the inverse secondary transformation IR $(=R^T)$ to perform matrix computation as indicated in the following Formula (15) and derives the vector $Y_{1d}$ as a result of the matrix computation. Here, the operator "T" represents an operation of the transposed matrix.

$$Y_{1d}^T = IR \cdot X_{1d}^T = R^T \cdot X_{1d}^T \tag{15}$$

For each sub-block (4×4 sub-block), the scaling section 243 applies bit shift computation of N (N is a natural number) bits as indicated in the following Formula (16) to all elements of the signal $Y_{1d}$ in order to normalize the norm of the signal $Y_{1d}$ supplied from the matrix computation section 242 and obtains the signal $Z_{1d}$ after the bit shift.

$$Z_{1d} = (Y_{1d}) >> N \tag{16}$$

Note that as indicated in the following Formula (17), a value of 1<<(N−1) may be added as an offset to each element of the signal $Z_{1d}$ before the shift computation of N bits. Note that a vector E in Formula (17) is a 1×16-dimensional vector in which the values of all the elements are 1.

$$Z_{1d} = (Y_{1d} + ((N-1) << 1) \cdot E) >> N \tag{17}$$

For example, the matrix of the inverse secondary transformation IR $(=R^T)$ is a transposed matrix of the matrix of the secondary transformation R illustrated in FIG. 5 and is a matrix subjected to 8-bit scaling. Therefore, the value of N used by the scaling section 243 to normalize the norm is 8. In a case where the matrix IR $(=R^T)$ of the inverse secondary transformation is subjected to N-bit scaling, the amount of bit shift of the norm normalization is generally N bits.

For each sub-block (4×4 sub-block), the matrix formation section 244 receives the signal $Z_{1d}$ after the norm normalization and the scan identifier scanIdx and transforms the 1×16-dimensional vector $Z_{1d}$ supplied from the scaling section 243 into the transformation coefficients Coeff_IS of 4×4 matrix based on the scan method designated by the scan identifier scanIdx supplied from the decoding section 211. The matrix formation section 244 supplies the obtained transformation coefficients Coeff_IS to the clip processing section 245.

The clip processing section 245 receives the transformation coefficients Coeff_IS of 4×4 matrix and the maximum value CoeffMax and the minimum value CoeffMin of the transformation coefficients. The clip processing section 245 uses the maximum value CoeffMax and the minimum value CoeffMin of the transformation coefficients to apply the clip process to each element Coeff (i,j) (i=0 . . . 3, j=0 . . . 3) of the transformation coefficients Coeff_IS supplied from the matrix formation section 244 as in the following Formula (18).

$$Coeff\_IS(i,j) = Clip3(CoeffMin, CoeffMax, Coeff\_IS(i,j)) \tag{18}$$

Here, the operator Clip3 (Xmin, Xmax, X) is a clip process of returning the value of Xmin in the case where the input value X is smaller than Xmin, returning Xmax in the case where the input value X is greater than Xmax, and returning the input value X in the other cases. Clip3 can also be expressed as in the following Formula (19) by using Min(x,y) and Max(x,y).

$$Clip3(Xmin, Xmax, X) = Min(Xmin, Max(Xmax, X)) = Max(Xmax, Min(Xmin, X)) \tag{19}$$

Note that it is desirable that the values of the maximum value CoeffMax and the minimum value CoeffMin of the transformation coefficients be as follows at 16-bit precision.

$$CoeffMax = 2^{15} - 1 = 32767$$

$$CoeffMin = -2^{15} = -32768$$

Note that the precision of the maximum value CoeffMax and the minimum value CoeffMin of the transformation coefficients is not limited to the 16-bit precision, and in general, the precision may be an integer multiple (M times (M>=1)) of 8 bits. In this case, the maximum value CoeffMax of the transformation coefficients is set to a value of 8*M−1, and the minimum value CoeffMin is set to −8*M.

$$CoeffMax = 8*M - 1$$

$$CoeffMin = -8*M$$

In addition, the maximum value CoeffMax and the minimum value CoeffMin of the transformation coefficients may be derived by Formulas (11) to (13) based on the bit depth BitDepth of the input signal and the extended computation precision flag extended_precision_processing_flag notified by the parameter set (such as SPS/PPS).

According to Formulas (11) to (13), the maximum value CoeffMax and the maximum value CoeffMin of the transformation coefficients can be decided based on the bit depth of the input signal and the extended computation precision flag. Particularly, in the case where the bit depth of the input signal is large (for example, 16 bits), the computation precision is insufficient when the precision of the transformation coefficients is 16 bits, and the encoding efficiency is reduced. Therefore, it is preferable to be able to control the computation precision of the transformation coefficients according to the bit depth of the input signal as described above.

The clip processing section 245 supplies, as primary transformation coefficients, the transformation coefficients Coeff after the clip process to the inverse primary transformation section 232.

That is, the clip processing section 245 applies the clip process to the primary transformation coefficients Coeff_IS, and the values are restricted to the range of the predetermined maximum value and minimum value. Therefore, the dynamic range width of the transformation coefficients can be suppressed within the predetermined range (for example, 16 bits), and the increase in the load of encoding can be suppressed. As a result, the increase in the size of the intermediate buffer that stores the transformation coefficients can be suppressed, and the increase in the cost can be suppressed.

<Flow of Image Decoding Process>

Next, flows of processes executed by the image decoding apparatus 200 will be described. First, an example of a flow of an image decoding process will be described with reference to a flow chart of FIG. 13.

Once the image decoding process is started, the decoding section 211 decodes the bitstream (encoded data) supplied to the image decoding apparatus 200 to obtain information, such as the header information Hinfo, the prediction mode information Pinfo, the transformation information Tinfo, the residual information Rinfo, and the quantized transformation coefficient level "level," in step S201.

In step S202, the inverse quantization section 212 performs inverse quantization of the quantized transformation coefficient level "level" obtained in the process of step S201 to derive the transformation coefficients Coeff_IQ. The inverse quantization is an opposite process of the quantization executed in step S105 (FIG. 9) of the image encoding process and is a process similar to the inverse quantization performed in step S106 (FIG. 9) of the image encoding process.

In step S203, the inverse transformation section 213 applies an inverse transformation to the transformation coefficients Coeff_IQ obtained in the process of step S202 to derive the predicted residual D'. The inverse transformation is an opposite process of the transformation process executed in step S104 (FIG. 9) of the image encoding process and is a process similar to the inverse transformation performed in step S107 (FIG. 9) of the image encoding process.

In step S204, the prediction section 216 performs prediction in the same prediction mode as in the prediction at the encoding based on the prediction mode information PInfo and generates a predicted image.

In step S205, the computation section 214 adds the predicted image obtained in the process of step S204 to the predicted residual D' obtained in the process of step S203 and obtains a decoded image.

Once the process of step S205 is finished, the image decoding process ends.

<Flow of Inverse Transformation Process>

Next, an example of a flow of the inverse transformation process executed in step S203 of FIG. 13 will be described with reference to a flow chart of FIG. 14.

Once the inverse transformation process is started, the inverse secondary transformation section 231 determines whether the secondary transformation identifier st_idx indicates to apply the inverse secondary transformation (st_idx>0) in step S221. If the inverse secondary transformation section 231 determines that the secondary transformation identifier st_idx is 0 (secondary transformation identifier st_idx indicates to skip the inverse secondary transformation), the inverse secondary transformation (process of steps S222 to S229) is skipped, and the process proceeds to step S230. That is, the inverse secondary transformation section 231 supplies the transformation coefficients Coeff_IQ as primary transformation coefficients Coeff_IS to the inverse primary transformation section 232.

In addition, if the inverse secondary transformation section 231 determines that the secondary transformation identifier st_idx is greater than 0 (secondary transformation identifier st_idx indicates to execute the inverse secondary transformation) in step S221, the process proceeds to step S222. The inverse secondary transformation is executed in the process of steps S222 to S229.

In step S222, the inverse secondary transformation selection section 246 selects the inverse secondary transformation IR designated by the secondary transformation identifier st_idx.

In step S223, the inverse secondary transformation section 231 selects an unprocessed sub-block included in the transformation block to be processed.

In step S224, the rasterization section 241 transforms the transformation coefficients Coeff_IQ into the 1×16-dimensional vector $X_{1d}$ based on the scan method designated by the scan identifier scanIdx.

In step S225, the matrix computation section 242 computes the matrix product of the vector $X_{1d}$ and the inverse secondary transformation IR and obtains the vector $Y_{1d}$.

In step S226, the scaling section 243 normalizes the norm of the vector $Y_{1d}$ and obtains the vector $Z_{1d}$.

In step S227, the matrix formation section 244 transforms the vector $Z_{1d}$ into a 4×4 matrix based on the scan method designated by the scan identifier scanIdx and obtains the primary transformation coefficients Coeff_IS of the sub-block to be processed.

In step S228, the clip processing section 245 uses the maximum value CoeffMax and the minimum value CoeffMin to apply the clip process to each element of the primary transformation coefficients Coeff_IS of the sub-block to be processed. The primary transformation coefficients Coeff_IS after the clip process are supplied to the inverse primary transformation section 232.

In step S229, the inverse secondary transformation section 231 determines whether all the sub-blocks of the transformation block to be processed are processed. If the inverse secondary transformation section 231 determines that there is an unprocessed sub-block, the process returns to step S223, and the subsequent process is repeated. That is, each process (inverse secondary transformation) of steps S223 to S229 is executed for each sub-block of the transformation block to be processed. If the inverse secondary transformation section 231 determines that all the sub-blocks are processed (inverse secondary transformation of all the sub-blocks is performed) in step S229, the process proceeds to step S230.

In step S230, the inverse primary transformation section 232 applies the inverse primary transformation to the primary transformation coefficients Coeff_IS based on the primary transformation identifier pt_idx and derives the predicted residual D'. The predicted residual D' is supplied to the computation section 214.

Figure 13:
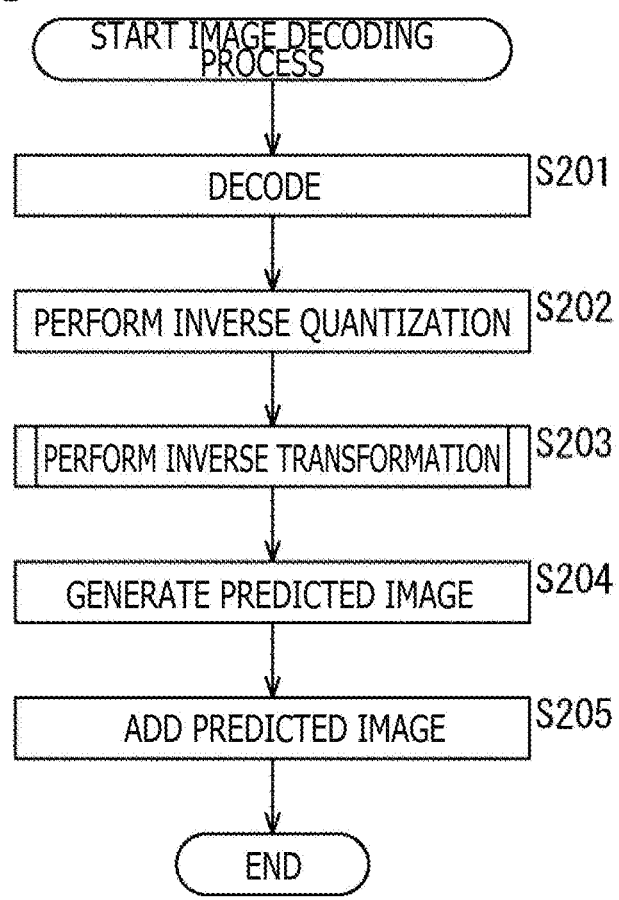
FIG. 13 is a flow chart describing an example of a flow of an image decoding process.

Once the process of step S230 is finished, the inverse transformation process ends, and the process returns to FIG. 13.

Note that in the inverse transformation process, the processing order of the steps may be switched, or the details of the process may be changed within a possible range. For example, if it is determined that the secondary transformation identifier st_idx is 0 in step S221, a 16×16 identity matrix may be selected as the inverse secondary transformation IR to execute each process of steps S222 to S229. In addition, the clip process of step S228 may be applied to the vector Z1d after the norm normalization of the vector Y1d derived in step S226, and then the process of matrix formation of step S227 may be executed.

As a result of the execution of each process, the dynamic range width of the transformation coefficients can be suppressed within a predetermined range (for example, 16 bits). That is, the increase in the load of decoding can be suppressed. In addition, this can suppress the increase in the size of the intermediate buffer that stores the transformation coefficients, and the increase in the cost can be suppressed.

Note that although the upper limit and the lower limit are used to clip the transformation coefficients in the description above, only one of the upper limit and the lower limit may be used to clip the transformation coefficients.

2. Second Embodiment

<Control of Amount of Bit Shift in Norm Normalization>

Note that in the secondary transformation or the inverse secondary transformation, the amount of shift of a one-dimensional vector may be derived, and the one-dimensional vector subjected to matrix computation may be scaled according to the derived amount of shift, instead of applying the clip process to the transformation coefficients.

This can also suppress the dynamic range width of the transformation coefficients within the predetermined range (for example, 16 bits) and suppress the increase in the load of encoding and decoding as in the case of first embodiment. Furthermore, the increase in the load of encoding and decoding can be suppressed in this case without the execution of the clip process.

<Transformation Section>

In this case, the configuration of the image encoding apparatus 100 is also basically similar to the case of the first embodiment. However, the image encoding apparatus 100 in this case includes: a rasterization section that transforms, into a one-dimensional vector, transformation coefficients obtained by applying a transformation process to a predicted residual that is a difference between an image and a predicted image of the image; a shift amount derivation section that derives an amount of shift of the one-dimensional vector; a matrix computation section that performs matrix computation of the one-dimensional vector; a scaling section that scales the one-dimensional vector subjected to the matrix computation according to the amount of shift derived by the shift amount derivation section; and a matrix formation section that forms a matrix of the scaled one-dimensional vector. That is, the transformation section 112 in this case transforms, into the one-dimensional vector, the transformation coefficients obtained by applying the transformation process to the predicted residual that is the difference between the image and the predicted image of the image, derives the amount of shift of the one-dimensional vector, performs the matrix computation of the one-dimensional vector, scales the one-dimensional vector subjected to the matrix computation according to the derived amount of shift, and forms the matrix of the scaled one-dimensional vector.

Figure 15:
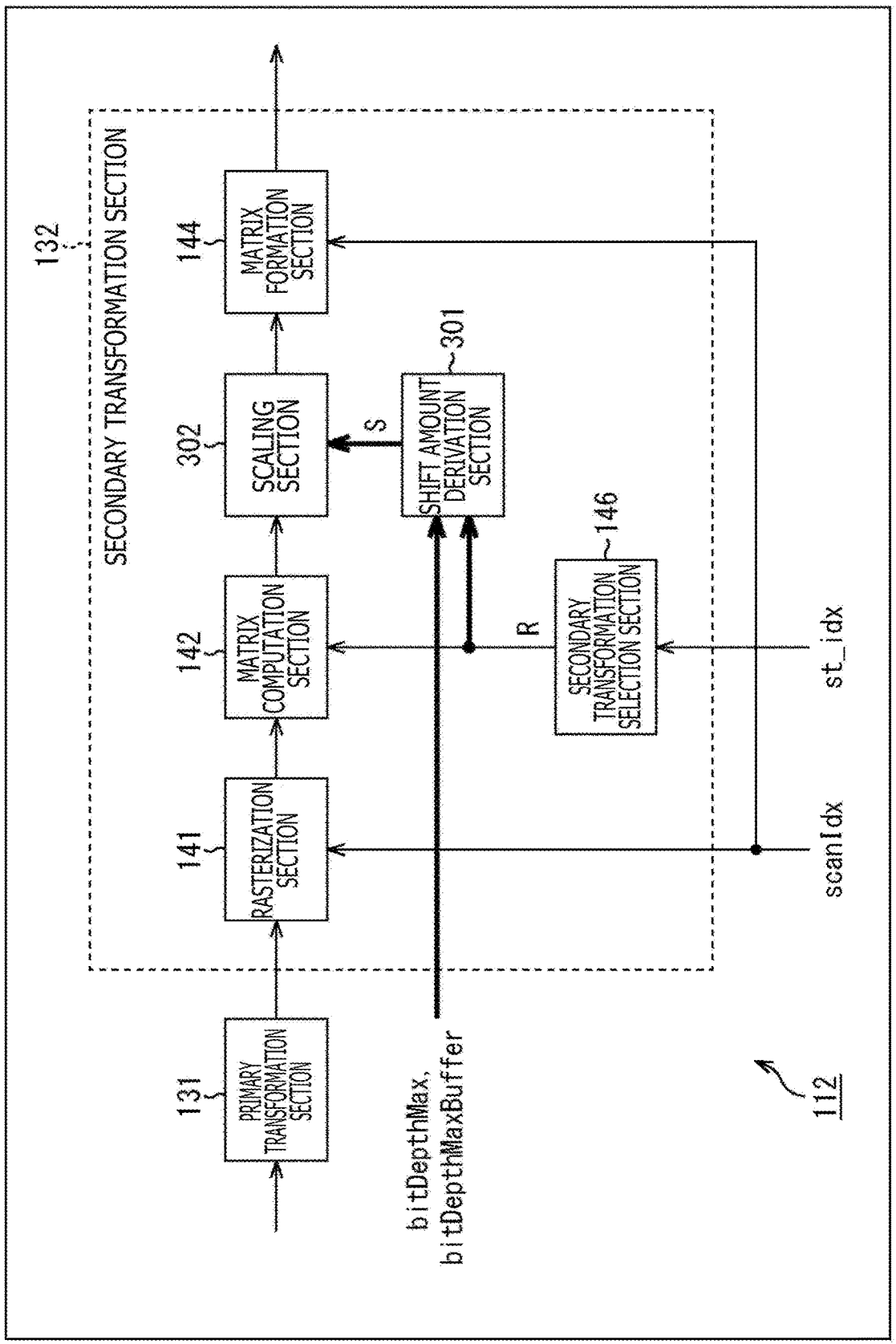
FIG. 15 is a block diagram illustrating a main configuration example of the transformation section.

FIG. 15 is a block diagram illustrating a main configuration example of the transformation section 112 in this case. As illustrated in FIG. 15, the configuration of the transformation section 112 in this case is also basically similar to the case of the first embodiment (FIG. 8). However, the secondary transformation section 132 in this case includes a shift amount derivation section 301 and a scaling section 302 in place of the scaling section 143 and the clip processing section 145.

The shift amount derivation section 301 receives a maximum value of the bit depth (largest bit depth) bitDepthMax, a maximum value of the bit depth of the intermediate buffer (intermediate buffer largest bit depth) bitDepthMaxBuffer, and the secondary matrix R. The shift amount derivation section 301 estimates the upper limit MaxVal of the dynamic range of the transformation coefficients Coeff after the secondary transformation as in Formula (2). Here, a value of $1<<(bitDepthMax-1)$ is set for A. In addition, the secondary transformation R is set for T.

Next, a difference DiffMaxVal between the upper limit MaxVal of the dynamic range of the secondary transformation R and an upper limit MaxValBuffer of the intermediate buffer ($=1<<(bitDepthMaxBuffer-1)=2^{15}-1=32767$) is derived by the following Formula (20). Here, the value of bitDepthMaxBuffer is 16.

$$DiffMaxVal = MaxVal - MaxValBuffer \quad (20)$$

Subsequently, a logarithm log 2DiffMaxVal with the difference DiffMaxVal of 2 as a base is derived by the following Formula (21). Note that it is assumed in Formula (21) that the difference DiffMaxVal is an integer equal to or greater than 0. In addition, the value input to the logarithm log 2(•) with 2 as a base may be an absolute value |DiffMaxVal| of the difference DiffMaxVal.

$$\log 2DiffMaxVal = \log 2(DiffMaxVal) \quad (21)$$

A ceiling function Ceil(•) is applied to the derived logarithm log 2DiffMaxVal, and the scaling section 302 derives an amount of shift S for shifting the bits to the right with respect to the transformation coefficients Coeff after the secondary transformation as indicated in the following Formula (22). In addition, a floor function Floor(•) may be used in place of the ceiling function Ceil(•) to derive the amount of shift S as indicated in the following Formula (23).

$$S = Ceil(\log 2DiffMaxVal) \quad (22)$$

$$S = Floor(\log 2DiffMaxVal) + 1 \quad (23)$$

The shift amount derivation section 301 supplies the amount of shift S obtained as described above to the scaling section 302. Note that although the shift amount derivation section 301 derives the amount of shift S through Formula (2), Formula (20), Formula (21), Formula (22), and Formula (23), the derivation is not limited to this. For example, the shift amount derivation section 301 may derive in advance the amount of shift S corresponding to each secondary transformation R, store the amounts of shift S in a lookup table, read the amount of shift S corresponding to the secondary transformation R designated by the secondary transformation identifier st_idx from the lookup table, and supply the amount of shift S to the scaling section 302. In this case, the amount of process for deriving the amount of shift S can be reduced.

The scaling section 302 receives the signal $Y_{1d}$ input from the matrix computation section 142 and the amount of shift S. For each sub-block (4×4 sub-block), the scaling section 302 applies bit shift computation of (N+S) bits to all the elements of the signal $Y_{1d}$ as indicated in the following Formula (24) in order to normalize the norm of the signal $Y_{1d}$ input from the matrix computation section 142 and to suppress the dynamic range to the dynamic range bitDepth-MaxBuffer of the intermediate buffer.

$$Z_{1d}=(Y_{1d})>>(N+S) \quad (24)$$

Note that as indicated in the following Formula (25), the value of 1<<(N−1) may be added as an offset to each element of the signal $Z_{1d}$ before the shift computation of (N+S) bits. Note that in Formula (25), the vector E is a 1×16-dimensional vector in which the values of all the elements are 1.

$$Z_{1d}=(Y_{1d}+((N-1)<<1)\cdot E)>>(N+S) \quad (25)$$

For example, the matrix of the secondary transformation R illustrated in FIG. 5 is a matrix subjected to 8-bit scaling, and the value of N used by the scaling section 302 to normalize the norm is 8. In a case where the matrix R of the secondary transformation is subjected to N-bit scaling, the amount of bit shift of the norm normalization is generally N bits.

That is, the shift amount derivation section 301 derives the amount of shift S for correcting the dynamic range such that the transformation coefficients Coeff after the secondary transformation fall within the dynamic range of the intermediate buffer. Based on the derived amount of shift S and the amount of shift N of norm normalization, the scaling section 302 then shifts the bits to the right by (N+S) for the one-dimensional vector $Y_{1d}$ subjected to the matrix computation to correct the one-dimensional vector $Y_{1d}$ such that the one-dimensional vector $Y_{1d}$ falls within the dynamic range of the intermediate buffer. Therefore, the dynamic range width of the transformation coefficients can be suppressed within the predetermined range (for example, 16 bits), and the increase in the load of encoding can be suppressed. As a result, the increase in the size of the intermediate buffer that stores the transformation coefficients can be suppressed, and the increase in the cost can be suppressed. In this case, the clip process can be skipped.

<Flow of Transformation Process>

Figure 16:
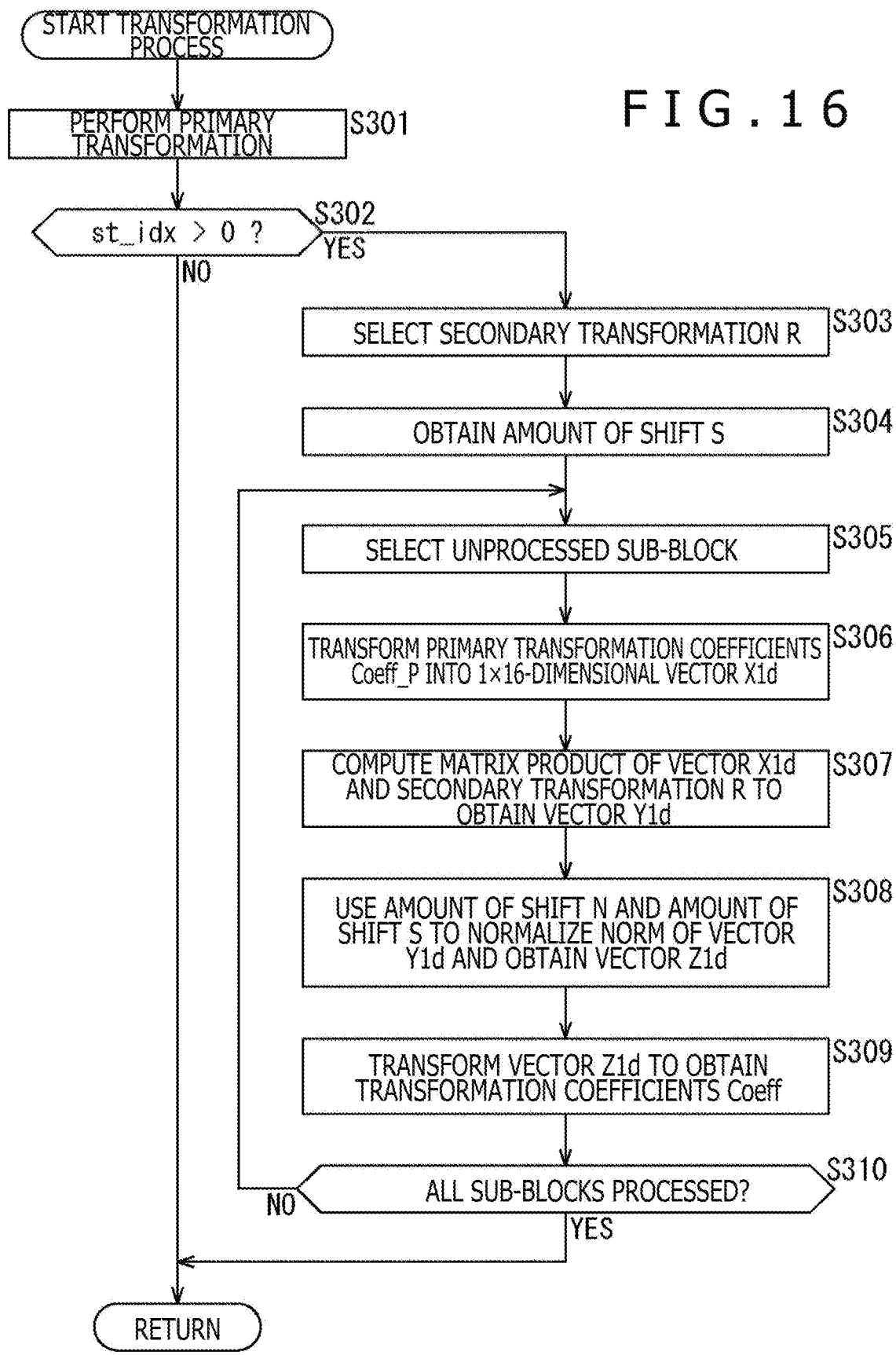
FIG. 16 is a flow chart describing an example of a flow of a transformation process.

Next, an example of a flow of each process executed by the image encoding apparatus 100 will be described. In this case, the image encoding apparatus 100 executes an image encoding process basically similar to the case of the first embodiment (FIG. 9). An example of a flow of a transformation process in this case will be described with reference to a flow chart of FIG. 16.

Figure 10:
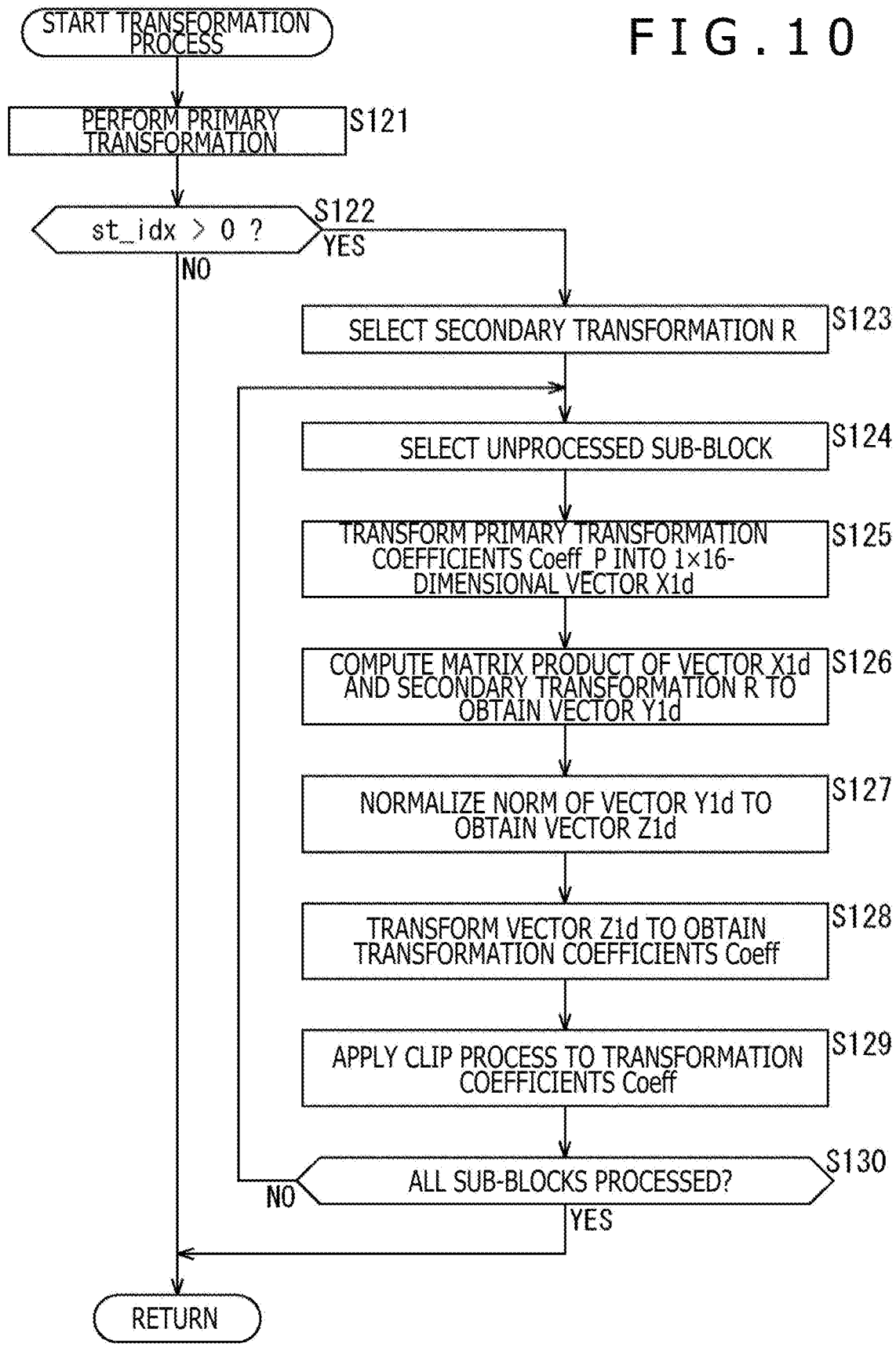
FIG. 10 is a flow chart describing an example of a flow of a transformation process.

Once the transformation process is started, each process of steps S301 to S303 is executed as in each process of steps S121 to S123 of FIG. 10.

In step S304, the shift amount derivation section 301 derives the amount of shift S based on the maximum value of the bit depth (largest bit depth) bitDepthMax, the maximum value of the bit depth of the intermediate buffer (intermediate buffer largest bit depth) bitDepthMaxBuffer, and the secondary transformation matrix R.

Each process of steps S305 to S307 is basically executed as in each process of steps S124 to S126 of FIG. 10.

In step S308, the scaling section 302 uses the amount of shift N and the amount of shift S to normalize the norm of the vector $Y_{1d}$ and obtains the vector $Z_{1d}$.

Each process of step S309 and step S310 is executed as in each process of step S129 and S130 of FIG. 10.

Figure 9:
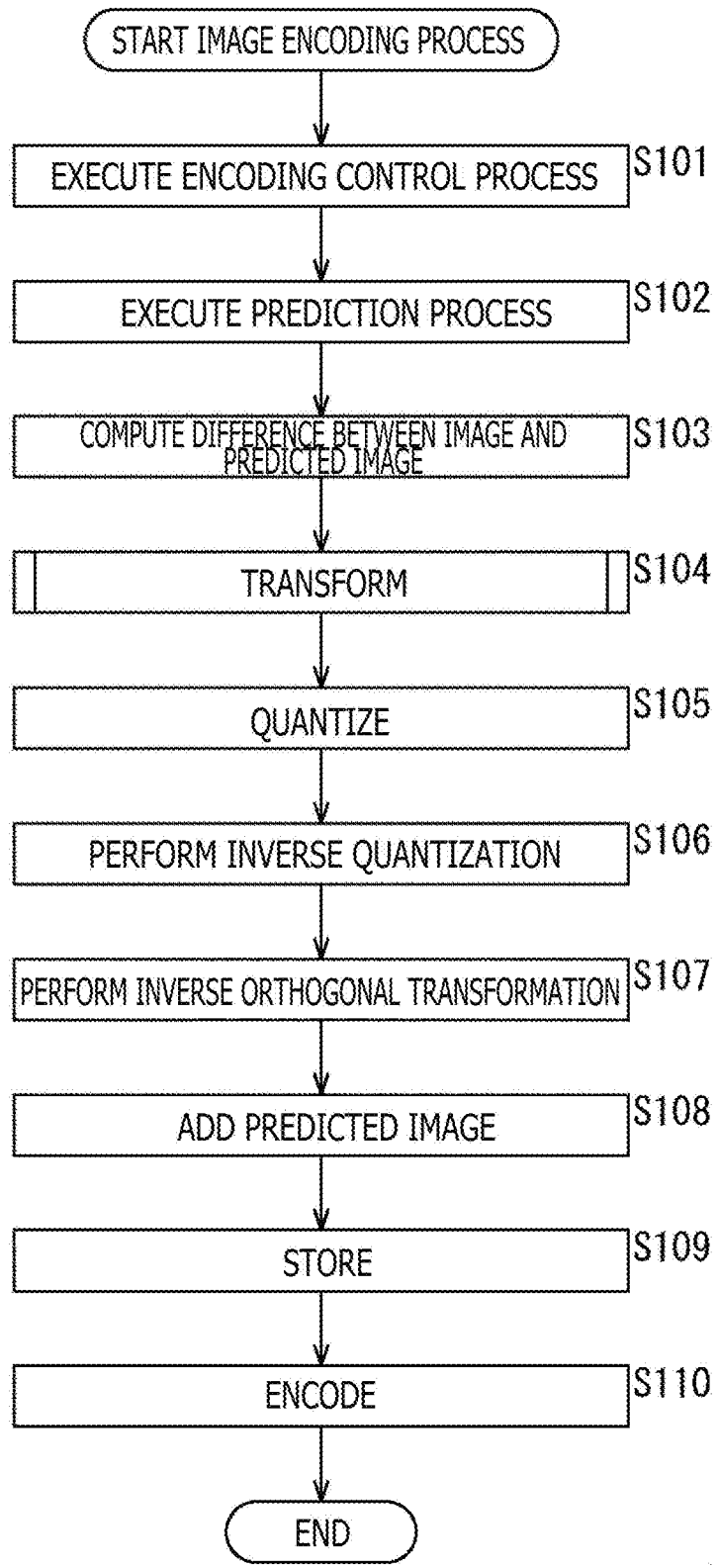
FIG. 9 is a flow chart describing an example of a flow of an image processing process.

If it is determined in step S310 that all the sub-blocks are processed (secondary transformation of all the sub-blocks is performed), the transformation process ends, and the process returns to FIG. 9.

As a result of the execution of each process, the dynamic range width of the transformation coefficients can be suppressed within the predetermined range (for example, 16 bits). That is, the increase in the load of encoding can be suppressed. In addition, this can suppress the increase in the size of the intermediate buffer that stores the transformation coefficients, and the increase in the cost can be suppressed. Furthermore, the clip process can be skipped.

<Inverse Transformation Section>

Next, the image decoding apparatus 200 will be described. In this case, the configuration of the image decoding apparatus 200 is also basically similar to the case of the first embodiment. However, the image decoding apparatus 200 in this case includes: a rasterization section that transforms, into a one-dimensional vector, transformation coefficients that are subjected to an inverse transformation process to obtain a predicted residual that is a difference between an image and a predicted image of the image; a shift amount derivation section that derives an amount of shift of the one-dimensional vector; a matrix computation section that performs matrix computation of the one-dimensional vector; a scaling section that scales the one-dimensional vector subjected to the matrix computation according to the amount of shift derived by the shift amount derivation section; and a matrix formation section that forms a matrix of the scaled one-dimensional vector. That is, the inverse transformation section 213 transforms, into the one-dimensional vector, the transformation coefficients that are subjected to the inverse transformation process to obtain the predicted residual that is the difference between the image and the predicted image of the image, derives the amount of shift of the one-dimensional vector, performs the matrix computation of the one-dimensional vector, scales the one-dimensional vector subjected to the matrix computation according to the derived amount of shift, and forms the matrix of the scaled one-dimensional vector.

Figure 17:
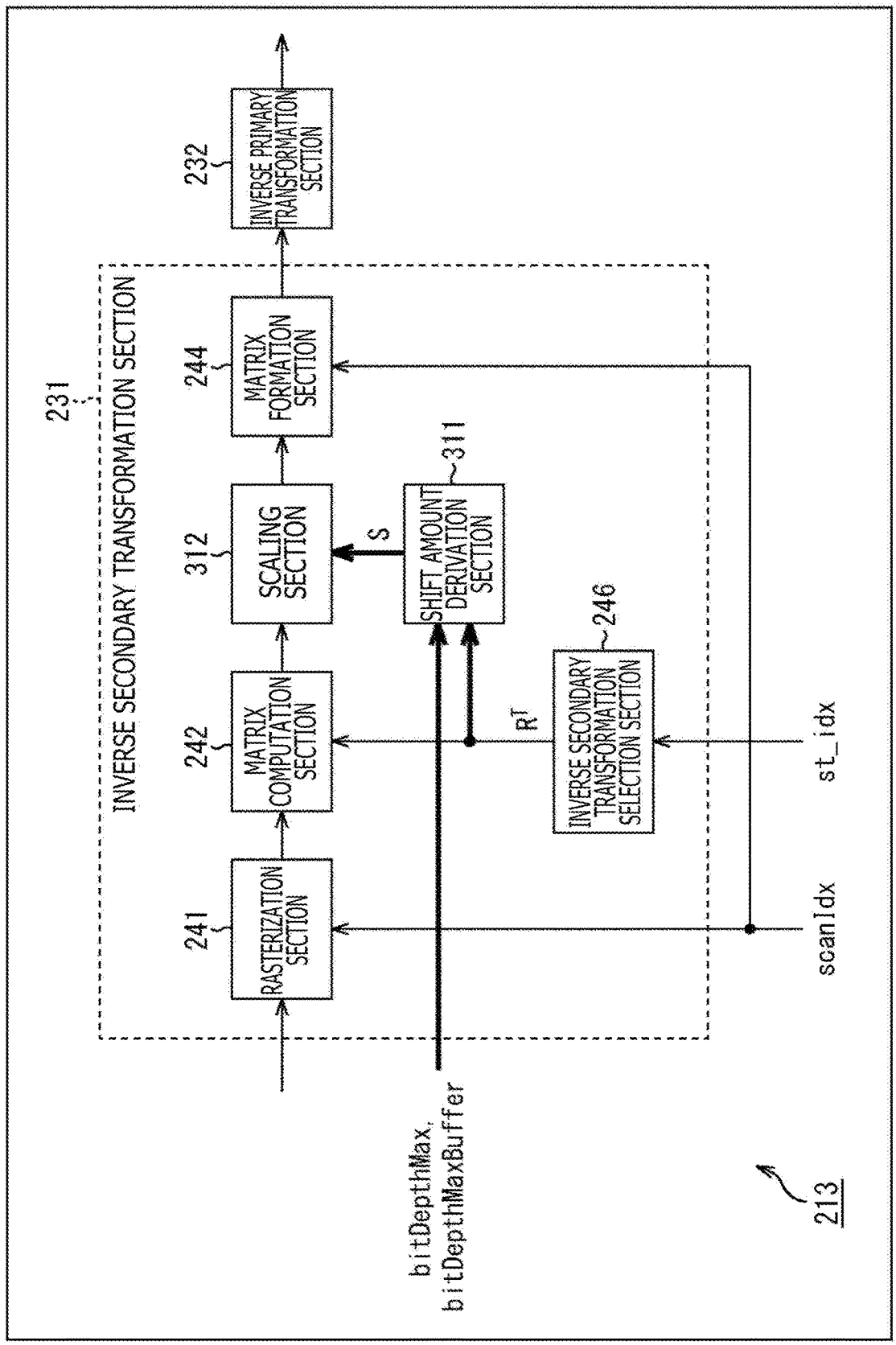
FIG. 17 is a block diagram illustrating a main configuration example of the inverse transformation section.

FIG. 17 is a block diagram illustrating a main configuration example of the inverse transformation section 213 in this case. As illustrated in FIG. 17, the configuration of the inverse transformation section 213 in this case is also basically similar to the case of the first embodiment (FIG. 12). However, the inverse secondary transformation section 231 in this case includes a shift amount derivation section 311 and a scaling section 312 in place of the scaling section 243 and the clip processing section 245.

The shift amount derivation section 311 receives the maximum value of the bit depth (largest bit depth) bitDepthMax, the maximum value of the bit depth of the intermediate buffer (intermediate buffer largest bit depth) bitDepthMaxBuffer, and the inverse secondary matrix IR. The shift amount derivation section 311 estimates the upper limit MaxVal of the dynamic range of the primary transformation coefficients Coeff_IS after the inverse secondary transformation as in Formula (2). Here, the value of 1<<(bitDepth- Max-1) is set for A. In addition, the inverse secondary transformation IR is set for T.

Next, the difference DiffMaxVal between the upper limit MaxVal of the dynamic range of the inverse secondary transformation IR and the upper limit MaxValBuffer of the intermediate buffer (=1<<bitDepthMaxBuffer−1)= $2^{15}−1=32767$) is derived by the following Formula (26). Here, the value of bitDepthMaxBuffer is 16.

DiffMaxVal=MaxVal−MaxValBuffer (26)

Subsequently, the logarithm log 2DiffMaxVal with the difference DiffMaxVal of 2 as a base is derived by the following Formula (27). Note that it is assumed in Formula (27) that the difference DiffMaxVal is an integer equal to or greater than 0. In addition, the value input to the logarithm log 2(•) with 2 as a base may be an absolute value |DiffMaxVal| of the difference DiffMaxVal.

log 2DiffMaxVal=log 2(DiffMaxVal) (27)

The ceiling function Ceil(•) is applied to the derived logarithm log 2DiffMaxVal, and the scaling section 312 derives the amount of shift S for shifting the bits to the right with respect to the transformation coefficients Coeff_IS after the inverse secondary transformation as indicated in the following Formula (28). In addition, the floor function Floor(•) may be used in place of the ceiling function Ceil(•) to derive the amount of shift S as indicated in the following Formula (29).

S=Ceil(log 2DiffMaxVal) (28)

S=Floor(log 2DiffMaxVal)+1 (29)

The shift amount derivation section 311 supplies the amount of shift S obtained as described above to the scaling section 312. Note that although the shift amount derivation section 311 derives the amount of shift S through Formula (2), Formula (26), Formula (27), Formula (28), and Formula (29), the derivation is not limited to this. For example, the shift amount derivation section 311 may derive in advance the amount of shift S corresponding to each inverse secondary transformation IR, store the amounts of shift S in a lookup table, read the amount of shift S corresponding to the inverse secondary transformation IR designated by the secondary transformation identifier st_idx from the lookup table, and supply the amount of shift S to the scaling section 312. In this case, the amount of process for deriving the amount of shift S can be reduced.

The scaling section 312 receives the signal $Y_{1d}$ input from the matrix computation section 242 and the amount of shift S supplied from the shift amount derivation section 311. For each sub-block (4×4 sub-block), the scaling section 312 applies bit shift computation of (N+S) bits to all the elements of the signal $Y_{1d}$ as indicated in the following Formula (30) in order to normalize the norm of the signal $Y_{1d}$ input from the matrix computation section 242 and to suppress the dynamic range to the dynamic range bitDepthMaxBuffer of the intermediate buffer.

$Z_{1d}=(Y_{1d})>>(N+S)$ (30)

Note that as indicated in the following Formula (31), the value of 1<<(N−1) may be added as an offset to each element of the signal $Z_{1d}$ before the shift computation of (N+S) bits. Note that in Formula (31), the vector E is a 1×16-dimensional vector in which the values of all the elements are 1.

$Z_{1d}=(Y_{1d}+((N−1)<<1)·E)>>(N+S)$ (31)

For example, the matrix of the inverse secondary transformation IR ($=R^T$) that is a transposed matrix of the secondary transformation R illustrated in FIG. 5 is a matrix subjected to 8-bit scaling, and the value of N used by the scaling section 312 to normalize the norm is 8. In the case where the matrix IR ($=R^T$) of the inverse secondary transformation is subjected to N-bit scaling, the amount of bit shift of the norm normalization is generally N bits.

That is, the shift amount derivation section 311 derives the amount of shift S for correcting the dynamic range such that the primary transformation coefficients Coeff_IS after the inverse secondary transformation fall within the dynamic range of the intermediate buffer. Based on the derived amount of shift S and the amount of shift N of norm normalization, the scaling section 312 then shifts the bits to the right by (N+S) for the one-dimensional vector $Y_{1d}$ subjected to the matrix computation to correct the one-dimensional vector $Y_{1d}$ such that the one-dimensional vector $Y_{1d}$ falls within the dynamic range of the intermediate buffer. Therefore, the dynamic range width of the transformation coefficients can be suppressed within the predetermined range (for example, 16 bits), and the increase in the load of decoding can be suppressed. As a result, the increase in the size of the intermediate buffer that stores the transformation coefficients can be suppressed, and the increase in the cost can be suppressed. In this case, the clip process can be skipped.

<Flow of Inverse Transformation Process>

Figure 18:
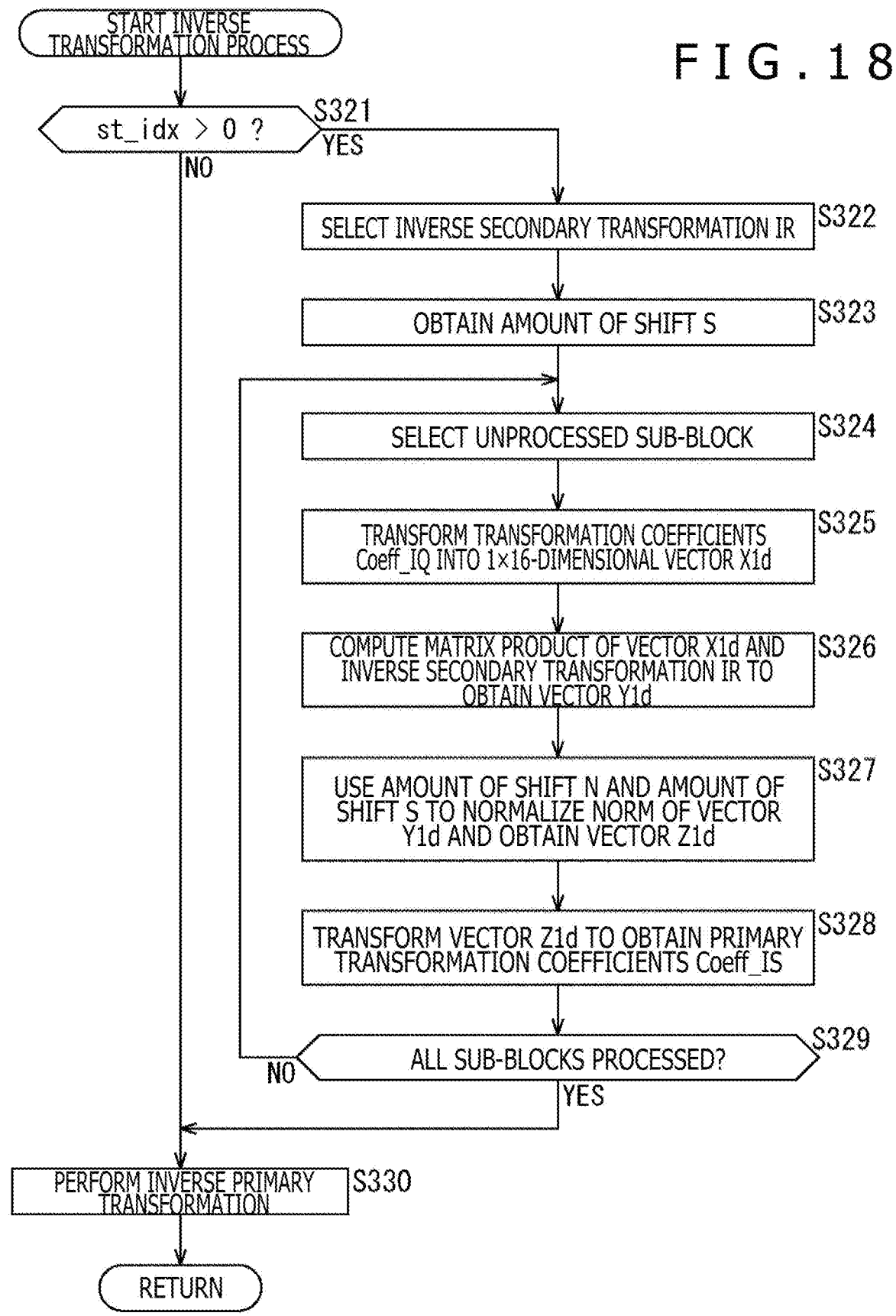
FIG. 18 is a flow chart describing an example of a flow of an inverse transformation process.

Next, an example of a flow of each process executed by the image decoding apparatus 200 will be described. In this case, the image decoding apparatus 200 basically executes an image decoding process as in the case of the first embodiment (FIG. 13). An example of a flow of an inverse transformation process in this case will be described with reference to a flow chart of FIG. 18.

Figure 14:
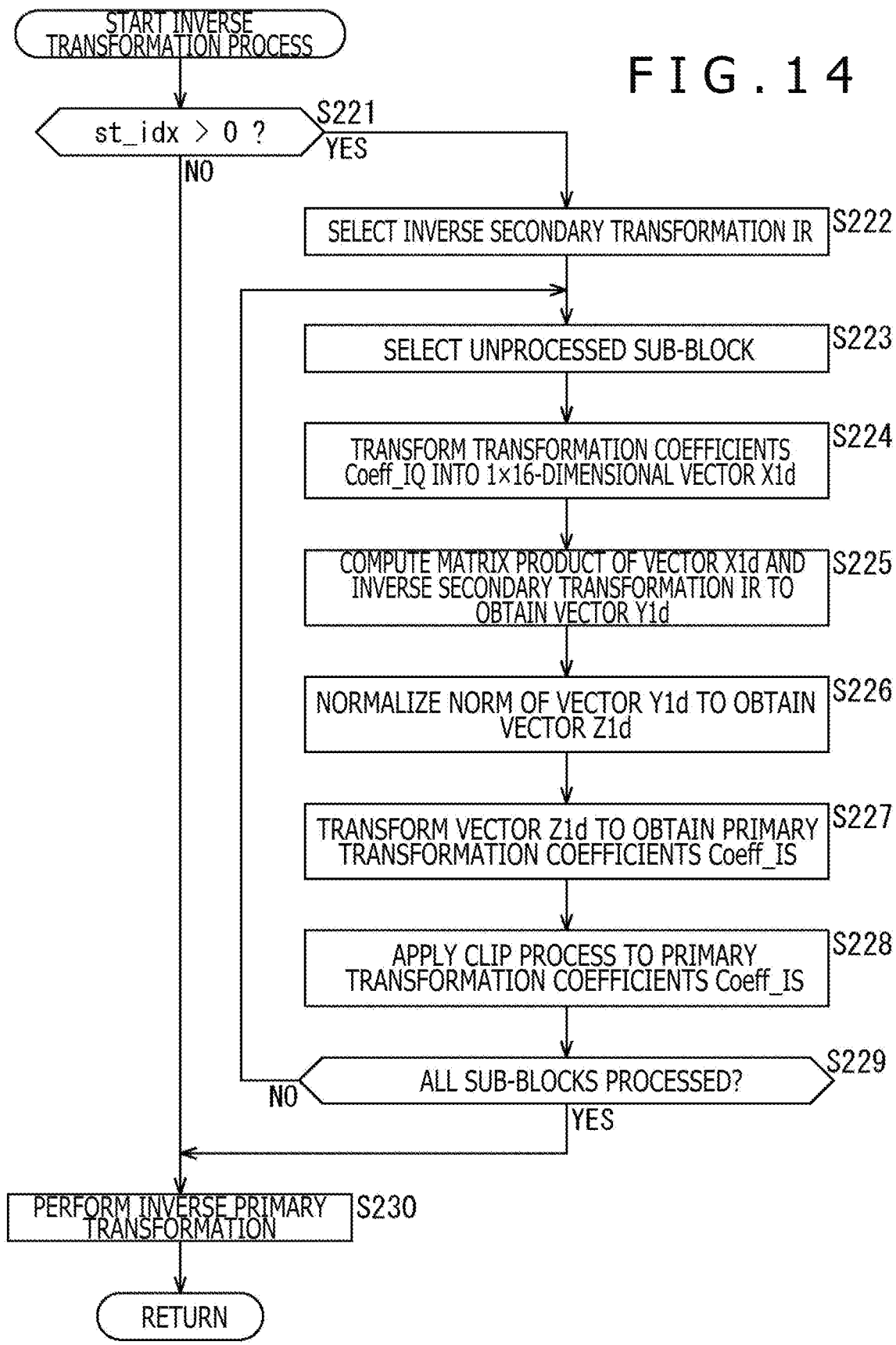
FIG. 14 is a flow chart describing an example of a flow of an inverse transformation process.

Once the transformation process is started, each process of step S321 and step S322 is executed as in each process of step S221 and step S222 of FIG. 14.

In step S323, the shift amount derivation section 311 derives the amount of shift S based on the maximum value of the bit depth (largest bit depth) bitDepthMax, the maximum value of the bit depth of the intermediate buffer (intermediate buffer largest bit depth) bitDepthMaxBuffer, and the inverse secondary transformation matrix IR.

Each process of steps S324 to S326 is basically executed as in each process of steps S223 to S225 of FIG. 14.

In step S327, the scaling section 312 uses the amount of shift N and the amount of shift S to normalize the norm of the vector $Y_{1d}$ and obtains the vector $Z_{1d}$.

Each process of steps S328 to S330 is executed as in each process of step S227, step S229, and step S230 of FIG. 14.

Once the process of step S330 is finished, the inverse transformation process ends, and the process returns to FIG. 13.

As a result of the execution of each process, the dynamic range width of the transformation coefficients can be suppressed within the predetermined range (for example, 16 bits). That is, the increase in the load of decoding can be suppressed. In addition, this can suppress the increase in the size of the intermediate buffer that stores the transformation coefficients, and the increase in the cost can be suppressed. Furthermore, the clip process can be skipped.

3. Third Embodiment

<Matrix Computation>

In NPL 1, it is disclosed that after a primary transformation (existing orthogonal transformation using DCT/DST or the like) is performed, a non-separate secondary transformation is further applied in 4×4 sub-blocks in order to increase the energy compaction (concentrate the transformation coefficients in a low-frequency region). Furthermore, in NPL 2, it is disclosed that a non-separable secondary transformation based on Hypercube-Gives Transform (also referred to as HyGT) is similarly applied in 4×4 sub-blocks. Note that the HyGT regarding the number of elements 16 will also be referred to as 16-points HyGT. In addition, the HyGT regarding the number of elements $2^N$ will also be referred to as $2^4$-points HyGT.

However, the secondary transformation is non-separable in both the method described in NPL 1 and the method described in NPL2, and the amount of computation is large. In addition, the number of matrices of the secondary transformation corresponds to the number of classes of the intra prediction mode and the number of secondary transformations corresponding to each class, and this may increase the memory size for holding the matrices of the secondary transformation. In other words, this may increase the load of encoding and decoding.

For example, in the case of the method described in NPL 1, the number of classes of the intra prediction mode is 12, and the number of secondary transformations for each class is 3. There are 12*3=36 matrices. In the case of the method described in NPL 2, the number of classes of the intra prediction mode is 35, and the number of secondary transformations for each class is 5. There are 35*5=175 matrices.

For example, it is assumed that the elements of each matrix is held at 9-bit precision. In the method described in NPL 1, the memory size required for holding the matrices of all the secondary transformations is 9 bits*16*16*36= 829944 bits=10368 bytes=10.125 KB. Furthermore, in the method described in NPL 2, the memory size required for holding the matrices of all the secondary transformations is 9 bits*16*16*175=403200 bits=50400 bytes=49.21875 KB.

<Decomposition of Matrix Computation>

Therefore, in the secondary transformation and the inverse secondary transformation, the transformation coefficients obtained by applying the transformation process to the predicted residual that is the difference between the image and the predicted image of the image are transformed into a one-dimensional vector, and matrix computation including a plurality of times of matrix multiplication is performed for the one-dimensional vector.

For example, the 16-points HyGT described in NPL 2 is decomposed into four orthogonal matrices and three permutation matrices to provide a separable orthogonal transformation. The separable orthogonal transformation is used to perform the secondary transformation and the inverse secondary transformation.

Figure 19:
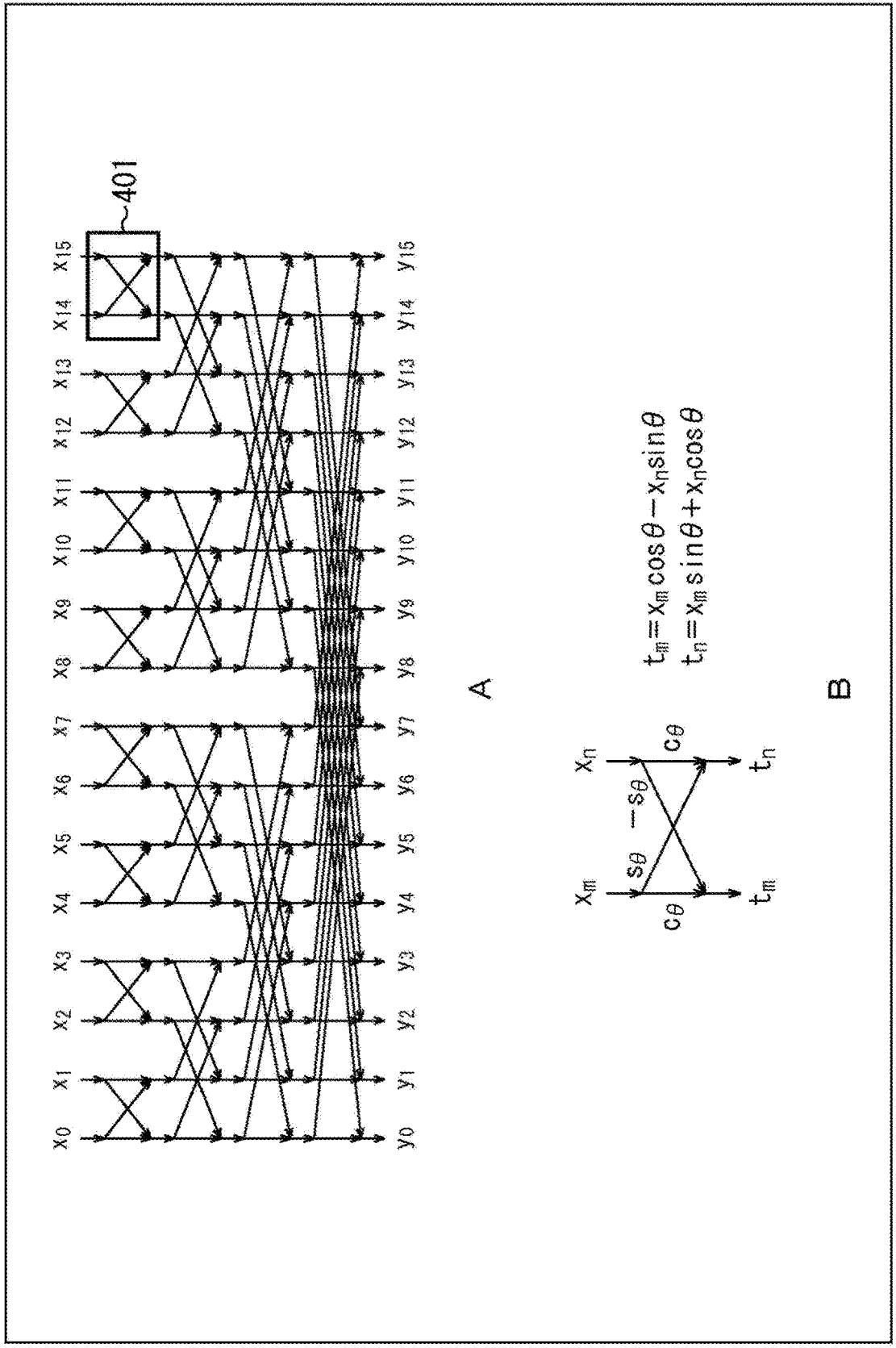
FIG. 19 is a diagram illustrating an example of a situation of a Hypercube-Givens Transform.

An example of a situation of the 16-points HyGT described in NPL 2 is illustrated in A of FIG. 19. A rectangle 401 of the 16-points HyGT is a rotation matrix (Givens Transform) as illustrated in B of FIG. 19. That is, the HyGT includes a plurality of rotation matrices.

Figure 20:
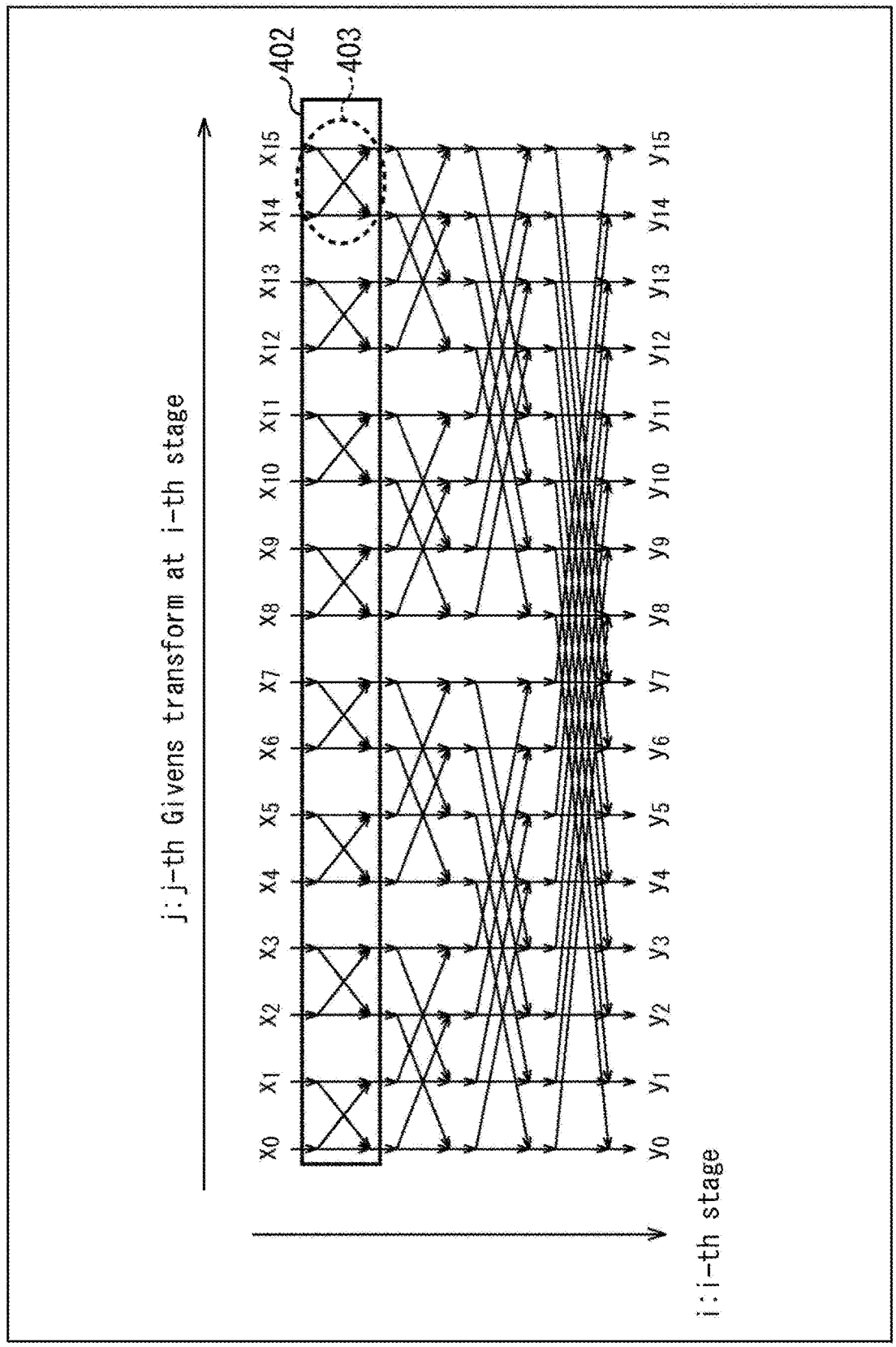
FIG. 20 is a diagram describing matrix decomposition of the Hypercube-Givens Transform.

Therefore, as illustrated in FIG. 20, a transformation (also referred to as an operation) of an ith stage of the 16-points HyGT as indicated by a rectangle 402 will be referred to as a transformation (operation) $T_i$, and a jth rotation matrix of the transformation (operation) $T_i$ surrounded by a dotted line 403 will be referred to as a rotation matrix $G_{i,j}$.

<Operation of First Stage>

Figure 21:
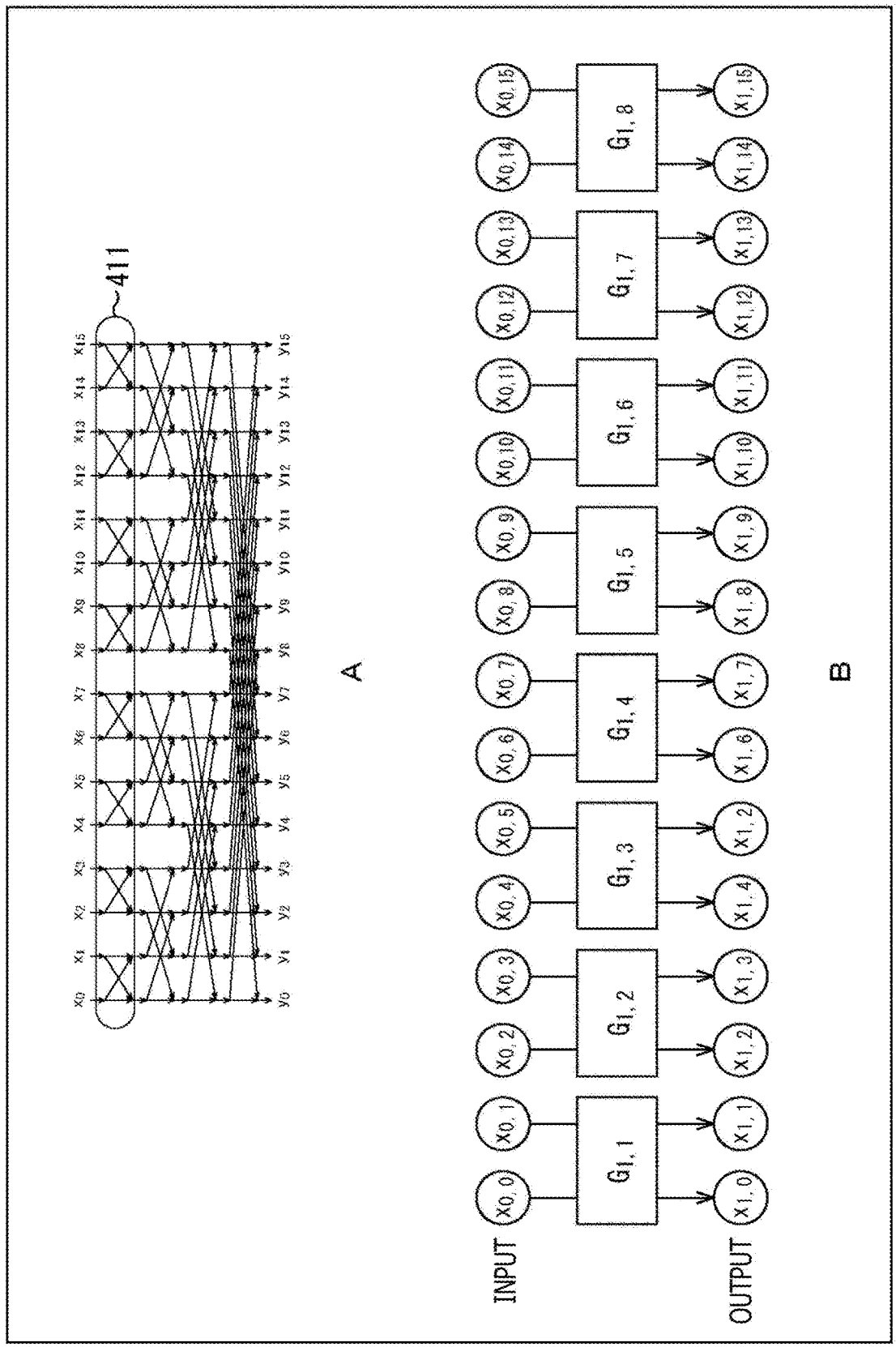
FIG. 21 is a diagram describing matrix decomposition of the Hypercube-Givens Transform.

First, an operation of a first stage of the 16-points HyGT (part surrounded by a frame 411 in A of FIG. 21) will be described. B of FIG. 21 is an enlarged illustration of an operation $T_1$ of the first stage. As illustrated in B of FIG. 21, the operation $T_1$ of the first stage includes an orthogonal transformation including eight rotation matrices $G_{1,1}$ to $G_{1,8}$.

That is, the operation $T_i$ of the first stage can be expressed by a sparse orthogonal matrix $F_1$ as in the following Formula (32), where the rotation matrices $G_{i,j}$ are provided as diagonal components, and the other elements are 0. Note that each rotation matrix $G_{i,j}$ can be expressed as in Formula (33).

[Math. 3]

$$F_1 = \begin{bmatrix} G_{1,1} & & & & & & & \\ & G_{1,2} & & & & & & \\ & & G_{1,3} & & & 0 & & \\ & & & G_{1,4} & & & & \\ & & & & G_{1,5} & & & \\ & & 0 & & & G_{1,6} & & \\ & & & & & & G_{1,7} & \\ & & & & & & & G_{1,8} \end{bmatrix} \quad (32)$$

[Math. 4]

$$G_{i,j} = \begin{bmatrix} \cos\theta_{i,j} & -\sin\theta_{i,j} \\ \sin\theta_{i,j} & \cos\theta_{i,j} \end{bmatrix} \quad (33)$$

<Operation of Second Stage>

Figure 22:
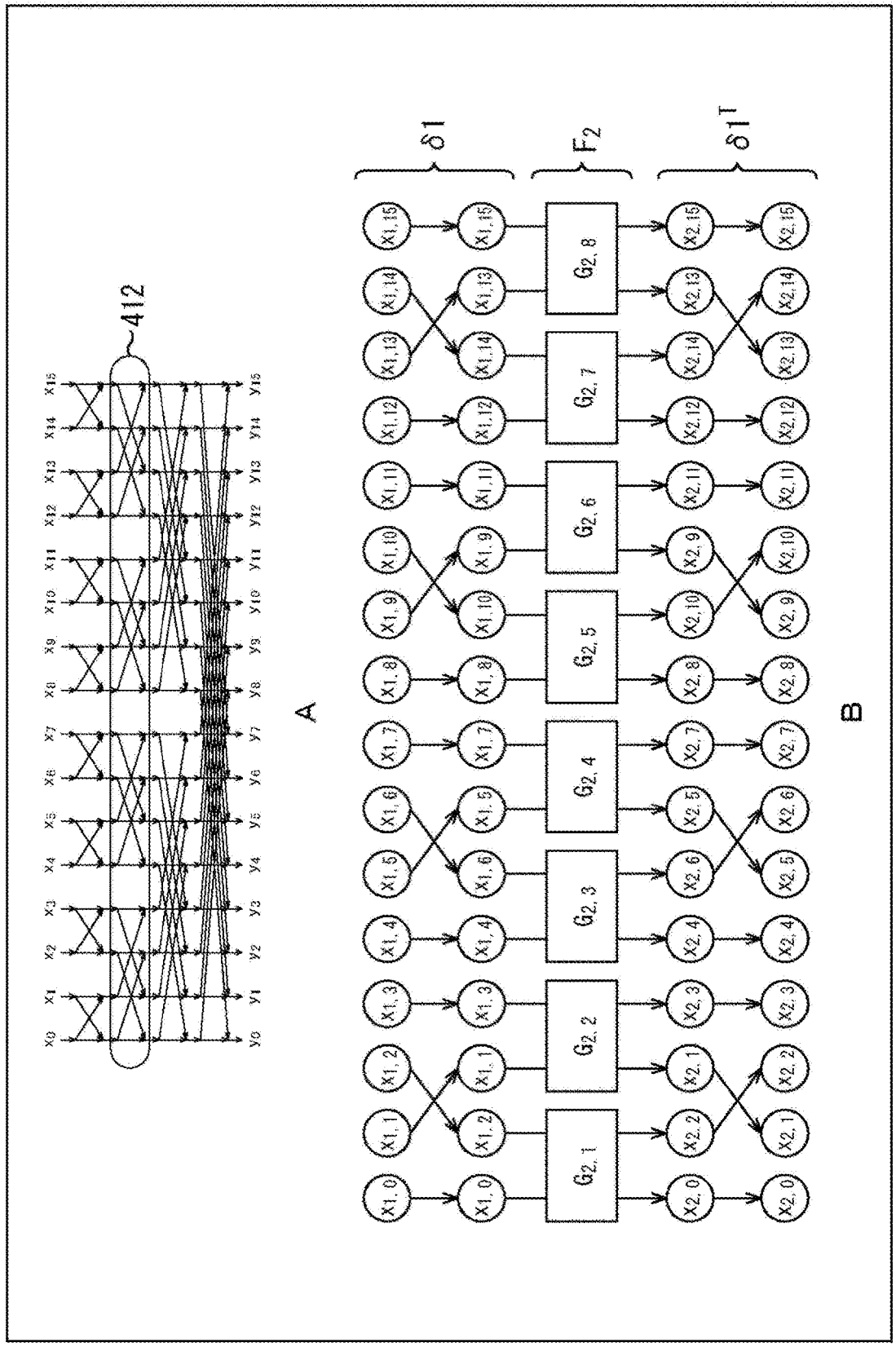
FIG. 22 is a diagram describing matrix decomposition of the Hypercube-Givens Transform.

Next, an operation of a second stage of the HyGT (part surrounded by a frame 412 in A of FIG. 22) will be described. B of FIG. 22 is an enlarged illustration of an operation $T_2$ of the second stage. As illustrated in B of FIG. 22, the operation $T_2$ of the second stage includes a permutation $\delta 1$, an orthogonal transformation including rotation matrices $G_{2,1}$ to $G_{2,8}$ and an inverse permutation $\delta_1^T$. The permutation $\delta 1$ can be expressed as in the following Formula (34).

[Math. 5]

$$\delta 1 = \begin{pmatrix} 0, 1, 2, 3, 4, 5, 6, 7, 8, 9, 10, 11, 12, 13, 14, 15 \\ 0, 2, 1, 3, 4, 6, 5, 7, 8, 10, 9, 11, 12, 14, 13, 15 \end{pmatrix} \quad (34)$$

The permutation δ1 can also be represented by a permutation matrix $P_1$ by using a matrix P as indicated in the following Formula (35). The matrix P can be expressed as in Formula (36).

[Math. 6]

$$P_1 = \begin{bmatrix} P & 0 \\ 0 & P \end{bmatrix} \quad (35)$$

[Math. 7]

$$P = \begin{bmatrix} 1 & 0 & 0 & 0 & 0 & 0 & 0 & 0 \\ 0 & 0 & 1 & 0 & 0 & 0 & 0 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 1 & 0 & 0 \\ 0 & 0 & 0 & 0 & 0 & 0 & 0 & 1 \end{bmatrix} \quad (36)$$

Note that the inverse permutation $\delta 1^T$ can be represented by a transposed matrix $P_1^T$ of the permutation matrix $P_1$. Furthermore, the orthogonal transformation of the second stage can be expressed by a sparse orthogonal matrix $F_2$ as in Formula (37), where rotational matrices $G2_{2,j}$ are provided as diagonal components, and the other elements are 0.

[Math. 8]

$$F_2 = \begin{bmatrix} G_{2,1} & & & & & & & \\ & G_{2,2} & & & & & & \\ & & G_{2,3} & & & & 0 & \\ & & & G_{2,4} & & & & \\ & & & & G_{2,5} & & & \\ & & 0 & & & G_{2,6} & & \\ & & & & & & G_{2,7} & \\ & & & & & & & G_{2,8} \end{bmatrix} \quad (37)$$

That is, the operation $T_2$ of the second stage can be expressed by matrix decomposition as in the following Formula (38).

$$T_2 = P_1^T * F_2 * P_1 \quad (38)$$

<Operation of Third Stage>

Figure 23:
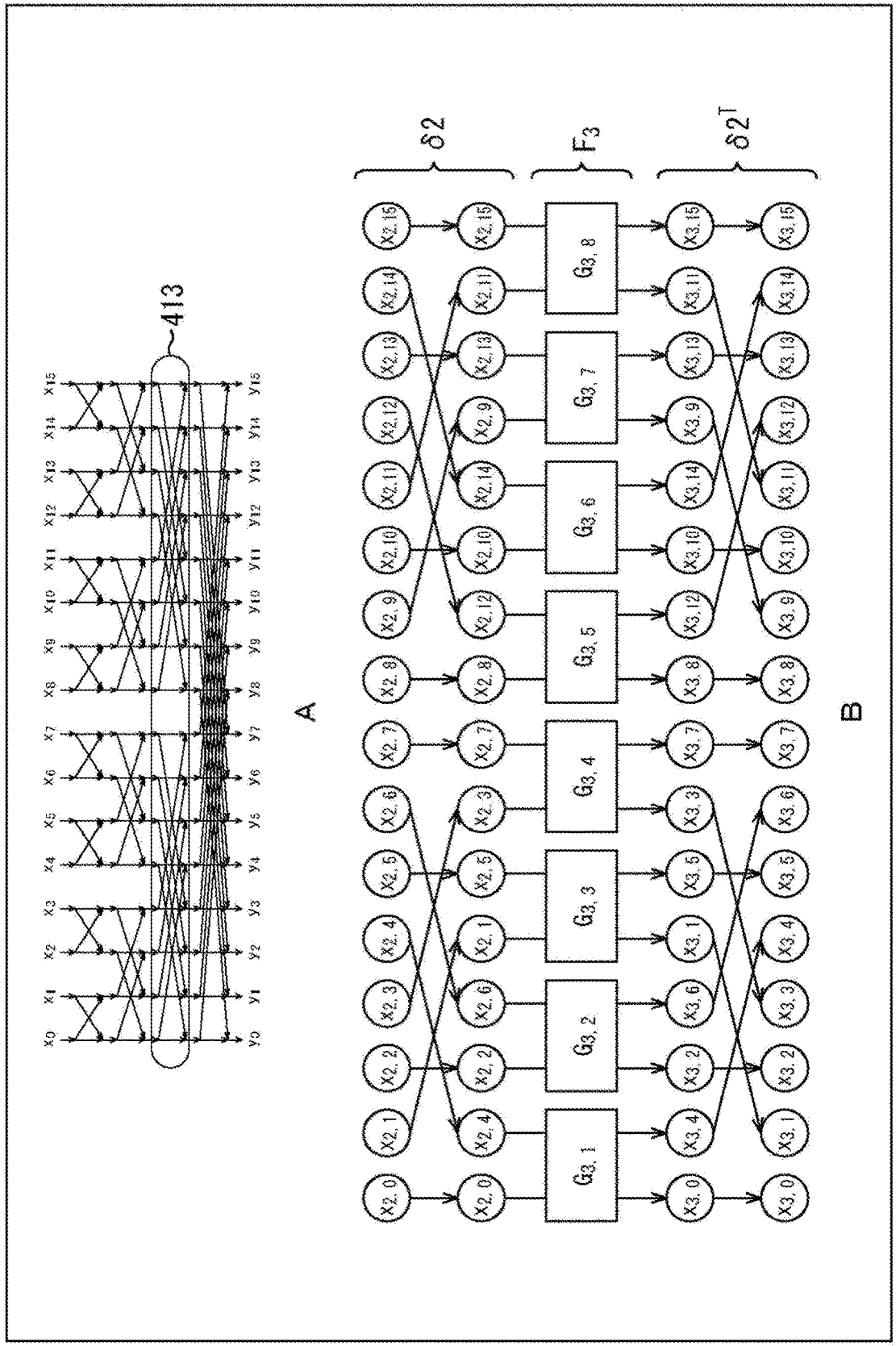
FIG. 23 is a diagram describing matrix decomposition of the Hypercube-Givens Transform.

Next, an operation of a third stage of HyGT (part surrounded by a frame 413 in A of FIG. 23) will be described. B of FIG. 23 is an enlarged illustration of an operation $T_3$ of the third stage. As illustrated in B of FIG. 23, the operation $T_3$ of the third stage includes a permutation δ2, an orthogonal transformation including rotation matrices $G_{3,1}$ to $G_{3,3}$, and an inverse permutation $\delta_2^T$. The permutation δ2 can be expressed as in the following Formula (39).

[Math. 9]

$$\delta 2 = \begin{pmatrix} 0, 1, 2, 3, 4, 5, 6, 7, 8, 9, 10, 11, 12, 13, 14, 15 \\ 0, 4, 2, 6, 1, 5, 3, 7, 8, 12, 10, 14, 9, 13, 11, 15 \end{pmatrix} \quad (39)$$

The permutation δ2 can also be expressed by a permutation matrix $P_2$ by using the matrix P as illustrated in the following Formula (40). The matrix P can be expressed as in Formula (41).

[Math. 10]

$$P_2 = \begin{bmatrix} P & 0 \\ 0 & P \end{bmatrix} \quad (40)$$

[Math. 11]

$$P = \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 0 & 0 & 1 & 0 & 0 \\ 0 & 0 & 0 & 1 & 0 & 0 & 0 & 0 \\ 0 & 0 & 0 & 0 & 0 & 0 & 0 & 1 \end{bmatrix} \quad (41)$$

Note that the inverse permutation $\delta_2^T$ can be represented by a transposed matrix $P_2^T$ of the permutation matrix $P_2$. In addition, the orthogonal transformation of the third stage can be expressed by a sparse orthogonal matrix $F_3$ as in Formula (42), where rotation matrices $G_{3,j}$ are provided as diagonal components, and the other elements are 0.

[Expression 12]

$$F_3 = \begin{bmatrix} G_{3,1} & & & & & & & \\ & G_{3,2} & & & & & & \\ & & G_{3,3} & & & & 0 & \\ & & & G_{3,4} & & & & \\ & & & & G_{3,5} & & & \\ & & 0 & & & G_{3,6} & & \\ & & & & & & G_{3,7} & \\ & & & & & & & G_{3,8} \end{bmatrix} \quad (42)$$

That is, the operation $T_3$ of the third stage can be expressed by matrix decomposition as in the following Formula (43).

$$T_3 = P_2^T \cdot F_3 \cdot P_2 \quad (43)$$

<Operation of Fourth Stage>

Figure 24:
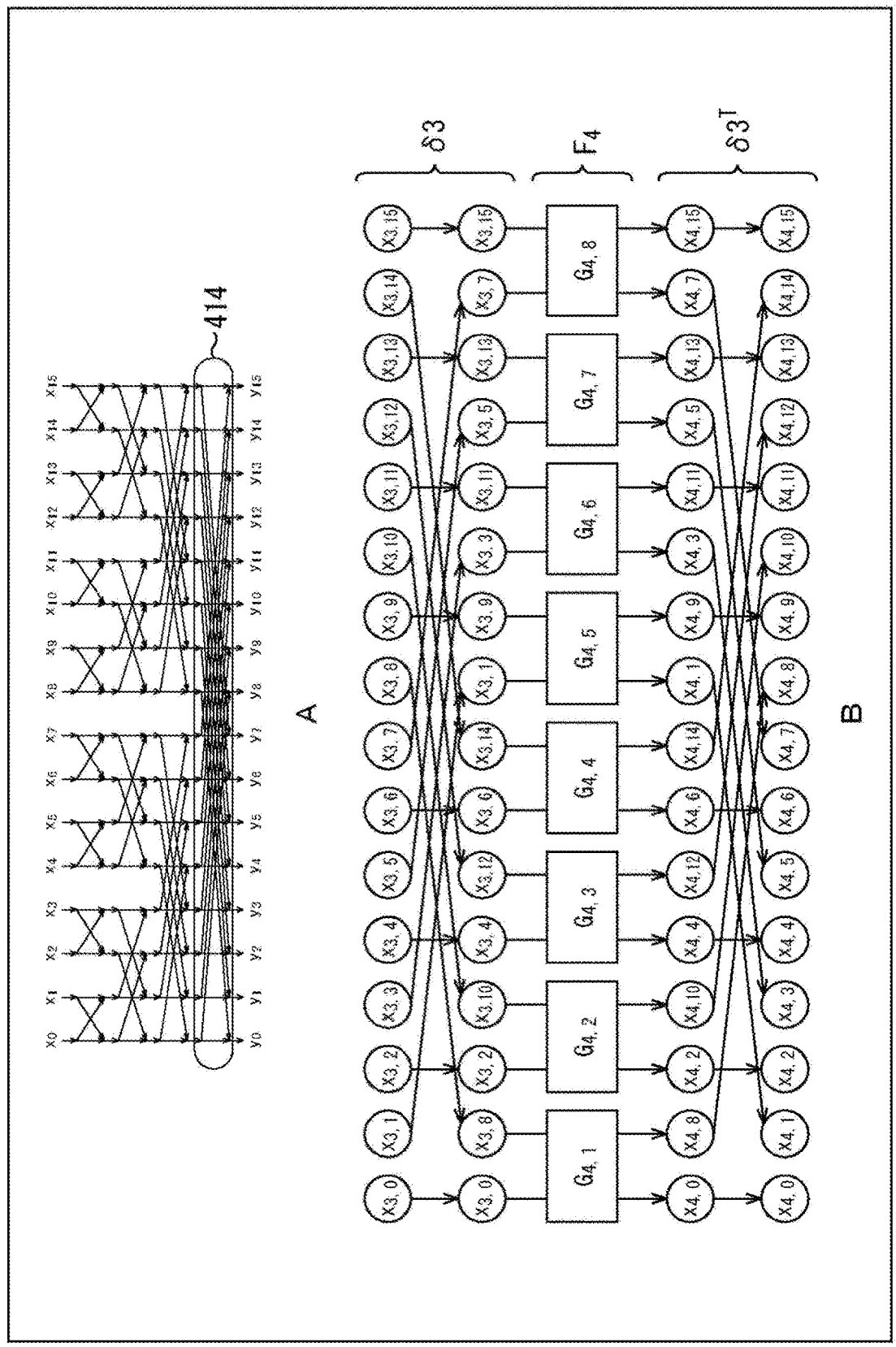
FIG. 24 is a diagram describing matrix decomposition of the Hypercube-Givens Transform.

Next, an operation of a fourth stage of the HyGT (part surrounded by a frame 414 in A of FIG. 24) will be described. B of FIG. 24 is an enlarged illustration of an operation $T_4$ of the fourth stage. As illustrated in B of FIG. 24, the operation $T_4$ of the fourth stage includes a permutation δ3, an orthogonal transformation including rotation matrices $G_{4,1}$ to $G_{4,u}$, and an inverse permutation $\delta_3^T$. The permutation 53 can be expressed as in the following Formula (44).

[Math. 13]

$$\delta 3 = \begin{pmatrix} 0, 1, 2, 3, 4, 5, 6, 7, 8, 9, 10, 11, 12, 13, 14, 15 \\ 0, 8, 2, 10, 4, 12, 6, 14, 1, 9, 3, 11, 5, 13, 7, 15 \end{pmatrix} \quad (44)$$

The permutation 53 can also be represented by a permutation matrix $P_3$ as indicated in the following Formula (45).

[Math. 14]

$$P_3 = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 1 & 0 & 0 \\ 0 & 1 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 1 \end{bmatrix} \quad (45)$$

Note that the inverse permutation δ3T can be represented by a transposed matrix $P_3^T$ of the permutation matrix $P_3$. In addition, the orthogonal transformation of the fourth stage can be expressed by a sparse orthogonal matrix $F_4$ as in Formula (46), where rotation matrices $G_{4,j}$ are provided as diagonal components, and the other elements are 0.

[Math. 15]

$$F_4 = \begin{bmatrix} G_{4,1} & & & & & & & \\ & G_{4,2} & & & & & & \\ & & G_{4,3} & & & 0 & & \\ & & & G_{4,4} & & & & \\ & & & & G_{4,5} & & & \\ & & 0 & & & G_{4,6} & & \\ & & & & & & G_{4,7} & \\ & & & & & & & G_{4,8} \end{bmatrix} \quad (46)$$

That is, the operation $T_4$ of the fourth stage can be expressed by matrix decomposition as in the following Formula (47).

$$T_4 = P_3^T \cdot F_4 \cdot P_3 \quad (47)$$

Therefore, the 16-points HyGT (matrix R of secondary transformation) can be expressed by matrix decomposition as in the following Formula (48). Similarly, the inverse HyGT (matrix IR $(=R^{-1})$ of inverse secondary transformation) can be expressed by matrix decomposition as in the following Formula (49).

$$R = P_3^T \cdot F_4 \cdot P_3 \cdot P_2^T \cdot F_3 \cdot P_2 \cdot P_1^T \cdot F_2 \cdot P_1 \cdot F_1 \quad (48)$$

$$\begin{aligned} R^{-1} &= (P_3^T \cdot F_4 \cdot P_3 \cdot P_2^T \cdot F_3 \cdot P_2 \cdot P_1^T \cdot F_2 \cdot P_1 \cdot F_1)^{-1} \\ &= F_1^{-1} \cdot P_1^{-1} \cdot F_2^{-1} \cdot (P_1^T)^{-1} \cdot P_2^{-1} \cdot F_3^{-1} \cdot (P_2^T)^{-1} \cdot P_3^{-1} \cdot F_4^{-1} \cdot \\ &\quad (P_3^T)^{-1} \\ &= F_1^T \cdot P_1^T \cdot F_2^T \cdot P_1 \cdot P_2^T \cdot F_3^T \cdot P_2 \cdot P_3^T \cdot F_4^T \cdot P_3 \end{aligned} \quad (49)$$

A table of A in FIG. 25 illustrates results of comparison between the case of the non-separable secondary transformation described in NPL 2 and the case of the separable secondary transformation after the matrix decomposition regarding the number of processes of multiplication and addition. As illustrated in the table of A in FIG. 25, the matrix decomposition can reduce the number of processes of multiplication and addition.

In addition, a table of B in FIG. 25 illustrates results of comparison between the case of the non-separable secondary transformation described in NPL 2 and the case of the separable secondary transformation after the matrix decomposition regarding the amount of information of the matrix of the secondary transformation (per transformation) and the memory size necessary for holding the matrix. As a result of the matrix decomposition, the nature of the sparse matrix of each orthogonal transformation after the matrix decomposition and the symmetry of coefficients can be used to reduce the number of coefficients held for the secondary transformation. Therefore, as indicated in the table of B in FIG. 25, the amount of information of the matrix of the secondary transformation can be reduced, and the increase in the necessary memory size can be suppressed. That is, the increase in the load of encoding can be suppressed.

<Transformation Section>

In this case, the configuration of the image encoding apparatus 100 is also basically similar to the case of the first embodiment. However, the image encoding apparatus 100 in this case includes: a rasterization section that transforms, into a one-dimensional vector, transformation coefficients obtained by applying a transformation process to a predicted residual that is a difference between an image and a predicted image of the image; a matrix computation section that applies matrix computation including a plurality of times of matrix multiplication to the one-dimensional vector; a scaling section that scales the one-dimensional vector subjected to the matrix computation subjected to the matrix computation; and a matrix formation section that forms a matrix of the scaled one-dimensional vector. That is, the transformation section 112 in this case transforms, into the one-dimensional vector, the transformation coefficients obtained by applying the transformation process to the predicted residual that is the difference between the image and the predicted image of the image, applies the matrix computation including a plurality of times of matrix multiplication to the one-dimensional vector, scales the one-dimensional vector subjected to the matrix computation, and forms the matrix of the scaled one-dimensional vector.

Figure 26:
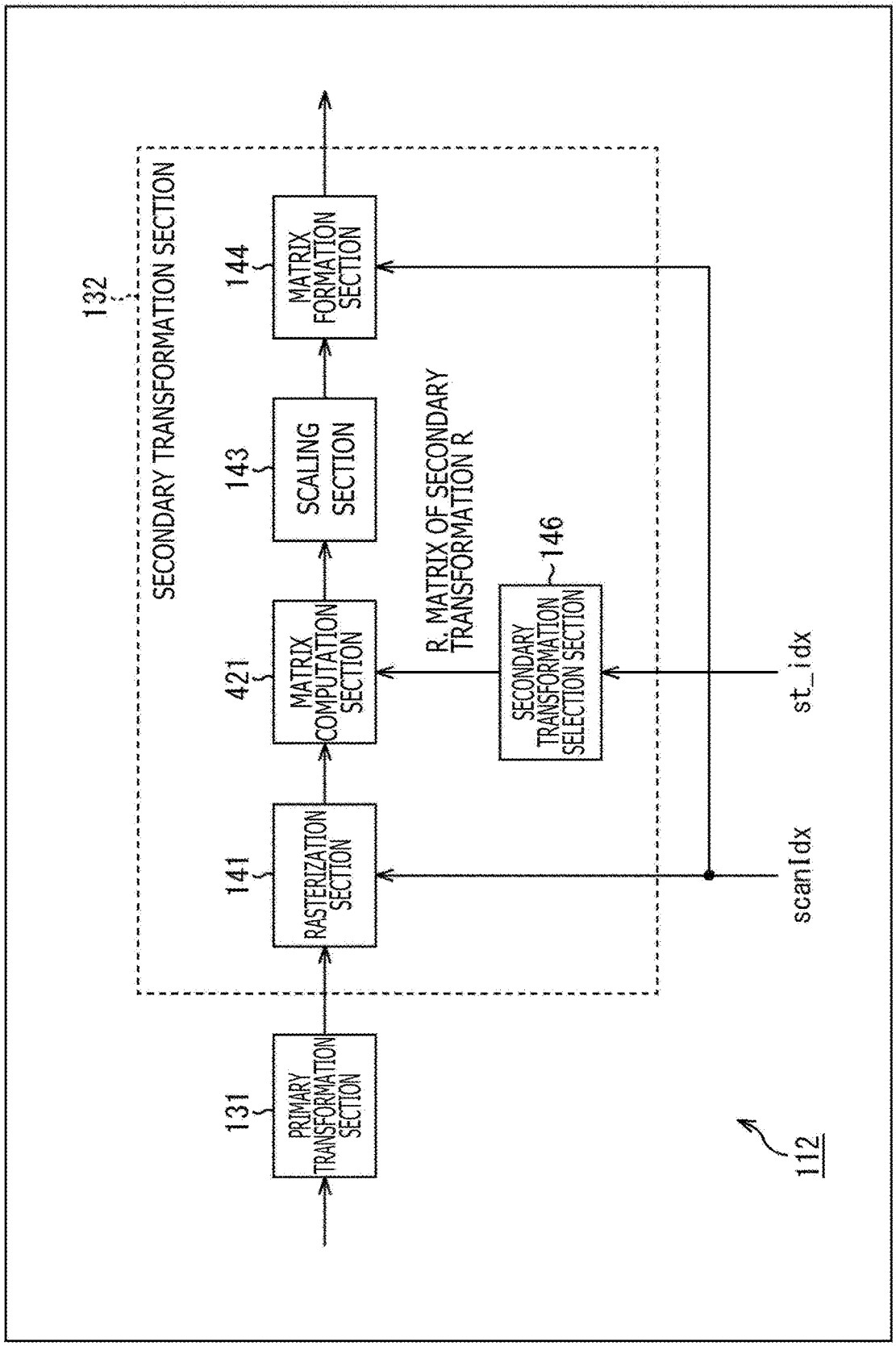
FIG. 26 is a block diagram illustrating a main configuration example of the transformation section.

FIG. 26 is a block diagram illustrating a main configuration example of the transformation section 112 in this case. As illustrated in FIG. 26, the configuration of the transformation section 112 in this case is also basically similar to the case of the first embodiment (FIG. 8). However, the secondary transformation section 132 in this case includes a matrix computation section 421 in place of the matrix computation section 142. In addition, the clip processing section 145 can be removed in this case. Note that the matrix computation section 421 uses a plurality of orthogonal matrices subjected to N-bit scaling to perform the matrix computation including a plurality of times (M times) of matrix multiplication, and the dynamic range is M*N bits. Therefore, the amount of shift for the scaling section 143 to normalize the norm of the vector Y1d is (M*N).

The matrix computation section 421 applies, to the one-dimensional vector supplied from the rasterization section 141, matrix computation including a plurality of times of matrix multiplication based on the matrix decomposition of the matrix of the secondary transformation R.

<Matrix Computation Section (16-Points HyGT Section)>

Figure 27:
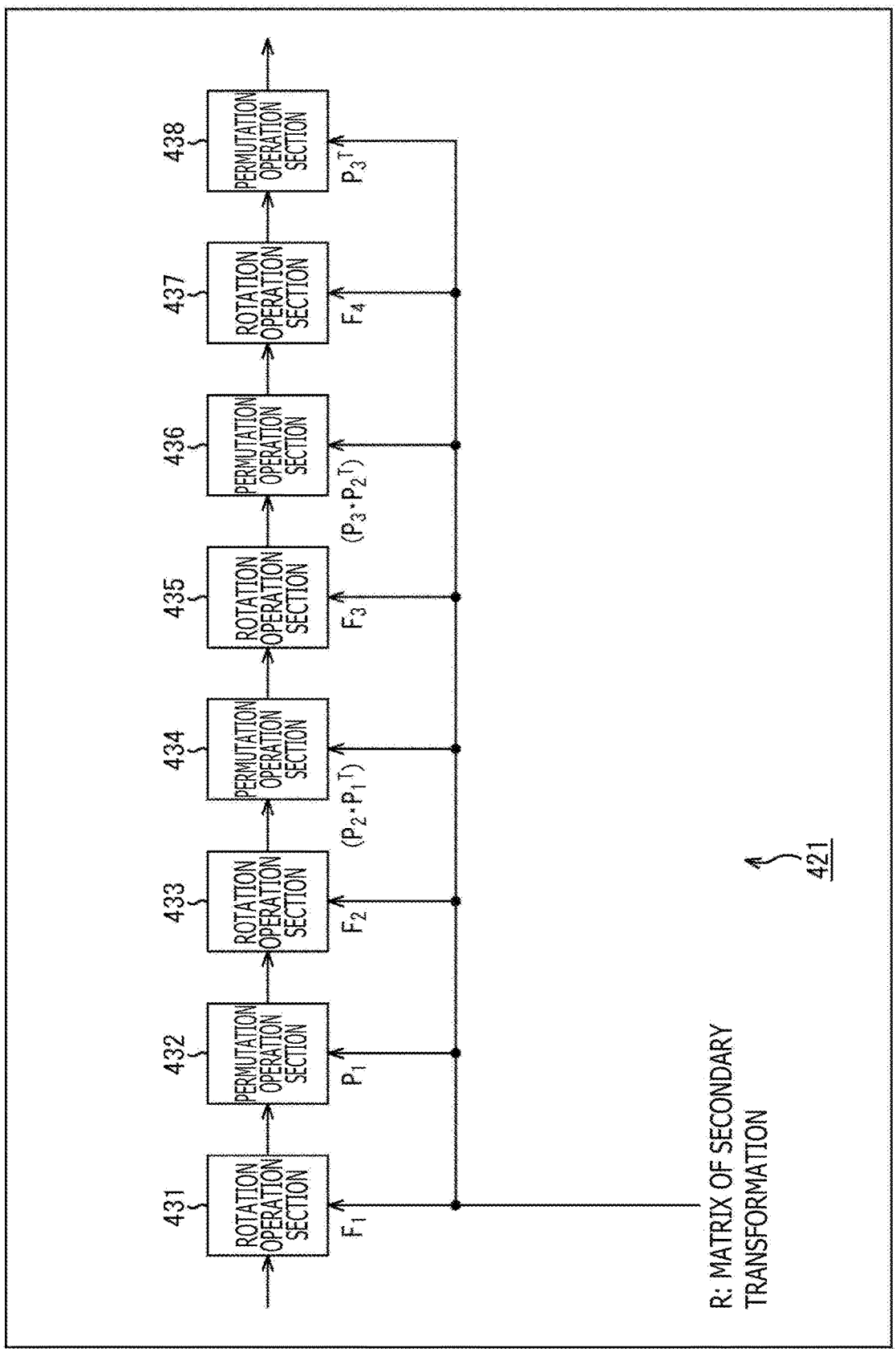
FIG. 27 is a block diagram illustrating a main configuration example of a matrix computation section.

FIG. 27 is a block diagram illustrating a main configuration example of the matrix computation section 421. As illustrated in FIG. 27, the matrix computation section 421 includes a rotation operation section 431, a permutation operation section 432, a rotation operation section 433, a permutation operation section 434, a rotation operation section 435, a permutation operation section 436, a rotation operation section 437, and a permutation operation section 438. Note that the matrix computation section 421 will also be referred to as a 16-points HyGT section 421.

The rotation operation section 431 obtains a matrix product $A_{1d}$ of the orthogonal matrix $F_1$ obtained by the matrix decomposition of the matrix R of the secondary transformation supplied from the secondary transformation selection section 146 and the row vector $X_{1d}$ supplied from the rasterization section 141. The rotation operation section 431 supplies the matrix product $A_{1d}$ to the permutation operation section 432.

The permutation operation section 432 obtains a matrix product $B_{1d}$ of the permutation matrix $P_1$ obtained by the matrix decomposition of the matrix R of the secondary transformation supplied from the secondary transformation selection section 146 and the matrix product $A_{1d}$ supplied from the rotation operation section 431. The permutation operation section 432 supplies the matrix product $B_{1d}$ to the rotation operation section 433.

The rotation operation section 433 obtains a matrix product $C_{1d}$ of the orthogonal matrix $F_2$ obtained by the matrix decomposition of the matrix R of the secondary transformation supplied from the secondary transformation selection section 146 and the matrix product $B_{1d}$ supplied from the permutation operation section 432. The rotation operation section 433 supplies the matrix product $C_{1d}$ to the permutation operation section 434.

The permutation operation section 434 obtains a matrix product $D_{1d}$ of the permutation matrix $P_2$ obtained by the matrix decomposition of the matrix R of the secondary transformation supplied from the secondary transformation selection section 146, the transposed matrix $P_1^T$ of the permutation matrix $P_1$ obtained by the matrix decomposition of the matrix R of the secondary transformation supplied from the secondary transformation selection section 146, and the matrix product $C_{1d}$ supplied from the rotation operation section 433. The permutation operation section 434 supplies the matrix product $D_{1d}$ to the rotation operation section 435.

The rotation operation section 435 obtains a matrix product $E_{1d}$ of the orthogonal matrix $F_3$ obtained by the matrix decomposition of the matrix R of the secondary transformation supplied from the secondary transformation selection section 146 and the matrix product $D_{1d}$ supplied from the permutation operation section 434. The rotation operation section 435 supplies the matrix product $E_{1j}$ to the permutation operation section 436.

The permutation operation section 436 obtains a matrix product $G_{1d}$ of the permutation matrix $P_3$ obtained by the matrix decomposition of the matrix R of the secondary transformation supplied from the secondary transformation selection section 146, the transposed matrix $P_2^T$ of the permutation matrix $P_2$ obtained by the matrix decomposition of the matrix R of the secondary transformation supplied from the secondary transformation selection section 146, and the matrix product $E_{1d}$ supplied from the rotation operation section 435. The permutation operation section 436 supplies the matrix product GA to the rotation operation section 437.

The rotation operation section 437 obtains a matrix product $H_{1d}$ of the orthogonal matrix $F_4$ obtained by the matrix decomposition of the matrix R of the secondary transformation supplied from the secondary transformation selection section 146 and the matrix product $G_{1d}$ supplied from the permutation operation section 436. The rotation operation section 437 supplies the matrix product $H_{1d}$ to the permutation operation section 438.

The permutation operation section 438 obtains a matrix product $Y_{1d}$ of the transposed matrix $P_3^T$ of the permutation matrix $P_3$ obtained by the matrix decomposition of the matrix R of the secondary transformation supplied from the secondary transformation selection section 146 and the matrix product Hi supplied from the rotation operation section 437. The permutation operation section 436 supplies the matrix product $Y_{1d}$ to the scaling section 143.

In this way, the matrix computation section 421 performs the matrix decomposition of the matrix of the secondary transformation to perform the matrix computation and transforms the row vector $X_{1d}$ into the row vector $Y_{1d}$. Therefore, the amount of computation (multiplication and addition) of the secondary transformation can be reduced. In addition, the number of coefficients held for the secondary transformation can be reduced, and the memory size necessary for holding the matrix of the secondary transformation can be reduced. That is, the increase in the load of encoding can be suppressed.

<Flow of Transformation Process>

Next, an example of a flow of each process executed by the image encoding apparatus 100 will be described. In this case, the image encoding apparatus 100 basically executes an image encoding process as in the case of the first embodiment (FIG. 9). An example of a flow of a transformation process in this case will be described with reference to a flow chart of FIG. 28.

Once the transformation process is started, each process of steps S401 to S409 is basically executed as in each process of steps S121 to S128 and step S130 of FIG. 10.

However, in this case, the matrix computation in the process of step S406 is performed by performing the matrix decomposition of the matrix R of the secondary transformation as described above.

<Flow of Matrix Computation Process>

An example of a flow of the matrix computation process executed in step S406 of FIG. 28 will be described with reference to a flow chart of FIG. 29.

Once the matrix computation process is started, the rotation operation section 431 obtains the matrix product A1d of the orthogonal matrix $F_1$ and the row vector $X_{1d}$ in step S421.

In step S422, the permutation operation section 432 obtains the matrix product $B_{1d}$ of the permutation matrix $P_1$ and the matrix product $A_{1d}$.

In step S423, the rotation operation section 433 obtains the matrix product $C_{1d}$ of the orthogonal matrix $F_2$ and the matrix product $B_{1d}$.

In step S424, the permutation operation section 434 obtains the matrix product $D_{1d}$ of the permutation matrix $P_2$, the transposed matrix $P_1^T$ of the permutation matrix $P_1$, and the matrix product $C_{1d}$.

In step S425, the rotation operation section 435 obtains the matrix product $E_{1d}$ of the orthogonal matrix $F_3$ and the matrix product $D_{1d}$.

In step S426, the permutation operation section 436 obtains the matrix product $G_{1d}$ of the permutation matrix $P_3$, the transposed matrix $P_2^T$ of the permutation matrix $P_2$, and the matrix product $E_{1d}$.

In step S427, the rotation operation section 437 obtains the matrix product $H_{1d}$ of the orthogonal matrix $F_4$ and the matrix product $G_{1d}$.

In step S428, the permutation operation section 438 obtains the matrix product $Y_{1d}$ of the transposed matrix $P_3^T$ of the permutation matrix P and the matrix product Hid.

Figure 28:
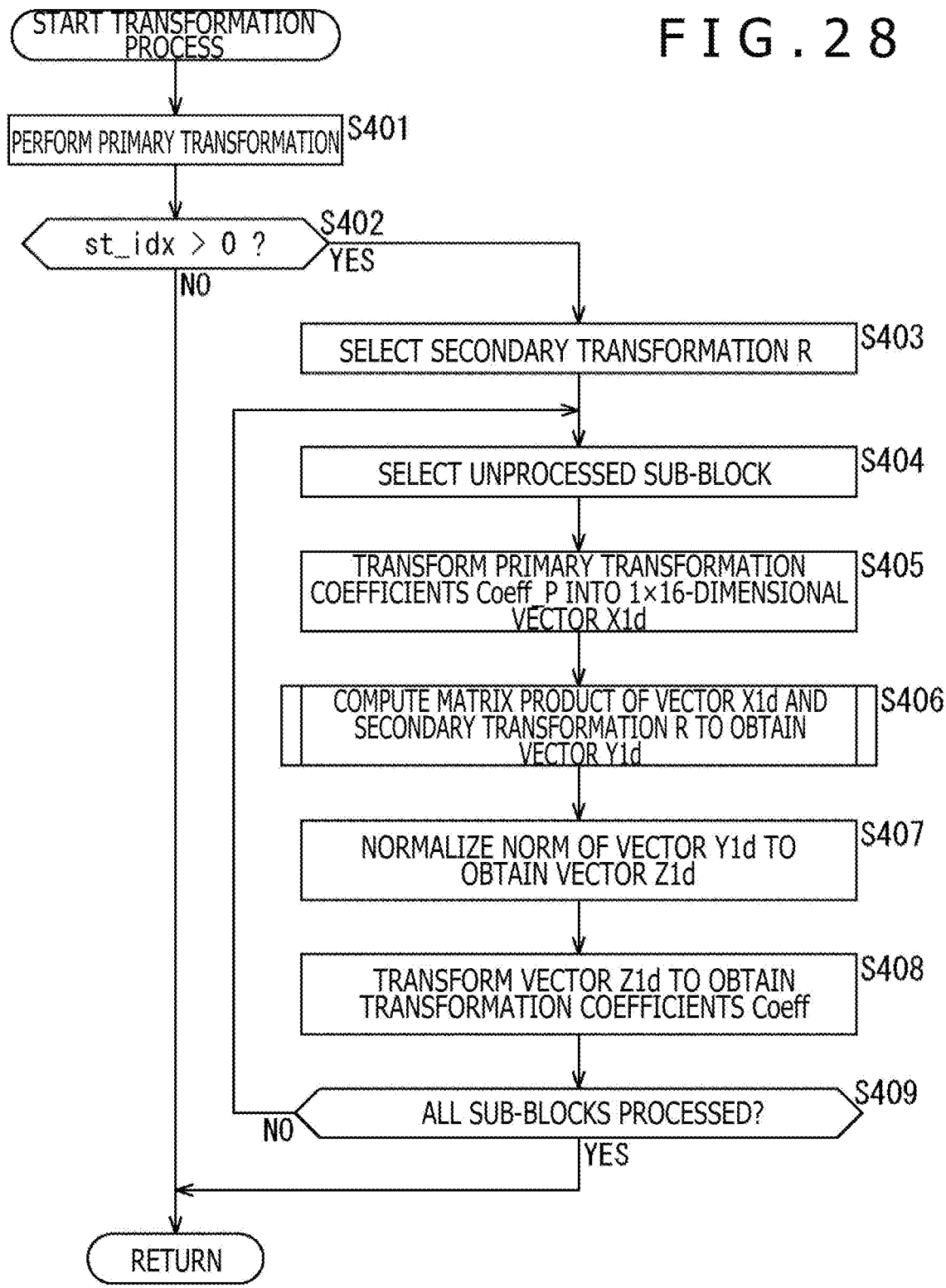
FIG. 28 is a flow chart describing an example of a flow of a transformation process.
Figure 29:
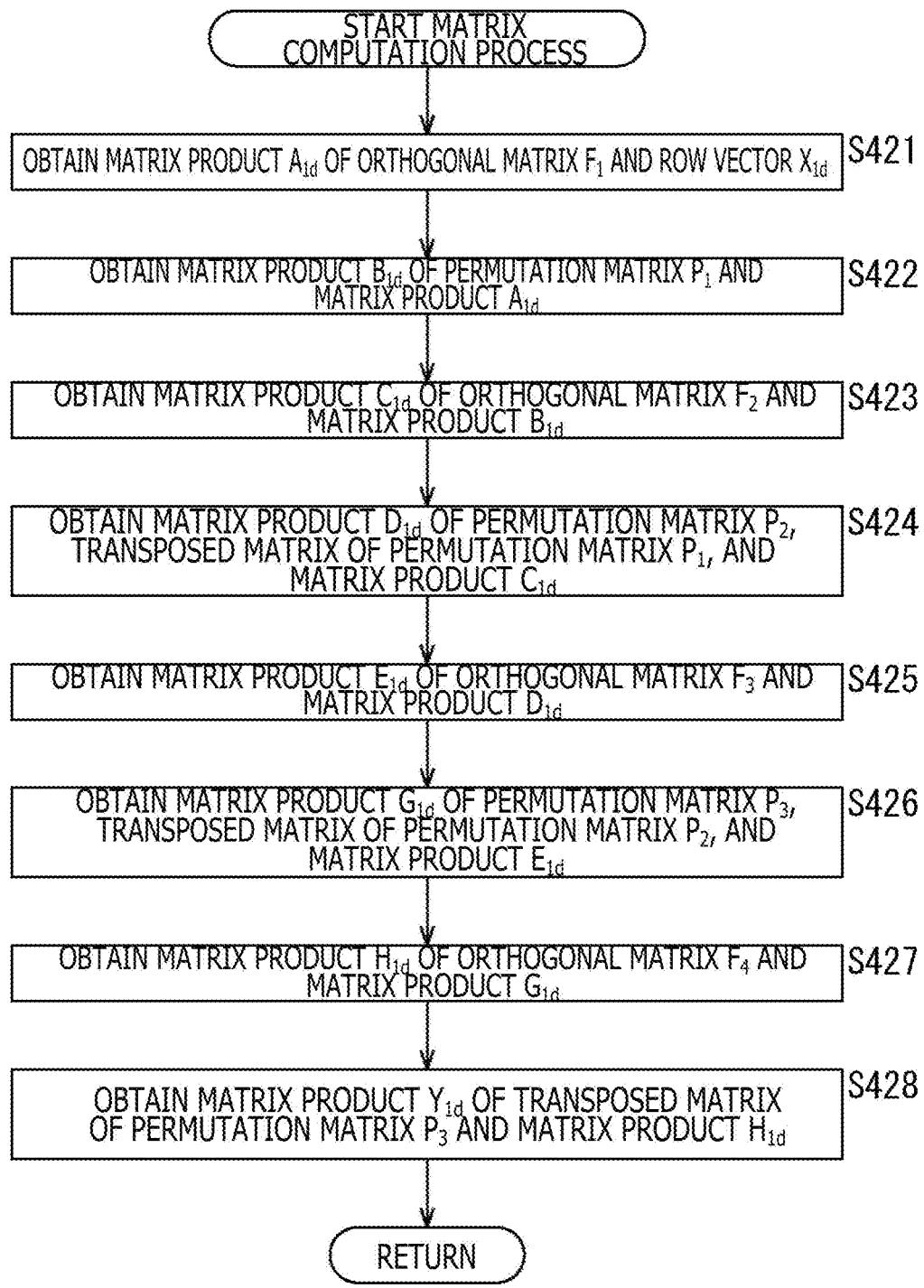
FIG. 29 is a flow chart describing an example of a flow of a matrix computation process.

Once the process of step S428 is finished, the process returns to FIG. 28.

As a result of the execution of each process, the amount of computation (multiplication and addition) of the secondary transformation can be reduced, and the memory size necessary for holding the matrix of the secondary transformation can be reduced. That is, the increase in the load of encoding can be suppressed.

Note that in the present embodiment, the matrix computation section 421 uses the plurality of orthogonal matrices subjected to N-bit scaling to perform the matrix computation including the plurality of times (M times) of matrix multiplication, and the dynamic range is M*N bits. Therefore, although the amount of shift used by the scaling section 143 to normalize the norm of the vector $Y_{1d}$ is (M*N), the amount of shift is not limited to this. For example, the rotation operation section 437 may be removed from the matrix computation section 421 of FIG. 27, and a scaling section that normalizes the norm of the matrix product obtained from each rotation operation section (rotation operation section 431, rotation operation section 433, and rotation operation section 435) may be arranged after each rotation operation section. In this case, the amount of shift for each scaling section (including the scaling section 143) to normalize the norm is N.

In addition, instead of arranging the scaling section after each rotation operation section, a scaling section may be arranged to normalize the norm of the matrix product after the plurality of rotation operations. For example, a scaling section that normalizes the matrix product obtained through the rotation operation section 431, the permutation operation section 432, and the rotation operation section 433 may be arranged after the rotation operation section 433 to normalize the norm of the matrix product. Similarly, the scaling section 143 may normalize the norm of the matrix product obtained through the permutation operation section 434, the rotation operation section 435, the permutation operation section 436, and the rotation operation section 437. In this case, the amount of shift for each scaling section to normalize the norm is 2N.

<Inverse Transformation Section>

Next, the image decoding apparatus 200 will be described. In this case, the configuration of the image decoding apparatus 200 is also basically similar to the case of the first embodiment. However, the image decoding apparatus 200 in this case includes: a rasterization section that transforms, into a one-dimensional vector, transformation coefficients that are subjected to an inverse transformation process to obtain a predicted residual that is a difference between an image and a predicted image of the image; a matrix computation section that applies matrix computation including a plurality of times of matrix multiplication to the one-dimensional vector; a scaling section that scales the one-dimensional vector subjected to the matrix computation; and a matrix formation section that forms a matrix of the scaled one-dimensional vector. That is, the inverse transformation section 213 transforms, into the one-dimensional vector, the transformation coefficients that are subjected to the inverse transformation process to obtain the predicted residual that is the difference between the image and the predicted image of the image, applies the matrix computation including a plurality of times of matrix multiplication to the one-dimensional vector, scales the one-dimensional vector subjected to the matrix computation, and forms the matrix of the scaled one-dimensional vector.

Figure 30:
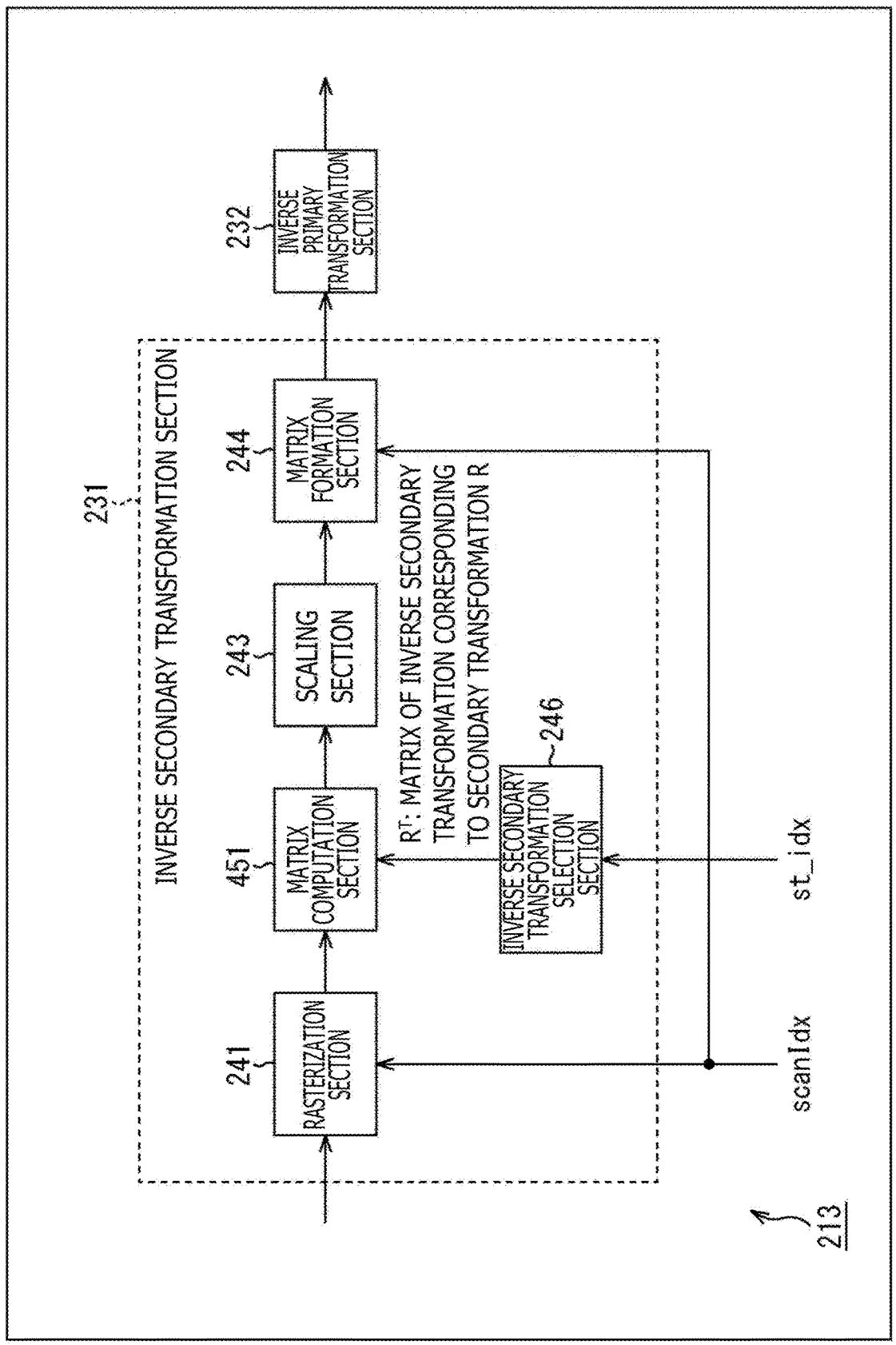
FIG. 30 is a block diagram illustrating a main configuration example of the inverse transformation section.

FIG. 30 is a block diagram illustrating a main configuration example of the inverse transformation section 213 in this case. As illustrated in FIG. 30, the configuration of the inverse transformation section 213 in this case is also basically similar to the case of the first embodiment (FIG. 12). However, the inverse secondary transformation section 231 in this case includes a matrix computation section 451 in place of the matrix computation section 242. In addition, the clip processing section 245 can be removed in this case. Note that the matrix computation section 451 uses a plurality of orthogonal matrices subjected to N-bit scaling to perform the matrix computation including a plurality of times (M times) of matrix multiplication, and the dynamic range is M*N bits. Therefore, the amount of shift for the scaling section 243 to normalize the norm of the vector $Y_{1d}$ is (M*N).

The matrix computation section 451 applies, to the one-dimensional vector supplied from the rasterization section 241, matrix computation including a plurality of times of matrix multiplication based on the matrix decomposition of the matrix of the inverse secondary transformation IR.

<Matrix Computation Section (Inverse 16-Points HyGT Section)>

Figure 31:
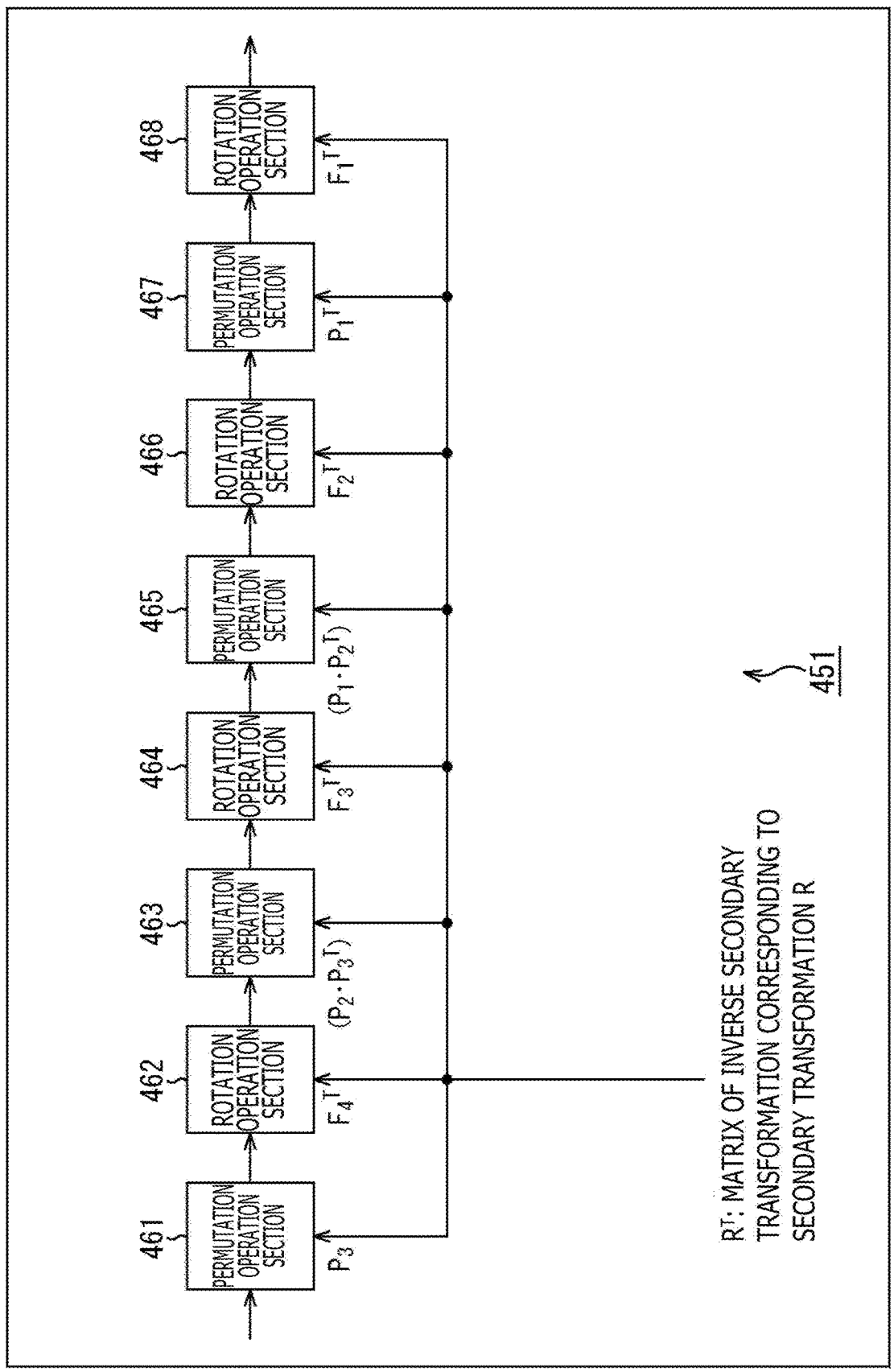
FIG. 31 is a block diagram illustrating a main configuration example of a matrix computation section.

FIG. 31 is a block diagram illustrating a main configuration example of the matrix computation section 451. As illustrated in FIG. 31, the matrix computation section 451 includes a permutation operation section 461, a rotation operation section 462, a permutation operation section 463, a rotation operation section 464, a permutation operation section 465, a rotation operation section 466, a permutation operation section 467, and a rotation operation section 468. Note that the matrix computation section 451 will also be referred to as an inverse 16-points HyGT section 451.

The permutation operation section 461 obtains a matrix product $A_{1d}$ of the permutation matrix $P_3$ obtained by the matrix decomposition of the matrix IR of the inverse secondary transformation supplied from the inverse secondary transformation selection section 246 and the row vector $X_{1d}$ supplied from the rasterization section 241. The permutation operation section 461 supplies the matrix product A to the rotation operation section 462.

The rotation operation section 462 obtains a matrix product $B_{1d}$ of the transposed matrix $F_4^T$ of the orthogonal matrix $F_4$ obtained by the matrix decomposition of the matrix IR of the inverse secondary transformation supplied from the inverse secondary transformation selection section 246 and the matrix product $A_{1d}$ supplied from the permutation operation section 461. The rotation operation section 462 supplies the matrix product $B_{1d}$ to the permutation operation section 463.

The permutation operation section 463 obtains a matrix product $C_{1d}$ of the permutation matrix $P_2$ obtained by the matrix decomposition of the matrix IR of the inverse secondary transformation supplied from the inverse secondary transformation selection section 246, the permutation matrix $P_3^T$ of the permutation matrix $P_3$ obtained by the matrix decomposition of the matrix IR of the inverse secondary transformation supplied from the inverse secondary transformation selection section 246, and the matrix product $B_{1d}$ supplied from the rotation operation section 462. The permutation operation section 463 supplies the matrix product CA to the rotation operation section 464.

The rotation operation section 464 obtains a matrix product $D_{1d}$ of the transposed matrix $F_3^T$ of the orthogonal matrix $F_3$ obtained by the matrix decomposition of the matrix IR of the inverse secondary transformation supplied from the inverse secondary transformation selection section 246 and the matrix product $C_{1d}$ supplied from the permutation operation section 462. The rotation operation section 464 supplies the matrix product $D_{1d}$ to the permutation operation section 465.

The permutation operation section 465 obtains a matrix product $E_{1d}$ of the permutation matrix $P_1$ obtained by the matrix decomposition of the matrix IR of the inverse secondary transformation supplied from the inverse secondary transformation selection section 246, the transposed matrix $P_2^T$ of the permutation matrix $P_2$ obtained by the matrix decomposition of the matrix IR of the inverse secondary transformation supplied from the inverse secondary transformation selection section 246, and the matrix product $D_{1d}$ supplied from the rotation operation section 464. The permutation operation section 465 supplies the matrix product $E_d$ to the rotation operation section 466.

The rotation operation section 466 obtains a matrix product $G_{1d}$ of the transposed matrix $F_2^T$ of the orthogonal matrix $F_2$ obtained by the matrix decomposition of the matrix IR of the inverse secondary transformation supplied from the inverse secondary transformation selection section 246 and the matrix product $E_{1d}$ supplied from the permutation operation section 465. The rotation operation section 466 supplies the matrix product $G_{1d}$ to the permutation operation section 467.

The permutation operation section 467 obtains a matrix product $H_{1d}$ of the transposed matrix $P_1^T$ of the permutation matrix $P_1$ obtained by the matrix decomposition of the matrix IR of the inverse secondary transformation supplied from the inverse secondary transformation selection section 246 and the matrix product $G_{1d}$ supplied from the rotation operation section 466. The permutation operation section 467 supplies the matrix product $H_{1d}$ to the rotation operation section 468.

The rotation operation section 468 obtains a matrix product $Y_{1d}$ of the transposed matrix $F_1^T$ of the orthogonal matrix $F_1$ obtained by the matrix decomposition of the matrix IR of the inverse secondary transformation supplied from the inverse secondary transformation selection section 246 and the matrix product $H_{1d}$ supplied from the permutation operation section 467. The rotation operation section 468 supplies the matrix product $Y_{1d}$ to the scaling section 243.

In this way, the matrix computation section 451 performs the matrix decomposition of the matrix of the inverse secondary transformation to perform the matrix computation and transforms the row vector $X_{1d}$ into the row vector $Y_{1d}$. Therefore, the amount of computation (multiplication and addition) of the inverse secondary transformation can be reduced. In addition, the number of coefficients held for the inverse secondary transformation can be reduced, and the memory size necessary for holding the matrix of the inverse secondary transformation can be reduced. That is, the increase in the load of decoding can be suppressed.

<Flow of Inverse Transformation Process>

Next, an example of a flow of each process executed by the image decoding apparatus 200 will be described. In this case, the image decoding apparatus 200 basically executes the image decoding process as in the case of the first embodiment (FIG. 13). An example of a flow of an inverse transformation process in this case will be described with reference to a flow chart of FIG. 32.

Once the inverse transformation process is started, each process of steps S441 to S449 is basically executed as in each process of steps S221 to S227, step S229, and step S230 of FIG. 14.

However, in this case, the matrix computation in the process of step S445 is performed by performing the matrix decomposition of the matrix IR of the inverse secondary transformation as described above.

<Flow of Matrix Computation Process>

An example of a flow of a matrix computation process executed in step S445 of FIG. 32 will be described with reference to a flow chart of FIG. 33.

Once the matrix computation process is started, the permutation operation section 461 obtains the matrix product A1d of the permutation matrix $P_3$ and the row vector $X_{1d}$ in step S461.

In step S462, the rotation operation section 462 obtains the matrix product $B_{1d}$ of the transposed matrix $F_4^T$ of the orthogonal matrix $F_4$ and the matrix product $A_d$.

In step S463, the permutation operation section 463 obtains the matrix product $C_{1d}$ of the permutation matrix $P_2$, the transposed matrix $P_3^T$ of the permutation matrix $P_3$, and the matrix product $B_{1d}$.

In step S464, the rotation operation section 464 obtains the matrix product $D_{1d}$ of the transposed matrix $F_3^T$ of the orthogonal matrix $F_3$ and the matrix product $C_{1d}$.

In step S465, the permutation operation section 465 obtains the matrix product $E_{1d}$ of the permutation matrix $P_1$, the transposed matrix $P_1$ of the permutation matrix $P_2$, and the matrix product $D_{1d}$.

In step S466, the rotation operation section 466 obtains the matrix product $G_{1d}$ of the transposed matrix $F_2^T$ of the orthogonal matrix $F_2$ and the matrix product $E_{1d}$.

In step S467, the permutation operation section 467 obtains the matrix product $H_{1d}$ of the transposed matrix $P_1^T$ of the permutation matrix $P_1$ and the matrix product $G_{1d}$.

In step S468, the rotation operation section 468 obtains the matrix product $Y_{1d}$ of the transposed matrix $F_1^T$ of the orthogonal matrix $F_1$ and the matrix product $H_{1d}$.

Figure 32:
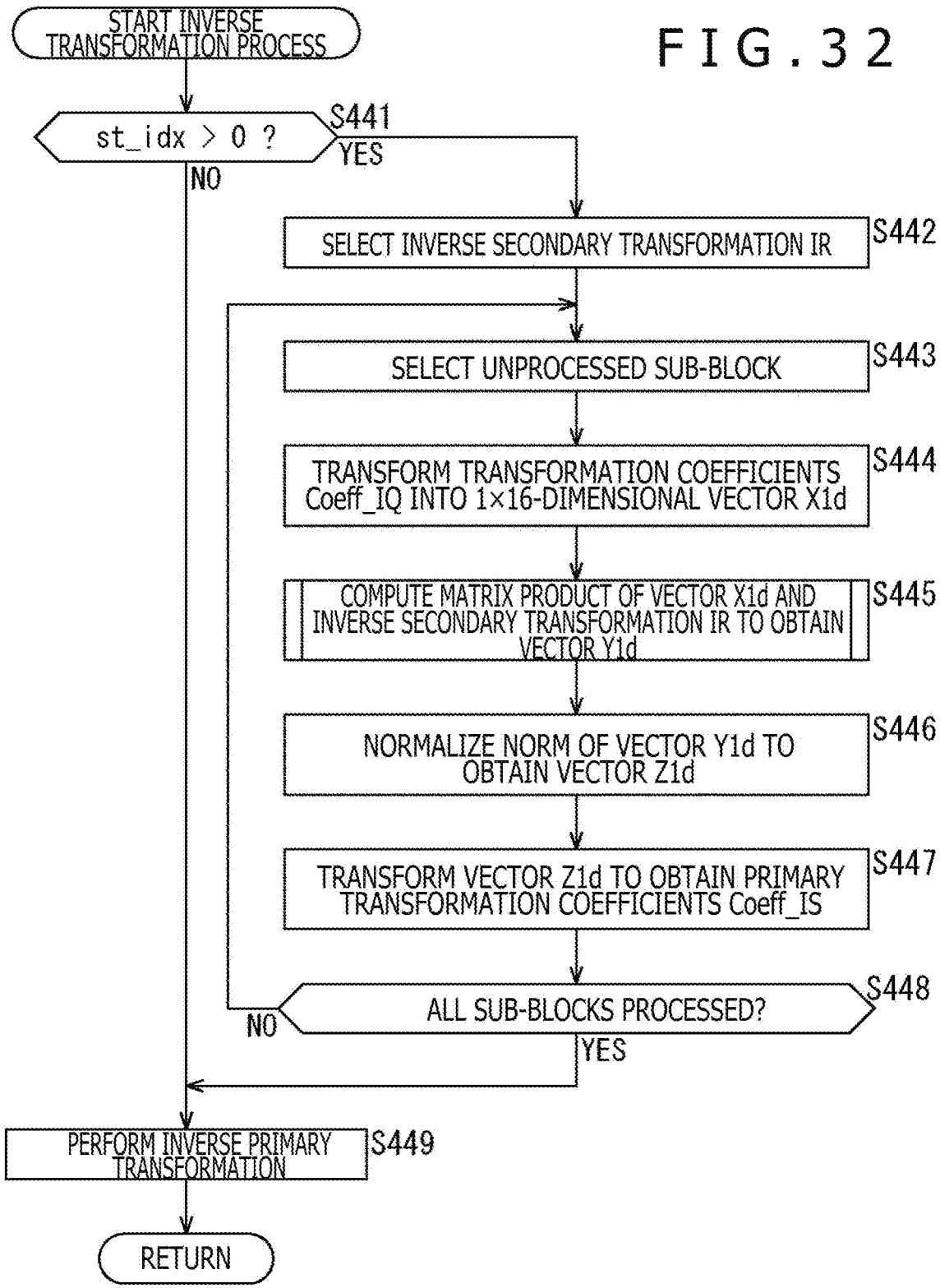
FIG. 32 is a flow chart describing an example of a flow of an inverse transformation process.
Figure 33:
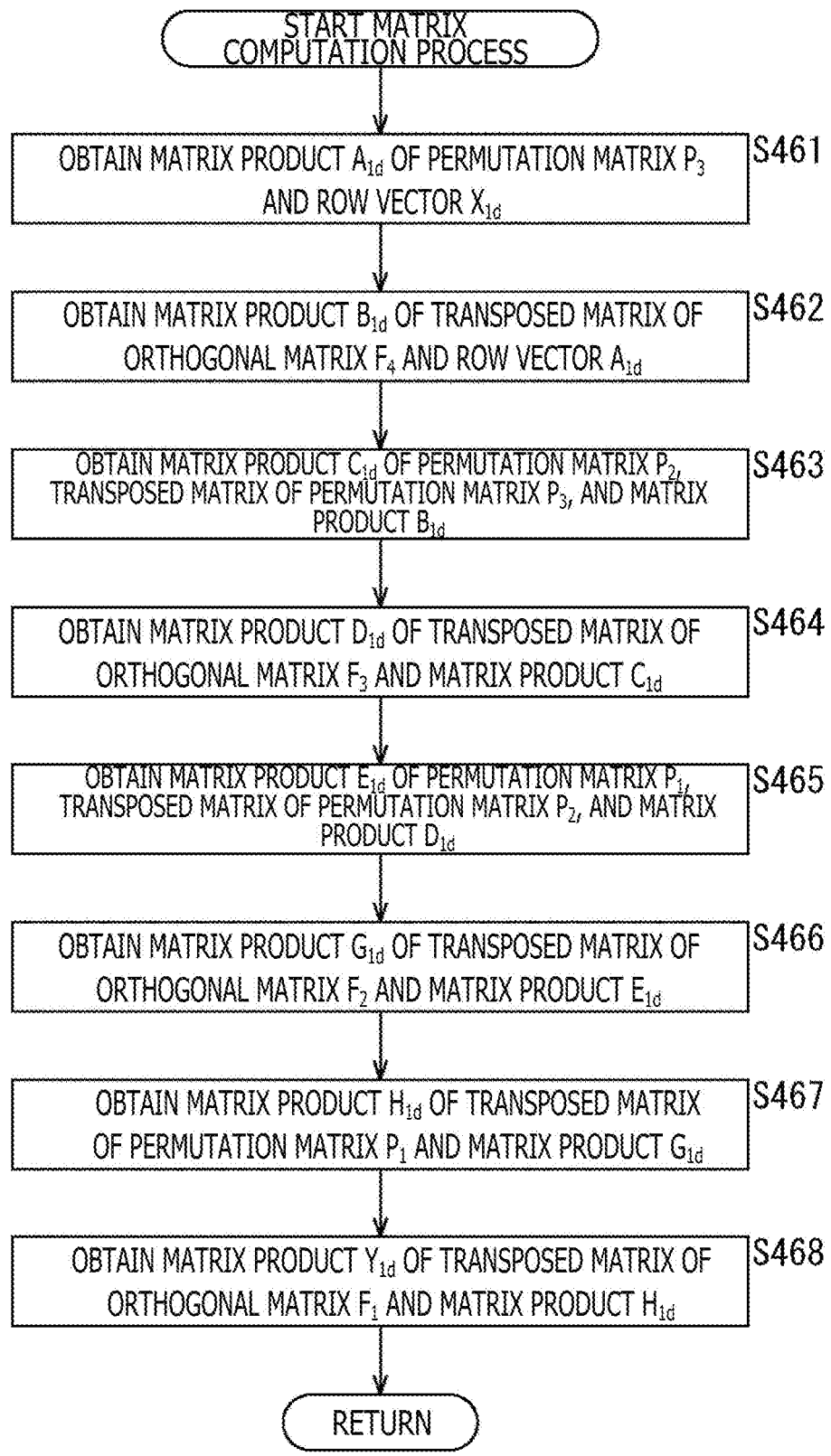
FIG. 33 is a flow chart describing an example of a flow of a matrix computation process.

Once the process of step S468 is finished, the process returns to FIG. 32.

As a result of the execution of each process, the amount of computation (multiplication and addition) of the inverse secondary transformation can be reduced, and the memory size necessary for holding the matrix of the inverse secondary transformation can be reduced. That is, the increase in the load of encoding can be suppressed.

Note that in the present embodiment, the matrix computation section 451 uses the plurality of orthogonal matrices subjected to N-bit scaling to perform the matrix computation including the plurality of times (M times) of matrix multiplication, and the dynamic range is M*N bits. Therefore, although the amount of shift used by the scaling section 243 to normalize the norm of the vector Y1d is (M*N), the amount of shift is not limited to this. For example, the rotation operation section 468 may be removed from the matrix computation section 451 of FIG. 31, and a scaling section that normalizes the norm of the matrix product obtained from each rotation operation section (rotation operation section 462, rotation operation section 464, and rotation operation section 466) may be arranged after each rotation operation section. In this case, the amount of shift for each scaling section (including the scaling section 243) to normalize the norm is N.

In addition, instead of arranging the scaling section after each rotation operation section, a scaling section may be arranged to normalize the norm of the matrix product after the plurality of rotation operations. For example, a scaling section that normalizes the matrix product obtained through the permutation operation section 461, the rotation operation section 462, the permutation operation section 463, and the rotation operation section 464 is arranged after the rotation operation section 464 to normalize the norm of the matrix product. Similarly, the scaling section 243 normalizes the norm of the matrix product obtained through the permutation operation section 465, the rotation operation section 466, the permutation operation section 467, and the rotation operation section 468. In this case, the amount of shift for each scaling section to normalize the norm is 2N.

4. Fourth Embodiment

<Another Expression of 16-Points HyGT>

Although the operation $T_1$ of the first stage of the 16-points HyGT (part surrounded by the frame 411 in A of FIG. 21) is expressed by the orthogonal transformation $F_1$ including eight rotation matrices $G_{1,1}$ to $G_{1,8}$ without using the expression of the permutation operation in the third embodiment, the operation $T_1$ can be expressed by a special permutation indicating that the input signal is not to be permuted.

Figure 34:
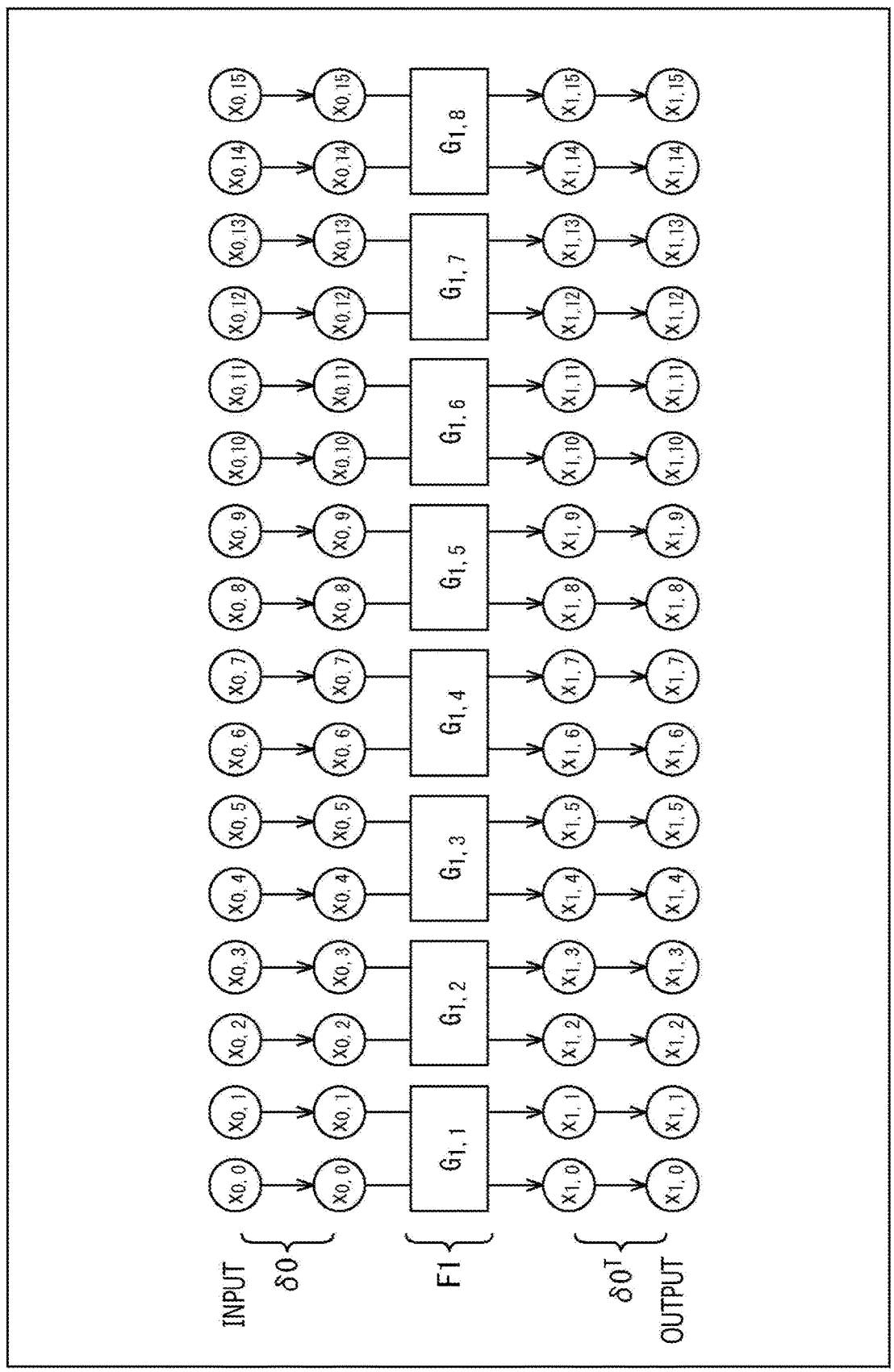
FIG. 34 is a diagram describing matrix decomposition of the Hypercube-Givens Transform.

For the convenience, the permutation operation in the operation T can be defined as a permutation $\delta 0$ in the third embodiment, and the schematic diagram of B in FIG. 21 can be replaced with FIG. 34. The permutation $\delta 0$ is represented by the following Formula (50). The permutation $\delta 0$ is a permutation operation indicating that the input signal is not to be permuted. That is, in Formula (50), an ith (i=0, . . . , 15) input signal is output as an ith output signal.

$$\delta 0 = \begin{pmatrix} 0, 1, 2, 3, 4, 5, 6, 7, 8, 9, 10, 11, 12, 13, 14, 15 \\ 0, 1, 2, 3, 4, 5, 6, 7, 8, 9, 10, 11, 12, 13, 14, 15 \end{pmatrix} \quad (50)$$

That is, the operation $T_1$ of the first stage can be expressed by the permutation $\delta 0$, an orthogonal transformation $F_1$, and an inverse permutation $\delta_0^T$ as in the following Formula (51). Here, the matrix corresponding to the permutation $\delta 0$ in Formula (51) is $P_0$ which corresponds to the 16×16 identity matrix.

$$T_1 = P_0^T \cdot F_1 \cdot P_0 \quad (51)$$

Based on the result of Formula (51), the permutation 50 can be assigned to obtain the following Formula (52) to re-express Formula (48) indicating the 16-points HyGT (secondary transformation R) described in the third embodiment and to obtain Formula (53) to re-express Formula (49) indicating the inverse 16-points HyGT (inverse secondary transformation). Here, the start numbers of the subscript indices of the permutations $\delta 0$, $\delta 1$, $\delta 2$, and $\delta 3$ and the corresponding permutation matrices $P_0$, $P_1$, $P_2$, and $P_3$ can be switched from 0 to 1 to redefine them as permutations $\delta 1$, $\delta 2$, $\delta 3$, and $\delta 4$ and corresponding permutation matrices $P_1$, $P_2$, $P_3$, and $P_4$ to express Formula (52) by the following Formula (54) and express Formula (53) by the following Formula (55).

$$R = T_4 \cdot T_3 \cdot T_2 \cdot T_1 \quad (52)$$
$$= (P_3^T \cdot F_4 \cdot P_3) \cdot (P_2^T \cdot F_3 \cdot P_2) \cdot (P_1^T \cdot F_2 \cdot P_1) \cdot (P_0^T \cdot F_1 \cdot P_0)$$
$$= \prod_{i=1}^{4} (P_{4-i}^T \cdot F_{5-i} \cdot P_{4-i})$$

$$R^{-1} = (T_4 \cdot T_3 \cdot T_2 \cdot T_1)^{-1} \quad (53)$$
$$= ((P_3^T \cdot F_4 \cdot P_3) \cdot (P_2^T \cdot F_3 \cdot P_2) \cdot (P_1^T \cdot F_2 \cdot P_1) \cdot$$
$$(P_0^T \cdot F_1 \cdot P_0))^{-1}$$
$$= (P_0^{-1} \cdot F_1^{-1} \cdot (P_0^T)^{-1}) \cdot (P_1^{-1} \cdot F_2^{-1} \cdot (P_1^T)^{-1}) \cdot (P_2^{-1} \cdot F_3^{-1} \cdot$$
$$(P_2^T)^{-1}) \cdot (P_3^{-1} \cdot F_4^{-1} \cdot (P_3^T)^{-1})$$
$$= (P_0^T \cdot F_1^T \cdot P_0)) P_1^T \cdot F_2^T \cdot P_1) \cdot (P_2^T \cdot F_3^T \cdot P_2) \cdot (P_3^T \cdot F_4^T \cdot P_3)$$
$$= \prod_{i=1}^{4} (P_{i-1}^T \cdot F_i \cdot P_{i-1})$$

$$R = (P_4^T \cdot F_4 \cdot P^4) \cdot (P_3^T \cdot F_3 \cdot P_3) \cdot (P_2^T \cdot F_2 \cdot P_2) \cdot \quad (54)$$
$$(P_1^T \cdot F_1 \cdot P_1)$$
$$= \prod_{i=1}^{4} (P_{5-i}^T \cdot F_{5-i} \cdot P_{5-i})$$

$$R^{-1} = ((P_4^T \cdot F_4 \cdot P_4) \cdot (P_3^T \cdot F_3 \cdot P_3) \cdot (P_2^T \cdot F_2 \cdot P_2) \cdot \quad (55)$$
$$(P_1^T \cdot F_1 \cdot P_1))^{-1}$$
$$= \prod_{i=1}^{4} (P_i^T \cdot F_i \, P_i)$$

<Matrix Computation Section (16-Points HyGT Section)>

Figure 35:
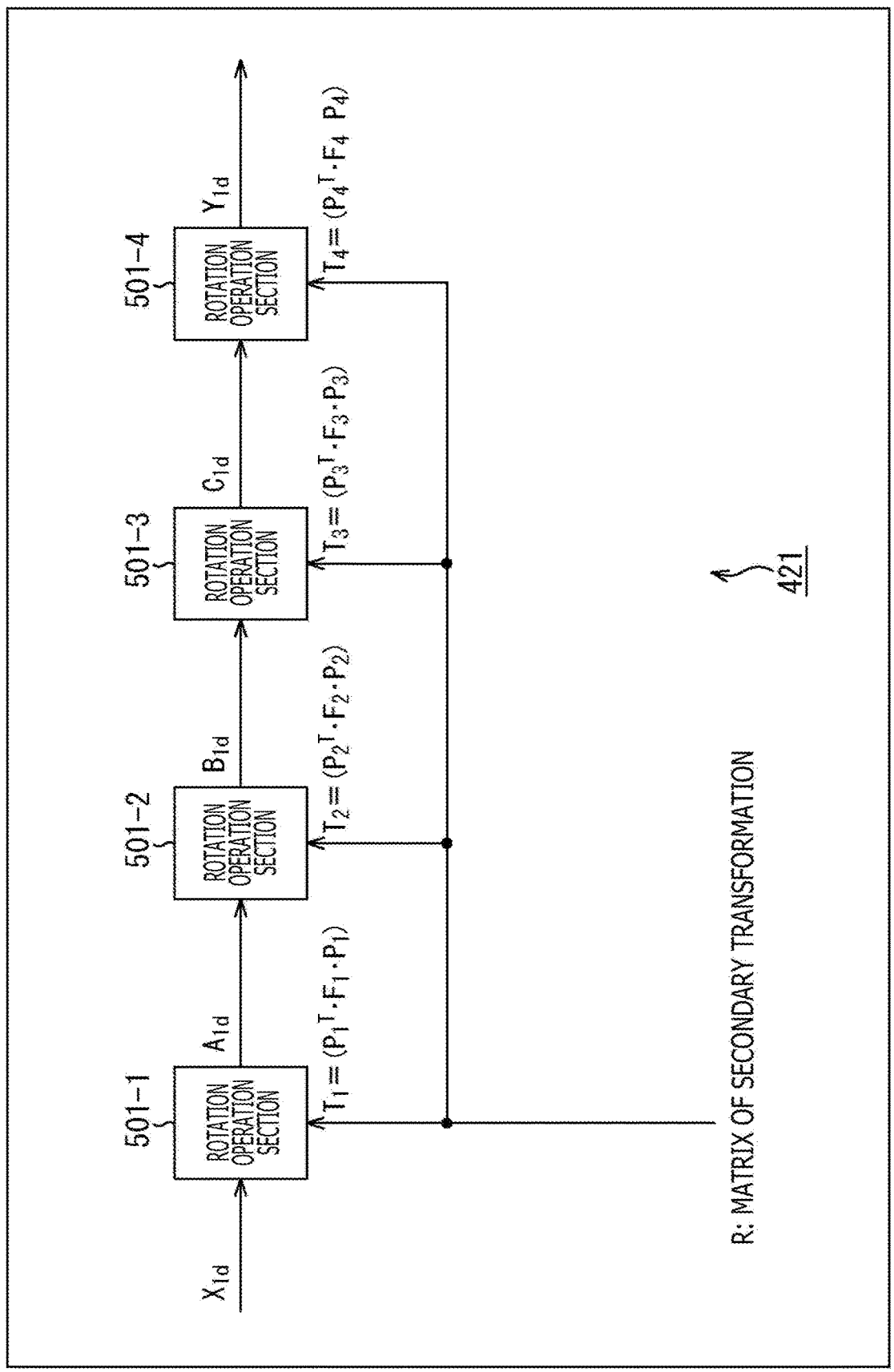
FIG. 35 is a block diagram illustrating a main configuration example of the matrix computation section.

Based on the result of Formula 52 (Formula 54), the matrix computation section 421 of the secondary transformation section 132 described in the third embodiment can also be realized by a configuration illustrated in FIG. 35 in place of the configuration illustrated in FIG. 27. In the case of FIG. 35, although the function of the matrix computation section 421 is the same as in the case of FIG. 27, the matrix computation section 421 decomposes the 16-points HyGT into four orthogonal matrices to provide a separable orthogonal transformation. Therefore, the matrix computation section 421 in the case of FIG. 35 can reduce the number of constituent blocks compared to the case of FIG. 27. That is, the circuit scale can be reduced.

FIG. 35 is a block diagram illustrating a main configuration of the matrix computation section 421. In the case of FIG. 35, the matrix computation section 421 includes a rotation operation section 501-1, a rotation operation section 501-2, a rotation operation section 501-3, and a rotation operation section 501-4.

The rotation operation section 501-1 obtains a matrix product $A_{1d}$ of an orthogonal matrix $T_1$ ($=P_1^T \cdot F_1 \cdot P_1 = F_1$) obtained by the matrix decomposition of the matrix R of the secondary transformation supplied from the secondary transformation selection section 146 and the row vector $X_{1d}$ supplied from the rasterization section 141. The rotation operation section 501-1 supplies the matrix product $A_{1d}$ to the permutation operation section 501-2.

The rotation operation section 501-2 obtains a matrix product $B_{1d}$ of an orthogonal matrix $T_2$ ($=P_2^T \cdot F_2 \cdot P_2$) obtained by the matrix decomposition of the matrix R of the secondary transformation supplied from the secondary transformation selection section 146 and the matrix product $A_d$ supplied from the rotation operation section 501-1. The rotation operation section 501-2 supplies the matrix product $B_{1d}$ to the rotation operation section 501-3.

The rotation operation section 501-3 obtains a matrix product C of an orthogonal matrix $T_3$ $(=P_3^T \cdot F_3 \cdot P_3)$ obtained by the matrix decomposition of the matrix R of the secondary transformation supplied from the secondary transformation selection section 146 and the matrix product $B_{1d}$ supplied from the rotation operation section 501-2. The rotation operation section 501-3 supplies the matrix product $C_{1d}$ to the rotation operation section 501-4.

The rotation operation section 501-4 obtains a matrix product $D_{1d}$ of an orthogonal matrix $T_4$ $(=P_4^T \cdot F_4 \cdot P_4)$ obtained by the matrix decomposition of the matrix R of the secondary transformation supplied from the secondary transformation selection section 146 and the matrix product $C_{1d}$ supplied from the rotation operation section 501-3. The rotation operation section 501-4 supplies the matrix product $Y_{1d}$ to the scaling section 143.

That is, the rotation operation sections 501-1 to 501-4 are processing sections that obtain the matrix products and execute the same process. Hereinafter, the rotation operation sections 501-1 to 501-4 will be referred to as rotation operation sections 501 in a case where the distinction is not necessary in the description. That is, the matrix computation section 421 includes four rotation operation sections 501 in this case.

In this way, the matrix computation section 421 performs the matrix decomposition of the matrix of the secondary transformation to perform the matrix computation and transforms the row vector $X_{1d}$ into the row vector $Y_{1d}$. Therefore, the amount of computation (multiplication and addition) of the secondary transformation can be reduced. In addition, the number of coefficients held for the secondary transformation can be reduced, and the memory size necessary for holding the matrix of the secondary transformation can be reduced. That is, the increase in the load of encoding can be suppressed.

<Flow of Matrix Computation Process>

Figure 36:
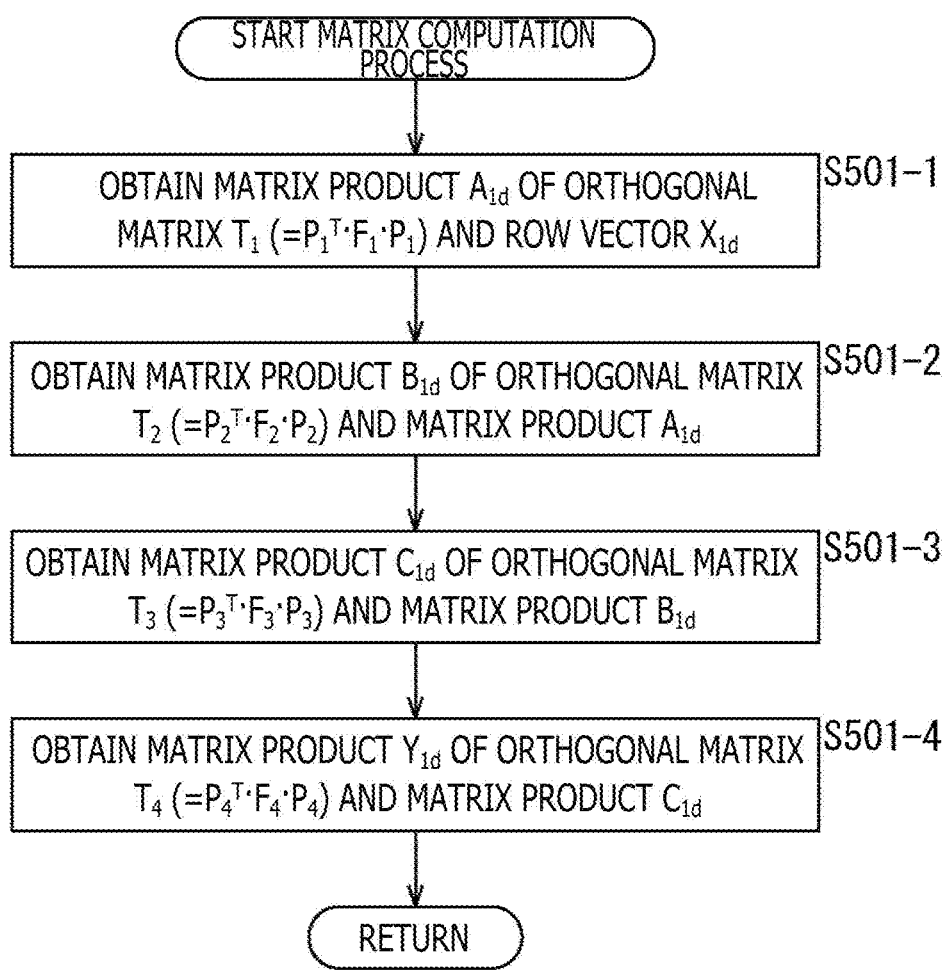
FIG. 36 is a flow chart describing an example of a flow of a matrix computation process.

An example of a flow of the matrix computation process executed in step S406 of FIG. 28 will be described with reference to a flow chart of FIG. 36.

Once the matrix computation process is started, the rotation operation section 501-1 obtains the matrix product $A_{1d}$ of the orthogonal matrix $T_1$ $(=P_1^T \cdot F_1 \cdot P_1=F_1)$ and the row vector $X_1$ in step S501-1.

In step S501-2, the rotation operation section 501-2 obtains the matrix product $B_{1d}$ of the orthogonal matrix $T_2$ $(=P_2^T \cdot F_2 \cdot P_2)$ and the matrix product $A_{1d}$.

In step S501-3, the rotation operation section 501-3 obtains the matrix product $C_{1d}$ of the orthogonal matrix $T_3$ $(=P_3^T \cdot F_3 \cdot P_3)$ and the matrix product $B_{1d}$.

In step S501-4, the rotation operation section 501-4 obtains the matrix product $Y_{1d}$ of the orthogonal matrix $T_4$ $(=P_4^T \cdot F_4 \cdot P_4)$ and the matrix product $C_{1d}$.

Once the process of step S501-4 is finished, the process returns to FIG. 28.

As a result of the execution of each process, the amount of computation (multiplication and addition) of the secondary transformation can be reduced, and the memory size necessary for holding the matrix of the secondary transformation can be reduced. That is, the increase in the load of encoding can be suppressed.

<Matrix Computation Section (Inverse 16-Points HyGT Section)>

Figure 37:
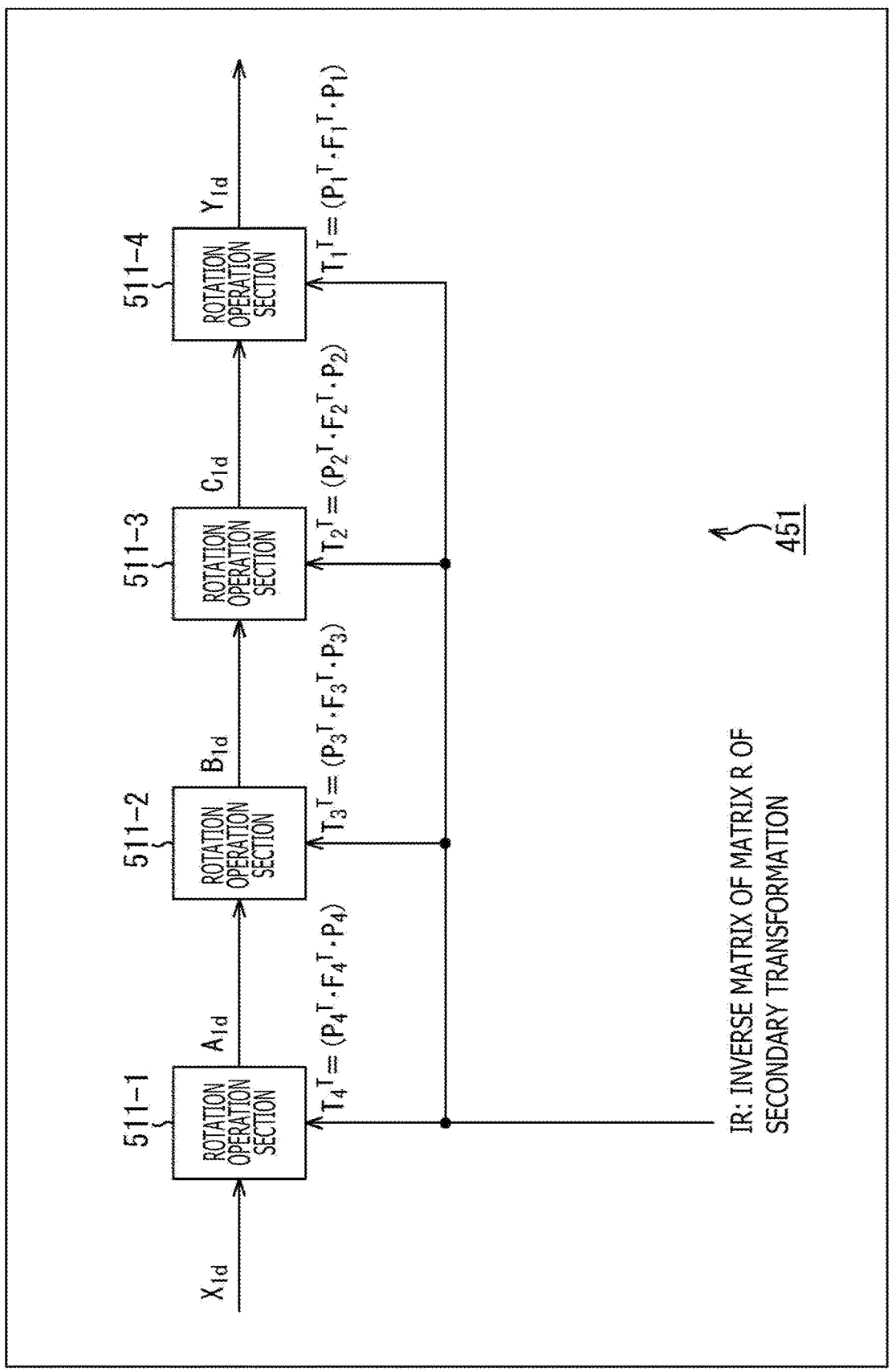
FIG. 37 is a block diagram illustrating a main configuration example of the matrix computation section.

Similarly, based on the result of Formula (53) (Formula (54)), the matrix computation section 451 of the inverse secondary transformation section 231 described in the third embodiment can also be realized by a configuration as illustrated in FIG. 37 in place of the configuration illustrated in FIG. 31. In the case of FIG. 37, although the function of the matrix computation section 451 is the same as in the case of FIG. 31, the matrix computation section 451 decomposes the 16-points HyGT into four orthogonal matrices to provide a separable orthogonal transformation. Therefore, the matrix computation section 451 in the case of FIG. 37 can reduce the number of constituent blocks compared to the case of FIG. 31. That is, the circuit scale can be reduced.

FIG. 37 is a block diagram illustrating a main configuration example of the matrix computation section 451. In the case of FIG. 37, the matrix computation section 451 includes a rotation operation section 511-1, a rotation operation section 511-2, a rotation operation section 511-3, and a rotation operation section 511-4.

The rotation operation section 511-1 obtains a matrix product $A_{1d}$ of a transposed matrix $T_4$ $(=P_4^T \cdot F_4^T \cdot P_4)$ of the orthogonal matrix $T_4$ $(=P_4^T \cdot F_4 \cdot P_4)$ obtained by the matrix decomposition of the matrix IR of the inverse secondary transformation supplied from the inverse secondary transformation selection section 246 and the row vector $X_{1d}$ supplied from the rasterization section 241. The rotation operation section 511-1 supplies the matrix product $A_8$ to the rotation operation section 511-2.

The rotation operation section 511-2 obtains a matrix product $B_{1d}$ a of a transposed matrix $T_3$a $(=P_3^T \cdot F_3^T \cdot P_3)$ of the orthogonal matrix $T_3$ $(=P_3^T \cdot F_3 \cdot P_3)$ obtained by the matrix decomposition of the matrix IR of the inverse secondary transformation supplied from the inverse secondary transformation selection section 246 and the matrix product $A_l$ supplied from the rotation operation section 511-1. The rotation operation section 511-2 supplies the matrix product $B_{1d}$ to the rotation operation section 511-3.

The rotation operation section 511-3 obtains a matrix product $C_d$ of a transposed matrix $T_2^T$ $(=P_2^T \cdot F_2^T \cdot P_2)$ of the orthogonal matrix $T_2$ $(=P_2^T \cdot F_2 \cdot P_2)$ obtained by the matrix decomposition matrix of the matrix IR of the inverse secondary transformation supplied from the inverse secondary transformation selection section 246 and the matrix product $B_{1d}$ supplied from the rotation operation section 511-4. The rotation operation section 511-3 supplies the matrix product $C_{1d}$ to the rotation operation section 511-4.

The rotation operation section 511-4 obtains a matrix product $Y_{1d}$ of a transposed matrix $T_1^T (=P_1^T \cdot F_1^T \cdot P_1 = F_1^T)$ of the orthogonal matrix $T_1$ $(=P_1^T \cdot F_1 P_1 = F_1)$ obtained by the matrix decomposition of the matrix IR of the inverse secondary transformation supplied from the inverse secondary transformation selection section 246 and the matrix product $C_{1d}$ supplied from the rotation operation section 511-3. The rotation operation section 511-4 supplies the matrix product $Y_{1d}$ to the scaling section 243.

That is, the rotation operation sections 511-1 to 511-4 are processing sections that obtain the matrix products and execute the same process. Hereinafter, the rotation operation sections 511-1 to 511-4 will be referred to as rotation operation sections 511 in a case where the distinction is not necessary in the description. That is, the matrix computation section 451 includes four rotation operation sections 511 in this case.

In this way, the matrix computation section 451 performs the matrix decomposition of the matrix of the inverse secondary transformation to perform the matrix computation and transforms the row vector $X_{1d}$ into the row vector $Y_{1d}$. Therefore, the amount of computation (multiplication and addition) of the inverse secondary transformation can be reduced. In addition, the number of coefficients held for the inverse secondary transformation can be reduced, and the memory size necessary for holding the matrix of the inverse secondary transformation can be reduced. That is, the increase in the load of decoding can be suppressed.

<Flow of Matrix Computation Process>

Figure 38:
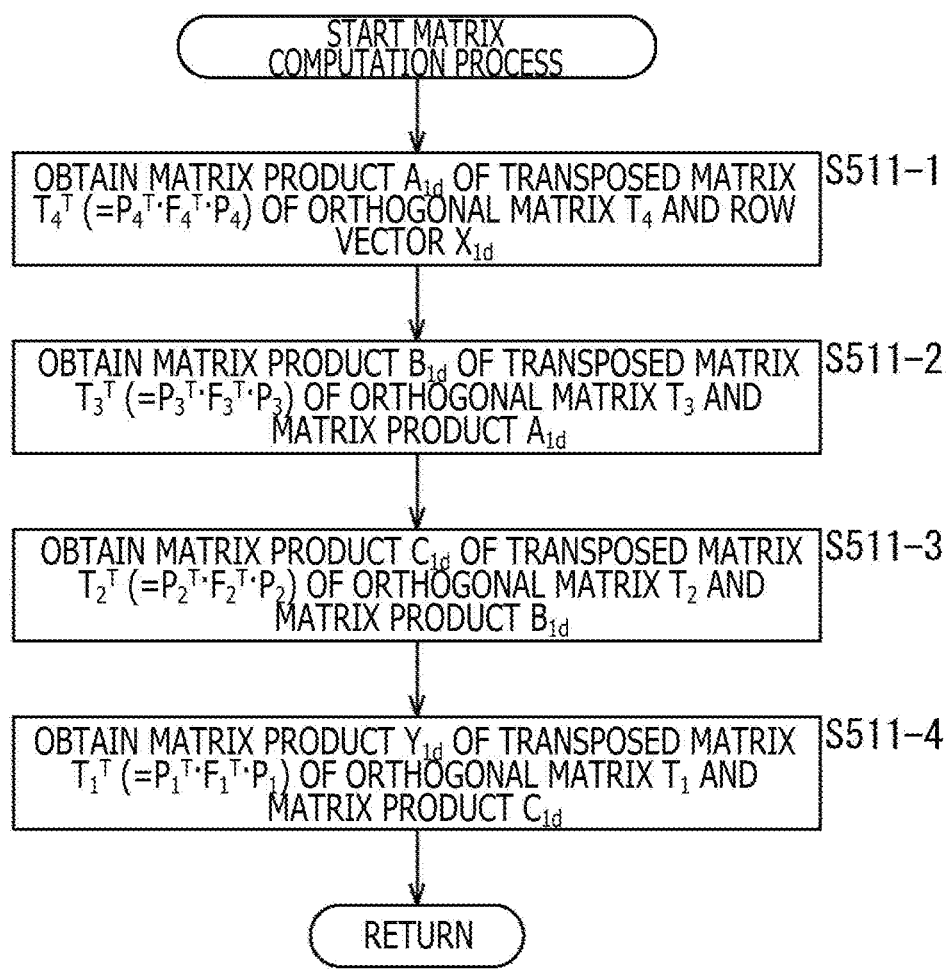
FIG. 38 is a flow chart describing an example of a flow of a matrix computation process.

An example of a flow of the matrix computation process executed in step S445 of FIG. 32 will be described with reference to a flow chart of FIG. 38.

Once the matrix computation process is started, the rotation operation section 511-1 obtains the matrix product $A_{1d}$ of the transposed matrix $T_4^T$ ($=P_4^T \cdot F_4^T \cdot P_4$) of the orthogonal matrix orthogonal matrix $T_4$ ($=P_4^T \cdot F_4 \cdot P_4$) and the row vector $X_{1d}$ in step S511-1.

In step S511-2, the rotation operation section 511-2 obtains the matrix product $B_{1d}$ of the transposed matrix $T_3^T$ ($=P_3^T \cdot F_3^T \cdot P_3$) of the orthogonal matrix $T_3$ ($=P_3^T \cdot F_3 \cdot P_3$) and the matrix product $A_{1d}$.

In step S511-3, the rotation operation section 511-3 obtains the matrix product $C_{1d}$ of the transposed matrix $T_2^T$ ($=P_2^T \cdot F_2^T \cdot P_2$) of the orthogonal matrix $T_2$ ($=P_2^T \cdot F_2 \cdot P_2$) and the matrix product $B_{1d}$.

In step S511-4, the rotation operation section 511-4 obtains the matrix product $Y_{11}$ of the transposed matrix $T_1^T$ ($=P_1^T \cdot F_1^T \cdot P_1 = F_1^T$) of the orthogonal matrix $T_1$ ($=P_1^T \cdot F_1 \cdot P_1 = F_1$) and the matrix product $C_{1d}$.

Once the process of step S511-4 is finished, the process returns to FIG. 32.

As a result of the execution of each process, the amount of computation (multiplication and addition) of the inverse secondary transformation can be reduced, and the memory size necessary for holding the matrix of the inverse secondary transformation can be reduced. That is, the increase in the load of decoding can be suppressed.

5. Fifth Embodiment

<$2^N$-Points HyGT and Inverse $2^Y$-Points HyGT>

In general terms regarding the HyGT, an ith operation $T_i$ is expressed by $T_i=(P_1^T \cdot F_i \cdot P_i)$ in the $2^N$-points HyGT provided with a permutation $\delta i$ of $2^N$ points (or corresponding $2^N \times 2^N$ permutation matrix $P_1$) and a $2^N \times 2^N$ orthogonal matrix $F_i$ (i=1, ..., N). Therefore, the $2^N$-points HyGT is expressed by a matrix product of N transformations $T_i$ as in the following Formula (56).

$$R = \prod_{i=1}^{N} T_i = \prod_{i=1}^{N} (P_i^T \cdot F_i \cdot P_i) \tag{56}$$

Similarly, the inverse transformation of the $2^N$-points HyGT, that is, inverse $2^N$-points HyGT (2N-points inverse HyGT) is also expressed by the following Formula (57).

$$R^{-1} = \prod_{i=1}^{N} T_{N-i+1}^T = \prod_{i=1}^{N} (P_{N-i+1}^T \cdot F_{N-i+1}^T \cdot P_{N-i+1}) \tag{57}$$

Here, the orthogonal matrix $F_i$ in an ith transformation $T_i$ of the $2^N$-points HyGT is a sparse orthogonal matrix as indicated in the following Formula (58), where rotation matrices $G_{i,j}$ (j=1, ..., $2^{N-1}$) indicated in Formula (33) are provided as diagonal components, and the other elements are 0.

$$F_i = \begin{bmatrix} G_{i,1} & & & & \\ & G_{i,2} & \cdots & 0 & \\ & \vdots & \ddots & \vdots & \\ & 0 & \cdots & G_{i,2N/2-1} & \\ & & & & G_{i,2N/2} \end{bmatrix} \tag{58}$$

In addition, the permutation $\delta i$ in the ith transformation $T_i$ of the 2N-points HyGT is derived by a pseudo code 521 indicated in FIG. 39. Note that in the pseudo code 521, an array permList[i] corresponds to the permutation $\delta i$, and permList[i][j] corresponds to an element number to be replaced with a jth element in the permutation $\delta_i$.

For example, the permutation $\delta i$ in the ith transformation $T_i$ of the 32-points HyGT (N=5) is as indicated in FIG. 40. That is, the permutation $\delta i$ in the ith (i=1, ..., N) transformation $T_i$ of the 2N-points HyGT is derived by partitioning elements of 0, ..., $2^{**}N-1$ into N-i+1 subsets including $2^i$ (i=1, ..., N) elements in the forward direction. In an element group of the left half $\{j*2^{i-1}, ..., (j+1)*2^{i-1}/2-1\}$ (first class) and an element group on the right half $\{(j+1)*2^{i-1}/2, ..., (j+1)*2^{i-1}\}$ (second class) each including $2^{i-1}$ elements in each subject j (j=0, ..., N-1), an odd-numbered element k of the first class is replaced with an even-numbered element m ($=j+2^{i-1}+1$) to the right of a corresponding odd-numbered element l ($=j+2^{i-1}$) of the second class.

Figure 41:
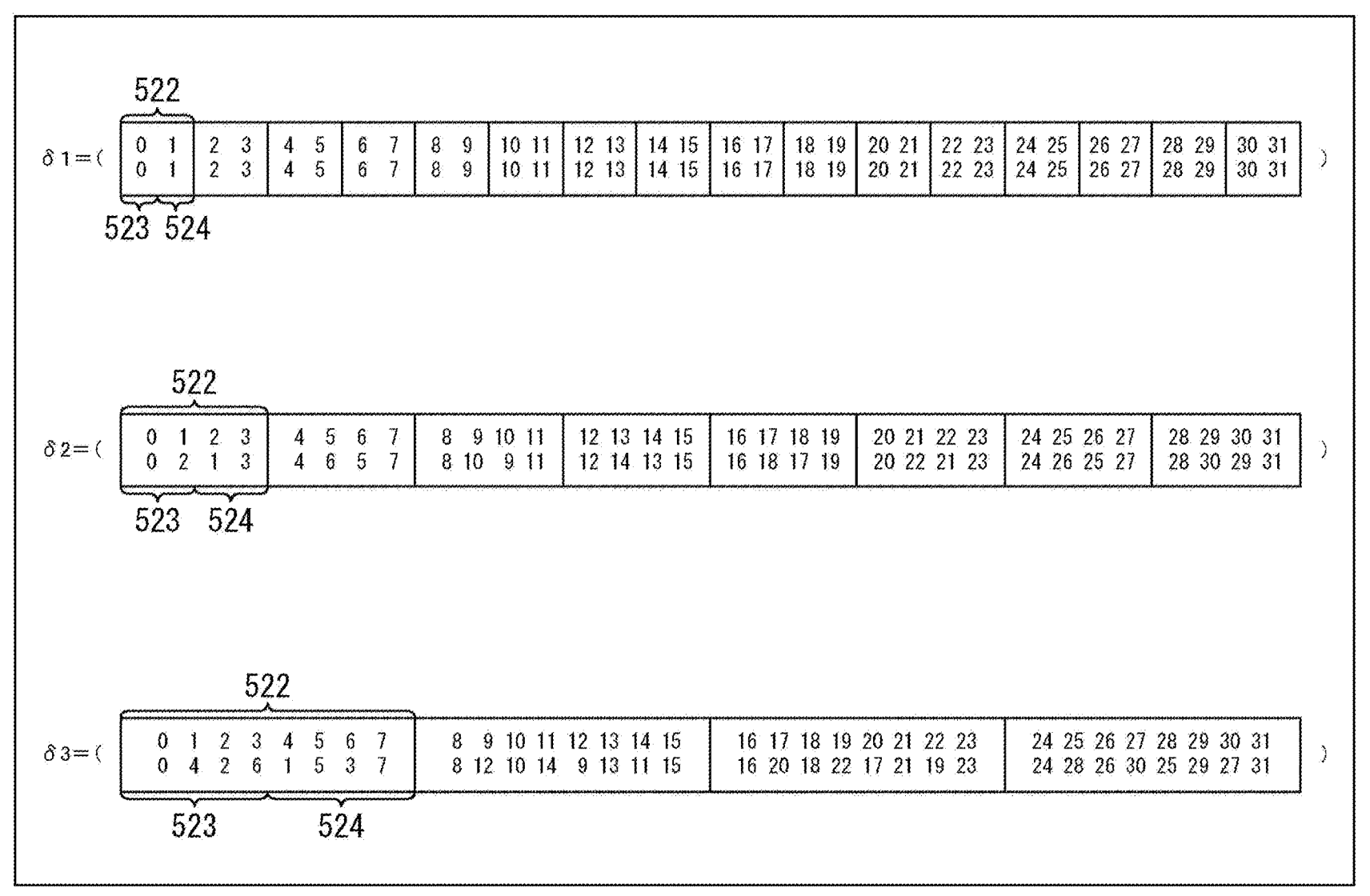

For example, in the case of the 32-points HyGT (N=5) indicated in FIG. 40, the elements of the first transformation $\delta 1$ are partitioned into subsets 522 including two elements as indicated in an upper part of FIG. 41. Although the reference sign is provided only to the subset at the left end in FIG. 40, all of the sets indicated by rectangular frames are the subsets 522. In addition, one element on the left is set as a first class 523, and one element on the right is set as a second class 524 in each subset 522. Furthermore, the elements are not switched in the transformation $\delta 1$.

The elements of the second transformation $\delta 2$ are partitioned into the subsets 522 including four elements as indicated in a middle part of FIG. 41. Two elements on the left in each subset 522 are set as the first class 523, and two elements on the right are set as the second class 524. In addition, for example, the element "1" of the first class 523 and the element "3" of the second class 524 are switched in the subset 522 at the left end. The elements are also switched in the other subsets 522 based on a similar positional relationship.

The elements of the third transformation $\delta 3$ are partitioned into the subsets 522 including eight elements as indicated in a lower part of FIG. 41. Four elements on the left in each subset 522 are set as the first class 523, and four elements on the right are set as the second class 524. In addition, for example, the element "1" of the first class 523 and the element "4" of the second class 524 are switched, and the element "3" of the first class 523 and the element "6" of the second class 524 are switched in the subset 522 at the left end. The elements are also switched in the other subsets 522 based on a similar positional relationship.

Figure 42:
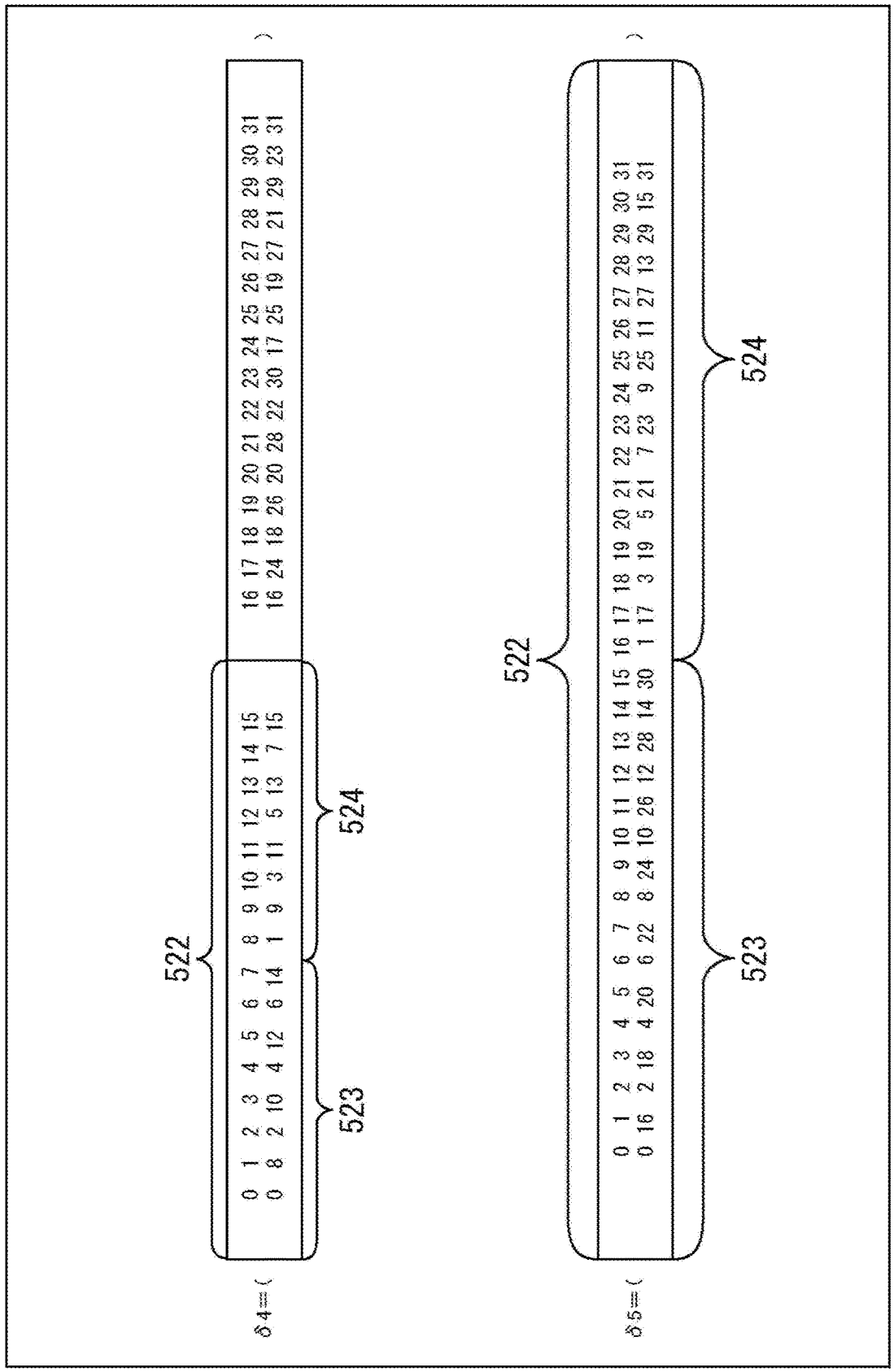
FIG. 42 is a diagram describing the example of the situation of the permutation δi in the case of the 32-points HyGT.

The elements of the fourth transformation $\delta 4$ are partitioned into the subsets 522 including sixteen elements as indicated in an upper part of FIG. 42. Eight elements on the left in each subset 522 are set as the first class 523, and eight elements on the right are set as the second class 524. In addition, for example, the element "1" of the first class 523 and the element "8" of the second class 524 are switched, the element "3" of the first class 523 and the element "10" of the second class 524 are switched, the element "5" of the first class 523 and the element "12" of the second class 524 are switched, and the element "7" of the first class 523 and the element "14" of the second class 524 are switched in the subset 522 at the left end. The elements are also switched in the other subsets 522 based on a similar positional relationship.

The elements of the fifth transformation δ5 are partitioned into the subsets 522 including 32 elements as indicated in a lower part of FIG. 42. That is, the entire 85 is set as one subset 522 in this case. In addition, sixteen elements on the left in the subset 522 are set as the first class 523, and sixteen elements on the right are set as the second class 524. Furthermore, the element "1" of the first class 523 and the element "16" of the second class 524 are switched, the element "3" of the first class 523 and the element "18" of the second class 524 are switched, the element "5" of the first class 523 and the element "20" of the second class are switched, the element "7" of the first class 523 and the element "22" of the second class 524 are switched, the element "9" of the first class 523 and the element "24" of the second class 524 are switched, the element "11" of first class 523 and the element "26" of the second class 524 are switched, the element "13" of the first class 523 and the element "28" of the second class 524 are switched, and the element "15" of the first class 523 and the element "30" of the second class 524 are switched.

In addition, the permutation δi in the ith transformation $T_i$ of the 64-points HyGT (N=6) is indicated in FIG. 43. Note that the permutation matrix $P_i$ corresponding to the permutation δi is obvious from the permutation δi, and the description will be skipped.

In this way, the pseudo code 521 illustrated in FIG. 39 can derive the permutation δi in the ith transformation $T_i$ of the $2^N$-points HyGT.

<$2^N$-Points HyGT Section>

Figure 44:
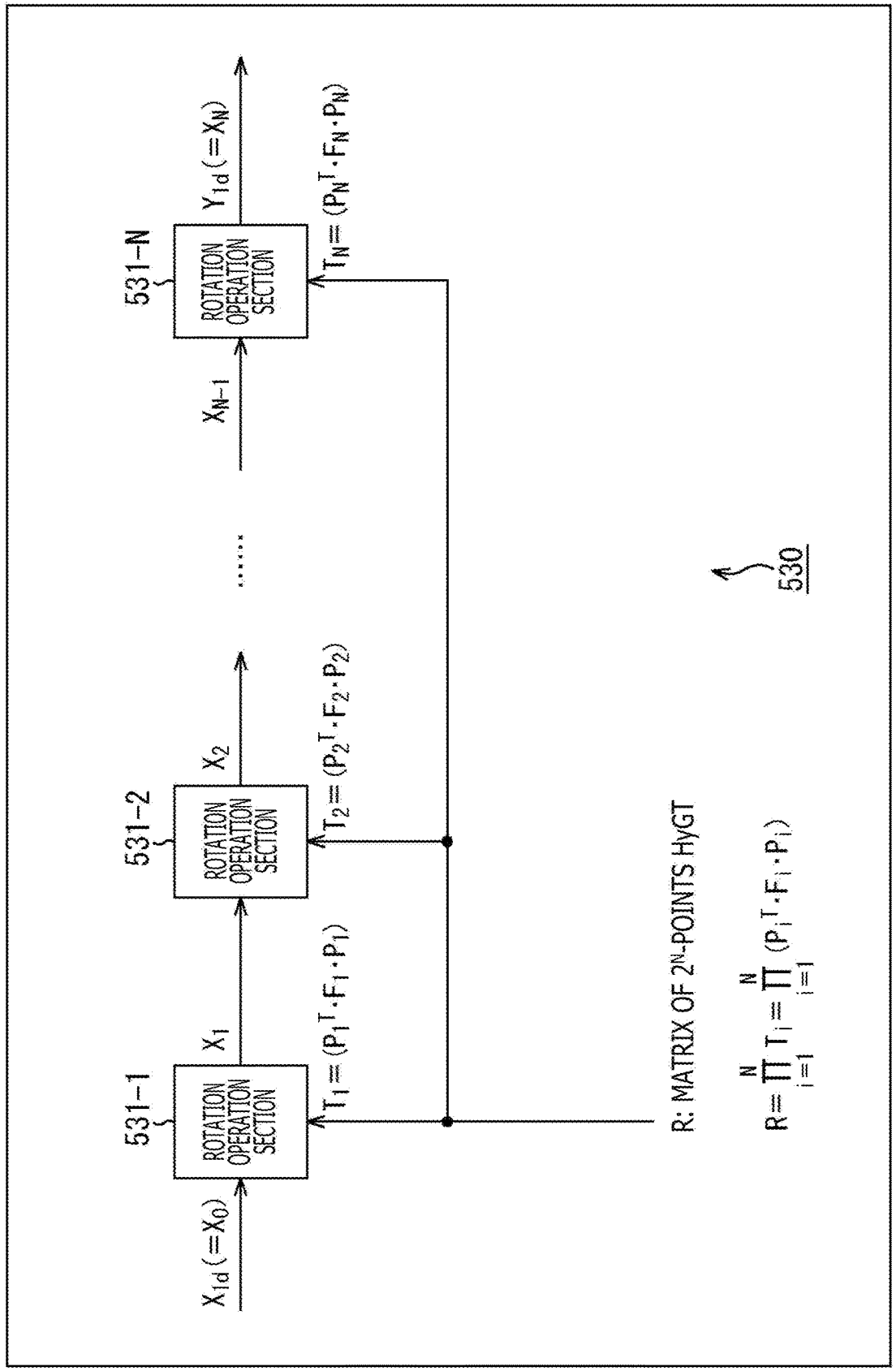
FIG. 44 is a block diagram illustrating a main configuration example of a $2^N$-points HyGT section.

Next, a configuration of the HyGT generalized as described above will be described. FIG. 44 is a block diagram illustrating a main configuration example of a $2^N$-points HyGT section 530 that performs the HyGT of $2^N$ points. As illustrated in FIG. 44, the $2^N$-points HyGT section 530 includes N rotation operation sections (rotation operation section 531-1, rotation operation section 531-2, ... , rotation operation section 531-N). Note that N can be an arbitrary integer equal to or greater than 1. In addition, the rotation operation section 531-1, the rotation operation section 531-2, ... , the rotation operation section 531-N will be referred to as rotation operation sections 531 in a case where the distinction is not necessary in the description.

As indicated in the following Formula (59), the rotation operation section 531-1 obtains a matrix product $X_1$ ($1 \times 2^N$ row vector) of an orthogonal matrix T corresponding to the first operation obtained by the matrix decomposition of the matrix R of the $2^N$-points HyGT supplied from the outside of the $2^N$-points HyGT section 530 and a transposed matrix of a 1×2 row vector $X_0$ (=$X_{1d}$) supplied from the outside of the $2^N$-points HyGT section 530. The rotation operation section 531-1 supplies the matrix product $X_1$ to the rotation operation section 531-2.

$$X_1^T = T_1 \cdot X_0^T = P_1^T \cdot F_1 \cdot P_1 \cdot X_0^T \quad (59)$$

As indicated in the following Formula (60), the rotation operation section 531-2 obtains a matrix product $X_2$ (1×2N row vector) of an orthogonal matrix $T_2$ corresponding to the second operation obtained by the matrix decomposition of the matrix R of the $2^N$-points HyGT supplied from the outside of the $2^N$-points HyGT section 530 and a transposed matrix of the $1 \times 2^N$ row vector $X_1$ supplied from the rotation operation section 531-1. The rotation operation section 531-2 supplies the matrix product $X_2$ to the next rotation operation section 531.

$$X_2^T = T_2 \cdot X_1^T = P_2^T \cdot F_2 \cdot P_2 \cdot X_1^T \quad (60)$$

Subsequently, each rotation operation section 531 executes a similar process. That is, an ith rotation operation section 531-$i$ obtains a matrix product $X_i$ ($1 \times 2^N$ row vector) of an orthogonal matrix $T_1$ corresponding to an ith operation obtained by the matrix decomposition of the matrix R of the $2^N$-points HyGT supplied from the outside of the $2^N$-points HyGT section 530 and a transposed matrix of a $1 \times 2^N$ row vector $X_{i-1}$ supplied from the previous rotation operation section 531-($i$−1). The rotation operation section 531-$i$ supplies the matrix product $X_1$ to the next rotation operation section 531-($i$+1).

As indicated in the following Formula (61), the rotation operation section 531-N obtains a matrix product $X_N$ ($1 \times 2^N$ row vector) of an orthogonal matrix $T_N$ corresponding to an Nth operation obtained by the matrix decomposition of the matrix R of the $2^N$-points HyGT supplied from the outside of the $2^N$-points HyGT section 530 and a transposed matrix of a $1 \times 2^N$ row vector $X_{N-1}$ supplied from the previous rotation operation section 531. The rotation operation section 531-N outputs the matrix product $X_N$ (=$Y_{1d}$) to the outside of the $2^N$-points HyGT section 530.

$$X_N^T = T_N \cdot X_{N-1}^T = P_N^T \cdot F_N \cdot P_N \cdot X_{N-1}^T \quad (61)$$

Note that in a case of N=2, the matrix product $X_2$ obtained by the rotation operation section 531-2 is output as the matrix product $Y_1$, to the outside of the 2N-points HyGT section 530. In addition, in a case of N=1, the matrix product $X_1$ obtained by the rotation operation section 531-1 is output as the matrix product $Y_1$a to the outside of the $2^N$-points HyGT section 530.

In this way, the N rotation operation sections 531 execute similar transformation processes. That is, the 2N-points HyGT section 530 can perform the matrix decomposition of the matrix R of the $2^N$-points HyGT to perform the matrix computation to transform the row vector $X_{1d}$ into the row vector $Y_{1d}$. Therefore, the amount of computation (multiplication and addition) of the transformation in the $2^N$-points HyGT can be reduced. This can also reduce the number of coefficients held for the transformation of the $2^N$-points HyGT, and the memory size necessary for holding the matrix R of the $2^N$-points HyGT can be reduced.

Note that a scaling section that performs scaling for norm normalization may be provided in a subsequent stage of each rotation operation section 531.

<Flow of Matrix Computation Process>

Figure 45:
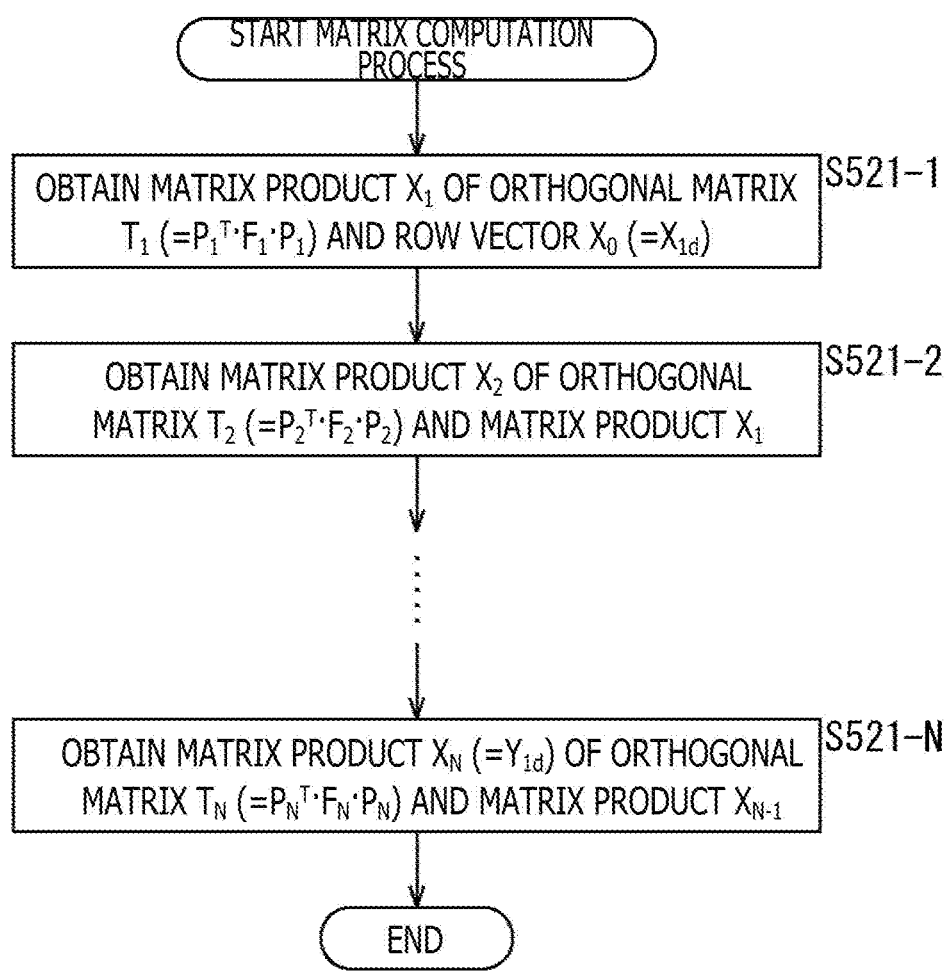
FIG. 45 is a flow chart describing an example of a flow of a matrix computation process.

An example of a flow of the matrix computation process executed by the $2^N$-points HyGT section 530 will be described with reference to a flow chart of FIG. 45.

Once the matrix computation process is started, the rotation operation section 531-1 obtains the matrix product $X_1$ of the orthogonal matrix $T_1$ (=$P_1^T \cdot F_1 \cdot P_1$=$F_1$) and the row vector $X_0$ in step S521-1.

In step S521-2, the rotation operation section 531-2 obtains the matrix product $X_2$ of the orthogonal matrix $T_2$ (=$P_2^T \cdot F_2 \cdot P_2$) and the matrix product $X_1$.

Similarly, the ith rotation operation section 531-$i$ obtains the matrix product $X_i$ of the orthogonal matrix $T_i$ (=$P_i^T \cdot F_i \cdot P_i$) and the matrix product $X_{N-1}$ in step S521-$i$.

Furthermore, the rotation operation section 531-N obtains the matrix product $X_N$ (=$Y_{1d}$) of the orthogonal matrix $T_N$ ($=P_N^T \cdot F_N \cdot P_N$) and the matrix product $X_{N-1}$ in step S521-N. Once the process of step S521-N is finished, the matrix computation process ends.

As a result of the execution of each process, the amount of computation (multiplication and addition) of the transformation in the $2^N$-points HyGT can be reduced.

Note that in the case of N=2, the matrix computation process ends once the process of step S521-2 is finished. Furthermore, in the case of N=1, the matrix computation process ends once the process of step S521-1 is finished.

<Application to Third Embodiment>

The $2^N$-points HyGT section 530 can be applied as, for example, the matrix computation section 421 described in the third embodiment. The matrix computation section 421 of the third embodiment performs the 16-points HyGT, and N is equal to 4. Therefore, the configuration is as described in the fourth embodiment (FIG. 35). That is, each rotation operation section 531 executes a process similar to each rotation operation section 501 of FIG. 35. Therefore, the flow of the matrix computation process in this case is similar to the case described with reference to the flow chart of FIG. 36.

<Inverse $2^N$-Points HyGT Section>

Figure 46:
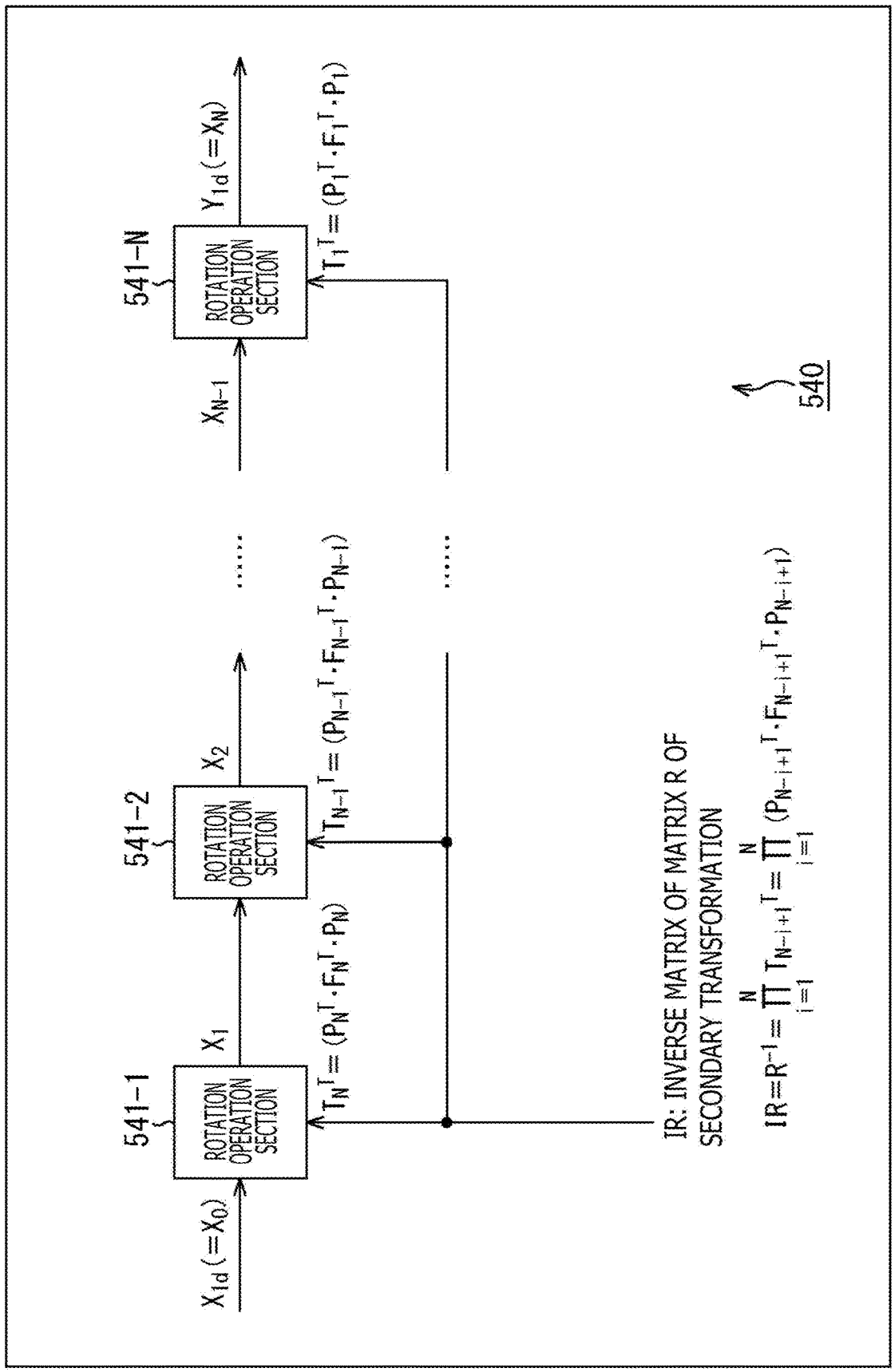
FIG. 46 is a block diagram illustrating a main configuration example of an inverse $2^N$-points HyGT section.

Next, an inverse $2^N$-points HyGT section (that executes an opposite process of the matrix computation performed by the $2^N$-points HyGT section 530) corresponding to the $2^N$-points HyGT section 530 will be described. FIG. 46 is a block diagram illustrating a main configuration example of the inverse $2^N$-points HyGT section. As illustrated in FIG. 46, an inverse $2^N$-points HyGT section 540 includes N rotation operation sections (rotation operation section 541-1, rotation operation section 541-2, . . . , rotation operation section 541-N). Note that N can be an arbitrary integer equal to or greater than 1. In addition, the rotation operation section 541-1, the rotation operation section 541-2, . . . , the rotation operation section 541-N will be referred to as rotation operation sections 541 in a case where the distinction is not necessary in the description.

As indicated in the following Formula (62), the rotation operation section 541-1 obtains a matrix product $X_1$ ($1 \times 2^N$ row vector) of an orthogonal matrix $T_N^T$ corresponding to the first operation obtained by the matrix decomposition of the matrix IR of the inverse $2^N$-points HyGT supplied from the outside of the inverse $2^N$-points HyGT section 540 and a transposed matrix of a $1 \times 2^N$ row vector $X_0$ ($=X_{1d}$) supplied from the outside of the inverse $2^N$-points HyGT section 540. The rotation operation section 541-1 supplies the matrix product $X_1$ to the rotation operation section 541-2.

$$X_1^T = T_N^T \cdot X_0^T = P_N^T \cdot F_N^T \cdot P_N \cdot X_0^T \qquad (62)$$

As indicated in the following Formula (63), the rotation operation section 541-2 obtains a matrix product $X_2$ ($1 \times 2^N$ row vector) of an orthogonal matrix $T_{N-1}^T$ corresponding to the second operation obtained by the matrix decomposition of the matrix IR of the inverse $2^N$-points HyGT supplied from the outside of the inverse $2^N$-points HyGT section 540 and a transposed matrix of the $1 \times 2^N$ row vector $X_1$ supplied from the rotation operation section 541-1. The rotation operation section 541-2 supplies the matrix product $X_2$ to the next rotation operation section 541.

$$X_2^T = T_{N-1}^T \cdot X_1^T = P_{N-1}^T \cdot F_{N-1}^T \cdot P_{N-1} \cdot X_1^T \qquad (63)$$

Subsequently, each rotation operation section 541 executes a similar process. That is, an ith rotation operation section 541-$i$ obtains a matrix product $X_i$ ($1 \times 2^N$ row vector) of an orthogonal matrix $T_{N-i+1}$ corresponding to an ith operation obtained by the matrix decomposition of the matrix IR of the inverse $2^N$-points HyGT supplied from the outside of the inverse $2^N$-points HyGT section 540 and a transposed matrix of a $1 \times 2^N$ row vector $X_{i-1}$ supplied from the previous rotation operation section 541-($i$-1). The rotation operation section 541-$i$ supplies the matrix product $X_i$ to the next rotation operation section 541-($i$+1).

As indicated in the following Formula (64), the rotation operation section 541-N obtains a matrix product $X_N$ ($1 \times 2^N$ row vector) of an orthogonal matrix $T_1^T$ corresponding to an Nth operation obtained by the matrix decomposition of the matrix IR of the inverse $2^N$-points HyGT supplied from the outside of the inverse $2^N$-points HyGT section 540 and a transposed matrix of a $1 \times 2^N$ row vector $X_i$-, supplied from the previous rotation operation section 541-(N-1). The rotation operation section 541-N outputs the matrix product $X_N$ ($=Y_{1d}$) to the outside of the inverse $2^N$-points HyGT section 540.

$$X_N^T = T_1^T \cdot X_{N-1}^T = P_1^T \cdot F_1^T \cdot P_1 \cdot X_{N-1}^T = F_1^T \cdot X_{N-1}^T \qquad (64)$$

Note that in the case of N=2, the matrix product $X_2$ obtained by the rotation operation section 541-2 is output as the matrix product $Y_{1d}$ to the outside of the inverse $2^N$-points HyGT section 540. In addition, in the case of N=1, the matrix product X, obtained by the rotation operation section 541-1 is output as the matrix product $Y_{1d}$ to the outside of the inverse $2^N$-points HyGT section 540.

In this way, the inverse $2^N$-points HyGT section 540 performs the matrix decomposition of the matrix IR of the inverse $2^N$-points HyGT to perform the matrix computation to transform the row vector $X_d$ into the row vector $Y_{1d}$. Therefore, the amount of computation (multiplication and addition) of the transformation in the inverse $2^N$-points HyGT can be reduced. This can also reduce the number of coefficients held for the transformation of the $2^N$-points HyGT, and the memory size necessary for holding the matrix of the inverse $2^N$-points HyGT can be reduced.

Note that a scaling section that performs scaling for norm normalization can be provided in a subsequent stage of each rotation operation section 541.

<Flow of Matrix Computation Process>

Figure 47:
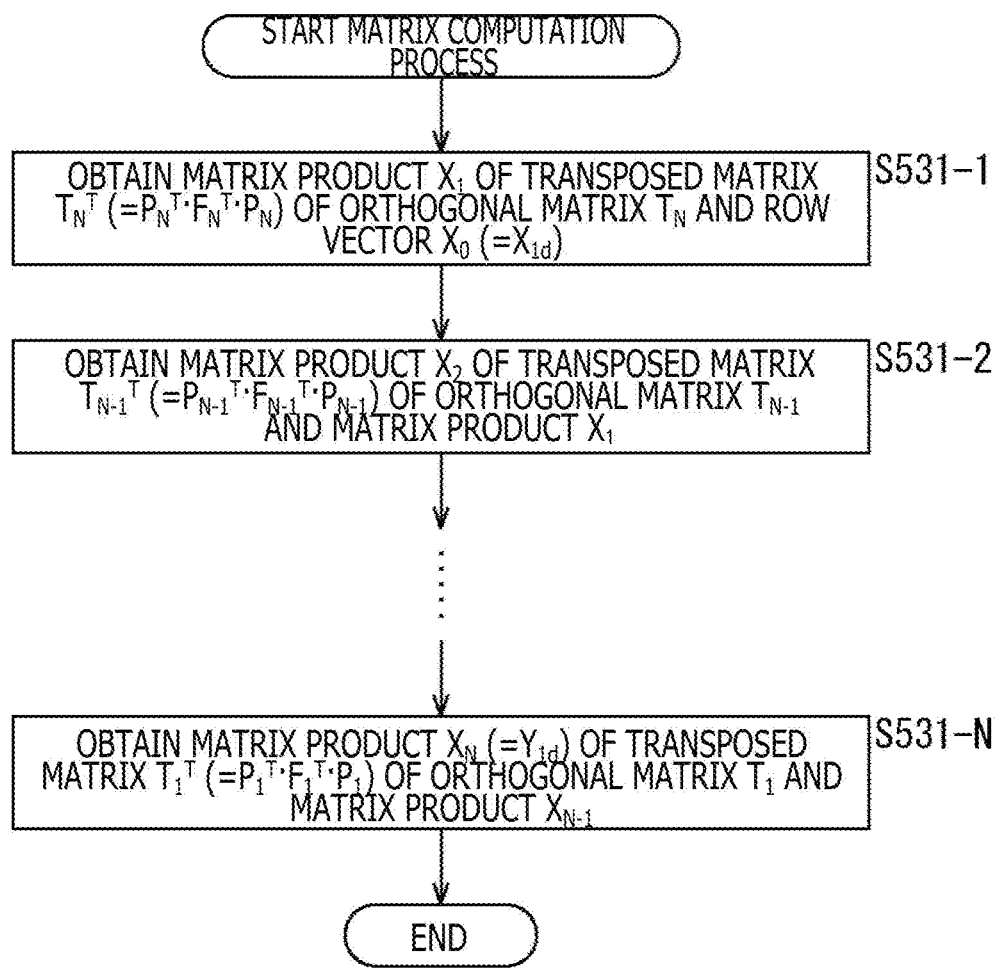
FIG. 47 is a flow chart describing an example of a flow of a matrix computation process.

An example of a flow of the matrix computation process executed by the inverse $2^N$-points HyGT section 540 will be described with reference to a flow chart of FIG. 47.

Once the matrix computation process is started, the rotation operation section 541-1 obtains the matrix product $X_1$ of the orthogonal matrix $T_N T$ ($=P_N^T \cdot F_N^T \cdot P_N$) and the row vector $X_0$ in step S531-1.

In step S531-2, the rotation operation section 541-2 obtains the matrix product $X_2$ of the orthogonal matrix $T_{N-1}^T$ ($=P_{N-1}^T \cdot F_{N-1}^T \cdot P_{N-1}$) and the matrix product $X_1$.

Similarly, the ith rotation operation section 541-$i$ obtains the matrix product $X_1$ of the orthogonal matrix $T_{N-1}^T$ ($=P_{N-i+1}^T \cdot F_{N-i+1}^T \cdot P_{N-i+1}$) and the matrix product $X_{i-1}$ in step S531-$i$.

Furthermore, the rotation operation section 541-N obtains the matrix product $X_N$ ($=Y_{1d}$) of the orthogonal matrix $T_1^T$ ($=P_1^T \cdot F_1^{T*} \cdot P_1 = F_1$) and the matrix product $X_{N-1}$ in step S531-N. Once the process of step S531-N is finished, the matrix computation process ends.

As a result of the execution of each process, the amount of computation (multiplication and addition) of the transformation in the inverse $2^N$-points HyGT can be reduced.

Note that in the case of N=2, the matrix computation process ends once the process of step S531-2 is finished. Furthermore, in the case of N=1, the matrix computation process ends once the process of step S531-1 is finished.

<Application to Third Embodiment>

The inverse $2^N$-points HyGT section 540 can be applied as, for example, the matrix computation section 451 described in the third embodiment. The matrix computation section 451 of the third embodiment performs the 16-points HyGT, and N is equal to 4. Therefore, the configuration is as described in the fourth embodiment (FIG. 37). That is, each rotation operation section 541 executes a process similar to each rotation operation section 511 of FIG. 37. Therefore, the flow of the matrix computation process in this case is similar to the case described with reference to the flow chart of FIG. 38.

6. Sixth Embodiment

<Case of 64-Points HyGT>

The secondary transformation and the inverse secondary transformation described in the third embodiment allow fast computation based on the matrix decomposition in the case where the HyGT-based secondary transformation is applied to each 4×4 sub-block. In addition, the 2N-points HyGT and the inverse 24-points HyGT as generalized HyGTs are described in Modification 6 of the sixth embodiment. Incidentally, it is disclosed in X. Zhao, A. Said, V. Seregin, M. Karczewicz, J. Chen, "EE2.7 related Improved non-separable secondary secondary transform," JVET-C0063, Joint Video Exploration Team (JVET) of ITU-T SG 16 WP 3 and ISO/IEC JTC 1/SC 29/WG 11 3rd Meeting: Geneva, CH, from 2016 May 26 to 2016 Jun. 1 2016 (hereinafter, also referred to as NPL 3) that a 64-points HyGT-based secondary transformation is applied to each 8×8 sub-block in a case where the transformation block size is equal to or greater than 8×8 in order to improve the performance of the energy compaction of the secondary transformation.

However, the 64-points HyGT-based secondary transformation in the method described in NPL 3 is non-separable, and the amount of computation is large. In addition, the number of matrices of 4×4 and 8×8 secondary transformations corresponds to the number of classes of the intra prediction mode and the number of secondary transformations corresponding to each class. Therefore, the memory size for holding the matrices of secondary transformation may be larger than in the method described in NPL 2. That is, this may increase the load of encoding and decoding.

For example, in the case of the method described in NPL 3, the number of classes of the intra prediction mode is 35, and the number of secondary transformations for each class is 5. Therefore, there are 35*5=175 matrices for each the 4×4 and 8×8 secondary transformations. Thus, when the elements of each matrix are held at 9-bit precision, the memory size required for holding the matrices of all the secondary transformations is 9 bits*16*16*175+9 bits*64*64 * 175=6854400 bits=856800 bytes=836.71875 KB.

<Decomposition of Matrix Computation>

Therefore, as in the 16-points HyGT described in the third embodiment, transformation coefficients obtained by applying a transformation process to a predicted residual that is a difference between an image and a predicted image of the image are transformed into a one-dimensional vector in the secondary transformation or the inverse secondary transformation in 8×8 sub-blocks, and matrix computation including a plurality of times of matrix multiplication is applied to the one-dimensional vector.

For example, the $2^N$-points HyGT and the inverse $2^N$-points HyGT described in the fifth embodiment can be applied (N=6) to the 64-points HyGT and the inverse 64-points HyGT that is an inverse transformation of the 64-points HyGT described in NPL 3, and a separable orthogonal transformation decomposed into six orthogonal matrices can be used to perform the secondary transformation and the inverse secondary transformation.

The matrices expressing the 64-points HyGT and the inverse 64-points HyGT in this case can be obtained by setting N=6 in Formula (56) and Formula (57). That is, the matrices can be expressed as in the following Formula (65) and Formula (66). Note that the orthogonal matrix $F_i$ (i=1, . . . , 6) in Formula (56) and Formula (57) is a sparse 64×64 matrix, where the rotation matrices $G_{i,j}$ (j=1, . . . , 16) indicated in formula (33) are provided as diagonal components, and the other elements are 0. The permutation matrix $P_i$ (i=1, . . . , 6) is a 64×64 matrix corresponding to the permutation $\delta_i$ (i=1, . . . , 6) obtained by setting N=6 to execute the pseudo code 521 indicated in FIG. 39.

$$R = (P_6^T \cdot F_6 \cdot P_6) \cdot (P_5^T \cdot F_5 \cdot P_5) \cdot (P_4^T \cdot F_4 \cdot P_4) \cdot (P_3^T \cdot F_3 \cdot P_3) \cdot \quad (65)$$
$$(P_2^T \cdot F_2 \cdot P_2) \cdot (P_1^T \cdot F_1 \cdot P_1)$$

$$R^{-1} = ((P_6^T \cdot F_6 \cdot P_6) \cdot (P_5^T \cdot F_5 \cdot P_5) \cdot (P_4^T \cdot F_4 \cdot P_4) \cdot \quad (66)$$
$$(P_3^T \cdot F_3 \cdot P_3) \cdot (P_2^T \cdot F_2 \cdot P_2) \cdot (P_1^T \cdot F_1 \cdot P_1))^{-1}$$
$$= (P_1^T \cdot F_1^T \cdot P_1) \cdot (P_2^T \cdot F_2^T \cdot P_2) \cdot (P_3^T \cdot F_3^T \cdot P_3) \cdot$$
$$(P_4^T \cdot F_4^T \cdot P_4) \cdot (P_5^T \cdot F_5^T \cdot P_5) \cdot (P_6^T \cdot F_6^T \cdot P_6)$$

A table of A in FIG. 48 indicates results of comparison between the number of processes of multiplication and addition in the case of the non-separable 64-points HyGT-based secondary transformation described in NPL 3 and the number of processes of multiplication and addition in the case of the separable 64-points HyGT-based secondary transformation after the matrix decomposition. As indicated in the table of A in FIG. 48, the matrix decomposition can clearly reduce the number of processes of multiplication and addition.

In addition, a table of B in FIG. 48 indicates results of comparison between the case of the non-separable 64 HyGT-based secondary transformation described in NPL 3 and the case of the separable 64-points HyGT-based secondary transformation after the matrix decomposition, regarding the amount of information (per transformation) of the matrix of the secondary transformation and the memory size necessary for holding the matrix. As a result of the matrix decomposition, the nature of the sparse matrix of each orthogonal transformation after the matrix decomposition and the symmetry of coefficients can be used to reduce the number of coefficients held for the secondary transformation. Therefore, as indicated in the table of B in FIG. 48, the amount of information of the matrix of the secondary transformation can be clearly and significantly reduced, and the increase in the necessary memory size can be suppressed. That is, the increase in the load of encoding can be suppressed.

7. Seventh Embodiment

<Shapes of CU, PU, and TU>

Figure 49:
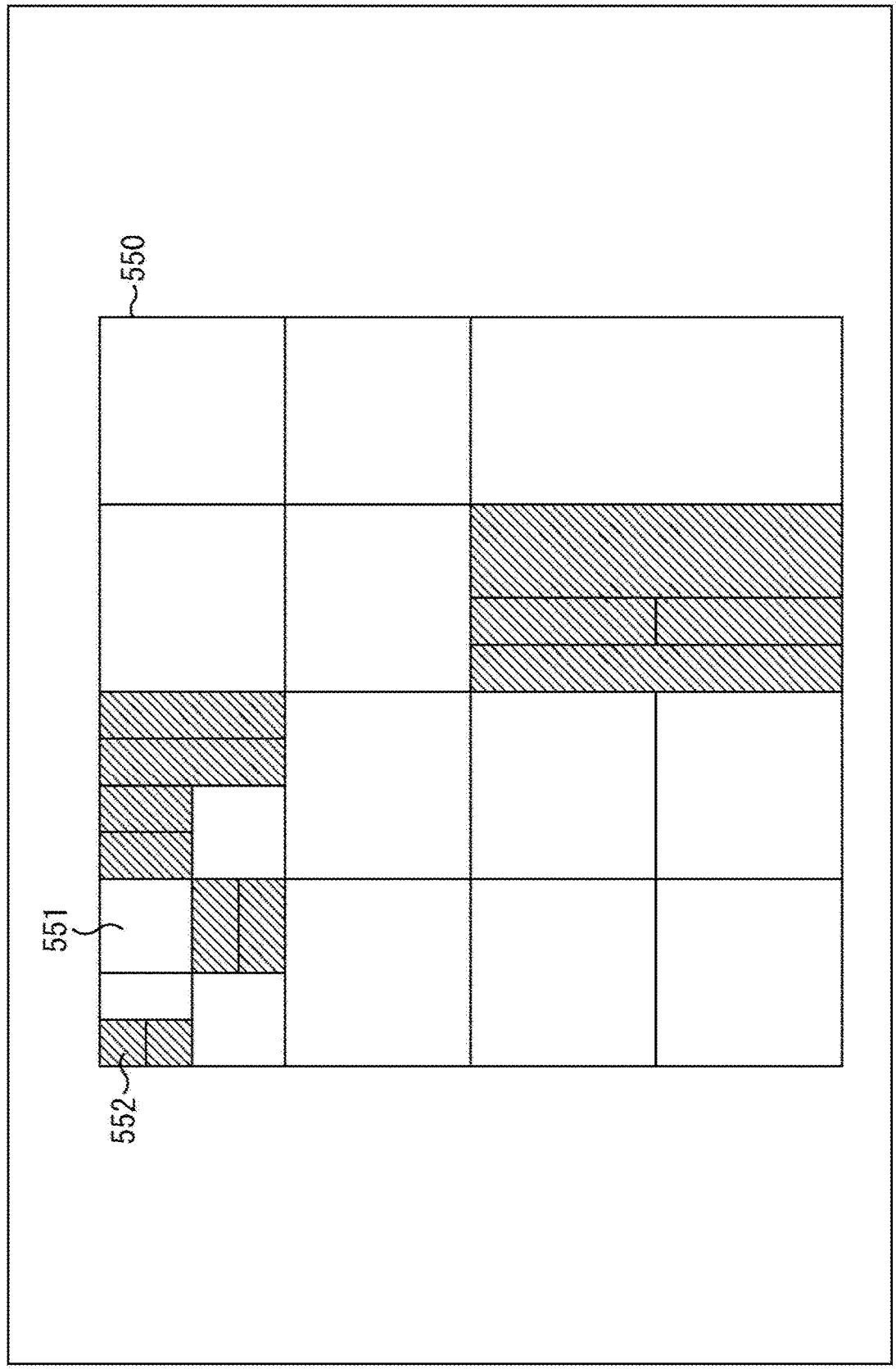
FIG. 49 is a diagram describing an example of a situation of block partitioning.

FIG. 49 is a diagram describing shapes of the CU, the PU, and the TU. The CU, the PU, and the TU in the case of applying the present technique can be the CU, the PU, and the TU of QTBT (Quad tree plus binary tree) described in H. Huang, K. Zhang, Y.-W. Huang, S. Lei, "EE2.1: Quadtree plus binary tree structure integration with JEM tools," JVET-C0024, Joint Video Exploration Team (JVET) of ITU-T SG 16 WP 3 and ISO/IEC JTC 1/SC 29/WG 11 3rd Meeting: Geneva, CH, from 2016 May 26 to 2016 Jun. 1 2016 (hereinafter, also referred to as NPL 4).

That is, in the block partitioning of CU, one block can be partitioned into not only four (=2×2) sub-blocks, but also two (=1×2, 2×1) sub-blocks as in the example illustrated in FIG. 49. More specifically, the block partitioning of CU in this case is performed by recursively repeating the partitioning of one block into four or two sub-blocks, and as a result, a tree structure is formed in a quad-tree shape or in a binary-tree shape in the horizontal or vertical direction. In FIG. 49, a CU 551 indicated by a rectangle with a white background in an LCU 550 is a CU partitioned into a quad-tree shape, and a CU 552 indicated by a rectangle in a diagonal line pattern is a CU partitioned into a binary-tree shape.

As a result, the shape of the CU can be not only a square, but also a rectangle. For example, in a case where the LCU size is 128×128, the size of the CU (size w in the horizontal direction×size h in the vertical direction) can be not only a square size, such as 128×128, 64×64, 32×32, 16×16, 8×8, and 4×4, but also a rectangle size, such as 128×64, 128×32, 128×16, 128×8, 128×4, 64×128, 32×128, 16×128, 8×128, 4×128, 64×32, 64×16, 64×8, 64×4, 32×64, 16×64, 8×64, 4×64, 32×16, 32×8, 32×4, 16×32, 8×32, 4×32, 16×8, 16×4, 8×16, 4×16, 8×4, and 4×8 as illustrated in FIG. 49. In addition, the PU and the TU in this case are the same as the CU. That is, the shape of the transformation block can be not only a square, but also a rectangle, as in the CU.

<Secondary Transformation Section>

In the case where the blocks (CUs, PUs, and TUs) are applied, the configuration of the image encoding apparatus 100 can also be basically similar to the case of the third embodiment. That is, the configuration of the image encoding apparatus 100 is as illustrated for example in FIG. 7, and the configuration of the transformation section 112 is as illustrated for example in FIG. 26. However, the configuration of the secondary transformation section 132 in this case is as illustrated for example in FIG. 50.

Figure 50:
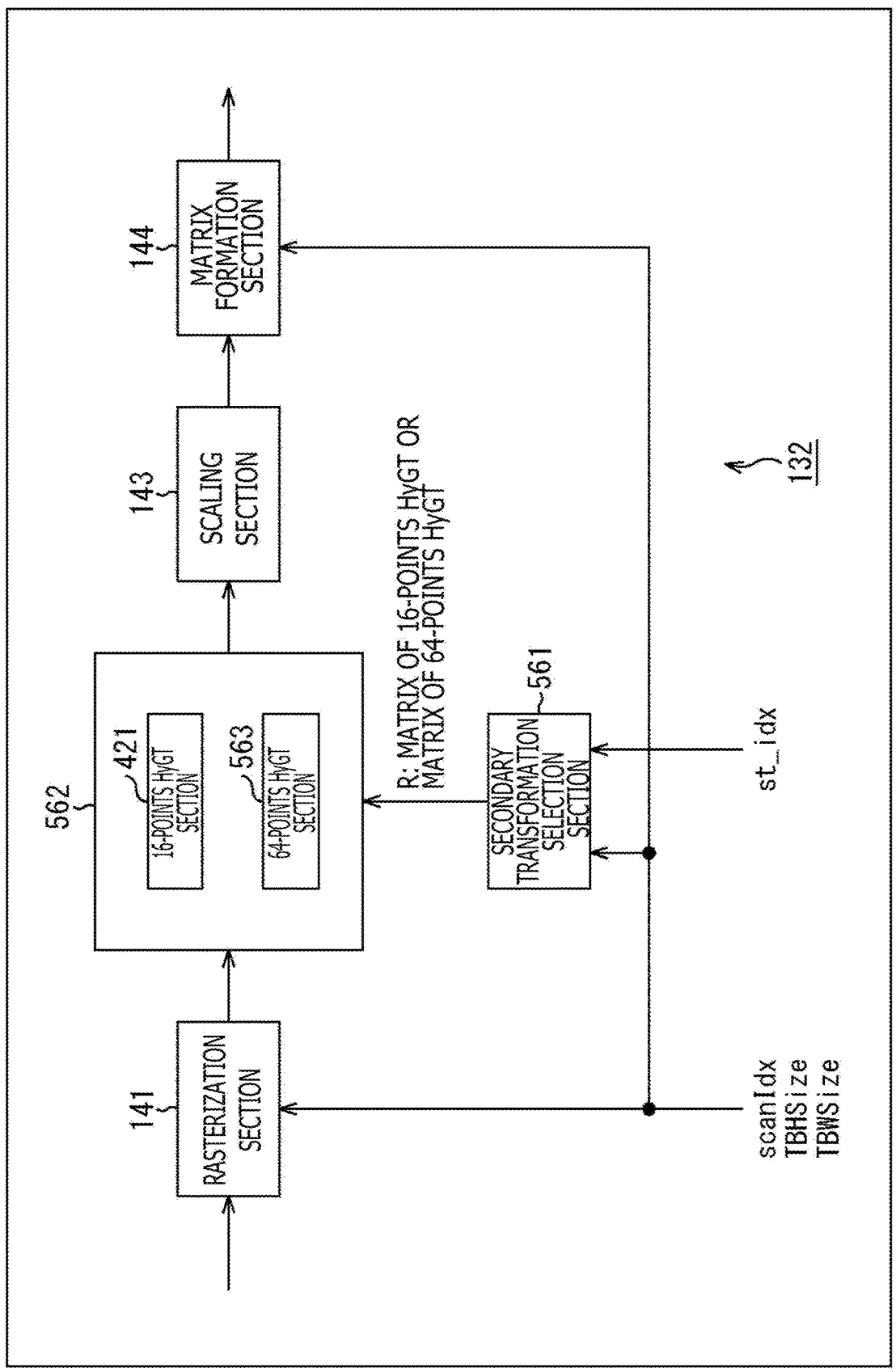
FIG. 50 is a block diagram illustrating a main configuration example of a secondary transformation section.

That is, although the secondary transformation section 132 in this case includes the rasterization section 141, the scaling section 143, and the matrix formation section 144 of FIG. 26, the secondary transformation section 132 includes a secondary transformation selection section 561 of FIG. 50 in place of the secondary transformation selection section 146 of FIG. 26 and includes a matrix computation section 562 of FIG. 50 in place of the matrix computation section 421 of FIG. 26. Note that the clip processing section 145 may be removed in this case as in the case of FIG. 26.

Based on the scan method of the transformation coefficients designated by the scan identifier scanIdx, the rasterization section 141 transforms the primary transformation coefficients Coeff_P supplied from the primary transformation section 131 into a 1×N-dimensional vector $X_{1d}$ for each sub-group including N elements. Note that in a case where one of a height size TBHSize and a width size TBWSize of the transformation block is 4, a 4×4 sub-block is set as a sub-group. In this case, N is equal to 16. Meanwhile, in a case where both the height size TBHSize and the width size TBWSize of the transformation block are 8 or more, an 8×8 sub-block is set as a sub-group. In this case, N is equal to 64. The rasterization section 141 supplies the obtained vector $X_{1d}$ to the matrix computation section 562. Note that N indicating the size (the number of elements) of the sub-group is decided according to, for example, the following Formula (67). In addition, a logarithm of each size may be used to decide the size according to the following Formula (68) instead of Formula (67).

$$N=\min(\text{TBHSize},\text{TBWSize})==4?16:64 \qquad (67)$$

$$N=\min(\log 2\text{TBHSize},\log 2\text{TBWSize})==2?16:64 \qquad (68)$$

The secondary transformation selection section 561 reads, from the internal memory (not illustrated) of the secondary transformation selection section 146, the matrix R of the secondary transformation designated by the secondary transformation identifier st_idx and the size N of the sub-group derived based on the height size TBHSize and the width size TBWSize of the transformation block and supplies the matrix R to the matrix computation section 562. For example, in the case where the size N of the sub-group is N=16 (4×4 sub-block), the transformation matrix R of the 16-points HyGT after the matrix decomposition corresponding to the secondary transformation identifier st_idx is selected. Furthermore, in the case where the size N of the sub-group is N=64 (8×8 sub-block), the transformation matrix R of the 64-points HyGT after the matrix decomposition corresponding to the secondary transformation identifier st_idx is selected.

Note that the secondary transformation selection section 561 may select the secondary transformation R according to the size of the sub-group based on the secondary transformation identifier st_idx and the intra prediction mode information IPinfo (for example, prediction mode number). In addition, the secondary transformation selection section 561 may select the transformation R according to the motion prediction information MVinfo, in place of the intra prediction mode information IPinfo, and the secondary transformation identifier st_idx.

The matrix computation section 562 includes the 16-points HyGT section 421 and a 64-points HyGT section 563. The matrix computation section 562 supplies, to the 16-points HyGT section 421 or the 64-points HyGT section 563, the 1×N-dimensional vector $X_{1d}$ ($=X_0$) and the matrix of the secondary transformation R for each sub-group. More specifically, in the case where the size N of the sub-group is 16 (processing unit of the secondary transformation is 4×4 sub-block), the matrix computation section 562 supplies the 1×16-dimensional vector $X_{1d}$ ($=X_0$) and the transformation matrix R of the 16-points HyGT to the 16-points HyGT section 421. Furthermore, in the case where the size N of the sub-group is 64 (processing unit of the secondary transformation is 8×8 sub-block), the matrix computation section 562 supplies the 1×64-dimensional vector $X_{1d}$ ($=X_0$) and the transformation matrix R of the 64-points HyGT to the 64-points HyGT section 563.

In the case where the 1×16-dimensional vector $X_{1d}$ ($=X_0$) and the transformation matrix R of the 16-points HyGT are supplied, the 16-points HyGT section 421 derives a matrix product $Y_{1d}$ of the transformation matrix R and the 1×16-dimensional vector $X_{1d}$ and supplies the matrix product $Y_{1d}$ to the scaling section 143. Furthermore, in the case where the 1×64-dimensional vector $X_d$ ($=X_0$) and the transformation matrix R of the 64-points HyGT are supplied, the 64-points HyGT section 563 derives a matrix product $Y_{1d}$ of the transformation matrix R and the 1×64-dimensional vector $X_{1d}$ and supplies the matrix product $Y_{1d}$ to the scaling section 143.

The scaling section 143 normalizes the norm of the signal $Y_{1d}$ supplied from the matrix computation section 562 and obtains a signal $Z_{1d}$ after the normalization. The scaling section 143 supplies the obtained signal $Z_{1d}$ to the matrix formation section 144. Based on the scan method designated by the scan identifier scanIdx, the matrix formation section 144 transforms the 1×N-dimensional vector $Z_{1d}$ after the norm normalization into an M×M sub-block (M×M square matrix) corresponding to the size N of the sub-group. For example, in the case where the size N of the sub-group is 16, the matrix formation section 144 transforms the 1×16-dimensional vector $Z_{1d}$ into a 4×4 sub-block (4×4 square matrix). In addition, for example, in the case where the size N of the sub-group is 64, the matrix formation section 144 transforms the 1×64-dimensional vector $Z_{1d}$ into an 8×8 sub-block (8×8 square matrix). The matrix formation section 144 outputs the obtained transformation coefficients Coeff to the outside.

In this way, the matrix computation section 562 performs the matrix decomposition of the matrix of the secondary transformation based on the 16-points HyGT or the 64-points HyGT to perform the matrix computation and transforms the row vector $X_{1d}$ into the row vector $Y_{1d}$. Therefore, the amount of computation (multiplication and addition) of the secondary transformation can be reduced. In addition, the number of coefficients held for the secondary transformation can be reduced, and the memory size necessary for holding the matrix of the secondary transformation can be reduced.

<64-Points HyGT Section>

Figure 51:
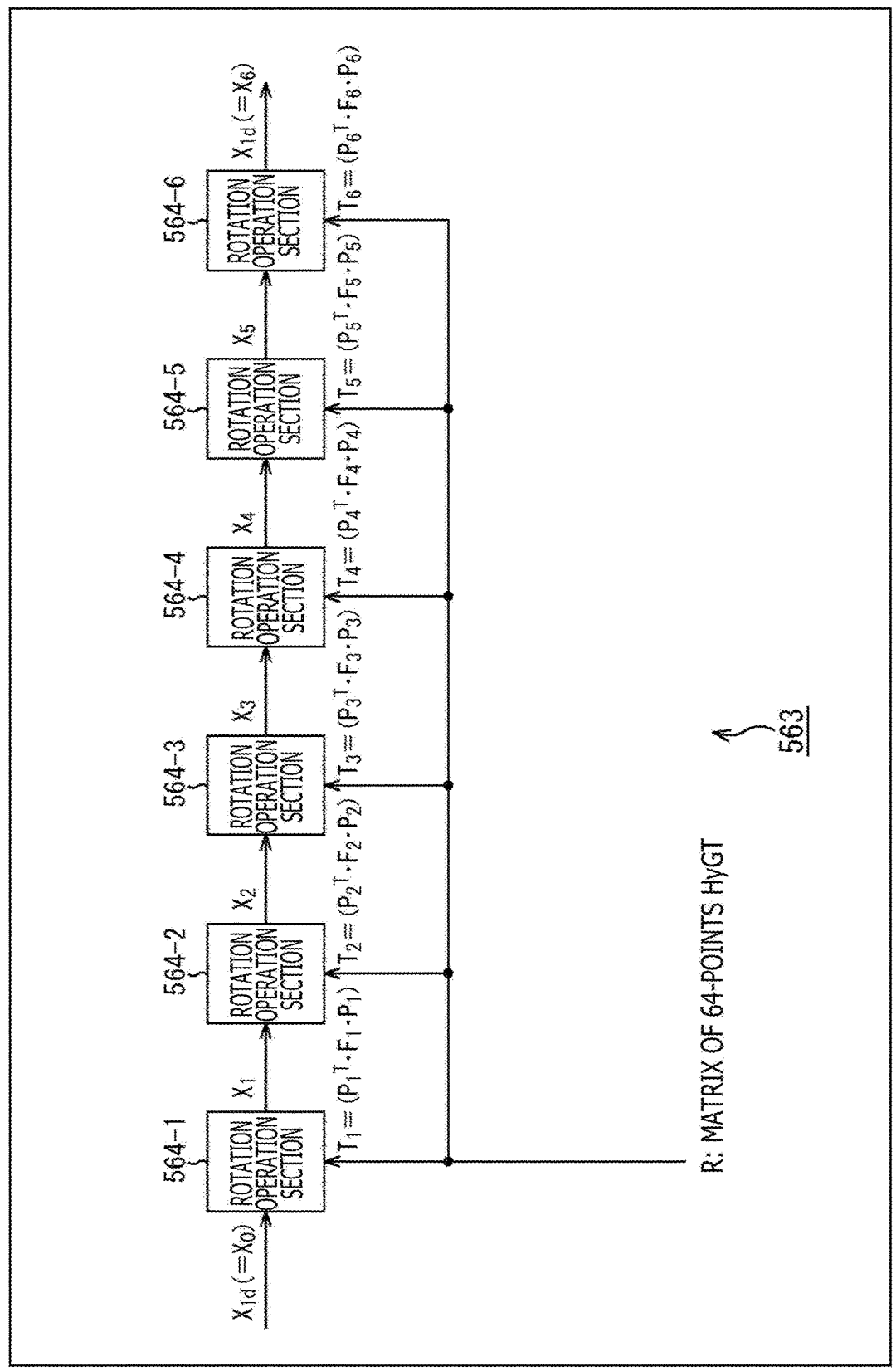
FIG. 51 is a block diagram illustrating a main configuration example of a 64-points HyGT section.

FIG. 51 is a block diagram illustrating a main configuration example of the 64-points HyGT section 563. As illustrated in FIG. 51, the 64-points HyGT section 563 includes a rotation operation section 564-1, a rotation operation section 564-2, a rotation operation section 564-3, a rotation operation section 564-4, a rotation operation section 564-5, and a rotation operation section 564-6. Note that the rotation operation sections 564-1 to 564-6 will be referred to as rotation operation sections 564 in a case where the distinction is not necessary in the description.

As indicated in the following Formula (69), the rotation operation section 564-1 obtains a matrix product $X_1$ (1×64 row vector) of an orthogonal matrix $T_1$ corresponding to the first operation obtained by the matrix decomposition of the matrix R of the 64-points HyGT supplied from the outside of the 64-points HyGT section 563 (secondary transformation selection section 561 (FIG. 50)) and a transposed matrix of a 1×64 row vector $X_0$ (=$X_{1d}$) supplied from the outside of the 64-points HyGT section 563 (rasterization section 141 (FIG. 50)). The rotation operation section 564-1 supplies the matrix product $X_1$ to the rotation operation section 564-2.

$$X_1^T = T_1 \cdot X_0^T = P_1^T \cdot F_1 \cdot P_1 \cdot X_0^T \tag{69}$$

As indicated in the following Formula (70), the rotation operation section 564-2 obtains a matrix product $X_2$ (1×64 row vector) of an orthogonal matrix $T_2$ corresponding to the second operation obtained by the matrix decomposition of the matrix R of the 64-points HyGT supplied from the outside of the 64-points HyGT section 563 (secondary transformation selection section 561 (FIG. 50)) and a transposed matrix of the 1×64 row vector $X_1$ supplied from the rotation operation section 564-1. The rotation operation section 564-2 supplies the matrix product $X_2$ to the rotation operation section 564-3.

$$X_2^T = T_2 \cdot X_1^T = P_2^T \cdot F_2 \cdot P_2 \cdot X_1^T \tag{70}$$

As indicated in the following Formula (71), the rotation operation section 564-3 obtains a matrix product $X_3$ (1×64 row vector) of an orthogonal matrix $T_3$ corresponding to the third operation obtained by the matrix decomposition of the matrix R of the 64-points HyGT supplied from the outside of the 64-points HyGT section 563 (secondary transformation selection section 561 (FIG. 50)) and a transposed matrix of the 1×64 row vector $X_2$ supplied from the outside. The rotation operation section 564-3 supplies the matrix product $X_3$ to the rotation operation section 564-4.

$$X_3^T = T_3 \cdot X_2^T = P_3^T \cdot F_3 \cdot P_3 \cdot X_2^T \tag{71}$$

As indicated in the following Formula (72), the rotation operation section 564-4 obtains a matrix product $X_4$ (1×64 row vector) of an orthogonal matrix $T_4$ corresponding to the fourth operation obtained by the matrix decomposition of the matrix R of the 64-points HyGT supplied from the outside of the 64-points HyGT section 563 (secondary transformation selection section 561 (FIG. 50)) and a transposed matrix of the 1×64 row vector $X_3$ supplied from the outside. The rotation operation section 564-4 supplies the matrix product $X_4$ to the rotation operation section 564-5.

$$X_4^T = T_4 \cdot X_3^T = P_4^T \cdot F_4 \cdot P_4 \cdot X_3^T \tag{72}$$

As indicated in the following Formula (73), the rotation operation section 564-5 obtains a matrix product $X_5$ (1×64 row vector) of an orthogonal matrix $T_5$ corresponding to the fifth operation obtained by the matrix decomposition of the matrix R of the 64-points HyGT supplied from the outside of the 64-points HyGT section 563 (secondary transformation selection section 561 (FIG. 50)) and a transposed matrix of the 1×64 row vector $X_4$ supplied from the outside. The rotation operation section 564-5 supplies the matrix product $X_5$ to the rotation operation section 564-6.

$$X_5^T = T_5 \cdot X_4^T = P_5^T \cdot F_5 \cdot P_5 \cdot X_4^T \tag{73}$$

As indicated in the following Formula (74), the rotation operation section 564-6 obtains a matrix product $X_6$ (1×64 row vector) of an orthogonal matrix $T_6$ corresponding to the sixth operation obtained by the matrix decomposition of the matrix R of the 64-points HyGT supplied from the outside of the 64-points HyGT section 563 (secondary transformation selection section 561 (FIG. 50)) and a transposed matrix of the 1×64 row vector $X_5$ supplied from the outside. The rotation operation section 564-6 supplies the matrix product $X_6$ (=$Y_{1d}$) to the outside of the 64-points HyGT section 563 (scaling section 143 (FIG. 50)).

$$X_6^T = T_6 \cdot X_5^T = P_6^T \cdot F_6 \cdot P_6 \cdot X_5^T \tag{74}$$

In this way, the six rotation operation sections 564 execute similar transformation processes. That is, the 64-points HyGT section 563 performs the matrix decomposition of the matrix R of the 64-points HyGT to perform the matrix computation to transform the row vector $X_{1d}$ into the row vector $Y_{1d}$. Therefore, the amount of computation (multiplication and addition) of the transformation in the 64-points HyGT can be reduced. This can also reduce the number of coefficients held for the transformation of the 64-points HyGT, and the memory size necessary for holding the matrix R of the 64-points HyGT can be reduced.

<Flow of Transformation Process>

Figure 52:
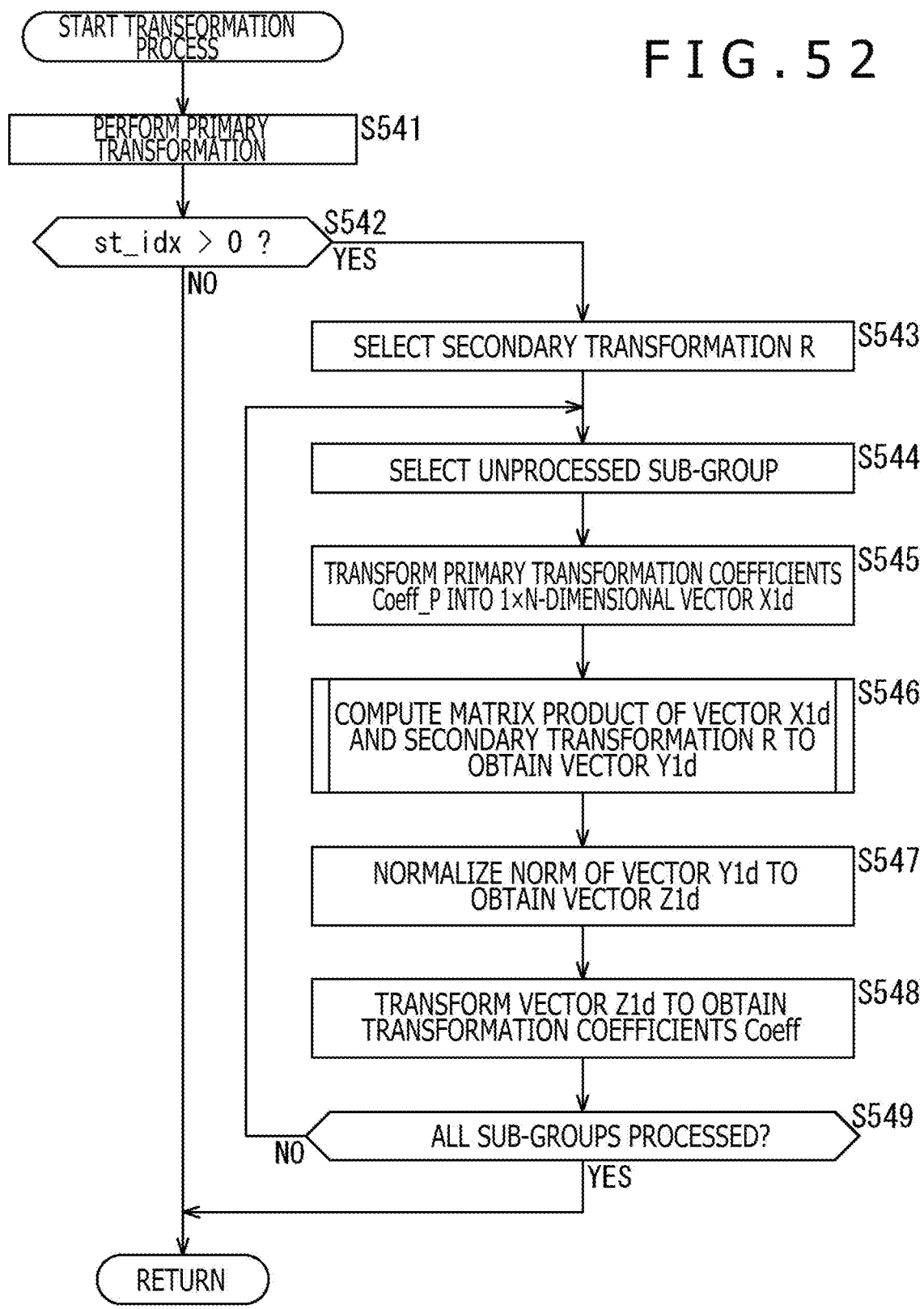
FIG. 52 is a flow chart describing an example of a flow of a transformation process.

Next, an example of a flow of the transformation process executed in step S104 of FIG. 9 will be described with reference to a flow chart of FIG. 52.

In this case, the flow of the transformation process is also basically similar to the case described with reference to the flow chart of FIG. 28. That is, once the transformation process is started, each process of steps S541 to S549 is basically executed as in each process of steps S401 to S409 of FIG. 28.

Note that in the process of step S543, the matrix R of the secondary transformation is selected based on the secondary transformation identifier st_idx and the size N of the sub-group derived by the height size TBHSize and the width size TBWSize of the transformation block. In addition, the process of step S544 is executed by replacing the sub-block in step S404 with the sub-group. Furthermore, the process of step S545 is executed by replacing the 1×16-dimensional vector $X_{1d}$ in step S405 with the 1×N-dimensional vector $X_{1d}$ (N=16, 64). In addition, the matrix computation in the process of step S546 is executed after the matrix decomposition of the matrix R of the secondary transformation. Furthermore, the process of step S549 is executed by replacing the sub-block in step S409 with the sub-group.

Note that in the transformation process, the processing order of the steps may be switched, or the details of the process may be changed within a possible range. For example, if it is determined that the secondary transformation identifier st_Idx is 0 in step S542, an N×N identity matrix corresponding to the size N of the sub-group may be selected as the secondary transformation R to execute each process of steps S544 to S549.

In this way, each process can be executed to reduce the amount of computation (multiplication and addition) of the secondary transformation, and the memory size necessary for holding the matrix of the secondary transformation can be reduced.

<Flow of Matrix Computation Process>

Figure 53:
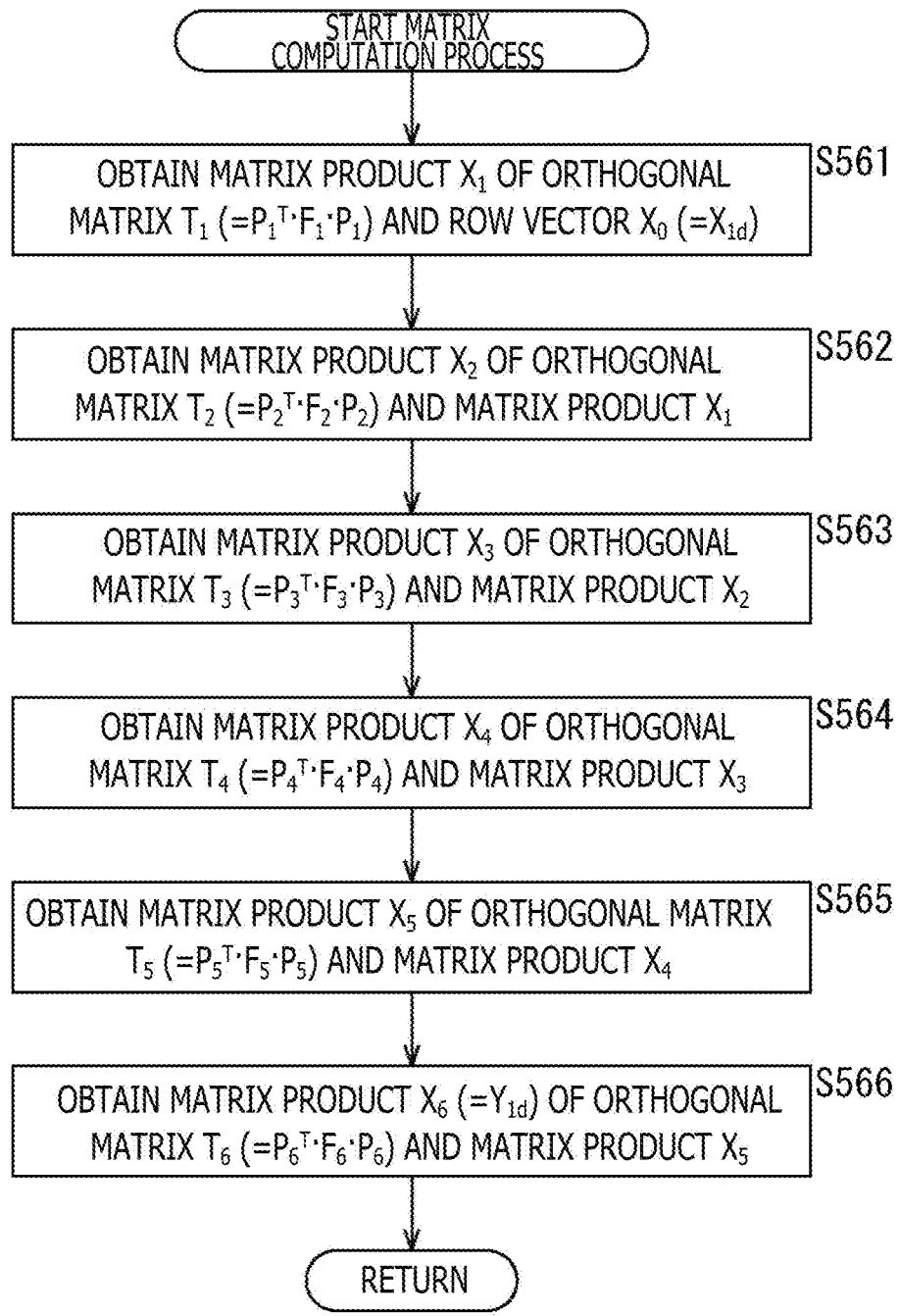
FIG. 53 is a flow chart describing an example of a flow of a matrix computation process.

Next, an example of a flow of the matrix computation process of the 64-points HyGT executed in step S546 of FIG. 52 will be described with reference to a flow chart of FIG. 53.

Once the matrix computation process of the 64-points HyGT is started, the rotation operation section 564-1 obtains the matrix product $X_1$ of the orthogonal matrix $T_1$ ($=P_1^T \cdot F_1 \cdot P_1 = F_1$) and the row vector $X_0$ in step S561.

In step S562, the rotation operation section 564-2 obtains the matrix product $X_2$ of the orthogonal matrix $T_2$ ($=P_2^T \cdot F_2 \cdot P_2$) and the matrix product $X_1$.

In step S563, the rotation operation section 564-3 obtains the matrix product $X_3$ of the orthogonal matrix $T_3$ ($=P_3^T \cdot F_3 \cdot P_3$) and the matrix product $X_Z$.

In step S564, the rotation operation section 564-4 obtains the matrix product $X_4$ of the orthogonal matrix $T_4$ ($=P_4^T \cdot F_4 \cdot P_4$) and the matrix product $X_3$.

In step S565, the rotation operation section 564-5 obtains the matrix product $X_5$ of the orthogonal matrix $T_5$ ($=P_5^T F_5 \cdot P_5$) and the matrix product $X_4$.

In step S566, the rotation operation section 564-6 obtains the matrix product $X_6$ ($=Y_{1d}$) of the orthogonal matrix $T_6$ ($=P_6^T \cdot F_6 \cdot P_6$) and the matrix product $X_5$. Once the process of step S566 is finished, the process returns to FIG. 52.

As a result of the execution of each process, the amount of computation (multiplication and addition) of the transformation in the 64-points HyGT can be reduced. In addition, the execution of each process can reduce the amount of computation (multiplication and addition) of the secondary transformation, and the memory size necessary for holding the matrix of the secondary transformation can be reduced.

<Inverse Secondary Transformation Section>

Next, the image decoding apparatus 200 corresponding to the image encoding apparatus 100 will be described. In the case of applying the blocks (CUs, PUs, and TUs) of the tree structure in a quad-tree shape or a binary-tree shape in the horizontal or vertical direction as in the example of FIG. 49, the configuration of the image decoding apparatus 200 can also be basically similar to the case of the third embodiment. That is, the configuration of the image decoding apparatus 200 is as illustrated for example in FIG. 11, and the configuration of the inverse transformation section 213 is as illustrated for example in FIG. 30. However, the configuration of the inverse secondary transformation section 231 in this case is as illustrated for example in FIG. 54.

Figure 54:
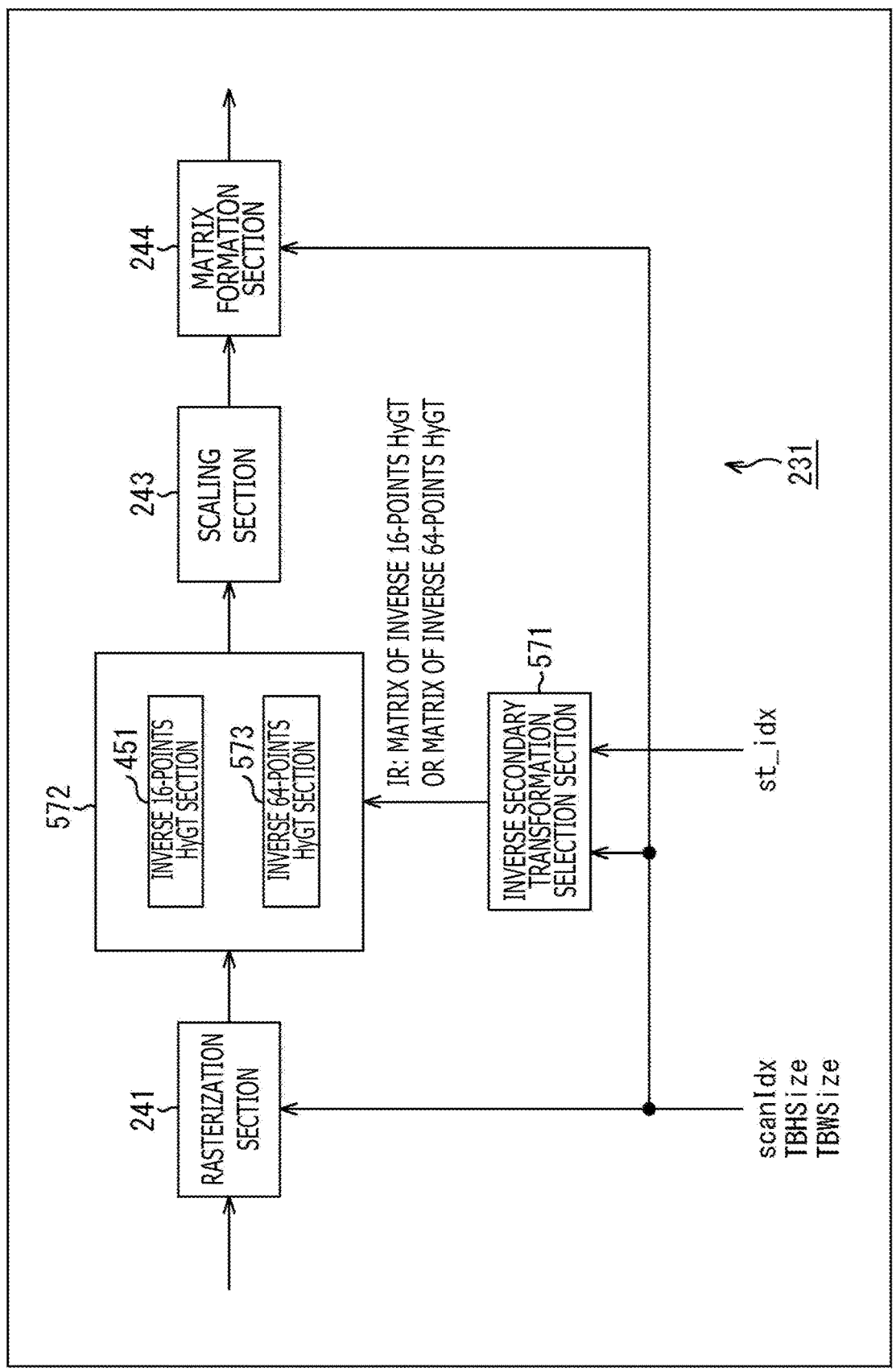
FIG. 54 is a block diagram illustrating a main configuration example of an inverse secondary transformation section.

That is, although the inverse secondary transformation section 231 in this case includes the rasterization section 241, the scaling section 243, and the matrix formation section 244 of FIG. 30, the inverse secondary transformation section 231 includes an inverse secondary transformation selection section 571 of FIG. 54 in place of the inverse secondary transformation selection section 246 of FIG. 30 and includes a matrix computation section 572 of FIG. 54 in place of the matrix computation section 451 of FIG. 30. Note that the clip processing section 145 may be removed in this case as in the case of FIG. 30.

Based on the scan method of the transformation coefficients designated by the scan identifier scanIdx supplied from the outside, the rasterization section 241 transforms the transformation coefficients Coeff_IQ supplied from the inverse transformation section 212 (FIG. 11) into a 1×N-dimensional vector $X_{1d}$ for each sub-group including N elements. The rasterization section 241 supplies the obtained vector $X_{1d}$ to the matrix computation section 572. Note that in the case where one of the height size TBHSize and the width size TBWSize of the transformation block is 4, a 4×4 sub-block is set as a sub-group. In this case, N is equal to 16. Meanwhile, in the case where both the height size TBHSize and the width size TBWSize of the transformation block are 8 or more, an 8×8 sub-block is set as a sub-group. In this case, N is equal to 64. The rasterization section 241 supplies the obtained vector $X_{1d}$ to the matrix computation section 572. N indicating the size (the number of elements) of the sub-group is decided according to, for example, Formula (67). In addition, a logarithm of each size may be used to decide the size according to Formula (68) instead of Formula (67).

The inverse secondary transformation selection section 571 reads, from an internal memory (not illustrated) of the inverse secondary transformation selection section 571, the matrix IR ($=R^T$) of the inverse secondary transformation designated by the secondary transformation identifier st_idx that is information regarding the content of the secondary transformation supplied from the decoding section 211 (FIG. 11) and the size N of the sub-group derived based on the height size TBHSize and the width size TBWSize of the transformation block and supplies the matrix IR to the matrix computation section 572. For example, in the case where the size N of the sub-group is N=16 (4×4 sub-block), the transformation matrix IR of the inverse 16-points HyGT after the matrix decomposition corresponding to the secondary transformation identifier st_idx is selected. Furthermore, in the case where the size N of the sub-group is N=64 (8×8 sub-block), the transformation matrix IR of the inverse 64-points HyGT after the matrix decomposition corresponding to the secondary transformation identifier st_idx is selected.

Note that the inverse secondary transformation selection section 571 may select the inverse secondary transformation IR ($=R^T$) according to, for example, the size of the sub-group based on the secondary transformation identifier st_idx and the intra prediction mode information IPinfo (for example, intra prediction mode number) supplied from the decoding section 211. In addition, the inverse transformation IR may be selected according to the motion prediction information MVinfo, in place of the intra prediction mode information IPinfo, and the secondary transformation identifier st_idx.

The matrix computation section 572 includes the inverse 16-points HyGT section 451 and an inverse 64-points HyGT section 573. The matrix computation section 572 supplies, to the inverse 16-points HyGT section 451 or the inverse 64-points HyGT section 573, the 1×N-dimensional vector $X_{1d}$ (=$X_0$) and the matrix of the inverse secondary transformation IR (=$R^T$) for each sub-group. More specifically, in the case where the size N of the sub-group is 16 (processing unit of the inverse secondary transformation is 4×4 sub-block), the matrix computation section 572 supplies the 1×16-dimensional vector $X_{1d}$ (=$X_0$) and the transformation matrix IR of the inverse 16-points HyGT to the inverse 16-points HyGT section 451. Furthermore, in the case where the size N of the sub-group is 64 (processing unit of the inverse secondary transformation is 8×8 sub-block), the matrix computation section 572 supplies the 1×64-dimensional vector $X_{1d}$ (=$X_0$) and the transformation matrix IR of the inverse 64-points HyGT to the inverse 64-points HyGT section 573.

In the case where the 1×16-dimensional vector $X_{1d}$ (=$X_0$) and the transformation matrix IR of the inverse 16-points HyGT are supplied, the inverse 16-points HyGT section 451 derives a matrix product $Y_{1d}$ of the transformation matrix IR and the 1×16-dimensional vector Xj and supplies the matrix product $Y_{1d}$ to the scaling section 243. Furthermore, in the case where the 1×64-dimensional vector $X_{1d}$ (=$X_0$) and the transformation matrix IR of the inverse 64-points HyGT are supplied, the inverse 64-points HyGT section 573 derives a matrix product $Y_{1d}$ of the transformation matrix IR and the 1×64-dimensional vector $X_{1d}$ and supplies the matrix product $Y_{1d}$ to the scaling section 243.

The scaling section 243 normalizes the norm of the signal $Y_{1d}$ supplied from the matrix computation section 572 and obtains a signal $Z_{1d}$ after the normalization. The scaling section 243 supplies the obtained signal $Z_{1d}$ to the matrix formation section 244. Based on the scan method designated by the scan identifier scanIdx, the matrix formation section 244 transforms the 1×N-dimensional vector $Z_{1d}$ after the norm normalization into an M×M sub-block (M×M square matrix) corresponding to the size N of the sub-group. For example, in the case where the size N of the sub-group is 16, the matrix formation section 244 transforms the 1×16-dimensional vector $Z_{1d}$ into a 4×4 sub-block (4×4 square matrix). In addition, in the case where the size N of the sub-group is 64, the matrix formation section 244 transforms the 1×64-dimensional vector $Z_{1d}$ into an 8×8 sub-block (8×8 square matrix). The matrix formation section 244 outputs the obtained transformation coefficients Coeff to the outside.

In this way, the matrix computation section 572 performs the matrix decomposition of the matrix of the inverse secondary transformation based on the inverse 16-points HyGT or the inverse 64-points HyGT to perform the matrix computation and transforms the row vector $X_{1d}$ into the row vector $Y_{1d}$. Therefore, the amount of computation (multiplication and addition) of the inverse secondary transformation can be reduced. In addition, the number of coefficients held for the inverse secondary transformation can be reduced, and the memory size necessary for holding the matrix of the inverse secondary transformation can be reduced.

<Inverse 64-Points HyGT Section>

Figure 55:
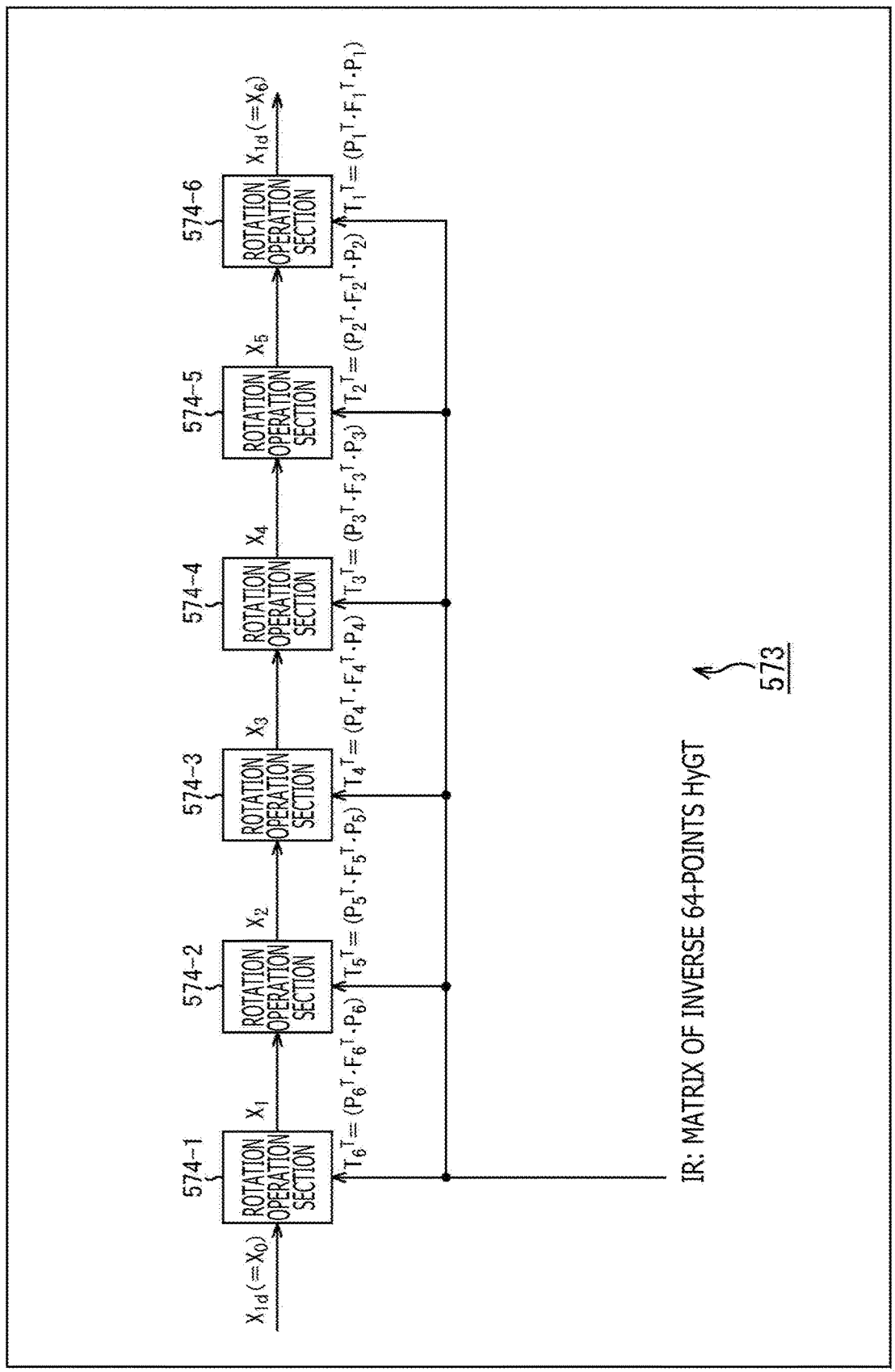
FIG. 55 is a block diagram illustrating a main configuration example of an inverse 64-points HyGT section.

FIG. 55 is a block diagram illustrating a main configuration example of the inverse 64-points HyGT section 573. As illustrated in FIG. 55, the inverse 64-points HyGT section 573 includes a rotation operation section 574-1, a rotation operation section 574-2, a rotation operation section 574-3, a rotation operation section 574-4, a rotation operation section 574-5, and a rotation operation section 574-6. Note that the rotation operation sections 574-1 to 574-6 will be referred to as rotation operation sections 574 in a case where the distinction is not necessary in the description.

As indicated in the following Formula (75), the rotation operation section 574-1 obtains a matrix product $X_1$ (1×64 row vector) of an orthogonal matrix $T_6^T$ corresponding to the first operation obtained by the matrix decomposition of the matrix IR of the inverse 64-points HyGT supplied from the outside of the inverse 64-points HyGT section 573 (inverse secondary transformation selection section 571 (FIG. 54)) and a transposed matrix of a 1×64 row vector $X_0$ (=$X_{1d}$) supplied from the outside of the inverse 64-points HyGT section 573 (rasterization section 241 (FIG. 54)). The rotation operation section 574-1 supplies the matrix product $X_1$ to the rotation operation section 574-2.

$$X_1^T = T_6^T \cdot X_0^T = P_6^T \cdot F_6^T \cdot P_6 \cdot X_0^T \qquad (75)$$

As indicated in the following Formula (76), the rotation operation section 574-2 obtains a matrix product $X_2$ (1×64 row vector) of an orthogonal matrix $T_5^T$ corresponding to the second operation obtained by the matrix decomposition of the matrix IR of the inverse 64-points HyGT supplied from the outside of the inverse 64-points HyGT section 573 (inverse secondary transformation selection section 571 (FIG. 54)) and a transposed matrix of a 1×64 row vector $X_1$ supplied from the rotation operation section 574-1. The rotation operation section 574-2 supplies the matrix product $X_2$ to the rotation operation section 574-3.

$$X_2^T = T_5^T \cdot X_1^T = P_5^T \cdot F_5^T \cdot P_5 \cdot X_1^T \qquad (76)$$

As indicated in the following Formula (77), the rotation operation section 574-3 obtains a matrix product $X_3$ (1×64 row vector) of an orthogonal matrix $T_4^T$ corresponding to the third operation obtained by the matrix decomposition of the matrix IR of the inverse 64-points HyGT supplied from the outside of the inverse 64-points HyGT section 573 (inverse secondary transformation selection section 571 (FIG. 54)) and a transposed matrix of a 1×64 row vector $X_2$ supplied from the rotation operation section 574-2. The rotation operation section 574-3 supplies the matrix product $X_3$ to the rotation operation section 574-4.

$$X_3^T = T_4^T \cdot X_2^T = P_4^T \cdot F_4^T \cdot P_4 \cdot X_3^T \qquad (77)$$

As indicated in the following Formula (78), the rotation operation section 574-4 obtains a matrix product $X_4$ (1×64 row vector) of an orthogonal matrix $T_3^T$ corresponding to the fourth operation obtained by the matrix decomposition of the matrix IR of the inverse 64-points HyGT supplied from the outside of the inverse 64-points HyGT section 573 (inverse secondary transformation selection section 571 (FIG. 54)) and a transposed matrix of a 1×64 row vector $X_3$ supplied from the rotation operation section 574-3. The rotation operation section 574-4 supplies the matrix product $X_4$ to the rotation operation section 574-5.

$$X_4^T = T_3^T \cdot X_3^T = P_3^T \cdot F_3^T \cdot P_3 \cdot X_4^T \qquad (78)$$

As indicated in the following Formula (79), the rotation operation section 574-5 obtains a matrix product $X_5$ (1×64 row vector) of an orthogonal matrix $T_2^T$ corresponding to the fifth operation obtained by the matrix decomposition of the matrix IR of the inverse 64-points HyGT supplied from the outside of the inverse 64-points HyGT section 573 (inverse secondary transformation selection section 571 (FIG. 54)) and a transposed matrix of a 1×64 row vector $X_4$ supplied from the rotation operation section 574-4. The rotation operation section 574-5 supplies the matrix product $X_5$ to the rotation operation section 574-6.

$$X_5{}^T = T_2{}^T \cdot X_4{}^T = P_5 \cdot F_5 \cdot P_5 \cdot X_4{}^T \qquad (79)$$

As indicated in the following Formula (80), the rotation operation section 574-6 obtains a matrix product $X_6$ (1×64 row vector) of an orthogonal matrix $T_1{}^T$ corresponding to the sixth operation obtained by the matrix decomposition of the matrix IR of the inverse 64-points HyGT supplied from the outside of the inverse 64-points HyGT section 573 (inverse secondary transformation selection section 571 (FIG. 54)) and a transposed matrix of a 1×64 row vector $X_5$ supplied from the rotation operation section 574-5. The rotation operation section 574-6 supplies the matrix product $X_6$ to the outside of the inverse 64-points HyGT section 573 (scaling section 243 (FIG. 54)).

$$X_6{}^T = T_1{}^T \cdot X_5{}^T \cdot P_1{}^T \cdot F_1{}^T \cdot P_1 \cdot X_5{}^T \qquad (80)$$

In this way, the six rotation operation sections 574 execute similar transformation processes. That is, the inverse 64-points HyGT section 573 can perform the matrix decomposition of the matrix IR of the inverse 64-points HyGT to perform the matrix computation to transform the row vector $X_{1d}$ into the row vector $Y_{1d}$. Therefore, the amount of computation (multiplication and addition) of the transformation in the inverse 64-points HyGT can be reduced. This can also reduce the number of coefficients held for the transformation of the inverse 64-points HyGT, and the memory size necessary for holding the matrix IR of the inverse 64-points HyGT can be reduced.

<Flow of Inverse Transformation Process>

Figure 56:
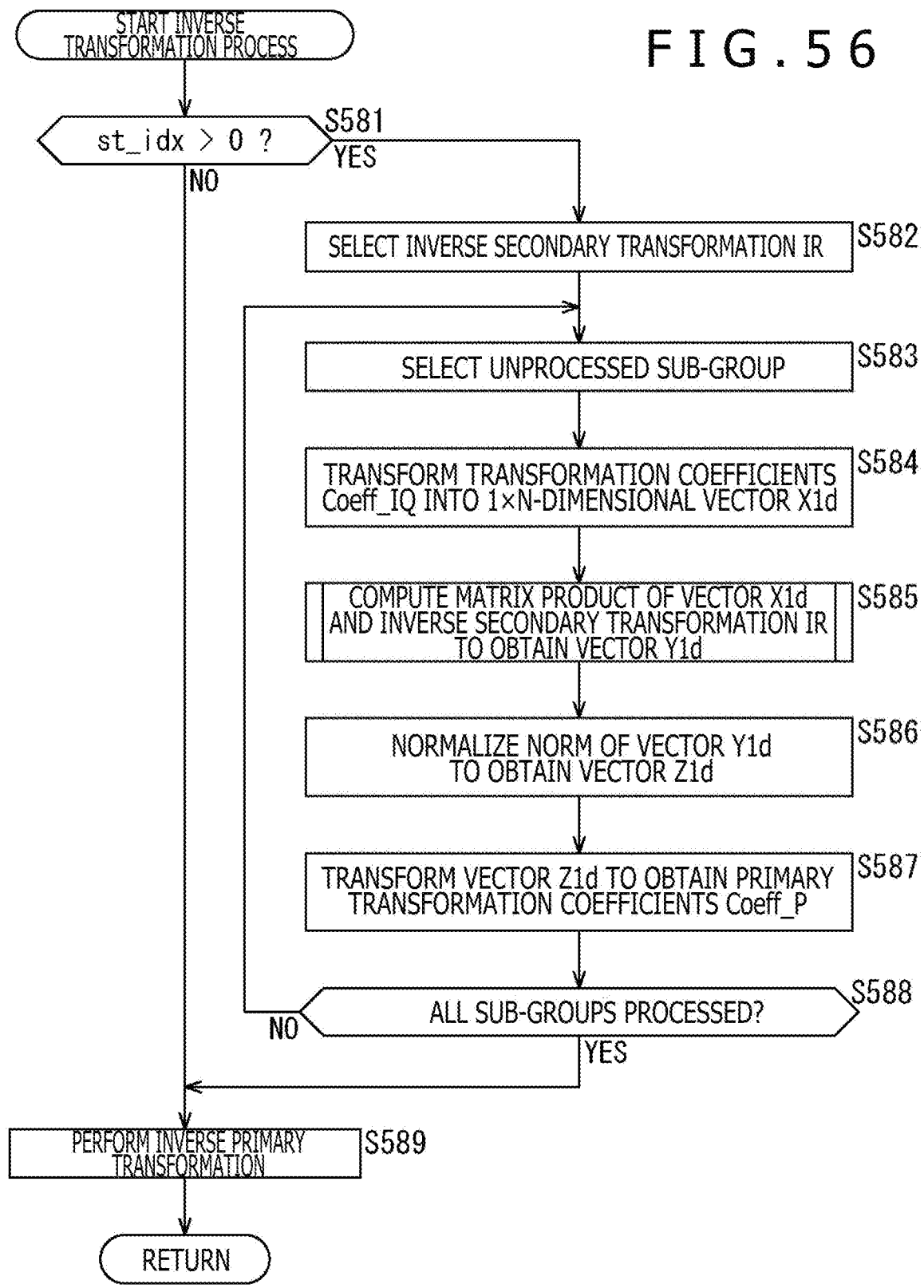
FIG. 56 is a flow chart describing an example of a flow of a transformation process.

Next, an example of a flow of the inverse transformation process executed in step S203 of FIG. 13 will be described with reference to a flow chart of FIG. 56.

In this case, the flow of the inverse transformation process is also basically similar to the case described with reference to the flow chart of FIG. 32. That is, once the inverse transformation process is started, each process of steps S581 to S589 is basically executed as in each process of steps S441 to S449 of FIG. 32.

Note that in the process of step S582, the matrix IR of the inverse secondary transformation is selected based on the secondary transformation identifier st_idx and the size N of the sub-group derived by the height size TBHSize and the width size TBWSize of the transformation block. In addition, the process of step S583 is executed by replacing the sub-block in step S443 with the sub-group. Furthermore, the process of step S584 is executed by replacing the 1×16-dimensional vector $X_{1d}$ in step S444 with the 1×N-dimensional vector $X_{1d}$ (N=16, 64). In addition, the matrix computation in the process of step S585 is executed after the matrix decomposition of the matrix IR of the inverse secondary transformation. Furthermore, the process of step S588 is executed by replacing the sub-block in step S448 with the sub-group.

Note that in the inverse transformation process, the processing order of the steps may be switched, or the details of the process may be changed within a possible range. For example, if it is determined that the secondary transformation identifier st_idx is 0 in step S581, an N×N identity matrix corresponding to the size N of the sub-group may be selected as the inverse secondary transformation IR to execute each process of steps S582 to S589.

In this way, each process can be executed to reduce the amount of computation (multiplication and addition) of the inverse secondary transformation, and the memory size necessary for holding the matrix of the inverse secondary transformation can be reduced.

<Flow of Matrix Computation Process>

Figure 57:
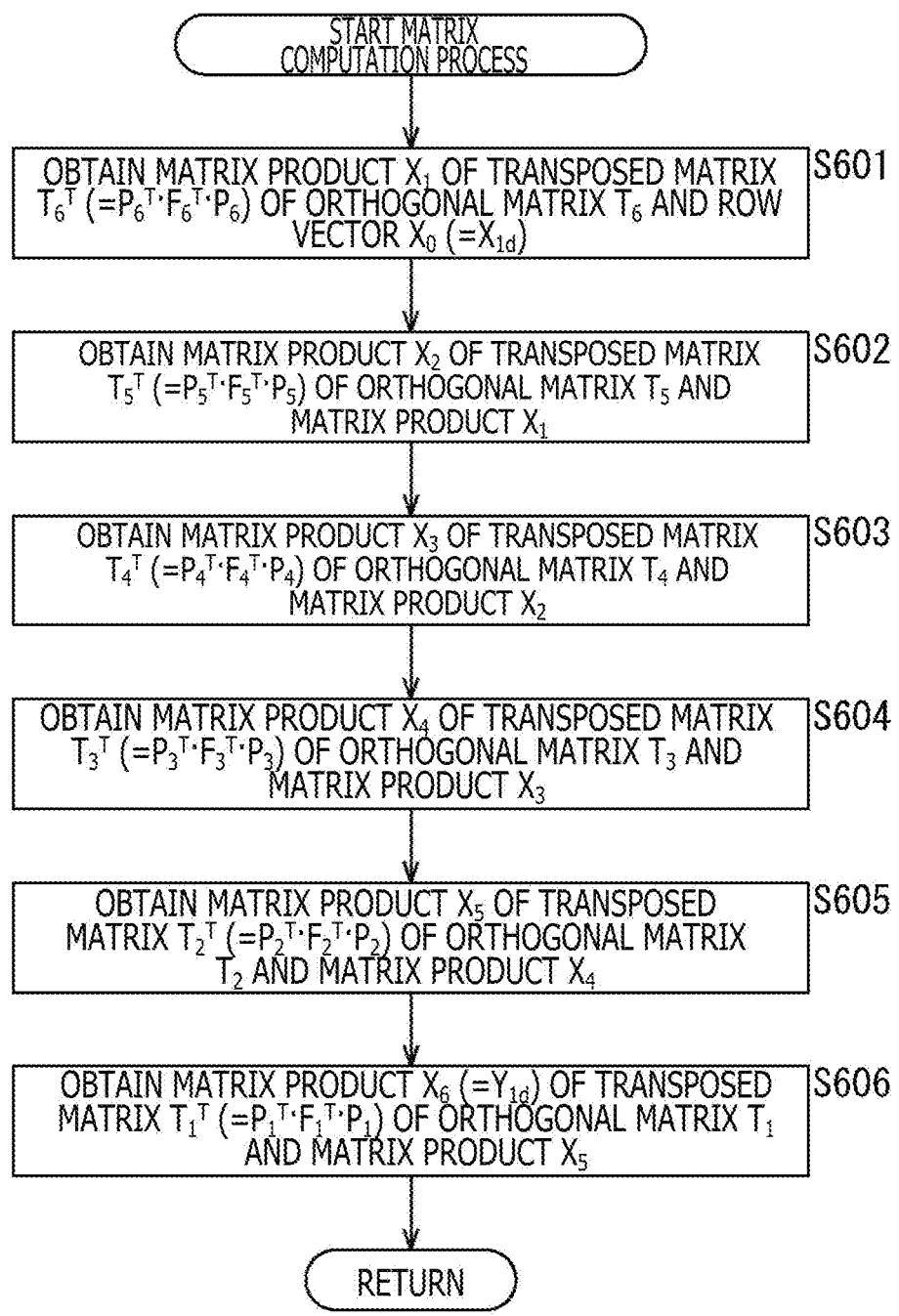
FIG. 57 is a flow chart describing an example of a flow of a matrix computation process.

Next, an example of a flow of the matrix computation process of the inverse 64-points HyGT executed in step S585 of FIG. 56 will be described with reference to a flow chart of FIG. 57.

Once the matrix computation process of the inverse 64-points HyGT is started, the rotation operation section 574-1 obtains the matrix product $X_1$ of the orthogonal matrix $T_6{}^T$ ($=P_6{}^T \cdot F_6{}^T \cdot P_6$) and the row vector $X_0$ in step S601.

In step S602, the rotation operation section 574-2 obtains the matrix product $X_2$ of the orthogonal matrix $T_5{}^T$ ($=P_5{}^T \cdot F_5{}^T \cdot P_5$) and the matrix product $X_1$.

In step S603, the rotation operation section 574-3 obtains the matrix product $X_3$ of the orthogonal matrix $T_4{}^T$ ($=P_4{}^T \cdot F_4{}^T \cdot P_4$) and the matrix product $X_2$.

In step S604, the rotation operation section 574-4 obtains the matrix product $X_4$ of the orthogonal matrix $T_3{}^T$ ($=P_3{}^T \cdot F_3{}^T \cdot P_3$) and the matrix product $X_3$.

In step S605, the rotation operation section 574-5 obtains the matrix product $X_5$ of the orthogonal matrix $T_2$ ($=P_2{}^T \cdot F_2{}^T \cdot P_2$) and the matrix product $X_4$.

In step S606, the rotation operation section 574-6 obtains the matrix product $X_6$ ($=Y_d$) of the orthogonal matrix $T_1{}^T$ ($=P_1{}^T \cdot F_1{}^T \cdot P_1 = F_1{}^T$) and the matrix product $X_5$. Once the process of step S606 is finished, the process returns to FIG. 56.

As a result of the execution of each process, the amount of computation (multiplication and addition) of the transformation in the inverse 64-points HyGT can be reduced. In addition, the execution of each process can reduce the amount of computation (multiplication and addition) of the inverse secondary transformation, and the memory size necessary for holding the matrix of the inverse secondary transformation can be reduced.

8. Eighth Embodiment

<Execution of Secondary Transformation>

Figure 58:
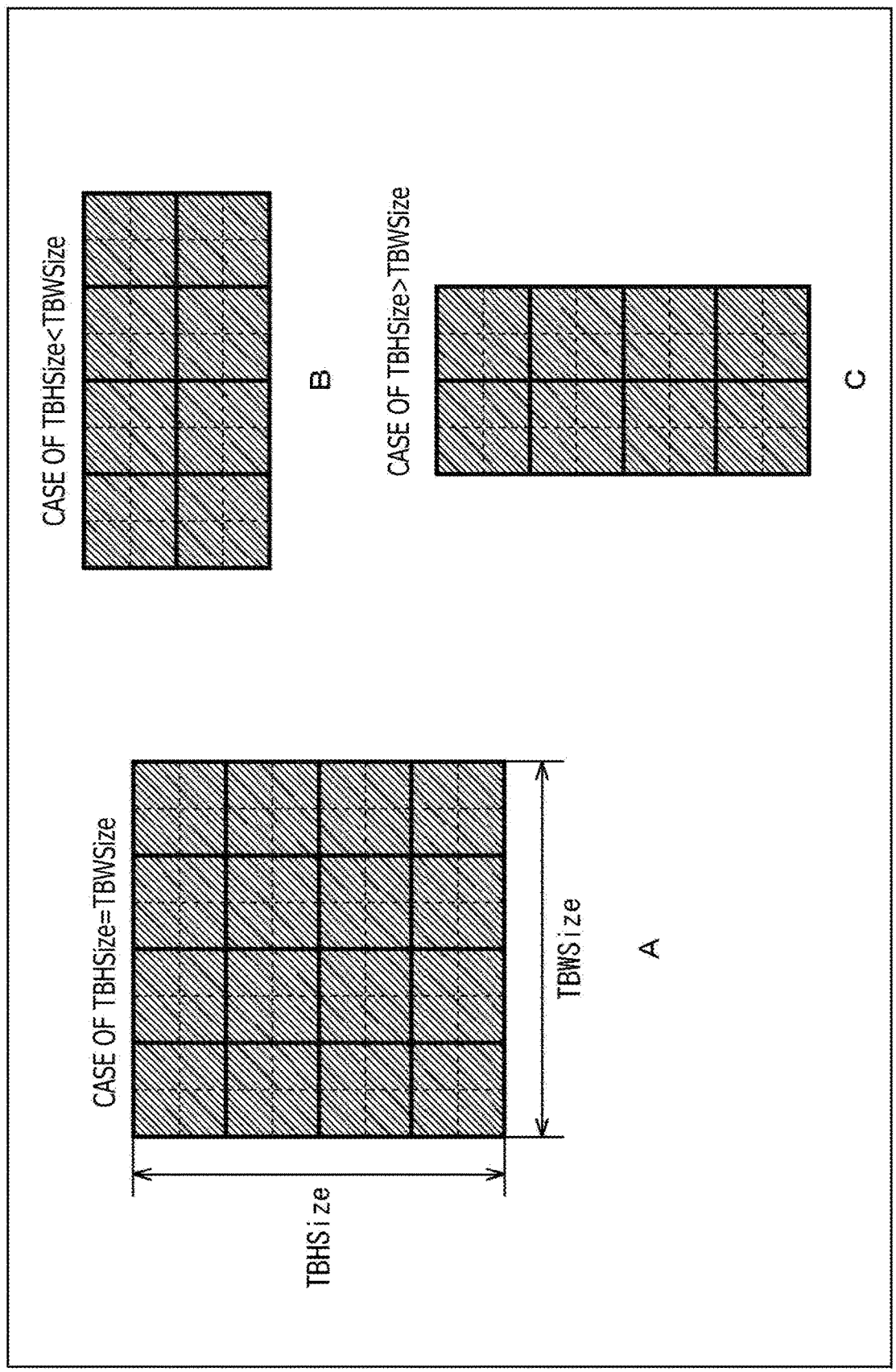
FIG. 58 is a diagram describing an example of a situation of execution of the secondary transformation.

The secondary transformation is executed in 4×4 sub-blocks or in sub-groups (8×8 sub-blocks) as illustrated in FIG. 58. In FIG. 58, A illustrates an example of a case where the transformation block is a square, B illustrates an example of a case where the transformation block is a rectangle (TBHSize<TBWSize), and C illustrates an example of a case where the transformation block is a rectangle (TBHSize>TBWSize). In FIG. 58, rectangles with solid lines indicate sub-groups (8×8 sub-blocks), and regions partitioned by dotted lines indicate 4×4 sub-blocks. In addition, regions indicated by a diagonal line pattern are regions where the secondary transformation is performed.

Figure 59:
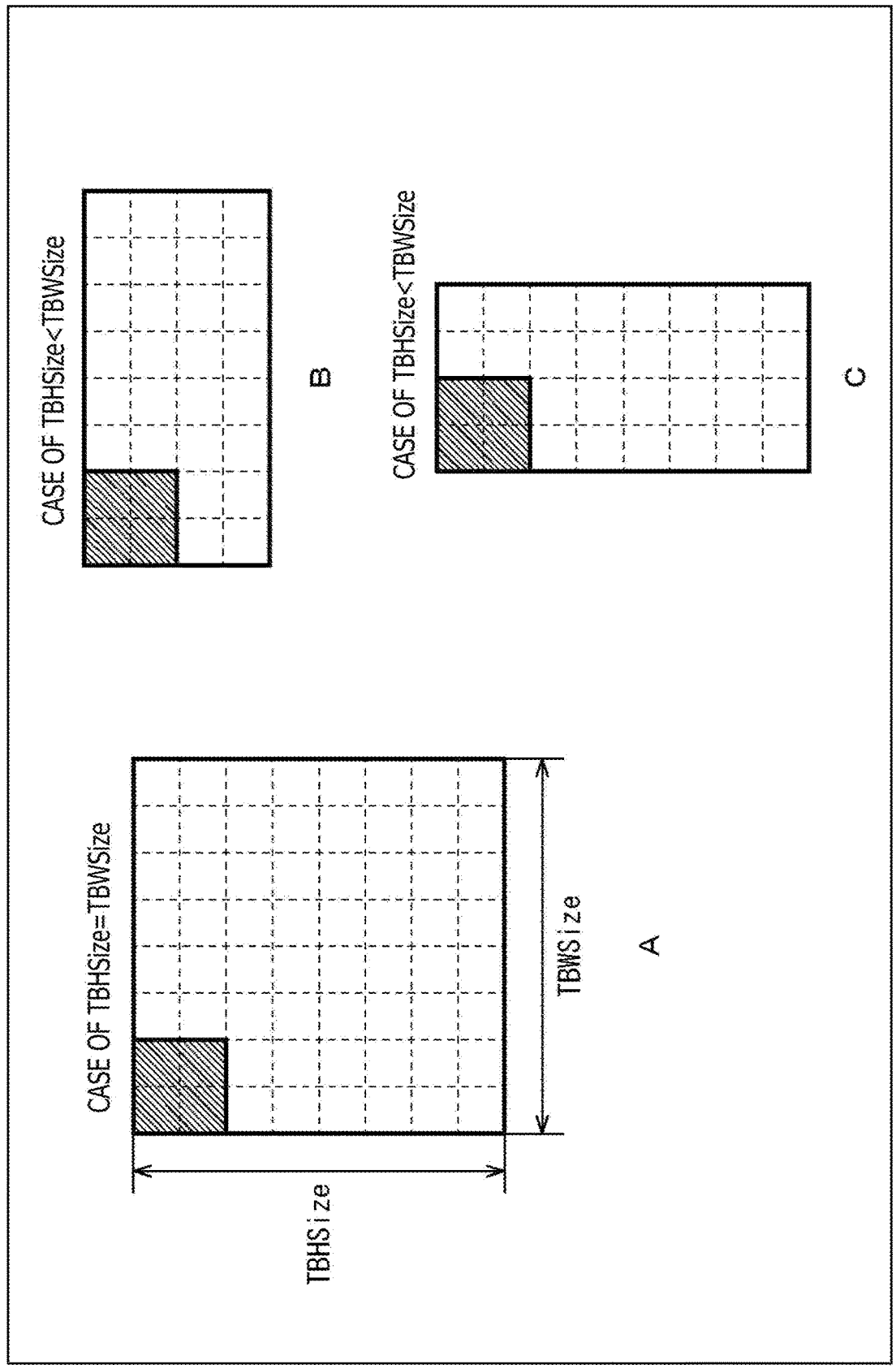
FIG. 59 is a diagram describing an example of a situation of execution of the secondary transformation.

Although the secondary transformation can be applied to the entire transformation blocks as in the example of FIG. 58, the secondary transformation may be applied only to low-frequency components as in an example of FIG. 59. As in the case of FIG. 58, A of FIG. 59 illustrates an example of a case where the transformation block is a square, B of FIG. 59 illustrates an example of a case where the transformation block is a rectangle (TBHSize<TBWSize), and C of FIG. 59 illustrates an example of a case where the transformation block is a rectangle (TBHSize>TBWSize). In FIG. 59, rectangles with solid lines indicate sub-groups (8×8 sub-blocks), and regions partitioned by dotted lines indicate 4×4 sub-blocks. In addition, regions indicated by a diagonal line pattern indicate regions where the secondary transformation is performed.

In the past, in the case where the secondary transformation is applied only to the low-frequency components, the secondary transformation is applied to four 4×4 sub-blocks (two sub-blocks vertically and two sub-blocks horizontally) on the upper left of the transformation block as illustrated in FIG. 59 (diagonal line part of FIG. 59). This is similar in the case where the transformation block is a square (A of FIG. 59), in the case where the transformation block is a rectangle (TBHSize<TBWSize) (B of FIG. 59), and in the case where the transformation block is a rectangle (TBHSize> TBWSize) (C of FIG. 59).

However, the region (diagonal line part) where the secondary transformation is performed in this case does not coincide with the decoding process order, and the secondary transformation cannot be performed until all the sub-blocks in the region are decoded. That is, unnecessary waiting time is generated, and this may increase the processing time.

Therefore, in applying the secondary transformation only to the low-frequency components, the sub-blocks where the secondary transformation is performed may be set according to the scan order. For example, in the case of applying the secondary transformation to the four 4×4 sub-blocks as illustrated in FIG. 59, the secondary transformation may be applied to the four 4×4 sub-blocks decoded first according to the scan order indicated by scanIdx.

Figure 60:
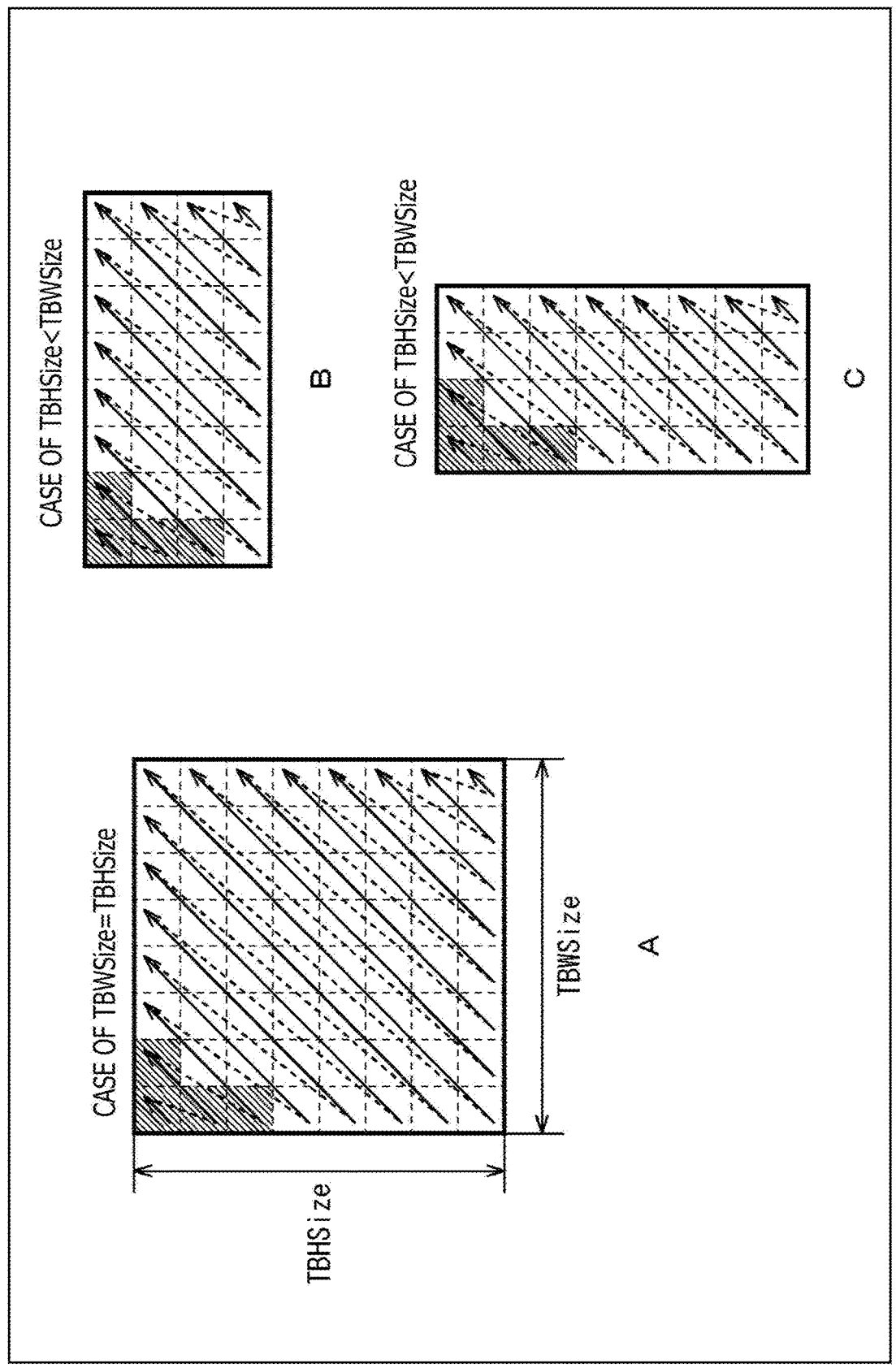
FIG. 60 is a diagram describing an example of a situation of execution of the secondary transformation.

For example, in a case where the scan order indicated by scanIdx is a diagonal direction as in FIG. 60, the secondary transformation may be performed in the order of a 4×4 sub-block at the upper left end of the transformation block, a 4×4 sub-block at the left end in the second stage from the top, a second 4×4 sub-block from the left in the uppermost stage, and a 4×4 sub-block at the left end in the third stage from the top. As in the case of FIG. 58, A of FIG. 60 illustrates an example of a case where the transformation block is a square, B of FIG. 60 illustrates a case where the transformation block is a rectangle (TBHSize<TBWSize), and C of FIG. 60 illustrates an example of a case where the transformation block is a rectangle (TBHSize>TBWSize). In FIG. 60, rectangles with solid lines indicate sub-groups (8×8 sub-blocks), and regions partitioned by dotted lines indicate 4×4 sub-blocks. In addition, arrows indicate the scan orders designated by scanIdx. Furthermore, regions indicated by a diagonal line pattern indicate regions where the secondary transformation is performed. The secondary transformation is applied to the four 4×4 sub-blocks (four 4×4 sub-blocks decoded first in the transformation block) in the case of A in FIG. 60, in the case of B in FIG. 60, and in the case of C in FIG. 60.

Figure 61:
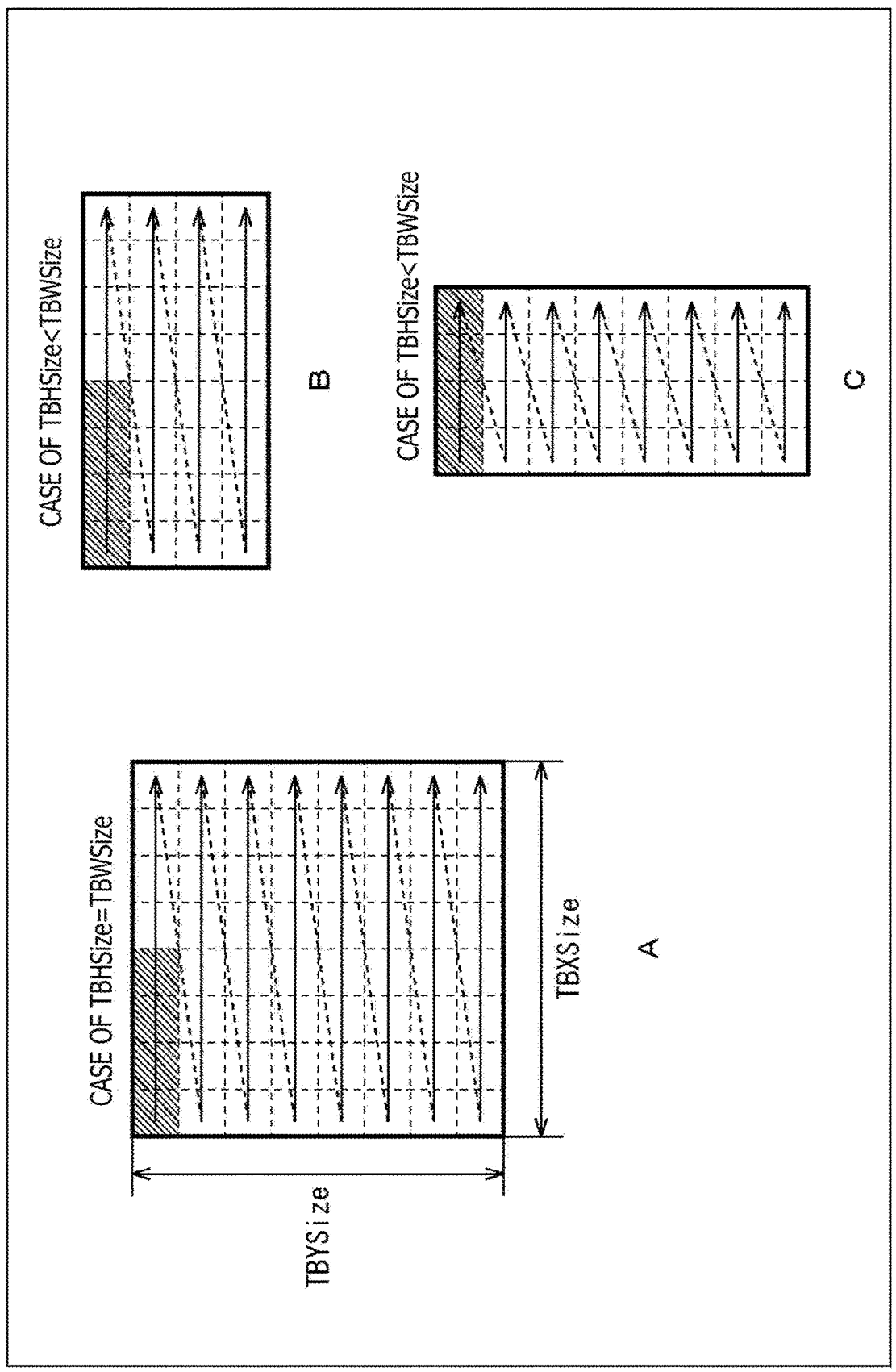
FIG. 61 is a diagram describing an example of a situation of execution of the secondary transformation.

For example, in a case where the scan order indicated by scanIdx is a horizontal direction as in FIG. 61, the secondary transformation may be performed in the order of a 4×4 sub-block at the upper left end of the transformation block, a second 4×4 sub-block from the left in the uppermost stage, a third 4×4 sub-block from the left in the upper most stage, and a fourth 4×4 sub-block from the left in the uppermost stage. As in the case of FIG. 58, A of FIG. 61 illustrates an example of a case where the transformation block is a square, B of FIG. 61 illustrates an example of a case where the transformation block is a rectangle (TBHSize<TBWSize), and C of FIG. 61 illustrates an example of a case where the transformation block is a rectangle (TBHSize> TBWSize). In FIG. 61, rectangles with solid lines indicate sub-groups (8×8 sub-blocks), and regions partitioned by dotted lines indicate 4×4 sub-blocks. In addition, arrows indicate scan orders designated by scanIdx. Regions indicated by a diagonal line pattern indicate regions where the secondary transformation is performed. The secondary transformation is applied to the four 4×4 sub-blocks (four 4×4 sub-blocks decoded first in the transformation block) in the case of A in FIG. 61, in the case of B in FIG. 61, and in the case of C in FIG. 61.

Figure 62:
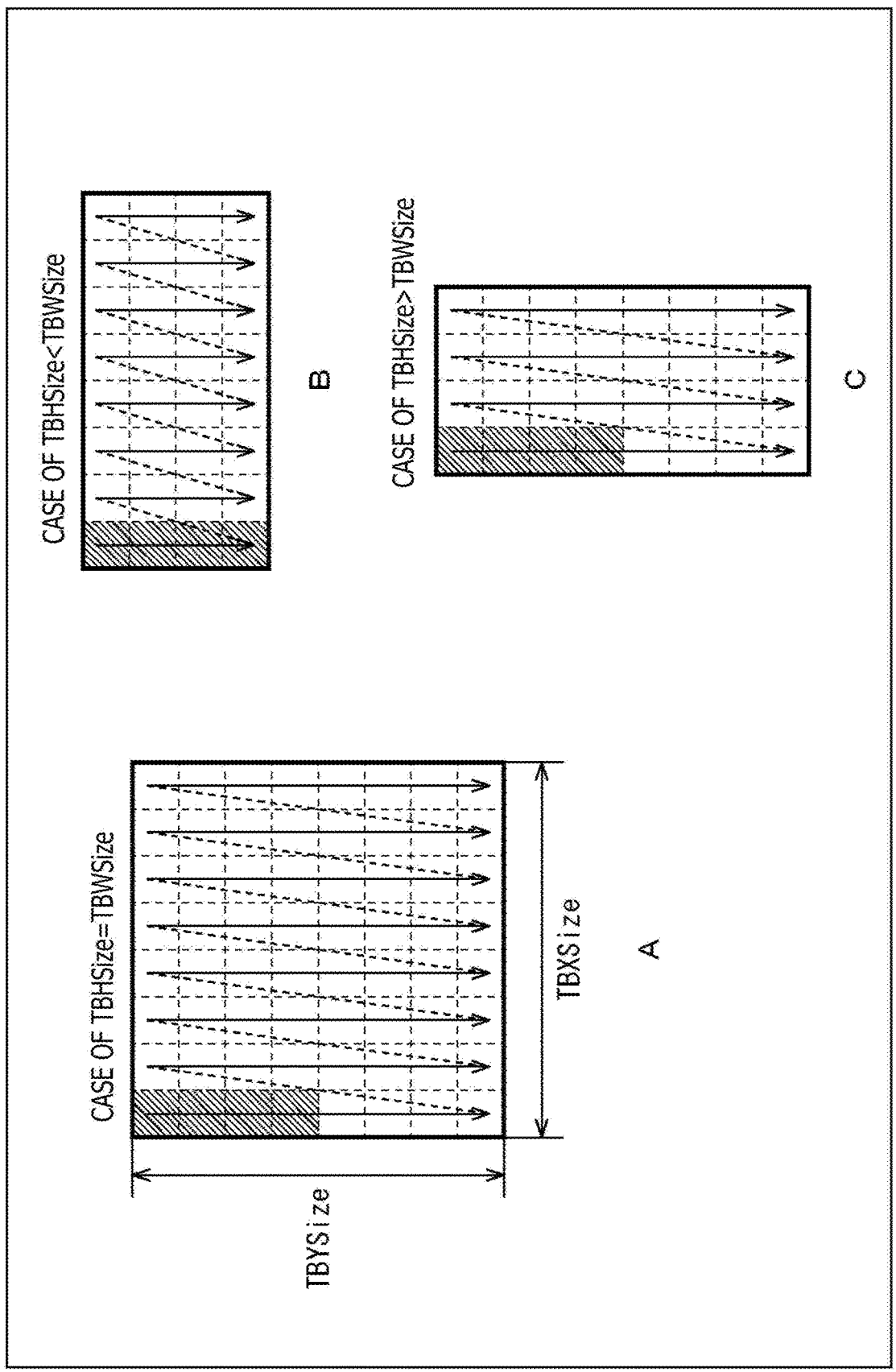
FIG. 62 is a diagram describing an example of a situation of execution of the secondary transformation.

For example, in a case where the scan order indicated by scanIdx is a vertical direction as in FIG. 62, the secondary transformation may be performed in the order of a 4×4 sub-block at the upper left end of the transformation block, a 4×4 sub-block at the left end in the second stage from the top, a 4×4 sub-block at the left end in the third stage from the top, and a 4×4 sub-block at the left end in the fourth stage from the top. As in the case of FIG. 58, A of FIG. 62 illustrates an example of a case where the transformation block is a square, B of FIG. 62 illustrates an example of a case where the transformation block is a rectangle (TBHSize<TBWSize), and C of FIG. 62 illustrates an example of a case where the transformation block is a rectangle (TBHSize>TBWSize). In FIG. 62, rectangles with solid lines indicate sub-groups (8×8 sub-blocks), and regions partitioned by dotted lines indicate 4×4 sub-blocks. In addition, arrows indicate scan orders designated by scanIdx. Furthermore, regions indicated by a diagonal line pattern indicate regions where the secondary transformation is performed. The secondary transformation is applied to the four 4×4 sub-blocks (four 4×4 sub-blocks decoded first in the transformation block) in the case of A in FIG. 62, in the case of B in FIG. 62, and in the case of C in FIG. 62.

By applying the secondary transformation to the 4×4 sub-blocks according to the scan order as in the examples of FIGS. 60 to 62, the secondary transformation can be sequentially applied to the decoded 4×4 sub-blocks, and the increase in the processing time can be suppressed. Note that the processing order can be applied to a secondary transformation of an arbitrary method. For example, the processing order can be applied to the secondary transformation using the non-separable HyGT as in the existing methods and can be applied to the secondary transformation using the separable HyGT as described above.

9. Ninth Embodiment

<SDT>

In NPL 1, it is disclosed that a primary transformation (orthogonal transformation using existing DCT (Discrete Cosine Transform), DST (Discrete Sine Transform), or the like) is performed, and then a non-separable secondary transformation based on 16-points KLT (Karhunen-Loeve transform) is further applied in 4×4 sub-blocks in order to increase the energy compaction (in order to concentrate the transformation coefficients in a low-frequency region). NPL 1 also discloses an encoding mode called SDT (Signal Dependent Transform) in which a plurality of patches similar to a local decoded image around a target block to be encoded are searched and found from decoded pixel regions of the current frame, a KLT-based orthogonal transformation is derived from the patch group, and the KLT-based orthogonal transformation is applied to the block to be encoded.

In NPL 2, it is disclosed that a 16-points HyGT-based non-separable secondary transformation is applied. In NPL 3, it is disclosed that a 64-points HyGT-based non-separable secondary transformation is applied in 8×8 sub-blocks in addition to the 16-points HyGT-based non-separable secondary transformation applied in 4×4 sub-blocks described in NPL 2.

However, the 64-points HyGT-based secondary transformation described in NPL 3 is not decomposed (non-separable), and the amount of computation is large. In addition, the number of matrices of the secondary transformation corresponds to the number of classes of the intra prediction mode and the number of secondary transformations corresponding to each class, and the memory size for holding the matrices of the secondary transformation is enormous. In NPL 3, the number of classes of the intra prediction mode is 35, and the size of the transformation block is 2. The number of secondary transformation for each class is 5, and there are 35*5=175 matrices for each transformation block size. For example, in the case of holding the elements of each matrix at 9-bit precision, the memory size required for holding the matrices of all the 16-points HyGT-based secondary transformations and the memory size required for holding the matrices of all the 64-points HyGT-based secondary transformations are as in the following Formulas (81) and (82), respectively.

Memory size required for holding matrices of all 16-points HyGT-based secondary transformations=9 bits*16*16*175=403200 bits=50400 bytes=49.21875 KB  (81)

Memory size required for holding matrices of all 64-points HyGT-based secondary transformations=9 bits*64*64*175=6451200 bits=806400 bytes=787.5 KB  (82)

That is, the required capacity is 836.71875 KB in total.

Furthermore, in the case where the orthogonal transformation is obtained based on the KLT, the computation complexity is significantly high, and the load of the process may increase. Therefore, the circuit scale or the cost may increase. For example, the order of the computation complexity necessary for solving the matrix decomposition (Matrix Decomposition) to obtain the KLT for N points is O(N^3). For example, the order is O(16**3)=O(4096) where N=16.

Therefore, a separable HyGT-based orthogonal transformation for decomposing a 2N-points HyGT-based orthogonal transformation into N orthogonal matrices and N-1 permutation matrices is applied as KLT-based secondary transformation/inverse secondary transformation (64 points) and orthogonal transformation/inverse orthogonal transformation (2N points) in SDT. In this way, the nature of the sparse matrix of each orthogonal transformation after the matrix decomposition and the symmetry of coefficients can be used to reduce the amount of computation in the orthogonal transformation. Therefore, the amount of computation (multiplication and addition) necessary for the orthogonal transformation/inverse orthogonal transformation can be reduced compared to the KLT-based orthogonal transformation.

Furthermore, the derivation of the transformation base of the 2N-points HyGT can subdivide the problem of the 2-points HyGT, and the computation complexity of the matrix decomposition can be reduced. Therefore, the amount of computation can be significantly reduced compared to the transformation base derivation method of KLT. For example, in the case of the 16-points HyGT-based orthogonal transformation, the order of computation complexity necessary for the matrix decomposition is O(23)*8*4=O(8)*32=O(256). Therefore, compared to the computation complexity O(4096) of the matrix decomposition in the case of the 16-points KLT-based orthogonal transformation, the computation complexity necessary for deriving the transformation base of the adaptive orthogonal transformation can be suppressed to O(256) while equivalent energy compaction is maintained.

In general, while the computation complexity of O((2N)3) is necessary to derive the KLT-based orthogonal transformation of 2N points, O(23)*(2**N/2)*N=O(4*N*2N) is necessary to derive the HyGT-based orthogonal transformation of 2N points. Therefore, the amount of computation can be dramatically reduced.

<Syntax>

First, the selection of the SDT is enabled in the syntax. For example, in the sequence parameter set, the setting of an sdt_enabled_flag is enabled for the SDT as in a line with a diagonal line pattern illustrated in FIG. 63. The sdt_enabled_ flag is a flag indicating whether the SDT can be selected. In a case where the sdt_enabled_flag is true (for example, "1"), the SDT can be selected in the sequence. In addition, in a case where the sdt_enabled_flag is false (for example, "0"), the SDT cannot be selected.

Furthermore, in the Residual Coding, the setting of an SDTAvailableFlag is enabled according to the value of the sdt_enabled_flag as in a line with a diagonal line pattern illustrated in FIG. 64. In addition, the setting of an sdt_flag is enabled according to the value of the SDTAvailableFlag.

The SDTAvailableFlag is a flag indicating whether to decode the sdt_flag. In a case where the SDTAvailableFlag is true (for example, "1"), the sdt_flag is decoded. That is, the sdt_flag exists (is set) in this case. Furthermore, in a case where the SDTAvailableFlag is false (for example, "0"), decoding of the sdt_flag is skipped. That is, the sdt_flag does not exist (is not set) in this case. For example, in the case of FIG. 64, the SDTAvailableFlag is set when the sdt_enabled_flag is true. In this case, the SDTAvailableFlag is set to true (for example, "1") in a case where it is inter prediction, it is a luminance signal, the block is a square smaller than a predetermined maximum size, a transform_skip_flag indicating whether to skip the transformation (inverse transformation) is false, and a cu_transquant_bypass_flag indicating whether to skip the transformation (inverse transformation) and the quantization (inverse quantization) is false. The SDTAvailableFlag is set to false (for example, "0") in the other cases.

The sdt_flag is a flag indicating whether to select the SDT as a secondary transformation. In a case where the sdt_flag is true (for example, "1"), the SDT is selected. On the other hand, in a case where the sdt_flag is false (for example, "0"), the SDT is not selected. For example, in the case of FIG. 64, the sdt_flag is set when the SDTAvailableFlag is true.

Note that the SDT may also be able to be selected in the intra prediction. For example, in the sequence parameter set, the setting of an intra_sdt_enabled_flag and an inter_sdt_enabled_flag is enabled for the SDT as in lines with a diagonal line pattern illustrated in FIG. 65. The intra_sdt_enabled_ flag is a flag indicating whether the SDT can be selected in the intra prediction. In a case where the intra_sdt_enabled_ flag is true (for example, "1"), the SDT can be selected in the block in which the intra prediction in the sequence is performed. Furthermore, in a case where the intra_sdt_enabled_flag is false (for example, "0"), the SDT cannot be selected in the block in which the intra prediction in the sequence is performed.

Furthermore, the inter_sdt_enabled_flag is a flag indicating whether the SDT can be selected in the inter prediction. In a case where the inter_sdt_enabled_flag is true (for example, "1"), the SDT can be selected in the block in which the inter prediction in the sequence is performed. Furthermore, in a case where the inter_sdt_enabled_flag is false (for example, "0"), the SDT cannot be selected in the block in which the inter prediction in the sequence is performed.

Figure 66:
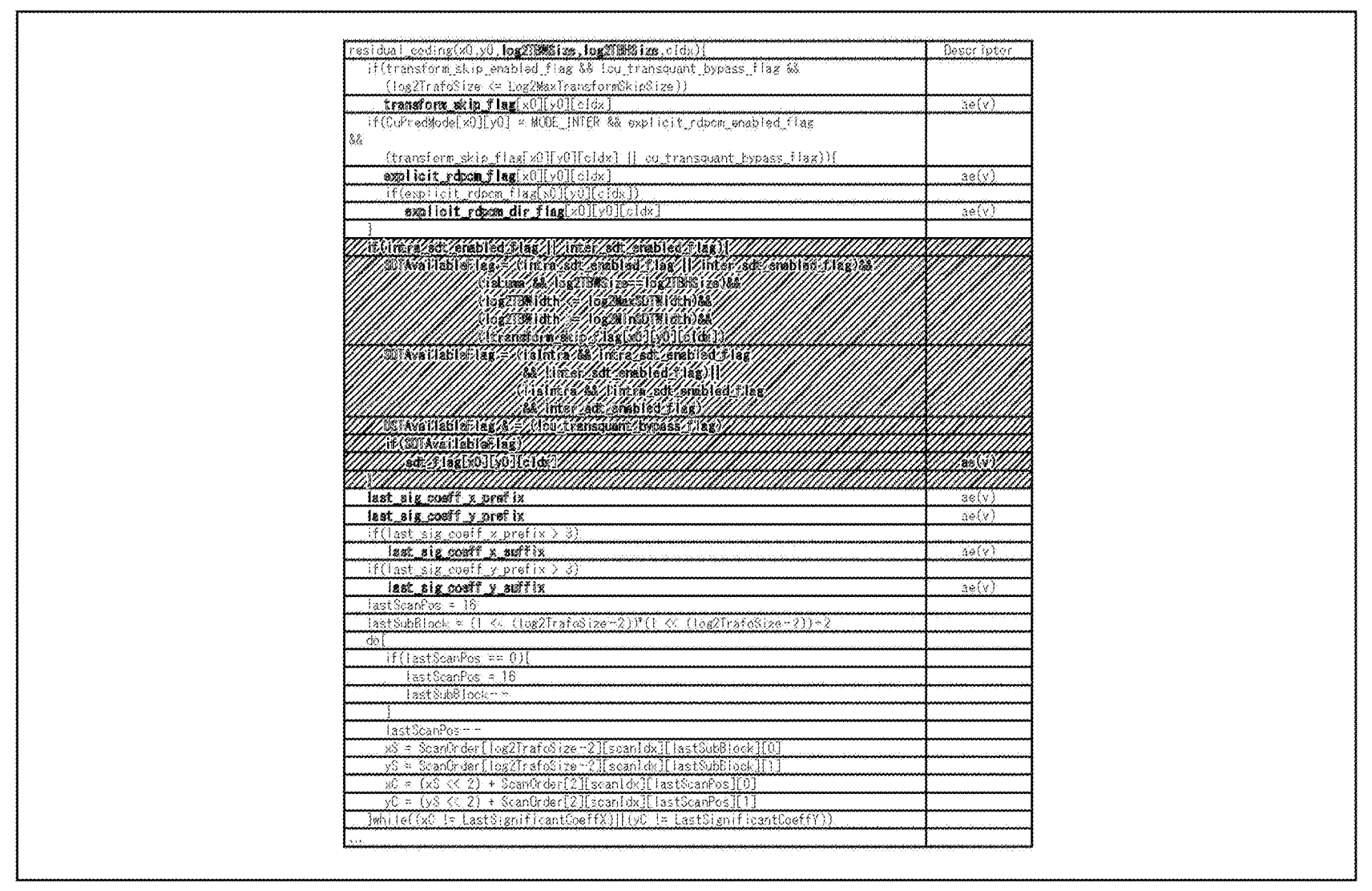

Furthermore, in this case, the setting of the SDTAvailableFlag is enabled in the Residual Coding according to the value of the intra_sdt_enabled_flag and the inter_sdt_enabled_flag as in lines with a diagonal line pattern illustrated in FIG. 66. In addition, the setting of the sdt_flag is enabled according to the value of the SDTAvailableFlag.

For example, in the case of FIG. 66, the SDTAvailableFlag is set when the intra_sdt_enabled_flag or the inter_sdt_enabled_flag is true. For example, the SDTAvalableFlag is set to true (for example, "1") in a case where it is a luminance signal, the block is a square smaller than a predetermined maximum size and larger than a predetermined minimum size, the transform_skip_flag and the cu_transquant_bypass_flag are false, and the intra_sdt_enabled_flag is true and the inter_sdt_enabled_flag is false in the intra prediction or the intra_sdt_enabled_flag is false and the inter_sdt_enabled_flag is true in the inter prediction. In the other cases, the SDTAvalableFlag is set to false (For example, "0").

Furthermore, the sdt_flag is set when, for example, the SDTAvalableFlag is true in the case of FIG. 66.

<Transformation Section>

Figure 67:
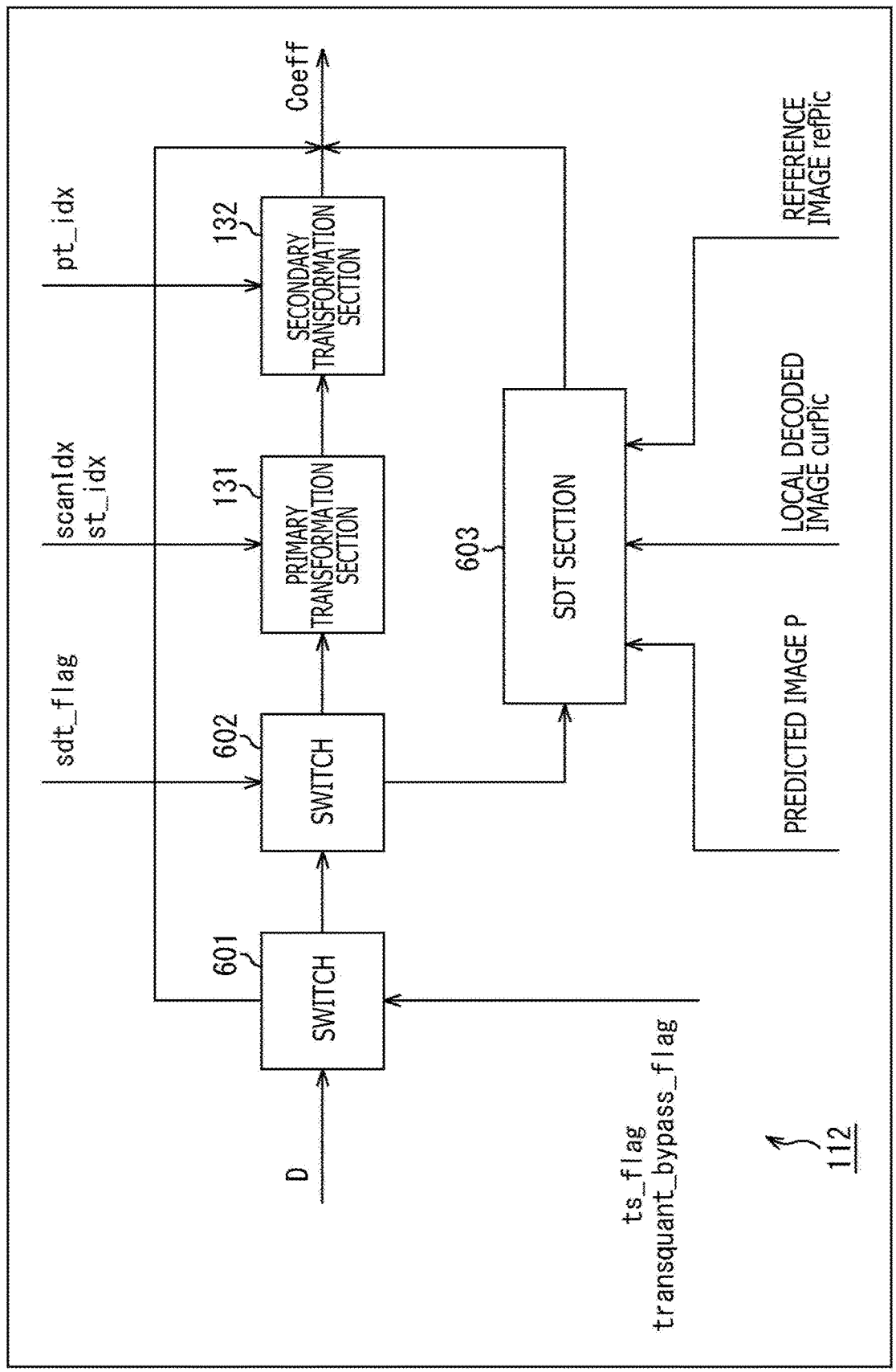
FIG. 67 is a block diagram illustrating a main configuration example of a transformation section.

In this case, the configuration of the image encoding apparatus 100 can also be basically similar to the case of the third embodiment. That is, the configuration of the image encoding apparatus 100 is as illustrated for example in FIG. 7. However, the configuration of the transformation section 112 in this case is as illustrated for example in FIG. 67. That is, the transformation section 112 in this case includes a switch 601, a switch 602, the primary transformation section 131, the secondary transformation section 132, and an SDT section 603 as illustrated in FIG. 67.

The switch 601 is an embodiment of a control section that controls the execution of the primary transformation and the secondary transformation. For example, in a case where the primary transformation is skipped, the switch 601 also controls and skips the secondary transformation. For example, the switch 601 controls the supply destination of the predicted residual D supplied from the computation section 111 according to the value of a transformation skip flag ts_flag regarding the skip of the primary transformation included in the transformation information Tinfo or according to the value of a transformation quantization bypass flag transquant_bypass_flag included in the transformation information Tinfo.

For example, in a case where the value of the transformation skip flag ts_flag is 1 or the value of the transformation quantization bypass flag transquant_bypass_flag is 1, the switch 601 skips the primary transformation and the secondary transformation. That is, the switch 601 in this case supplies the predicted residual D as transformation coefficients Coeff to the quantization section 113.

Furthermore, in a case where the value of the transformation skip flag ts_flag is 0, and the value of the transformation quantization bypass flag transquant_bypass_flag is 0, the switch 601 supplies the predicted residual D to the switch 602.

The switch 602 is an embodiment of a control section that controls the selection (execution) of the SDT. For example, the switch 602 controls the supply destination of the predicted residual D supplied from the switch 601 according to the value of the sdt_flag. For example, the switch 602 selects the SDT in the case where the value of the sdt_flag is 1. That is, the switch 602 supplies the predicted residual D to the SDT section 603 in this case. Furthermore, in the case where the value of the sdt_flag is 0, the switch 602 does not select the SDT and supplies the predicted residual D to the primary transformation section 131.

The SDT section 603 applies a process regarding the SDT to the predicted residual D supplied from the switch 602 based on the predicted image P, a local decoded image curPic, a reference image refPic, and the like. The SDT section 603 supplies the transformation coefficients Coeff obtained by performing the SDT to the quantization section 113. Note that the block size of the predicted residual D is $2^K \times 2^L$, and the number of elements is $2^N (=2^{(K+L)}, N=K+L)$. Both K and L are integers equal to or greater than 1.

<SDT Section>

Figure 68:
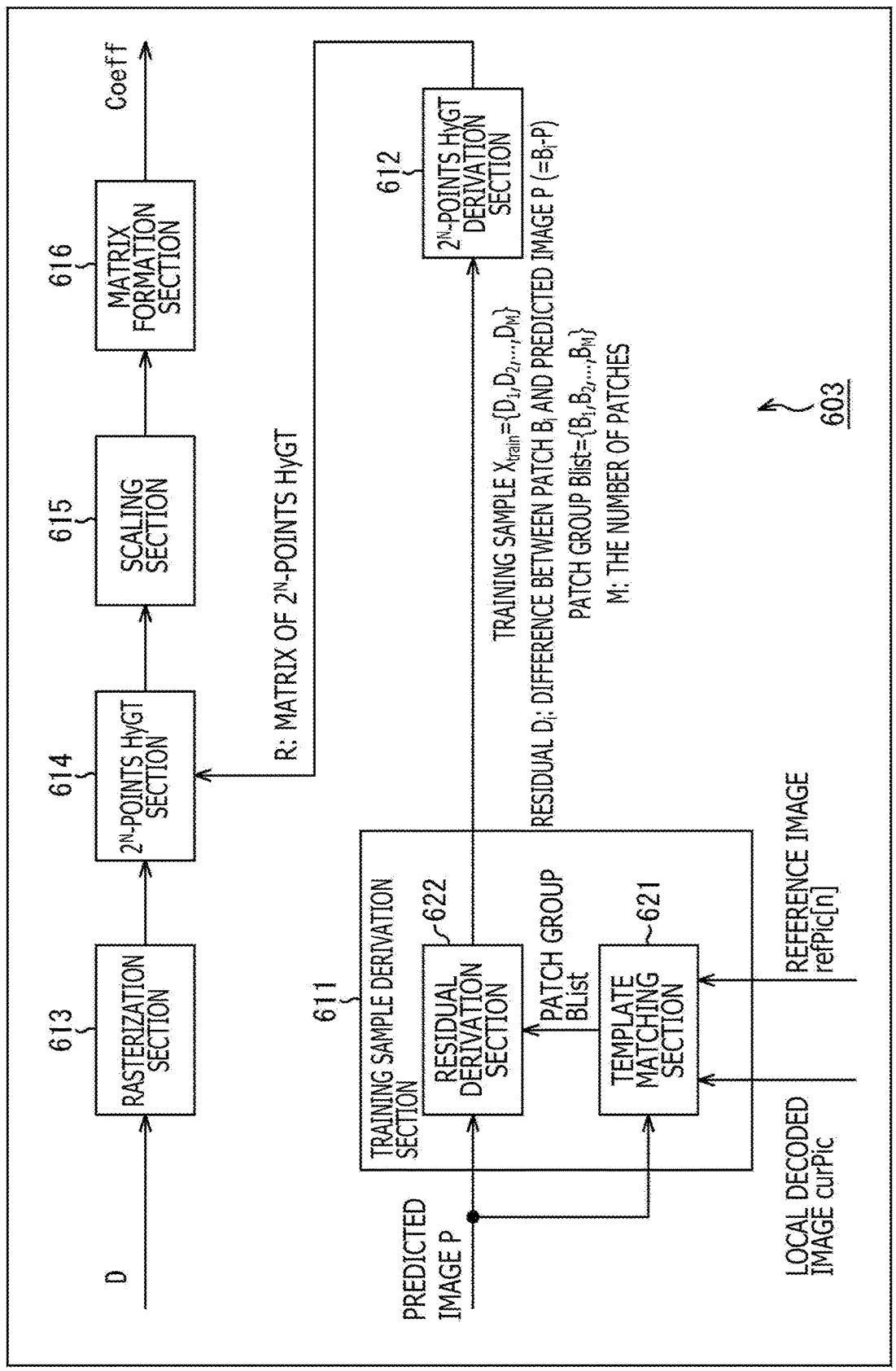
FIG. 68 is a block diagram illustrating a main configuration example of an SDT section.

FIG. 68 illustrates a main configuration example of the SDT section 603. As illustrated in FIG. 68, the SDT section 603 includes, for example, a training sample derivation section 611, a $2^N$-points HyGT derivation section 612, a rasterization section 613, a $2^N$-points HyGT section 614, a scaling section 615, and a matrix formation section 616.

The training sample derivation section 611 uses the predicted image P, the local decoded image curPic, and the reference image refPic[n] to derive a training sample $X_{train}$. The details of the derivation of the training sample will be described later. The training sample derivation section 611 supplies the derived training sample $X_{train}$ to the $2^N$-points HyGT derivation section 612.

The $2^N$-points HyGT derivation section 612 uses the training sample $X_{train}$ supplied from the training sample derivation section 611 to derive the matrix R of the $2^N$-points HyGT. The $2^N$-points HyGT derivation section 612 supplies the derived matrix R of the $2^N$-points HyGT to the $2^N$-points HyGT section 614.

The rasterization section 613 executes a process basically similar to the rasterization section 141. That is, the rasterization section 613 transforms the predicted residual D supplied from the switch 602 into a $1 \times 2^Y$-dimensional vector $X_{1d}$. The rasterization section 613 supplies the obtained vector $X_{1d}$ to the $2^N$-points HyGT section 614.

The $2^N$-points HyGT section 614 executes a process basically similar to the matrix computation section 421. That is, the $2^N$-points HyGT section 614 derives a matrix product $Y_{1d}$ of the matrix R of the $2^N$-points HyGT supplied from the $2^N$-points HyGT derivation section 612 and the vector $X_{1d}$ supplied from the rasterization section 613. The $2^N$-points HyGT section 614 supplies the derived matrix product $Y_{1d}$ to the scaling section 615.

The scaling section 615 executes a process basically similar to the scaling section 143. That is, the scaling section 615 normalizes the norm of the signal $Y_{1d}$ supplied from the $2^N$-points HyGT section 614 and obtains a signal $Z_{1d}$ after the normalization. The scaling section 615 supplies the obtained signal $Z_{1d}$ to the matrix formation section 616.

The matrix formation section 616 executes a process basically similar to the matrix formation section 144. That is, based on the scan method designated by the scan identifier scanIdx, the matrix formation section 616 transforms the $1 \times 2^N$-dimensional vector $Z_{1d}$ after the norm normalization into a $2^K \times 2^T$ block ($2^K \times 2^L$ matrix) in the same block size as the predicted residual D. The matrix formation section 616 supplies the obtained transformation coefficients Coeff to the outside of the transformation section 112 (quantization section 113).

<Derivation of Training Sample>

The $2^N$-points HyGT derivation section 612 uses surrounding images similar to the current block to be processed to derive the matrix R. More specifically, the training sample derivation section 611 uses the surrounding images similar to the current block to be processed to derive the training sample $X_{train}$, and the $2^N$-points HyGT derivation section 612 uses the training sample $X_{train}$ to derive the matrix R.

As described, the training sample derivation section 611 uses the predicted image P, the local decoded image curPic, and the reference image refPic[n] to derive the training sample $X_{train}$. As illustrated in FIG. 68, the training sample derivation section 611 includes a template matching section 621 and a residual derivation section 622.

The template matching section 621 executes a process regarding template matching and uses the predicted image P, the local decoded image curPic, and the reference image refPic[n] to derive a patch group BList. The template matching section 621 supplies the derived patch group BList to the residual derivation section 622.

The residual derivation section 622 uses the predicted image P and the patch group BList supplied from the template matching section 621 to derive a residual Di and derives the training sample $X_{train}$. The residual derivation section 622 supplies the derived training sample $X_{train}$ to the $2^N$-points HyGT derivation section 612.

<Template Matching>

Figure 69:
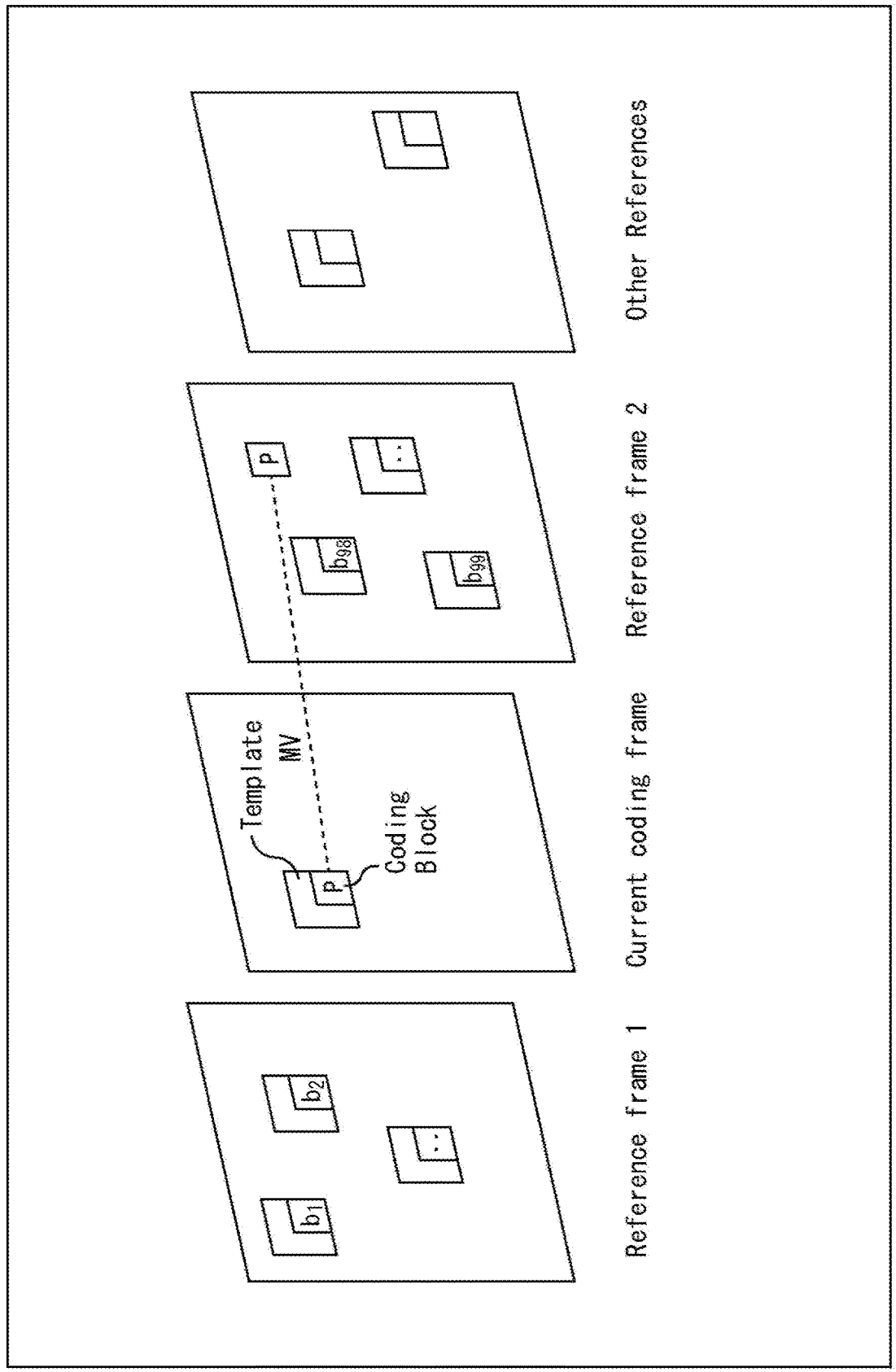
FIG. 69 is a diagram describing an example of a situation of template matching.

Next, the template matching in the derivation of the training sample will be described. The template matching section 621 searches for surrounding images similar to the current block. As illustrated in FIG. 69, the surrounding images similar to the current block are searched from reference images (Reference frames n (n is an arbitrary natural number)) other than a current frame (Current coding frame) to be processed. The number of reference frames to be searched is arbitrary, and a plurality of reference frames may be searched as illustrated in FIG. 69.

Figure 70:
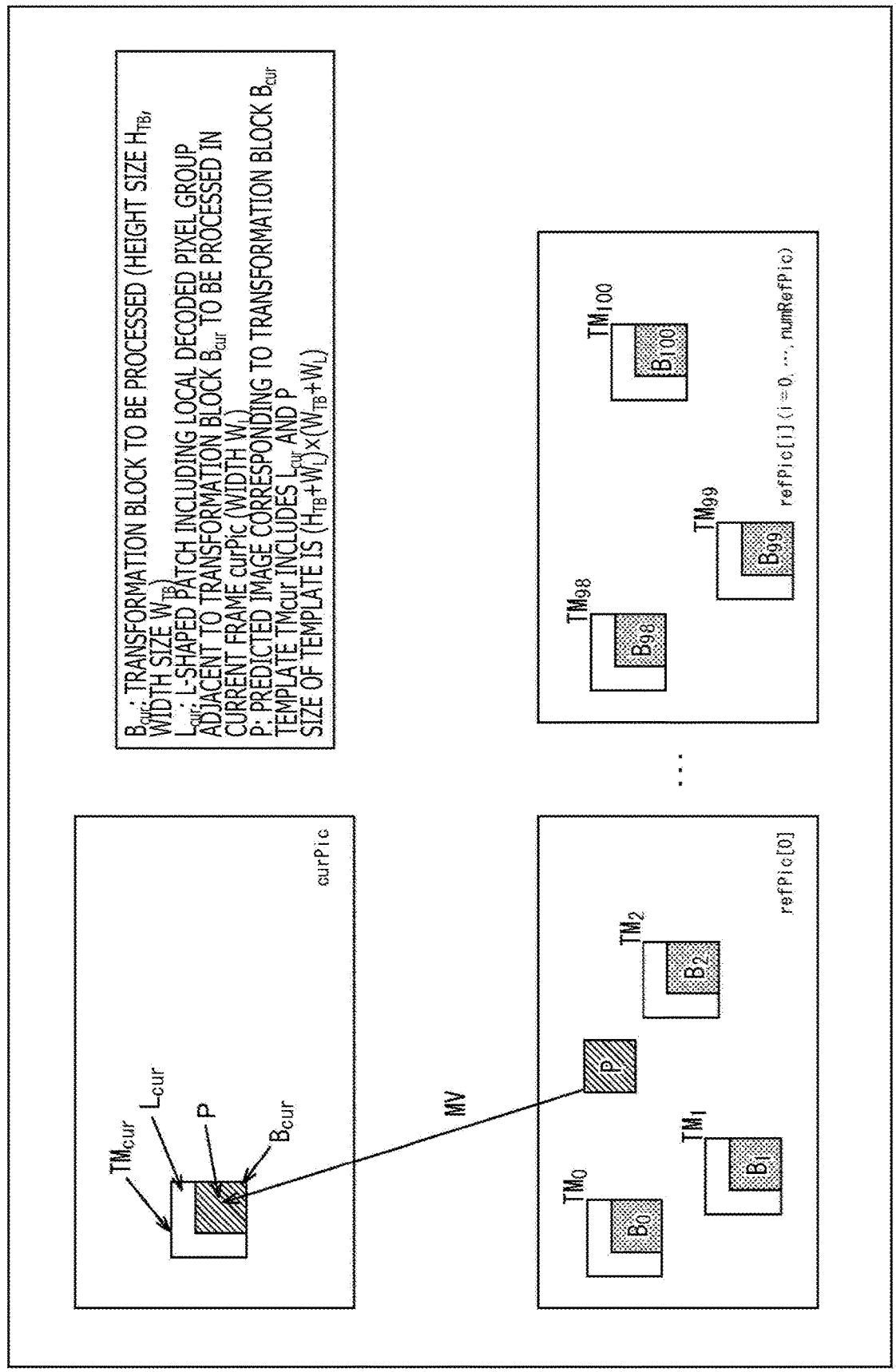
FIG. 70 is a diagram describing the example of the situation of the template matching.

For example, in FIG. 70, $B_{cur}$ of a current picture curPic is the current block. The height size of the current block $B_{cur}$ will be referred to as $H_{TB}$, and the width size will be referred to as $W_{TB}$. In addition, P of the current picture curPic is a predicted image corresponding to the current block $B_{cur}$. In addition, $L_{cur}$ of the current picture curPic is an L-shaped patch including a local decoded pixel group adjacent to the current block $B_{cur}$. The width of the patch $L_{cur}$ will be referred to as $W_L$. $TM_{cur}$ of the current picture curPic is a current template including the current block $B_{cur}$ and the patch $L_{cur}$. In this way, a region including the transformation block and the patch will be referred to as a template TM.

Here, the similar images are searched on the basis of regions in a predetermined size greater than the transformation block referred to as the template TM. The size of the template TM is $(H_{TB}+W_L)$ vertically and $(W_{TB}+W_L)$ horizontally.

The template matching section 621 uses the predicted image P and the local decoded image curPic to set the current template $TM_{cur}$ and sets blocks B, and templates $TM_j$ including the blocks $B_j$ in each reference image refPic[n]. The template matching section 621 then derives a difference (error $E_j$) between the current template $TM_{cur}$ and each surrounding template $TM_j$ and searches for a template $TM_j$ with the error $E_j$ smaller than a predetermined threshold (ThE). The template matching section 621 then includes (adds), in the patch group list BList, the block $B_j$ of the template $TM_j$ in which the detected error $E_j$ is small.

In this way, the template matching section 621 derives the patch group list BList (BList={$B_1, B_2, \ldots, B_M$}) (M is the number of patches) and supplies the patch group list BList to the residual derivation section 622.

<Derivation of Residual>

Next, the derivation of the residual in the derivation of the training sample will be described. The residual derivation section 622 derives a difference ($B_i$-P) between a patch $B_i$ that is an element of the patch group list BList (BList={$B_1, B_2, \ldots, B_M$}) supplied from the template matching section 621 and the predicted image P. The difference ($B_i$-P) between the patch $B_i$ and the predicted image P will be referred to as a residual $D_i$. The residual derivation section 622 derives the residual $D_i$ for each patch $B_i$ and sets the derived M residuals $D_i$ as training samples $X_{train}$.

The residual derivation section 622 supplies the derived training samples $X_{train}$ ($X_{train}$={$D_1, D_2, \ldots, D_M$}) to the $2^N$-points HyGT derivation section 612.

In this way, the application of the separable $2^N$-points HyGT applying the present technique to the matrix computation in the SDT can reduce the amount of computation necessary for the orthogonal transformation as described in each embodiment. In addition, the number of coefficients held in the orthogonal transformation can be reduced, and the memory size necessary for holding the matrix of the orthogonal transformation can be reduced.

In addition, the derivation of the matrix R of the $2^N$-points HyGT using the $2^N$-points HyGT as described above can suppress the increase in the computation complexity and reduce the amount of computation.

<Flow of Transformation Process>

Next, an example of a flow of the transformation process in this case executed in step S104 of FIG. 9 will be described with reference to a flow chart of FIG. 71.

In this case, the switch 601 determines whether the transformation skip flag ts_flag is 1 or whether the value of the transformation quantization bypass flag transquant_bypass_flag is 1 in step S621. If the switch 601 determines that at least one of the values of the transformation skip flag ts_flag and the transformation quantization bypass flag transquant_bypass_flag is 1, the transformation process ends, and the process returns to FIG. 9. In addition, if the switch 601 determines that the values of both the transformation skip flag ts_flag and the transformation quantization bypass flag transquant_bypass_flag are 0 in step S621, the process proceeds to step S622.

In step S622, the switch 602 determines whether the value of sdt_flag is 1. If the switch 602 determines that the value of sdt_flag is 0, the process proceeds to step S623. In step S623, the primary transformation section 131 performs the primary transformation, and the secondary transformation section 132 performs the secondary transformation. Once the process of step S623 is finished, the transformation process ends, and the process returns to FIG. 9.

In addition, if the switch 602 determines that the value of sdt_flag is 1 in step S622, the process proceeds to step S624. In step S624, the SDT section 603 executes the SDT process. Once the process of step S624 is finished, the transformation process ends, and the process returns to FIG. 9.

<Flow of SDT Process>

Next, an example of a flow of the SDT process executed in step S624 of FIG. 71 will be described with reference to a flow chart of FIG. 72.

Once the SDT process is started, the training sample derivation section 611 of the SDT section 603 derives the training samples $X_{train}$ in step S631. In step S632, the $2^N$-points HyGT derivation section 612 derives the transformation matrix R. The details of the processes will be described later.

In step S633, the components from the rasterization section 613 to the matrix formation section 616 perform the orthogonal transformation based on the transformation matrix R (matrix R of the $2^N$-points HyGT) derived in step S632. The process is similar to the process described in each embodiment (for example, steps S543 to S549 of FIG. 52 or the like), and the description will not be repeated.

Figure 71:
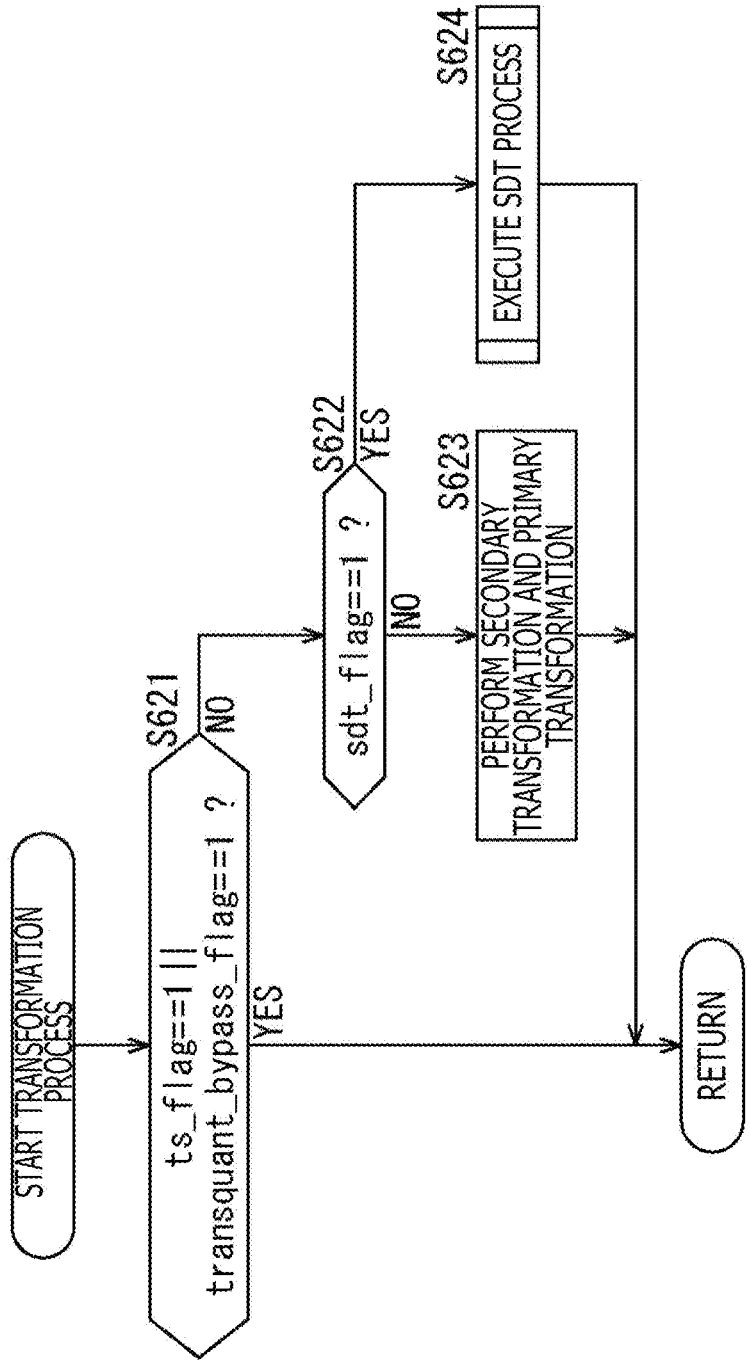
FIG. 71 is a flow chart describing an example of a flow of a transformation process.
Figure 72:
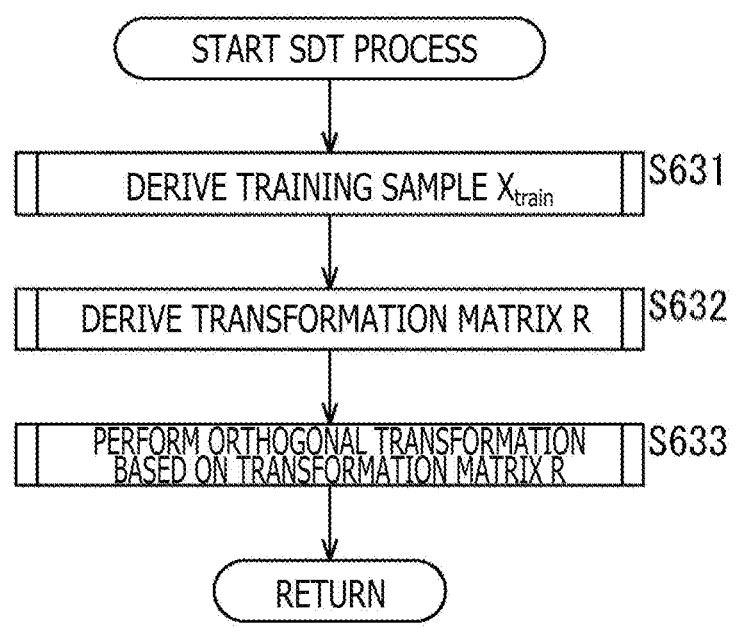
FIG. 72 is a flow chart describing an example of a flow of an SDT process.

Once the process of step S633 is finished, the SDT process ends, and the process returns to FIG. 71.

<Training Sample Derivation Process>

Figure 73:
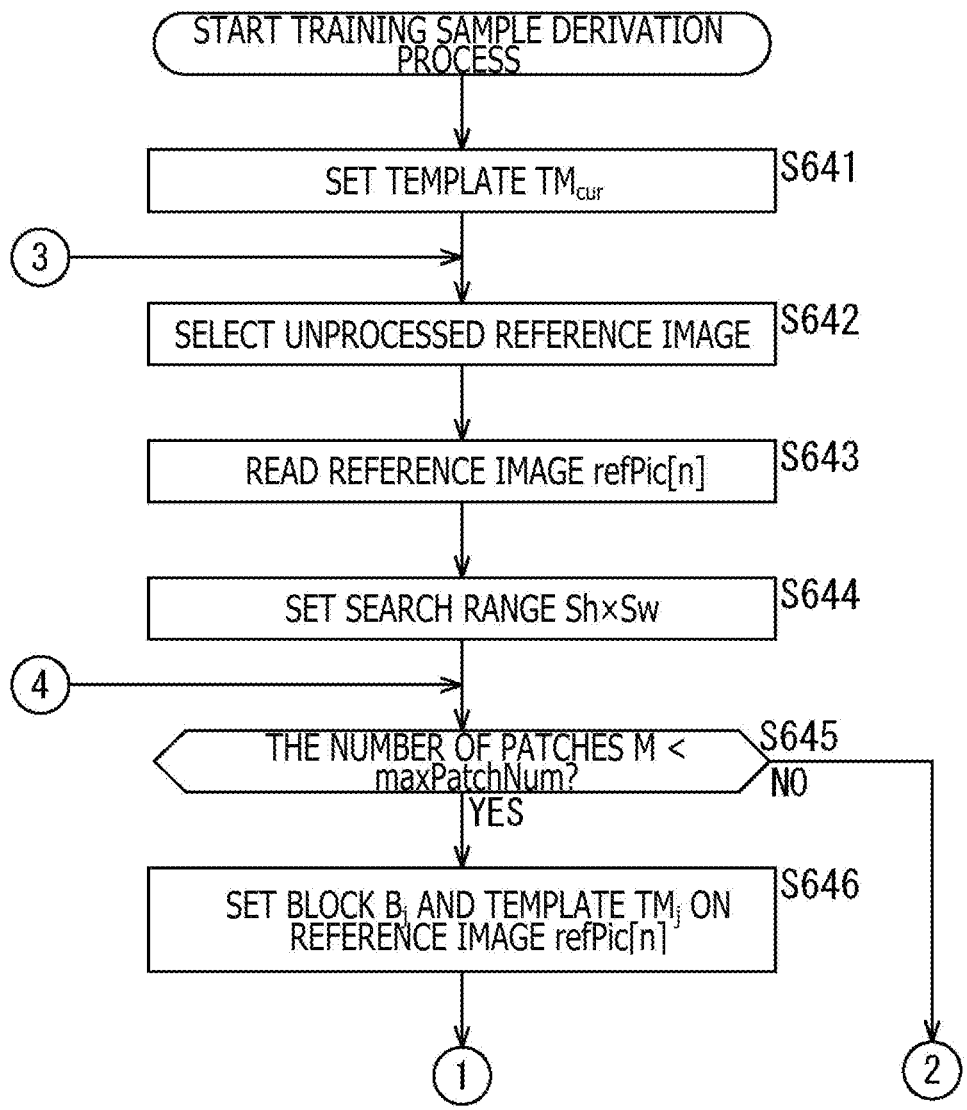
FIG. 73 is a flow chart describing an example of a flow of a training sample derivation process.

Next, an example of a flow of the training sample derivation process executed in step S631 of FIG. 72 will be described with reference to a flow chart of FIGS. 73 and 74.

Once the training sample derivation process is started, the template matching section 621 sets the template $TM_{cur}$ in step S641. In step S642, the template matching section 621 selects an unprocessed reference image. In step S643, the template matching section 621 reads the reference image refPic[n] selected in step S642. In step S644, the template matching section 621 sets a search range Sh×Sw for searching for the block similar to the current block.

In step S645, the template matching section 621 determines whether the number of detected patches M is smaller than a maximum value maxPatchNum of the number of patches. If the template matching section 621 determines that the number of patches M is smaller than the maxPatchNum, the process proceeds to step S646.

In step S646, the template matching section 621 sets the block $B_j$ and the template $TM_j$ on the reference image refPic[n]. Once the process of step S646 is finished, the process proceeds to step S651 of FIG. 74.

Figure 74:
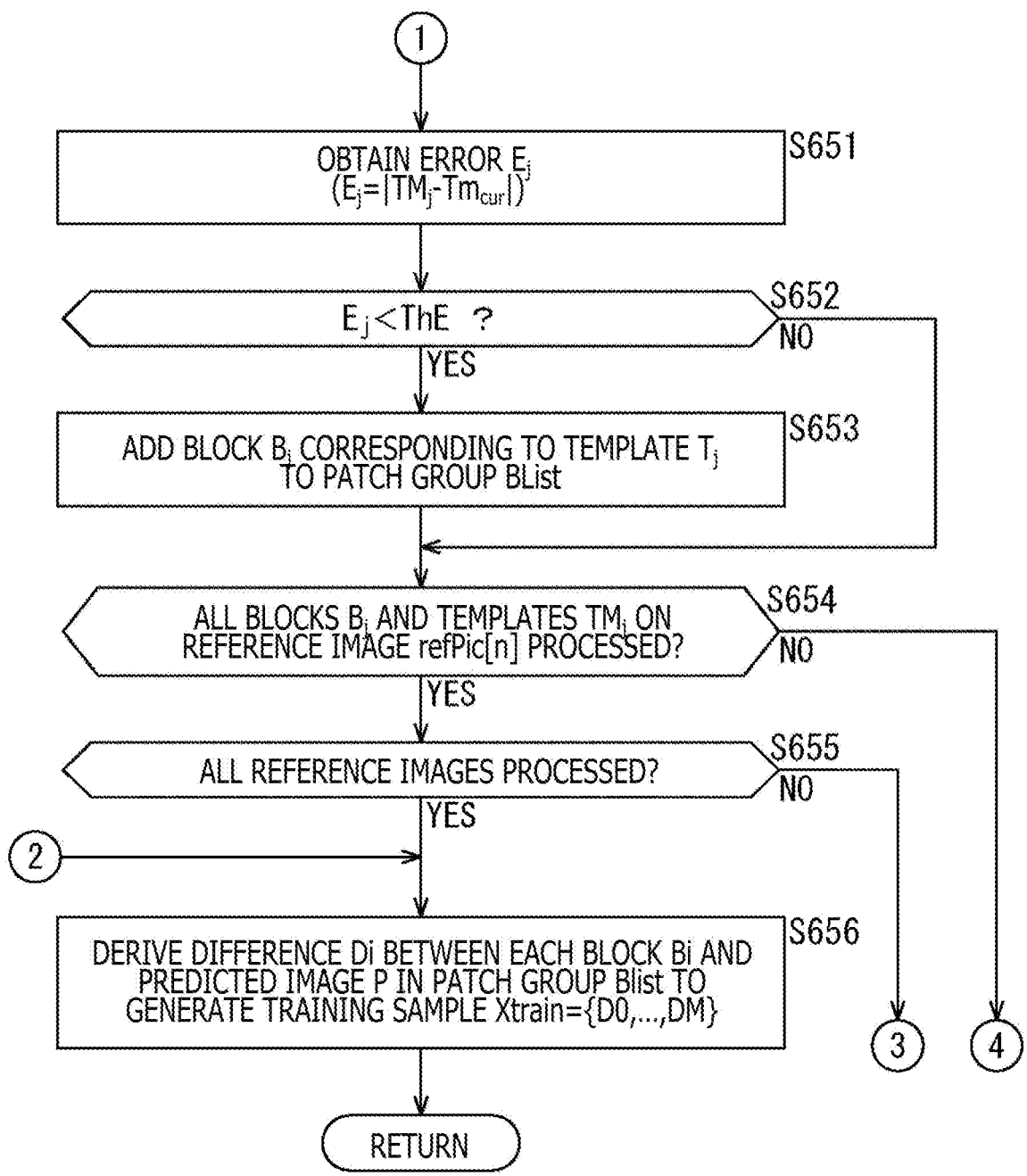
FIG. 74 is a flow chart describing the example of the flow of the training sample derivation process following FIG. 73.

In step S651 of FIG. 74, the template matching section 621 obtains the error $E_3$ ($E_j=|TM_j-TM_{cur}|$). In step S652, the template matching section 621 determines whether the error $E_j$ obtained in step S651 is smaller than the predetermined threshold ThE. If the template matching section 621 determines that the error $E_j$ is smaller than the predetermined threshold ThE, the process proceeds to step S653.

In step S653, the template matching section 621 adds the block $B_j$ corresponding to the template $T_j$ to the patch group BList. Once the process of step S653 is finished, the process proceeds to step S654. In addition, if the template matching section 621 determines that the error $E_j$ is equal or greater than the predetermined threshold ThE in step S652, the process of step S653 is skipped, and the process proceeds to step S654.

In step S654, the template matching section 621 determines whether all the blocks $B_j$ and the templates $TM_j$ on the reference image refPic[n] are processed. If the template matching section 621 determines that there is an unprocessed template $TM_j$, the process returns to step S645 of FIG. 73, and the subsequent process is repeated. That is, the process from step S645 to step S654 is applied to all the blocks $B_j$ and the templates $TM_j$ on the reference image refPic[n]. Furthermore, if the template matching section 621 determines that all the blocks $B_j$ and the templates $TM_j$ are processed in step S654, the process proceeds to step S655.

In step S655, the template matching section 621 determines whether all the reference images are processed. If the template matching section 621 determines that there is an unprocessed reference image, the process returns to step S642 of FIG. 73, and the subsequent process is repeated. That is, the process from step S642 to step S655 is applied to all the blocks $B_j$ and the templates $TM_j$ of each reference image. Furthermore, if the template matching section 621 determines that all the reference images are processed in step S655, the process proceeds to step S656.

In step S656, the residual derivation section 622 derives the residual $D_i$ that is the difference between each block $B_i$ and the predicted image P in the patch group BList derived in the process and generates the training sample $X_{train}=\{D_0, \ldots, D_M\}$. Once the process of step S656 is finished, the training sample derivation process ends, and the process returns to FIG. 72.

<Flow of Transformation Matrix R Derivation Process>

Figure 75:
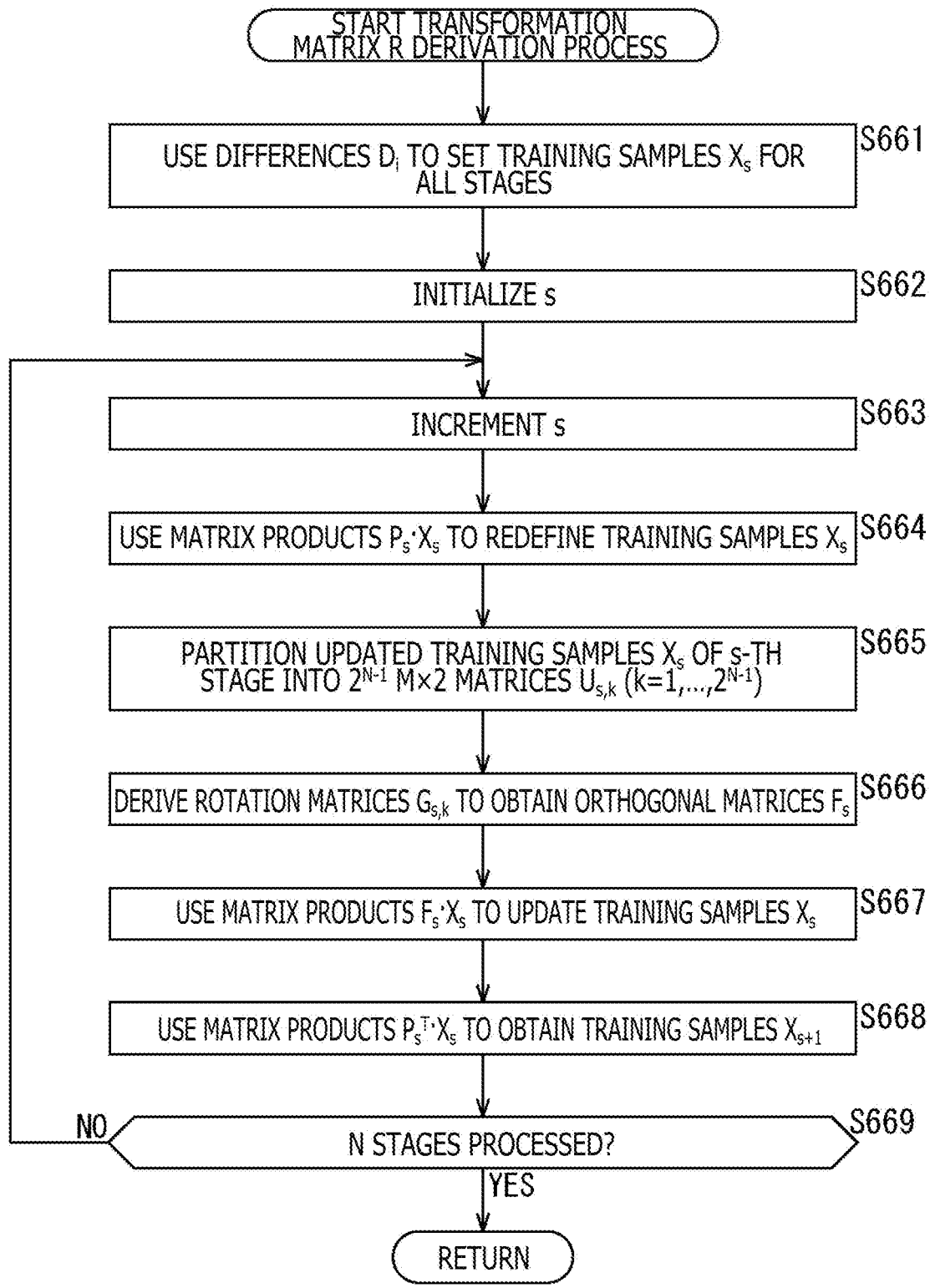
FIG. 75 is a flow chart describing an example of a flow of a transformation matrix R derivation process.

Next, an example of a flow of the transformation matrix R derivation process executed in step S632 of FIG. 72 will be described with reference to a flow chart of FIG. 75.

Once the transformation matrix derivation process is started, the $2^N$-points HyGT derivation section 621 uses the differences $D_i$ to set the training samples $X_s$ for all stages in S661. In step S662, the 2N-points HyGT derivation section 612 initializes the variable s.

In step S663, the $2^N$-points HyGT derivation section 612 increments (+1) the variable s. In step S664, the $2^N$-points HyGT derivation section 612 uses matrix products $P_s \cdot X_s$ to redefine the training samples $X_s$. In step S665, the $2^N$-points HyGT derivation section 612 partitions the updated training samples $X_s$ of the s-th stage into $2^N$ M×2 matrices $U_{s,k}$ ($k=1, \ldots, 2^{N-1}$).

In step S666, the $2^N$-points HyGT derivation section 612 derives rotation matrices $G_{s,k}$ to obtain orthogonal matrices $F_s$. In step S667, the $2^N$-points HyGT derivation section 612 uses matrix products $F_s \cdot X_s$ to update the training samples $X_s$. In step S668, the $2^N$-points HyGT derivation section 612 uses matrix products $P_s^T \cdot X_s$ to obtain training samples $X_{s+1}$.

In step S669, the $2^N$-points HyGT derivation section 612 determines whether N stages are processed. If the $2^N$-points HyGT derivation section 612 determines that N stages are not processed, the process returns to step S663, and the subsequent process is repeated. Each process of steps S663 to S669 is executed for each stage, and if the $2^N$-points HyGT derivation section 612 determines that N stages are processed in step S669, the transformation matrix R is derived. Therefore, the transformation matrix R derivation process ends, and the process returns to FIG. 72.

As a result of the execution of each process, the amount of computation (multiplication and addition) of the SDT can be reduced, and the memory size necessary for holding the matrix of the orthogonal transformation of the SDT can be reduced.

<Inverse Transformation Section>

Figure 76:
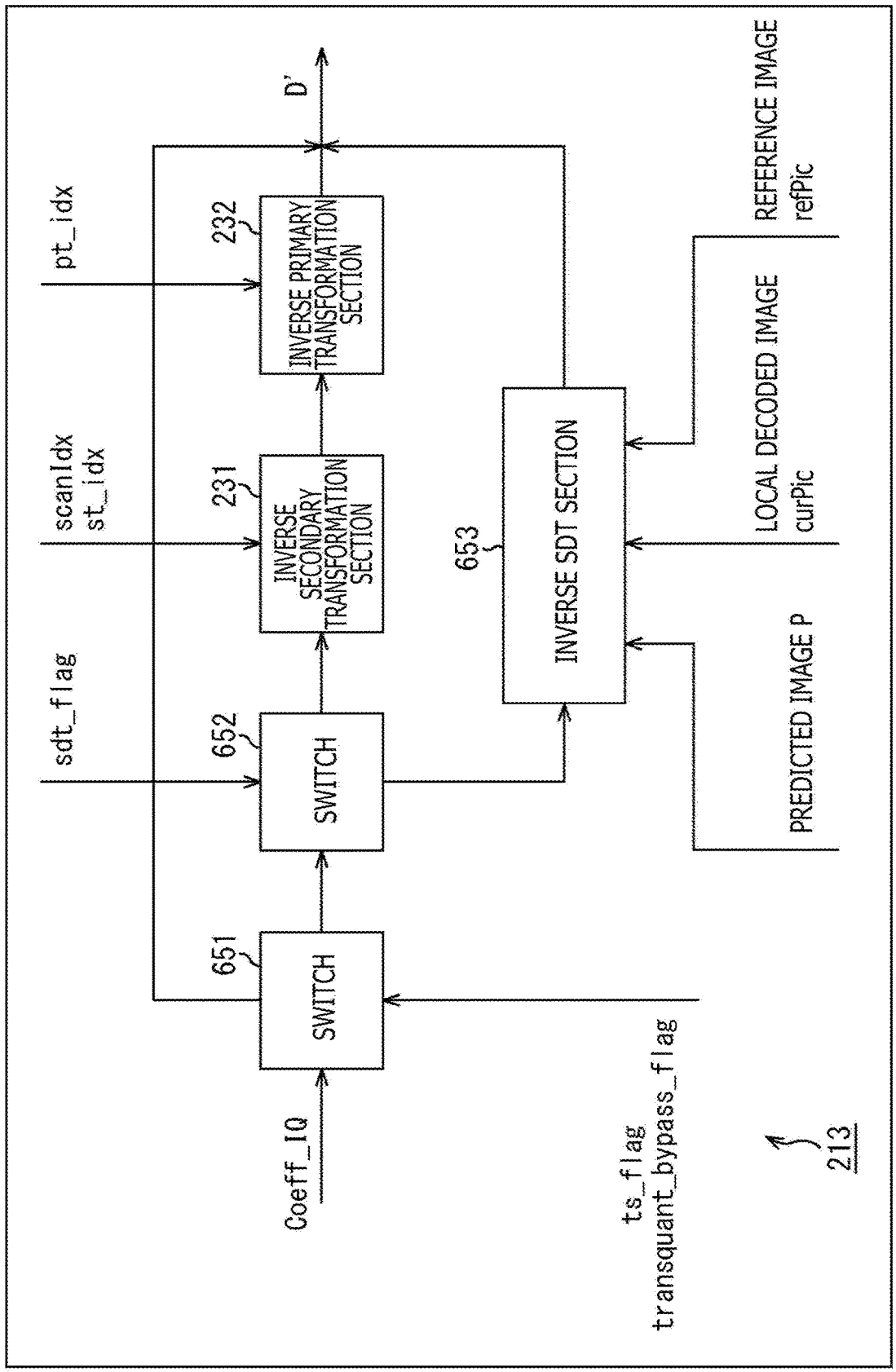
FIG. 76 is a block diagram illustrating a main configuration example of the inverse transformation section.

Next, the inverse transformation section 213 corresponding to the transformation section 112 will be described. In this case, the configuration of the image decoding apparatus 200 corresponding to the image encoding apparatus 100 can also be basically similar to the case of the third embodiment. That is, the configuration of the image decoding apparatus 200 is as illustrated for example in FIG. 11. However, the configuration of the inverse transformation section 213 in this case is as illustrated for example in FIG. 76. That is, the inverse transformation section 213 in this case includes a switch 651, a switch 652, the inverse secondary transformation section 231, the inverse primary transformation section 232, and an inverse SDT section 653 as illustrated in FIG. 76.

The switch 651 is an embodiment of a control section that controls the execution of the inverse secondary transformation and the inverse primary transformation. For example, in a case where the inverse secondary transformation is skipped, the switch 651 also controls and skips the inverse primary transformation. For example, the switch 651 controls the supply destination of the transformation coefficients Coeff_IQ supplied from the inverse quantization section 212 according to the value of the transformation skip flag ts_flag regarding the skip of the primary transformation included in the transformation information Tinfo or according to the value of the transformation quantization bypass flag transquant_bypass_flag included in the transformation information Tinfo.

For example, in the case where the value of the transformation skip flag ts_flag is 1 or the value of the transformation quantization bypass flag transquant_bypass_flag is 1, the switch 651 skips the inverse secondary transformation and the inverse primary transformation. That is, the switch 651 in this case supplies the transformation coefficients Coeff_IQ as the predicted residual D' to the computation section 214.

Furthermore, in the case where the value of the transformation skip flag ts_flag is 0, and the value of the transformation quantization bypass flag transquant_bypass_flag is 0, the switch 651 supplies the transformation coefficients Coeff_IQ to the switch 652.

The switch 652 is an embodiment of a control section that controls the selection (execution) of the inverse SDT that is an opposite process of the SDT. For example, the switch 652 controls the supply destination of the transformation coefficients Coeff_IQ supplied from the switch 651 according to the value of the sdt_flag. For example, the switch 652 selects the inverse SDT in the case where the value of the sdt_flag is 1. That is, the switch 652 supplies the transformation coefficients Coeff_IQ to the inverse SDT section 653 in this case. Furthermore, in the case where the value of the sdt_flag is 0, the switch 652 does not select the inverse SDT and supplies the transformation coefficients Coeff_IQ to the inverse secondary transformation section 231.

The inverse SDT section 653 applies a process regarding the inverse SDT to the transformation coefficients Coeff_IQ supplied from the switch 652 based on the predicted image P, the local decoded image curPic, the reference image refPic, and the like. The inverse SDT section 653 supplies the predicted residual D' obtained by performing the inverse SDT to the computation section 214. Note that the block size of the predicted residual D' is $2^K \times 2^L$, and the number of elements is $2^N (=2^{(K+L)}, N=K+L)$. Both K and L are integers equal to or greater than 1.

<Inverse SDT Section>

Figure 77:
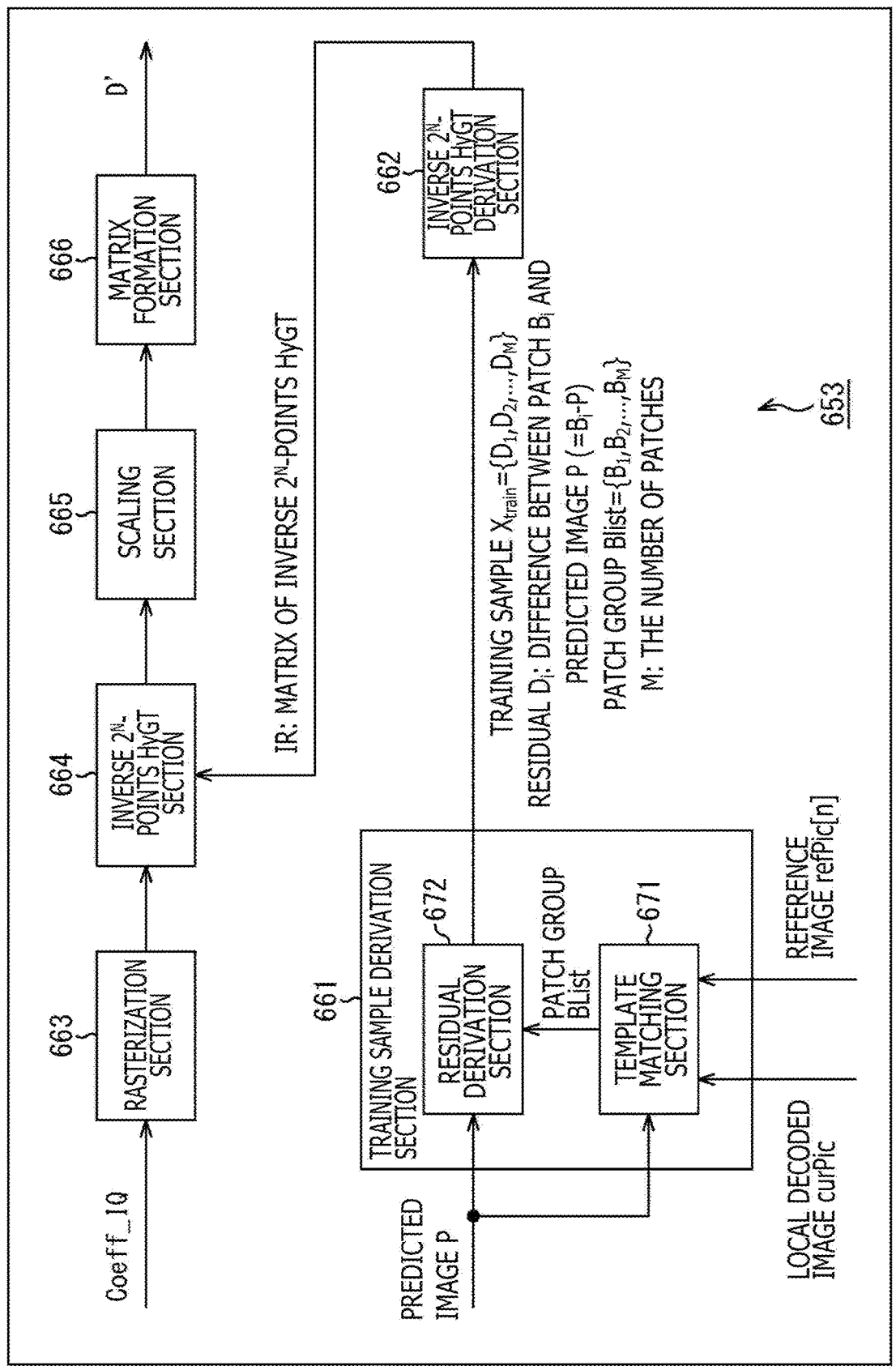
FIG. 77 is a block diagram illustrating a main configuration example of an inverse SDT section.

FIG. 77 illustrates a main configuration example of the inverse SDT section 653. As illustrated in FIG. 77, the inverse SDT section 653 includes, for example, a training sample derivation section 661, an inverse $2^N$-points HyGT derivation section 662, a rasterization section 663, an inverse $2^N$-points HyGT section 664, a scaling section 665, and a matrix formation section 666.

The training sample derivation section 661 executes a process similar to the training sample derivation section 661 and uses the predicted image P, the local decoded image curPic, and the reference image refPic[n] to derive the training sample $X_{train}$. The training sample derivation section 661 includes a template matching section 671 and a residual derivation section 672. The template matching section 671 executes a process similar to the template matching section 621 and uses the predicted image P, the local decoded image curPic, and the reference image refPic[n] to derive the patch group BList. The residual derivation section 672 executes a process similar to the residual derivation section 622 and uses the predicted image P and the patch group BList supplied from the template matching section 671 to derive the residual $D_i$ to derive the training sample $X_{train}$. The training sample derivation section 661 (residual derivation section 622) supplies the derived training sample $X_{train}$ to the inverse $2^N$-points HyGT derivation section 662.

The inverse $2^N$-points HyGT derivation section 662 uses the training sample $X_{train}$ supplied from the training sample derivation section 661 to derive the matrix IR of the inverse $2^N$-points HyGT. The inverse $2^N$-points HyGT derivation section 662 supplies the derived matrix IR of the inverse $2^N$-points HyGT to the inverse 2N-points HyGT section 664.

The rasterization section 663 executes a process basically similar to the rasterization section 241. That is, the rasterization section 663 transforms the transformation coefficients Coeff_IQ supplied from the switch 652 into the $1 \times 2^N$-dimensional vector $X_{1d}$. The rasterization section 663 supplies the obtained vector $X_{1d}$ to the inverse $2^N$-points HyGT section 664.

The inverse $2^N$-points HyGT section 664 executes a process basically similar to the matrix computation section 451. That is, the inverse $2^N$-points HyGT section 664 derives the matrix product $Y_{1d}$ of the matrix IR of the inverse $2^N$-points HyGT supplied from the inverse $2^N$-points HyGT derivation section 662 and the vector $X_d$ supplied from the rasterization section 663. The inverse $2^N$-points HyGT section 664 supplies the derived matrix product $Y_{1d}$ to the scaling section 665.

The scaling section 665 executes a process basically similar to the scaling section 243. That is, the scaling section 665 normalizes the norm of the signal $Y_{1d}$ supplied from the inverse $2^N$-points HyGT section 664 and obtains the signal $Z_{1d}$ after the normalization. The scaling section 665 supplies the obtained signal $Z_{1d}$ to the matrix formation section 666.

The matrix formation section 666 executes a process basically similar to the matrix formation section 244. That is, based on the scan method designated by the scan identifier scanIdx, the matrix formation section 666 transforms the $1 \times 2^N$-dimensional vector $Z_{1d}$ after the norm normalization into the $2^K \times 2^L$ block ($2^K \times 2^L$ matrix) in the same block size as the predicted residual D'. The matrix formation section 666 supplies the obtained predicted residual D' to the outside of the inverse transformation section 213 (quantization section 214).

In this way, the separable inverse $2^N$-points HyGT according to the present technique can also be applied to the matrix computation in the inverse SDT as in the case of the SDT. This can reduce the amount of computation necessary for the inverse orthogonal transformation as described in each embodiment. In addition, the number of coefficients held in the inverse orthogonal transformation can be reduced, and the memory size necessary for holding the matrix of the inverse orthogonal transformation can be reduced.

In addition, the derivation of the matrix IR of the inverse $2^N$-points HyGT using the inverse $2^N$-points HyGT as described above can suppress the increase in the computation complexity and reduce the amount of computation.

<Flow of Inverse Transformation Process>

Next, an example of a flow of the inverse transformation process in this case executed in step S203 of FIG. 13 will be described with reference to a flow chart of FIG. 78.

In this case, the switch 651 determines whether the transformation skip flag ts_flag is 1 or whether the value of the transformation quantization bypass flag transquant_bypass_flag is 1 in step S681. If the switch 651 determines that at least one of values of the transformation skip flag ts_flag and the transformation quantization bypass flag transquant_bypass_flag is 1, the inverse transformation process ends, and the process returns to FIG. 13. In addition, if the switch 651 determines that the values of both the transformation skip flag ts_flag and the transformation quantization bypass flag transquant_bypass_flag are 0 in step S681, the process proceeds to step S682.

In step S682, the switch 652 determines whether the value of sdt_flag is 1. If the switch 652 determines that the value of sdt_flag is 0, the process proceeds to step S683. In step S683, the inverse secondary transformation section 231 performs the inverse secondary transformation, and the inverse primary transformation section 232 performs the inverse primary transformation. Once the process of step S683 is finished, the inverse transformation process ends, and the process returns to FIG. 13.

In addition, if the switch 652 determines that the value of sdt_flag is 1 in step S682, the process proceeds to step S684. In step S684, the inverse SDT section 653 executes the inverse SDT process. Once the process of step S684 is finished, the inverse transformation process ends, and the process returns to FIG. 13.

<Flow of SDT Process>

Next, an example of a flow of the inverse SDT process executed in step S684 of FIG. 78 will be described with reference to a flow chart of FIG. 79.

Once the inverse SDT process is started, the training sample derivation section 661 of the inverse SDT section 653 derives the training samples $X_{train}$ in step S691. The training sample derivation process in this case is similar to the case executed in the SDT process (FIG. 73 and FIG. 74), and the description will not be repeated.

In step S692, the inverse $2N$-points HyGT derivation section 662 derives the transformation matrix IR ($=R^T$). The details of the process will be described later.

In step S693, the components from the rasterization section 663 to the matrix formation section 666 perform the inverse orthogonal transformation based on the transformation matrix IR (matrix IR of the inverse $2^N$-points HyGT) derived in step S692. The process is similar to the process described in each embodiment (for example, steps S582 to S588 of FIG. 56 or the like), and the description will not be repeated.

Figure 78:
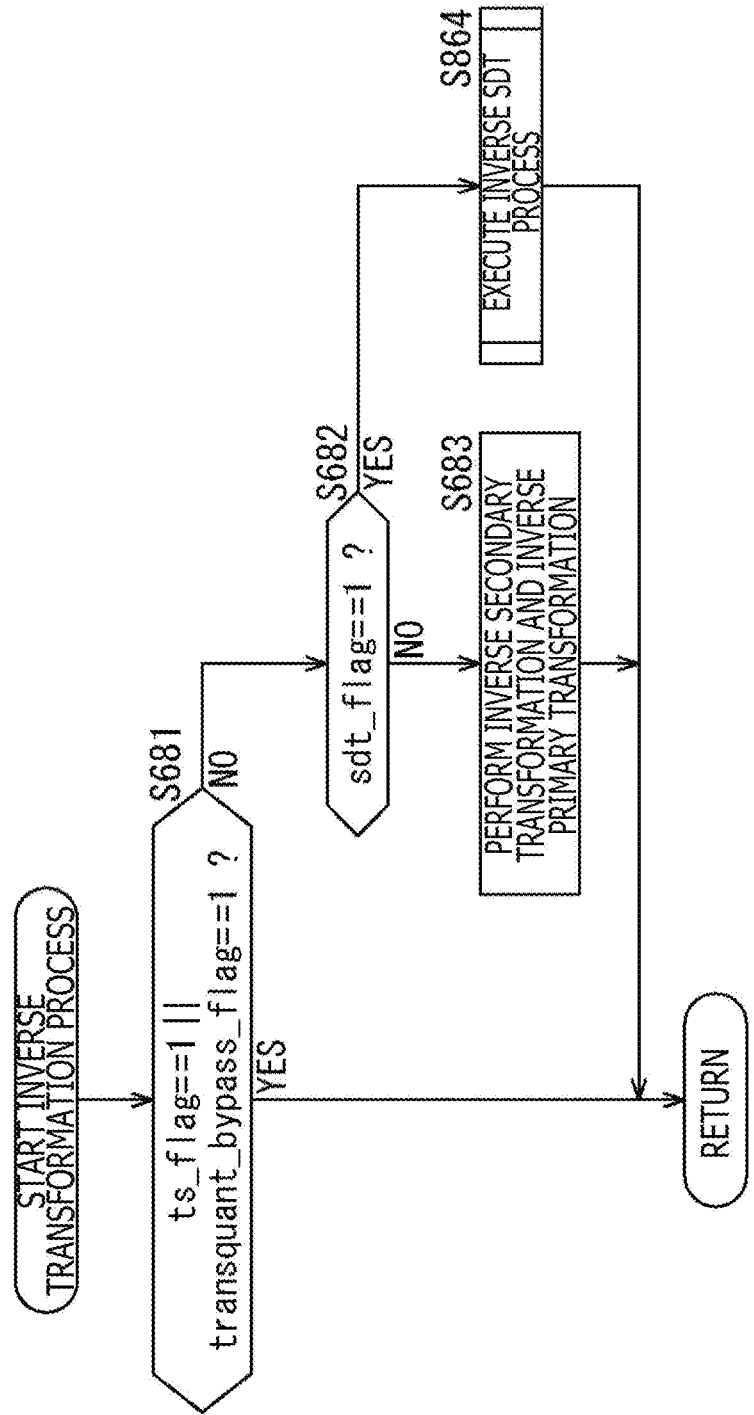
FIG. 78 is a flow chart describing an example of a flow of an inverse transformation process.
Figure 79:
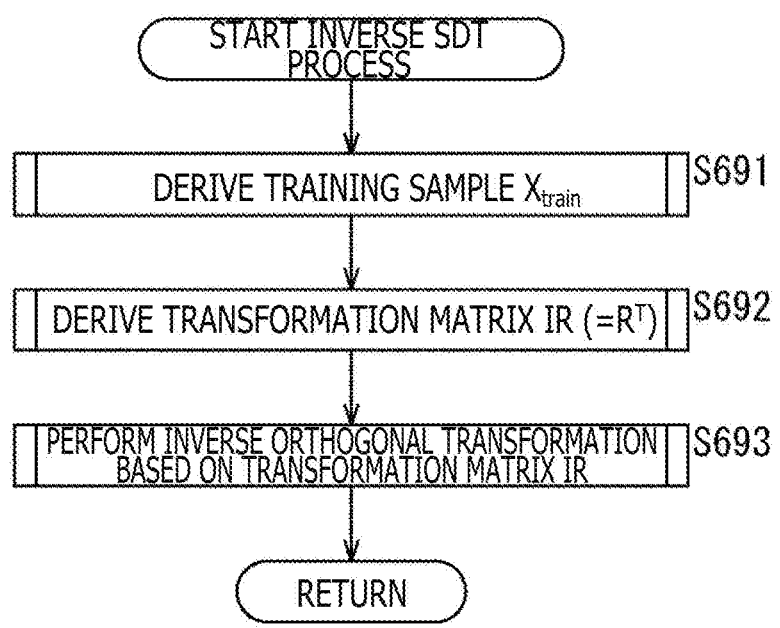
FIG. 79 is a flow chart describing an example of a flow of an inverse SDT process.

Once the process of step S693 is finished, the inverse SDT process ends, and the process returns to FIG. 78.

<Flow of Transformation Matrix IR Derivation Process>

Figure 80:
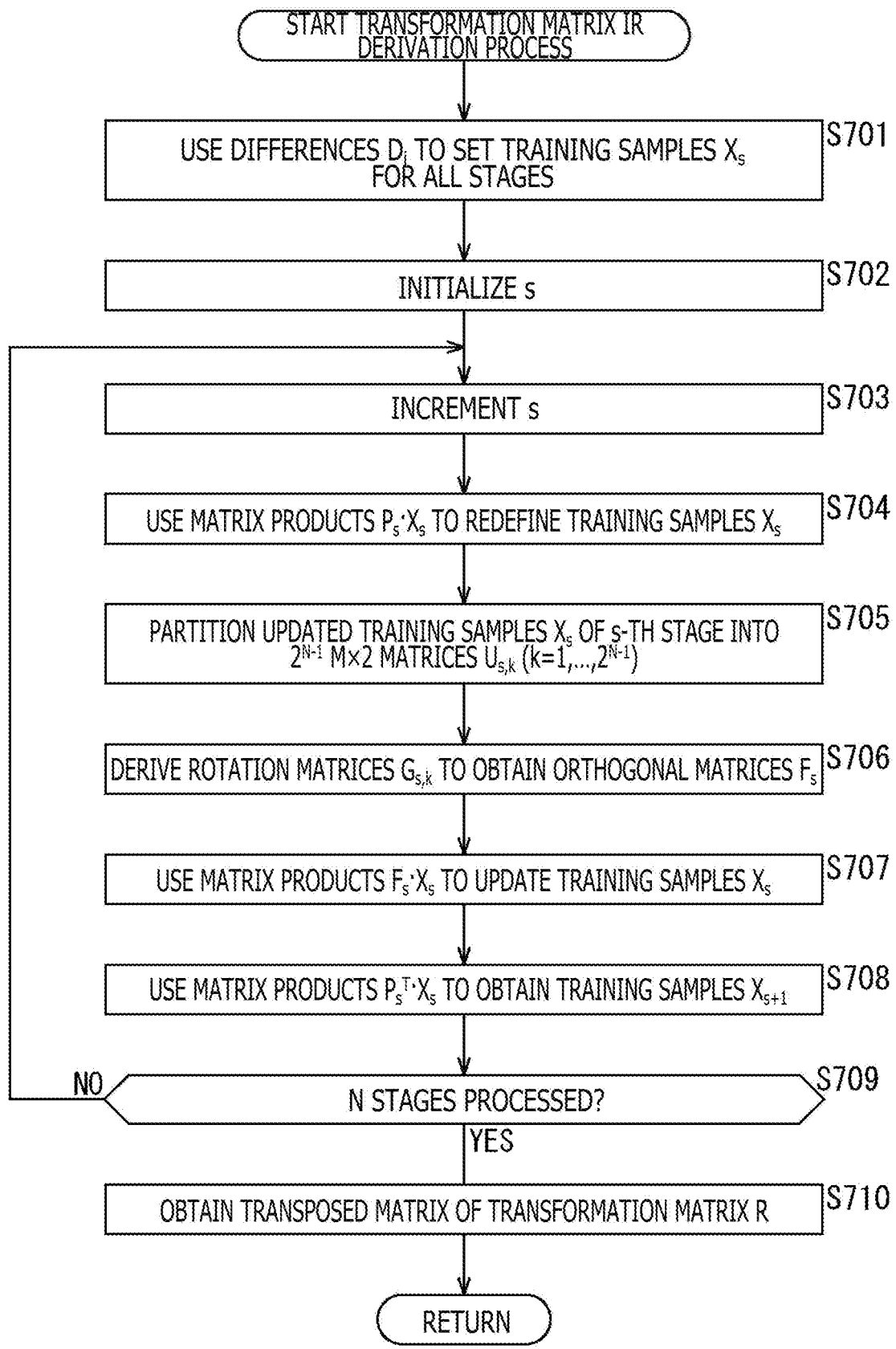
FIG. 80 is a flow chart describing an example of a flow of a transformation matrix IR derivation process.

Next, an example of a flow of the transformation matrix IR derivation process executed in step S692 of FIG. 79 will be described with reference to a flow chart of FIG. 80.

Once the transformation matrix IR derivation process is started, the inverse $2^N$-points HyGT derivation section 662 uses the differences $D_i$ to set the training samples $X_s$ for all stages in step S701. In step S702, the inverse $2^N$-points HyGT derivation section 662 initializes the variable s.

In step S703, the inverse $2^N$-points HyGT derivation section 662 increments (+1) the variable s. In step S704, the inverse $2^N$-points HyGT derivation section 662 uses matrix products $P_s \cdot X_s$ to redefine the training samples $X_s$. In step S705, the inverse $2^N$-points HyGT derivation section 662 partitions the updated training samples $X_s$ of the s-th stage into $2^{N-1}$ M×2 matrices $U_{s,k}$ (k=1, . . . , $2^{N-1}$).

In step S706, the inverse $2^N$-points HyGT derivation section 662 derives rotation matrices $G_{s,k}$ to obtain orthogonal matrices $F_s$. In step S707, the inverse $2^N$-points HyGT derivation section 662 uses matrix products $F_s \cdot X_s$ to update the training samples $X_s$. In step S708, the inverse $2^N$-points HyGT derivation section 662 uses matrix products $P_s^T \cdot X_s$ to obtain the training samples $X_{s+1}$.

In step S709, the inverse $2^N$-points HyGT derivation section 662 determines whether N stages are processed. If the inverse $2^N$-points HyGT derivation section 662 determines that N stages are not processed, the process returns to step S703, and the subsequent process is repeated. Each process of steps S703 to step S709 is executed for each stage, and if the inverse $2^N$-points HyGT derivation section 662 determines that N stages are processed in step S709, the process proceeds to step S710. In step S710, the inverse $2^N$-points HyGT derivation section 662 obtains a transposed matrix $R^T$ (=IR) of the transformation matrix R obtained in the process up to step S709. Once the transformation matrix IR is obtained, the transformation IR derivation process ends, and the process returns to FIG. 79.

As a result of the execution of each process, the amount of computation (multiplication and addition) of the inverse SDT can be reduced, and the memory size necessary for holding the matrix of the inverse orthogonal transformation of the inverse SDT can be reduced.

<Inverse Transformation Section of Image Encoding Apparatus>

Although the inverse transformation section 213 of the image decoding apparatus 200 has been described in each embodiment, the present technique can also be similarly applied to the inverse transformation section 116 of the image encoding apparatus 100. That is, the description regarding the inverse transformation section 213 can also be applied to the inverse transformation section 116.

However, the inverse transformation section 116 may use the transformation matrix R used by the transformation section 112 (including the transformation matrix R derived by the transformation section 112) to obtain the transformation matrix IR. For example, the inverse SDT section 653 (FIG. 76 and FIG. 77) of the inverse transformation section 116 may obtain the matrix IR of the inverse $2^N$-points HyGT from the matrix R of the $2^N$-points HyGT derived by the $2^N$-points HyGT derivation section 612 of the SDT section 603 (FIG. 67 and FIG. 68).

Figure 81:
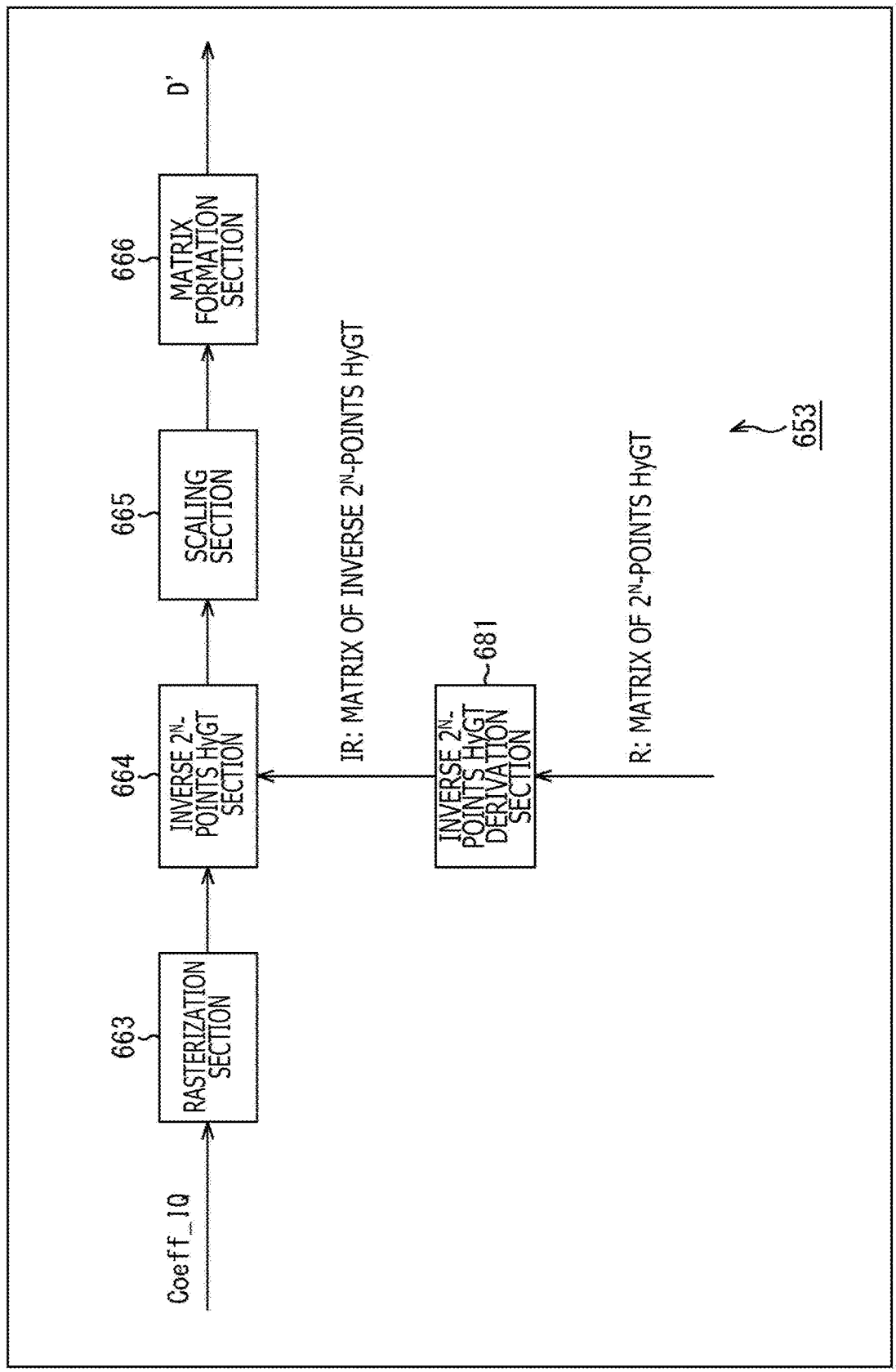
FIG. 81 is a block diagram illustrating a main configuration example of the inverse SDT section.

FIG. 81 illustrates a main configuration example of the inverse SDT section 653 in this case. As illustrated in FIG. 81, although the configuration of the inverse SDT section 653 in this case is basically similar to the case of FIG. 77, the inverse SDT section 653 includes an inverse $2^N$-points HyGT derivation section 681 in place of the training sample derivation section 661 and the inverse $2^N$-points HyGT derivation section 662.

The inverse $2^N$-points HyGT derivation section 681 acquires the matrix R of the $2^N$-points HyGT from the SDT section 603 ($2^N$-points HyGT derivation section 612) (FIG. 68). The inverse 2-points HyGT derivation section 681 derives the matrix IR of the inverse $2^N$-points HyGT from the matrix R of the $2^N$-points HyGT. The inverse $2^N$-points HyGT derivation section 681 obtains the transposed matrix of the matrix R of the $2^N$-points HyGT to derive the matrix IR of the inverse $2^N$-points HyGT. The inverse $2^N$-points HyGT derivation section 681 supplies the derived matrix IR of the inverse $2^N$-points HyGT to the inverse $2^N$-points HyGT section 664. The inverse $2^N$-points HyGT section 664 derives the matrix product $Y_{1d}$ of the matrix IR of the inverse $2^N$-points HyGT and the vector $X_{1d}$ supplied from the rasterization section 663.

In this way, the inverse SDT section 653 can derive the matrix IR of the inverse $2^N$-points HyGT more easily than in the case of deriving the training sample.

<Flow of Inverse SDT Process>

An example of a flow of the inverse SDT process in this case will be described with reference to a flow chart of FIG. 82. In this case, once the inverse SDT process is started, the inverse $2^N$-points HyGT derivation section 681 uses the transformation matrix R to derive the transformation matrix IR ($=R^T$) in step S731.

In step S732, the components from the rasterization section 663 to the matrix formation section 666 perform an inverse orthogonal transformation based on the transformation matrix IR (matrix IR of inverse $2^N$-points HyGT) derived in step S731. The process is similar to the process described in each embodiment (for example, steps S582 to S588 of FIG. 56 or the like), and the description will not be repeated.

As a result of the execution of each process, the amount of computation (multiplication and addition) of the inverse SDT can be reduced, and the memory size necessary for holding the matrix of the inverse orthogonal transformation of the inverse SDT can be reduced.

10. Tenth Embodiment

<Data Units of Information>

The data units in setting the information regarding the image or the information regarding encoding and decoding of the image (or the data units of the target data) described above are arbitrary, and the data units are not limited to the examples. For example, the information may be set for each TU, PU, CU, LCU, sub-block, block, tile, slice, picture, sequence, or component, or the data in the data units may be the target. Obviously, the data units are set according to the information. That is, all the information may not be set (or targeted) in the same data units. Note that the storage location of the information is arbitrary, and the information may be stored in the header, the parameter set, or the like of the data unit. In addition, the information may be stored in a plurality of places.

<Control Information>

The control information regarding the present technique described in each embodiment may be transmitted from the encoding side to the decoding side. For example, control information (for example, enabled_flag) for controlling whether to permit (or prohibit) the application of the present technique may be transmitted. In addition, for example, control information designating one or both an upper limit and a lower limit of the block size that permits (or prohibits) the application of the present technique may be transmitted.

<Encoding and Decoding>

The present technique can be applied to arbitrary image encoding and decoding for performing the primary transformation and the secondary transformation (inverse secondary transformation and inverse primary transformation). That is, the specifications of the transformation (inverse transformation), the quantization (inverse quantization), the encoding (decoding), the prediction, and the like are arbitrary and are not limited to the examples. For example, a transformation (inverse) other than the primary transformation (inverse) and the secondary transformation (inverse) (that is, three or more transformations (inverse)) may be performed in the transformation (inverse transformation). In addition, the encoding (decoding) may be a reversible system or an irreversible system. Furthermore, the quantization (inverse quantization), the prediction, and the like may be skipped. In addition, processes, such as a filter process, not described above may be executed.

<Field of Application of the Present Technique>

The systems, the apparatuses, the processing sections, and the like according to the present technique can be used in arbitrary fields, such as, for example, traffic, medical care, crime prevention, agriculture, livestock industry, mining industry, cosmetics, factories, home equipment, weather, and natural surveillance.

For example, the present technique can also be applied to a system or a device that transmits an image to be viewed. The present technique can also be applied to, for example, a system or a device used for traffic. Furthermore, the present technique can be applied to, for example, a system or a device used for security. The present technique can also be applied to, for example, a system or a device used for sports. Furthermore, the present technique can be applied to, for example, a system or a device used for agriculture. The present technique can also be applied to, for example, a system or a device used for livestock industry. Furthermore, the present technique can be applied to, for example, a system or a device that monitors the state of the nature, such as volcanos, forests, and oceans. The present technique can also be applied to a weather observation system or a weather observation apparatus that observes, for example, the weather, temperature, humidity, wind velocity, sunshine hours, and the like. Furthermore, the present technique can be applied to, for example, a system or a device that observes ecology of the wild life, such as birds, fish, reptiles, amphibians, mammals, insects, and plants.

<Application to Multi-View Image Encoding/Decoding System>

The series of processes can be applied to a multi-view image encoding/decoding system that performs encoding and decoding of multi-view images including images from a plurality of viewpoints (views). In that case, the present technique can be applied to the encoding and decoding from each viewpoint (view).

<Application to Tiered Image Encoding/Decoding System>

In addition, the series of processes can be applied to a tiered image encoding (scalable encoding) and decoding system that encodes and decodes tiered images divided into a plurality of layers (tiers) to provide a scalability function for a predetermined parameter. In that case, the present technique can be applied to the encoding and decoding of each tier (layer).

<Computer>

The series of processes can be executed by hardware or can be executed by software. In the case where the series of processes are executed by software, a program included in the software is installed on a computer. Here, examples of the computer include a computer incorporated into dedicated hardware and a general-purpose personal computer that can execute various functions by installing various programs.

Figure 83:
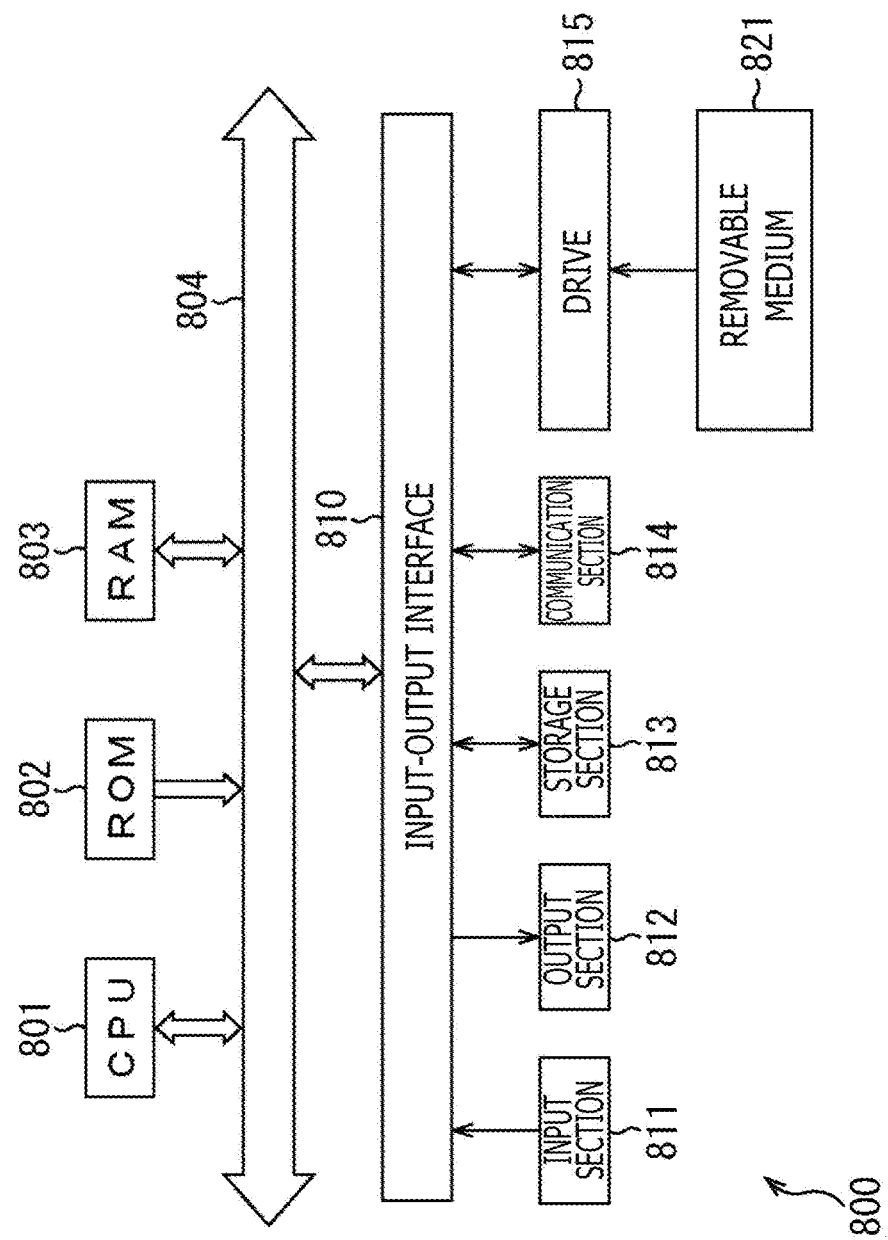
FIG. 83 is a block diagram illustrating a main configuration example of a computer.

FIG. 83 is a block diagram illustrating a configuration example of the hardware of the computer that uses a program to execute the series of processes.

In a computer 800 illustrated in FIG. 83, a CPU (Central Processing Unit) 801, a ROM (Read Only Memory) 802, and a RAM (Random Access Memory) 803 are connected to each other through a bus 804.

An input-output interface 810 is also connected to the bus 804. An input section 811, an output section 812, a storage section 813, a communication section 814, and a drive 815 are connected to the input-output interface 810.

The input section 811 includes, for example, a keyboard, a mouse, a microphone, a touch panel, an input terminal, and the like. The output section 812 includes, for example, a display, a speaker, an output terminal, and the like. The storage section 813 includes, for example, a hard disk, a RAM disk, a non-volatile memory, and the like. The communication section 814 includes, for example, a network interface. The drive 815 drives a removable medium 821, such as a magnetic disk, an optical disk, a magneto-optical disk, and a semiconductor memory.

In the computer configured in this way, the CPU 801 loads, for example, a program stored in the storage section 813 to the RAM 803 through the input-output interface 810 and the bus 804 to execute the program to thereby execute the series of processes. Data and the like necessary for the CPU 801 to execute various processes are also appropriately stored in the RAM 803.

The program executed by the computer (CPU 801) can be applied by, for example, recording the program in the removable medium 821 as a package medium or the like. In this case, the removable medium 821 can be mounted on the drive 815 to install the program on the storage section 813 through the input-output interface 810.

The program can also be provided through a wired or wireless transmission medium, such as a local area network, the Internet, and digital satellite broadcasting. In this case, the program can be received by the communication section 814 and installed on the storage section 813.

In addition, the program can also be installed in advance on the ROM 802 or the storage section 813.

<Application of the Present Technique>

The image encoding apparatus 100 and the image decoding apparatus 200 according to the embodiments can be applied to, for example, various electronic equipment, such as a transmitter and a receiver in the distribution through satellite broadcasting, cable broadcasting like cable TV, or the Internet or in the distribution to a terminal through cellular communication, a recording apparatus that records images in a medium like an optical disk, a magnetic disk, or a flash memory, and a reproduction apparatus that reproduces images from these storage media.

First Application Example: Television Receiver

Figure 84:
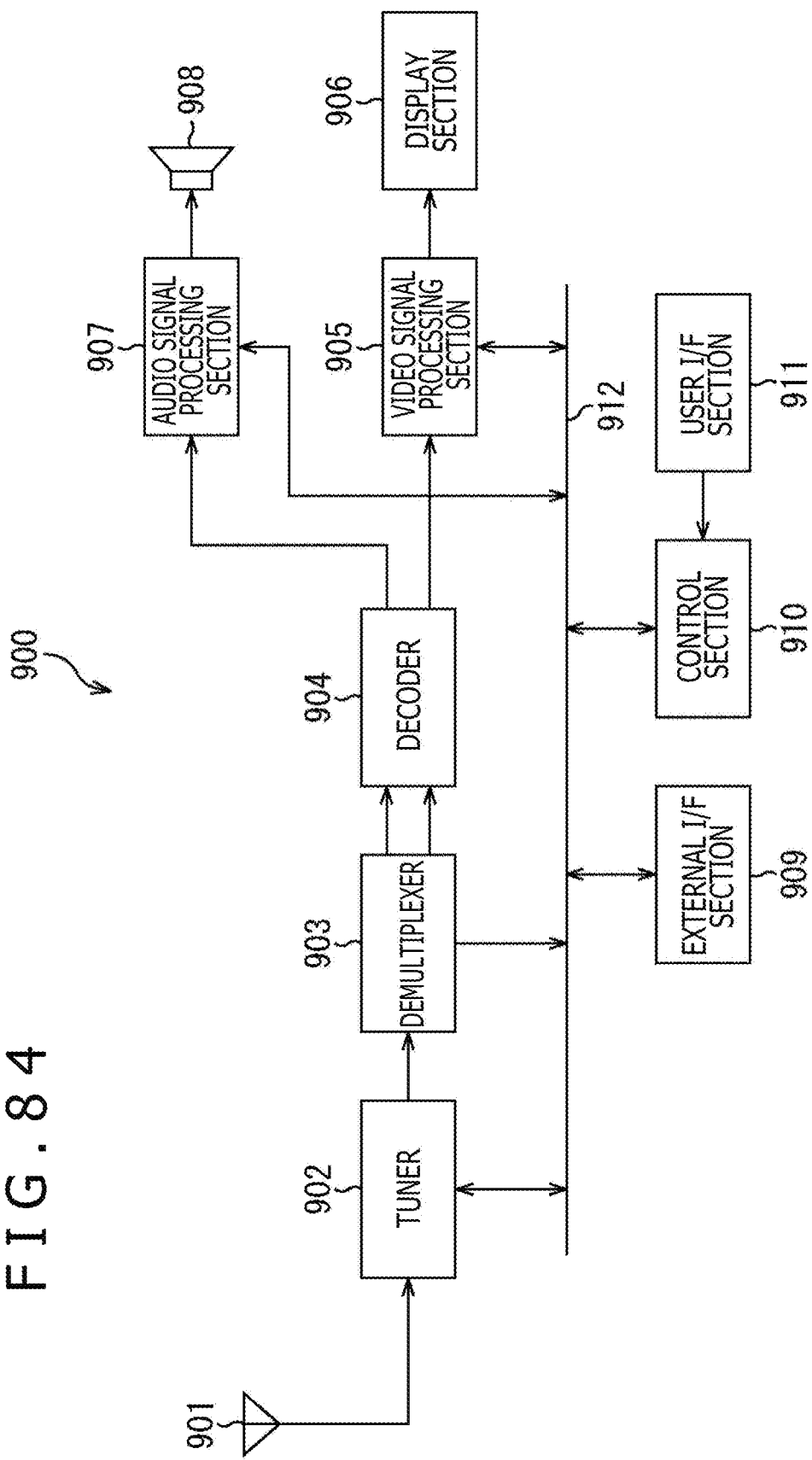
FIG. 84 is a block diagram illustrating an example of a schematic configuration of a television apparatus.

FIG. 84 illustrates an example of a schematic configuration of a television apparatus according to the embodiments. A television apparatus 900 includes an antenna 901, a tuner 902, a demultiplexer 903, a decoder 904, a video signal processing section 905, a display section 906, an audio signal processing section 907, a speaker 908, an external interface (I/F) section 909, a control section 910, a user interface (I/F) section 911, and a bus 912.

The tuner 902 extracts a signal of a desired channel from a broadcast signal received through the antenna 901 and demodulates the extracted signal. The tuner 902 then outputs an encoded bitstream obtained by the demodulation to the demultiplexer 903. That is, the tuner 902 plays a role of a transmission section in the television apparatus 900 that receives an encoded stream in which an image is encoded.

The demultiplexer 903 separates a video stream and an audio stream of a program to be viewed from the encoded bitstream and outputs each of the separated streams to the decoder 904. The demultiplexer 903 also extracts auxiliary data, such as EPG (Electronic Program Guide), from the encoded bitstream and supplies the extracted data to the control section 910. Note that in a case where the encoded bitstream is scrambled, the demultiplexer 903 may descramble the encoded bitstream.

The decoder 904 decodes the video stream and the audio stream input from the demultiplexer 903. The decoder 904 then outputs video data generated in a decoding process to the video signal processing section 905. The decoder 904 also outputs audio data generated in the decoding process to the audio signal processing section 907.

The video signal processing section 905 reproduces the video data input from the decoder 904 and causes the display section 906 to display the video. The video signal processing section 905 may also cause the display section 906 to display an application screen supplied through a network. The video signal processing section 905 may also apply, for example, an additional process, such as noise removal, to the video data according to the setting. The video signal processing section 905 may further generate, for example, an image of GUI (Graphical User Interface), such as a menu, a button, and a cursor, and superimpose the generated image on the output image.

The display section 906 is driven by a drive signal supplied from the video signal processing section 905, and the display section 906 displays a video or an image on a video screen of a display device (for example, liquid crystal display, plasma display, OELD (Organic ElectroLuminescence Display) (organic EL display), or the like).

The audio signal processing section 907 applies a reproduction process, such as D/A conversion and amplification, to the audio data input from the decoder 904 and causes the speaker 908 to output the sound. The audio signal processing section 907 may also apply an additional process, such as noise removal, to the audio data.

The external interface section 909 is an interface for connecting the television apparatus 900 and external equipment or a network. For example, the decoder 904 may decode a video stream or an audio stream received through the external interface section 909. That is, the external interface section 909 also plays a role of a transmission section in the television apparatus 900 that receives an encoded stream in which an image is encoded.

The control section 910 includes a processor, such as a CPU, and a memory, such as a RAM and a ROM. The memory stores a program executed by the CPU, program data, EPG data, data acquired through the network, and the like. The CPU reads and executes the program stored in the memory at, for example, the start of the television apparatus 900. The CPU executes the program to control the operation of the television apparatus 900 according to, for example, an operation signal input from the user interface section 911.

The user interface section 911 is connected to the control section 910. The user interface section 911 includes, for example, a button and a switch for the user to operate the television apparatus 900, a reception section of a remote control signal, and the like. The user interface section 911 detects an operation by the user through these constituent elements to generate an operation signal and outputs the generated operation signal to the control section 910.

The bus 912 mutually connects the tuner 902, the demultiplexer 903, the decoder 904, the video signal processing section 905, the audio signal processing section 907, the external interface section 909, and the control section 910.

In the television apparatus 900 configured in this way, the decoder 904 may have the function of the image decoding apparatus 200. That is, the decoder 904 may use the methods described in the embodiments to decode the encoded data. As a result, the television apparatus 900 can obtain advantageous effects similar to the advantageous effects of the embodiments described with reference to FIGS. 1 to 82.

In addition, in the television apparatus 900 configured in this way, the video signal processing section 905 may be able to, for example, encode the image data supplied from the decoder 904 and output the obtained encoded data to the outside of the television apparatus 900 through the external interface section 909. In addition, the video signal processing section 905 may have the function of the image encoding apparatus 100. That is, the video signal processing section 905 may use the methods described in the embodiments to encode the image data supplied from the decoder 904. As a result, the television apparatus 900 can obtain advantageous effects similar to the advantageous effects of the embodiments described with reference to FIGS. 1 to 82.

Second Application Example: Mobile Phone

Figure 85:
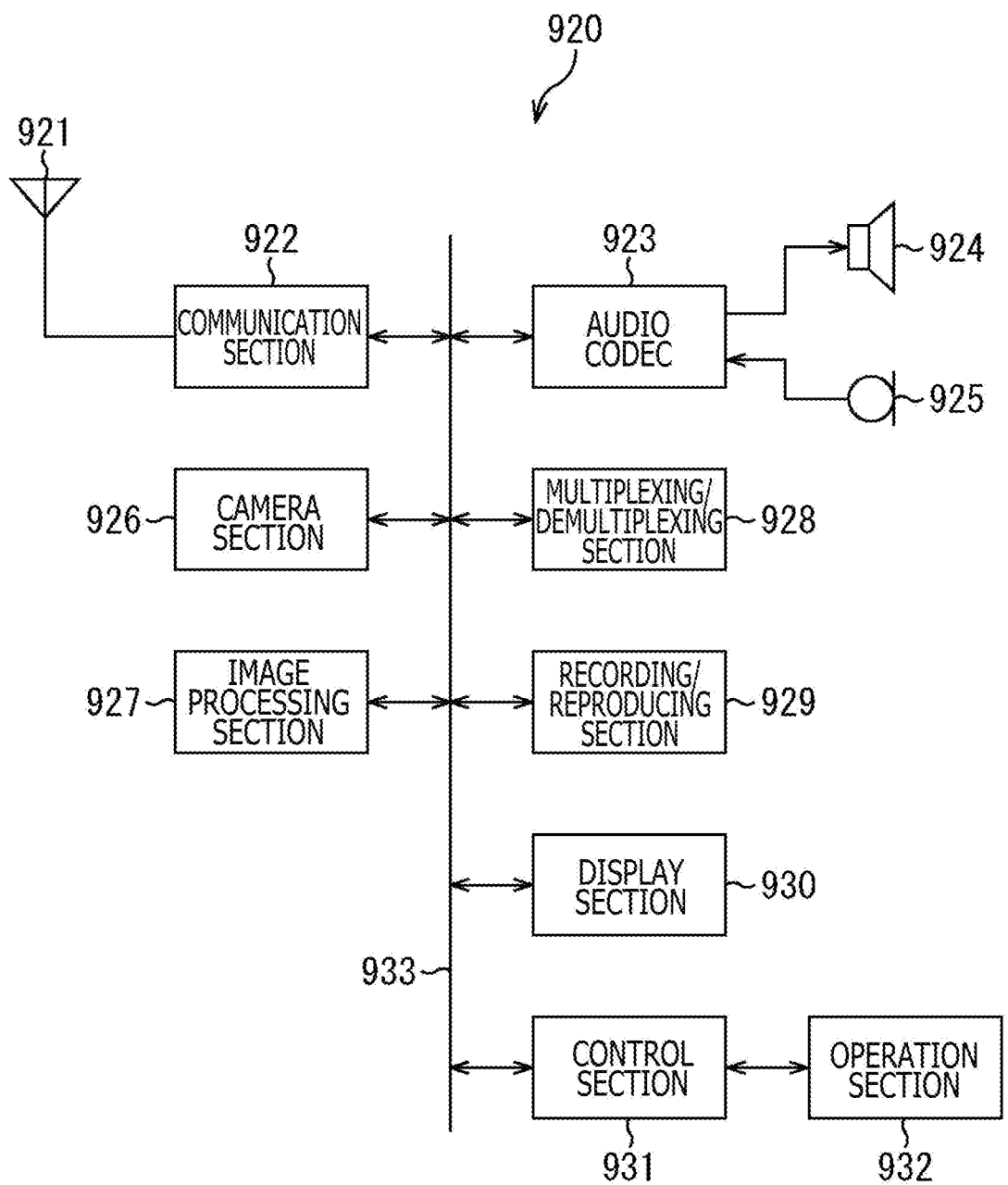
FIG. 85 is a block diagram illustrating an example of a schematic configuration of a mobile phone.

FIG. 85 illustrates an example of a schematic configuration of a mobile phone according to the embodiments. A mobile phone 920 includes an antenna 921, a communication section 922, an audio codec 923, a speaker 924, a microphone 925, a camera section 926, an image processing section 927, a multiplexing/demultiplexing section 928, a recording/reproducing section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 mutually connects the communication section 922, the audio codec 923, the camera section 926, the image processing section 927, the multiplexing/demultiplexing section 928, the recording/reproducing section 929, the display section 930, and the control section 931.

The mobile phone 920 performs operations, such as transmitting and receiving an audio signal, transmitting and receiving email or image data, taking an image, and recording data, in various operation modes including a voice call mode, a data communication mode, an imaging mode, and a TV phone mode.

In the voice call mode, an analog audio signal generated by the microphone 925 is supplied to the audio codec 923. The audio codec 923 converts the analog audio signal into audio data and performs A/D conversion to compress the converted audio data. The audio codec 923 then outputs the audio data after the compression to the communication section 922. The communication section 922 encodes and modulates the audio data to generate a transmission signal. The communication section 922 then transmits the generated transmission signal to a base station (not illustrated) through the antenna 921. The communication section 922 also amplifies a wireless signal received through the antenna 921 and converts the frequency to acquire a reception signal. The communication section 922 then demodulates and decodes the reception signal to generate audio data and outputs the generated audio data to the audio codec 923. The audio codec 923 expands and performs D/A conversion of the audio data to generate an analog audio signal. The audio codec 923 then supplies the generated audio signal to the speaker 924 to output the sound.

In addition, for example, the control section 931 generates character data of an email according to an operation by the user through the operation section 932 in the data communication mode. The control section 931 also causes the display section 930 to display the characters. The control section 931 also generates email data according to a transmission instruction from the user through the operation section 932 and outputs the generated email data to the communication section 922. The communication section 922 encodes and modulates the email data to generate a transmission signal. The communication section 922 then transmits the generated transmission signal to a base station (not illustrated) through the antenna 921. The communication section 922 also amplifies a wireless signal received through the antenna 921 and converts the frequency to acquire a reception signal. The communication section 922 then demodulates and decodes the reception signal to restore email data and outputs the restored email data to the control section 931. The control section 931 causes the display section 930 to display the content of the email and supplies the email data to the recording/reproducing section 929 to write the email data to a storage medium of the recording/reproducing section 929.

The recording/reproducing section 929 includes an arbitrary read/write storage medium. For example, the storage medium may be a built-in storage medium, such as a RAM and a flash memory, or may be an externally mounted storage medium, such as a hard disk, a magnetic disk, a magneto-optical disk, an optical disk, a USB (Universal Serial Bus) memory, and a memory card.

In addition, for example, the camera section 926 takes an image of a subject to generate image data and outputs the generated image data to the image processing section 927 in the imaging mode. The image processing section 927 encodes the image data input from the camera section 926 and supplies the encoded stream to the recording/reproducing section 929 to write the encoded stream to the storage medium of the recording/reproducing section 929.

Furthermore, the recording/reproducing section 929 reads an encoded stream recorded in the storage medium and outputs the encoded stream to the image processing section 927 in the image display mode. The image processing section 927 decodes the encoded stream input from the recording/reproducing section 929 and supplies the image data to the display section 930 to display the image.

In addition, for example, the multiplexing/demultiplexing section 928 multiplexes a video stream encoded by the image processing section 927 and an audio stream input from the audio codec 923 and outputs a multiplexed stream to the communication section 922 in the TV phone mode. The communication section 922 encodes and modulates the stream to generate a transmission signal. The communication section 922 then transmits the generated transmission signal to a base station (not illustrated) through the antenna 921. The communication section 922 also amplifies a wireless signal received through the antenna 921 and converts the frequency to acquire a reception signal. The transmission signal and the reception signal can include encoded bitstreams. The communication section 922 then demodulates and decodes the reception signal to restore the stream and outputs the restored stream to the multiplexing/demultiplexing section 928. The multiplexing/demultiplexing section 928 separates a video stream and an audio stream from the input stream, outputs the video stream to the image processing section 927, and outputs the audio stream to the audio codec 923. The image processing section 927 decodes the video stream to generate video data. The video data is supplied to the display section 930, and the display section 930 displays a series of images. The audio codec 923 expands and performs D/A conversion of the audio stream to generate an analog audio signal. The audio codec 923 then supplies the generated audio signal to the speaker 924 to output the sound.

In the mobile phone 920 configured in this way, the image processing section 927 may have, for example, the function of the image encoding apparatus 100. That is, the image processing section 927 may use the methods described in the embodiments to encode the image data. As a result, the mobile phone 920 can obtain advantageous effects similar to the advantageous effects of the embodiments described with reference to FIGS. 1 to 82.

In addition, in the mobile phone 920 configured in this way, the image processing section 927 may have, for example, the function of the image decoding apparatus 200. That is, the image processing section 927 may use the methods described in the embodiments to decode the encoded data. As a result, the mobile phone 920 can obtain advantageous effects similar to the advantageous effects of the embodiments described with reference to FIGS. 1 to 82.

Third Application Example: Recording/Reproducing Apparatus

Figure 86:
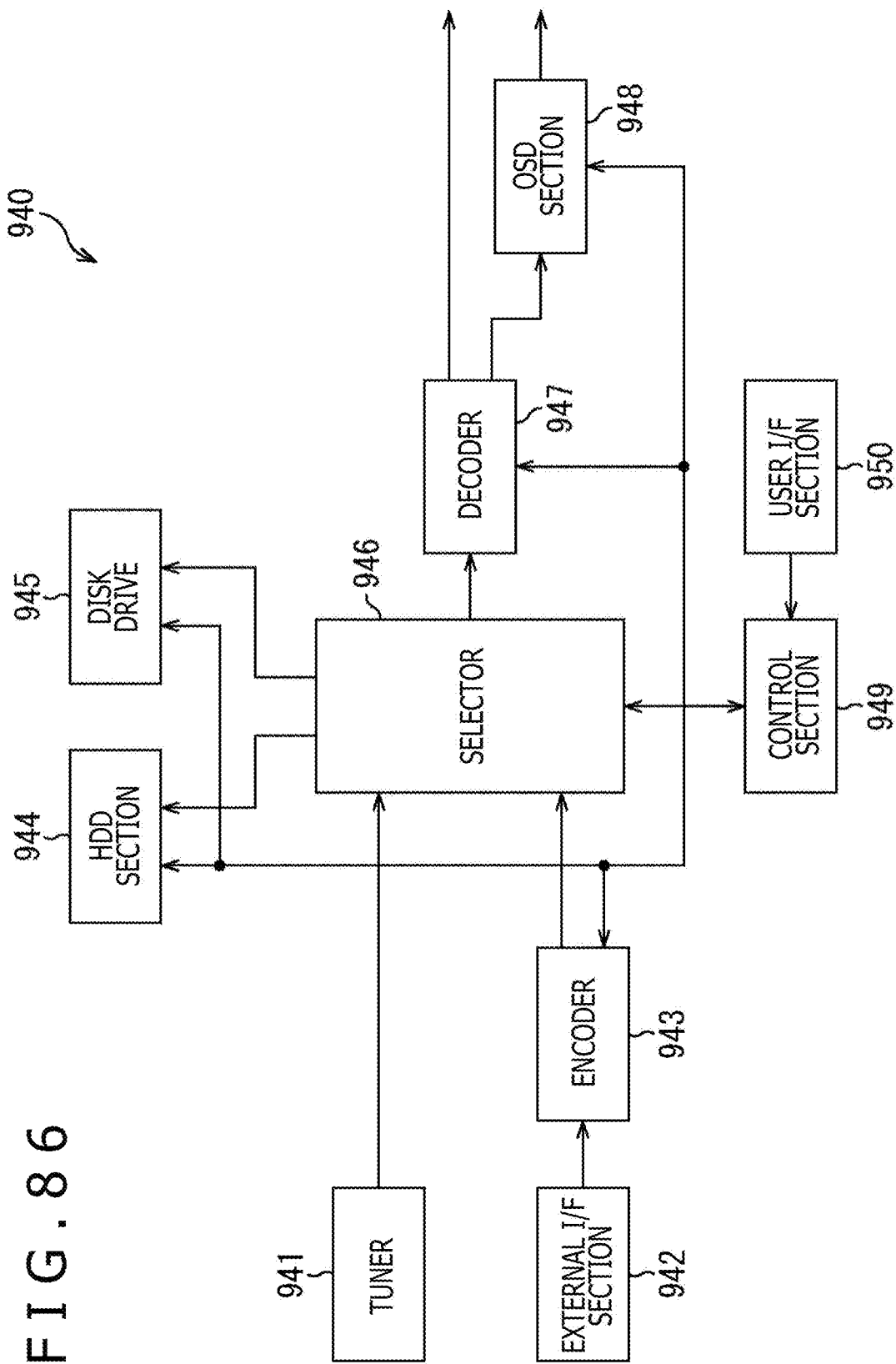
FIG. 86 is a block diagram illustrating an example of a schematic configuration of a recording/reproducing apparatus.

FIG. 86 illustrates an example of a schematic configuration of a recording/reproducing apparatus according to the embodiments. For example, a recording/reproducing apparatus 940 encodes audio data and video data of a received broadcast program and records the audio data and the video data in a recording medium. The recording/reproducing apparatus 940 may also encode audio data and video data acquired from another apparatus and record the audio data and the video data in the recording medium, for example. The recording/reproducing apparatus 940 also reproduces data recorded in the recording medium on a monitor and a speaker according to an instruction of the user, for example. In this case, the recording/reproducing apparatus 940 decodes audio data and video data.

The recording/reproducing apparatus 940 includes a tuner 941, an external interface (I/F) section 942, an encoder 943, an HDD (Hard Disk Drive) section 944, a disk drive 945, a selector 946, a decoder 947, an OSD (On-Screen Display) section 948, a control section 949, and a user interface (I/F) section 950.

The tuner 941 extracts a signal of a desired channel from a broadcast signal received through an antenna (not illustrated) and demodulates the extracted signal. The tuner 941 then outputs an encoded bitstream obtained by the demodulation to the selector 946. That is, the tuner 941 plays a role of a transmission section in the recording/reproducing apparatus 940.

The external interface section 942 is an interface for connecting the recording/reproducing apparatus 940 and external equipment or a network. The external interface section 942 may be, for example, an IEEE (Institute of Electrical and Electronic Engineers) 1394 interface, a network interface, a USB interface, a flash memory interface, or the like. For example, video data and audio data received through the external interface section 942 are input to the encoder 943. That is, the external interface section 942 plays a role of a transmission section in the recording/reproducing apparatus 940.

The encoder 943 encodes video data and audio data in a case where the video data and the audio data input from the external interface section 942 are not encoded. The encoder 943 then outputs an encoded bitstream to the selector 946.

The HDD section 944 records encoded bitstreams including compressed content data of video, sound, and the like, various programs, and other data in an internal hard disk. The HDD section 944 also reads the data from the hard disk at the reproduction of the video and the sound.

The disk drive 945 records and reads data to and from a mounted recording medium. The recording medium mounted on the disk drive 945 may be, for example, a DVD (Digital Versatile Disc) disk (DVD-Video, DVD-RAM (DVD-Random Access Memory), DVD-R (DVD-Recordable), DVD-RW (DVD-Rewritable), DVD+R (DVD+Recordable), DVD+RW (DVD+Rewritable), or the like), a Blu-ray (registered trademark) disk, or the like.

At the recording of the video and the sound, the selector 946 selects an encoded bitstream input from the tuner 941 or the encoder 943 and outputs the selected encoded bitstream to the HDD 944 or the disk drive 945. In addition, at the reproduction of the video and the sound, the selector 946 outputs the encoded bitstream input from the HDD 944 or the disk drive 945 to the decoder 947.

The decoder 947 decodes the encoded bitstream to generate video data and audio data. The decoder 947 then outputs the generated video data to the OSD section 948. In addition, the decoder 947 outputs the generated audio data to an external speaker.

The OSD section 948 reproduces the video data input from the decoder 947 and displays the video. The OSD section 948 may also superimpose, for example, an image of GUI, such as a menu, a button, and a cursor, on the displayed video.

The control section 949 includes a processor, such as a CPU, and a memory, such as a RAM and a ROM. The memory stores a program executed by the CPU, program data, and the like. The CPU reads and executes the program stored in the memory at, for example, the start of the recording/reproducing apparatus 940. The CPU executes the program to control the operation of the recording/reproducing apparatus 940 according to, for example, an operation signal input from the user interface section 950.

The user interface section 950 is connected to the control section 949. The user interface section 950 includes, for example, a button and a switch for the user to operate the recording/reproducing apparatus 940, a reception section of a remote control signal, and the like. The user interface section 950 detects an operation by the user through these constituent elements to generate an operation signal and outputs the generated operation signal to the control section 949.

In the recording/reproducing apparatus 940 configured in this way, the encoder 943 may have, for example, the function of the image encoding apparatus 100. That is, the encoder 943 may use the methods described in the embodiments to encode the image data. As a result, the recording/reproducing apparatus 940 can obtain advantageous effects similar to the advantageous effects of the embodiments described with reference to FIGS. 1 to 82.

Furthermore, in the recording/reproducing apparatus 940 configured in this way, the decoder 947 may have, for example, the function of the image decoding apparatus 200. That is, the decoder 947 may use the methods described in the embodiments to decode the encoded data. As a result, the recording/reproducing apparatus 940 can obtain advantageous effects similar to the advantageous effects of the embodiments described with reference to FIGS. 1 to 82.

Fourth Application Example: Imaging Apparatus

Figure 87:
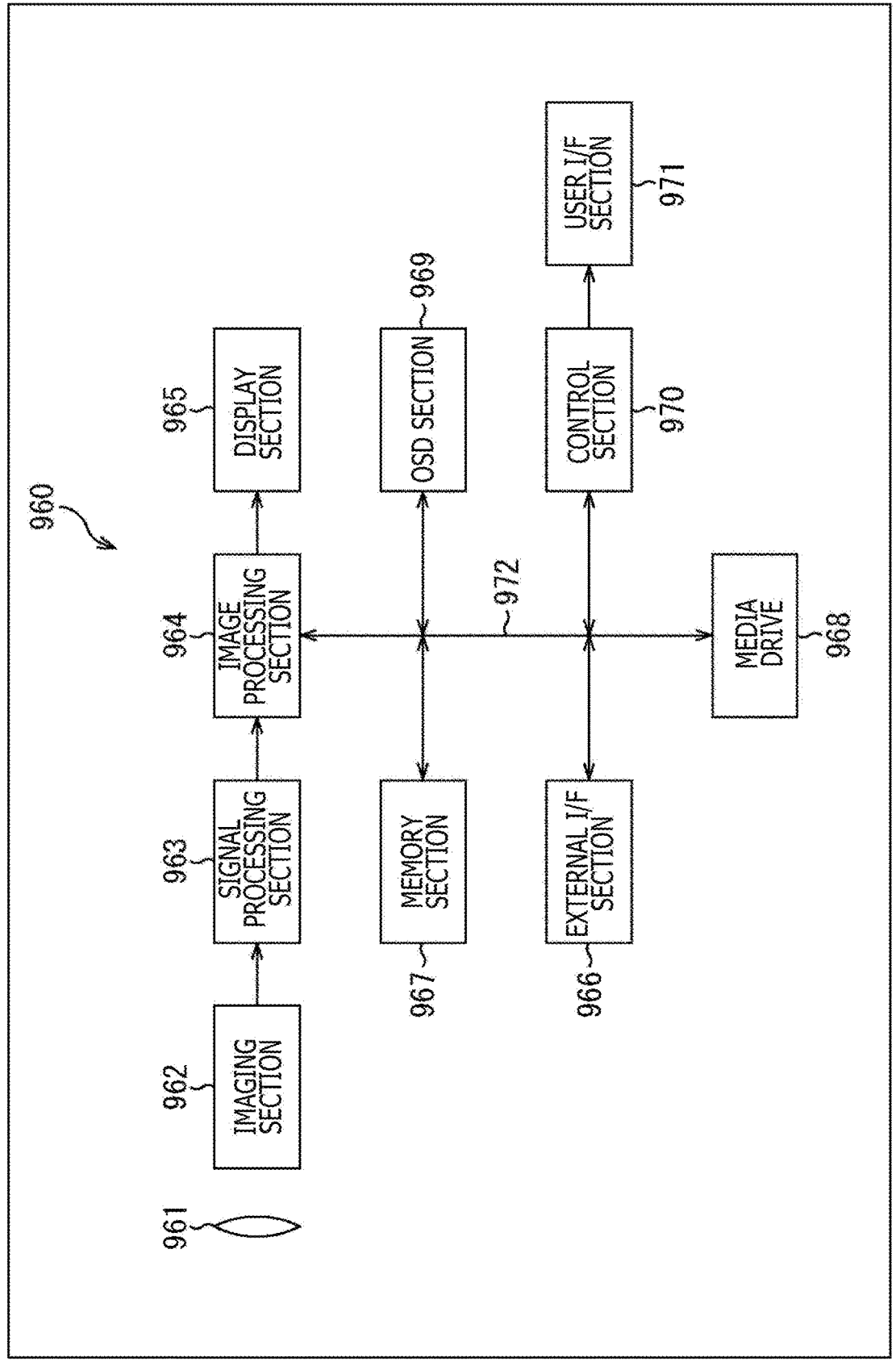
FIG. 87 is a block diagram illustrating an example of a schematic configuration of an imaging apparatus.

FIG. 87 illustrates an example of a schematic configuration of an imaging apparatus according to the embodiments. An imaging apparatus 960 images a subject, generates an image, encodes image data, and records the image data in a recording medium.

The imaging apparatus 960 includes an optical block 961, an imaging section 962, a signal processing section 963, an image processing section 964, a display section 965, an external interface (I/F) section 966, a memory section 967, a media drive 968, an OSD section 969, a control section 970, a user interface (I/F) section 971, and a bus 972.

The optical block 961 is connected to the imaging section 962. The imaging section 962 is connected to the signal processing section 963. The display section 965 is connected to the image processing section 964. The user interface section 971 is connected to the control section 970. The bus 972 mutually connects the image processing section 964, the external interface section 966, the memory section 967, the media drive 968, the OSD section 969, and the control section 970.

The optical block 961 includes a focus lens, a diaphragm mechanism, and the like. The optical block 961 forms an optical image of the subject on an imaging surface of the imaging section 962. The imaging section 962 includes an image sensor, such as a CCD (Charge Coupled Device) and a CMOS (Complementary Metal Oxide Semiconductor), and performs photoelectric conversion of the optical image formed on the imaging surface to convert the optical image into an image signal as an electrical signal. The imaging section 962 then outputs the image signal to the signal processing section 963.

The signal processing section 963 applies various types of camera signal processing, such as knee correction, gamma correction, and color correction, to the image signal input from the imaging section 962. The signal processing section 963 outputs the image data after the camera signal processing to the image processing section 964.

The image processing section 964 encodes the image data input from the signal processing section 963 to generate encoded data. The image processing section 964 then outputs the generated encoded data to the external interface section 966 or the media drive 968. The image processing section 964 also decodes encoded data input from the external interface section 966 or the media drive 968 to generate image data. The image processing section 964 then outputs the generated image data to the display section 965. The image processing section 964 may also output the image data input from the signal processing section 963 to the display section 965 to display the image. The image processing section 964 may also superimpose display data acquired from the OSD section 969 on the image output to the display section 965.

The OSD section 969 generates, for example, an image of GUI, such as a menu, a button, and a cursor, and outputs the generated image to the image processing section 964.

The external interface section 966 is provided as, for example, a USB input/output terminal. The external interface section 966 connects, for example, the imaging apparatus 960 and a printer at the printing of an image. A drive is also connected to the external interface section 966 as necessary. A removable medium, such as, for example, a magnetic disk and an optical disk, is mounted on the drive, and a program read from the removable medium can be installed on the imaging apparatus 960. Furthermore, the external interface section 966 may be provided as a network interface connected to a network, such as a LAN and the Internet. That is, the external interface section 966 plays a role of a transmission section in the imaging apparatus 960.

A recording medium mounted on the media drive 968 may be, for example, an arbitrary read/write removable medium, such as a magnetic disk, a magneto-optical disk, an optical disk, and a semiconductor memory. In addition, the recording medium may be fixed and mounted on the media drive 968 to provide, for example, a non-portable storage section, such as a built-in hard disk drive and an SSD (Solid State Drive).

The control section 970 includes a processor, such as a CPU, and a memory, such as a RAM and a ROM. The memory stores a program executed by the CPU, program data, and the like. The CPU reads and executes the program stored in the memory at, for example, the start of the imaging apparatus 960. The CPU executes the program to control the operation of the imaging apparatus 960 according to, for example, an operation signal input from the user interface section 971.

The user interface section 971 is connected to the control section 970. The user interface section 971 includes, for example, a button, a switch, and the like for the user to operate the imaging apparatus 960. The user interface section 971 detects an operation by the user through these constituent elements to generate an operation signal and outputs the generated operation signal to the control section 970.

In the imaging apparatus 960 configured in this way, the image processing section 964 may have, for example, the function of the image encoding apparatus 100. That is, the image processing section 964 may use the methods described in the embodiments to encode the image data. As a result, the imaging apparatus 960 can obtain advantageous effects similar to the advantageous effects of the embodiments described with reference to FIGS. 1 to 82.

In addition, in the imaging apparatus 960 configured in this way, the image processing section 964 may have, for example, the function of the image decoding apparatus 200. That is, the image processing section 964 may use the methods described in the embodiments to decode the encoded data. As a result, the imaging apparatus 960 can obtain advantageous effects similar to the advantageous effects of the embodiments described with reference to FIGS. 1 to 82.

Fifth Application Example: Video Set

Figure 88:
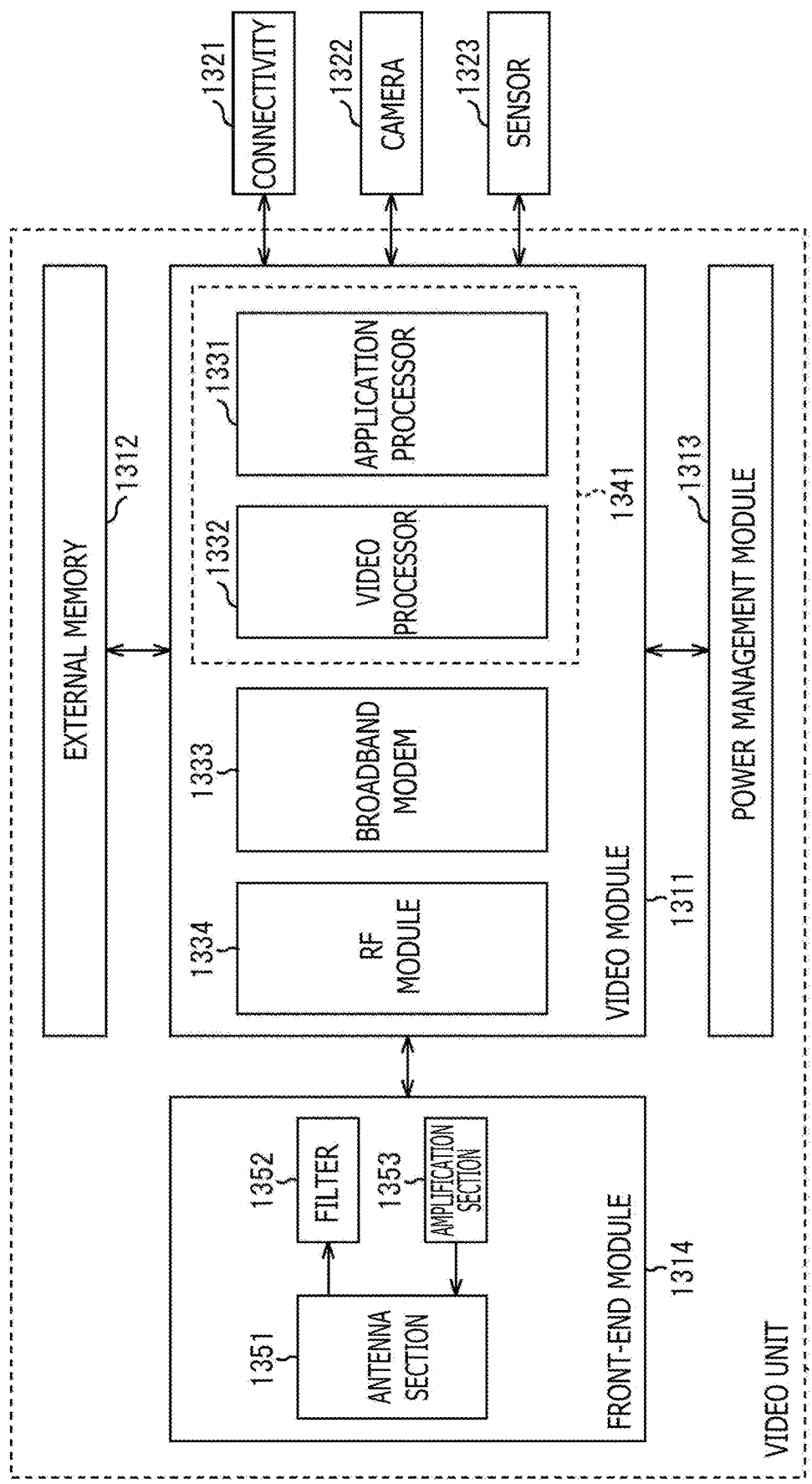
FIG. 88 is a block diagram illustrating an example of a schematic configuration of a video set.

The present technique can also be carried out in any configuration mounted on an apparatus included in an arbitrary apparatus or system, such as, for example, a processor as system LSI (Large Scale Integration) or the like, a module using a plurality of processors or the like, a unit using a plurality of modules or the like, and a set provided with other functions in addition to the unit (that is, configuration of part of an apparatus). FIG. 88 illustrates an example of a schematic configuration of a video set according to the present technique.

In recent years, electronic equipment is provided with more functions, and in the development or manufacturing of the electronic devices, there is a case where the configuration of part of the electronic devices is implemented by selling or providing the configuration. Instead of implementing the configuration as a configuration having one function, a plurality of configurations with related functions are often combined to implement the configurations as one set provided with a plurality of functions.

A video set 1300 illustrated in FIG. 88 has such a configuration with multiple functions, and a device having functions regarding encoding or decoding (one or both encoding and decoding) of images is combined with a device having other functions related to the functions.

As illustrated in FIG. 88, a video set 1300 includes a module group, such as a video module 1311, an external memory 1312, a power management module 1313, and a front-end module 1314, and a device having related functions, such as a connectivity 1321, a camera 1322, and a sensor 1323.

The modules are components with integrated functions, in which some functions of components related to each other are integrated. The specific physical configuration is arbitrary, and for example, a plurality of processors with respective functions, electronic circuit elements, such as resistors and capacitors, and other devices can be arranged and integrated on a wiring board or the like. In addition, other modules, processors, and the like can be combined with the modules to provide new modules.

In the case of the example of FIG. 88, components with functions regarding image processing are combined in the video module 1311, and the video module 1311 includes an application processor, a video processor, a broadband modem 1333, and an RF module 1334.

The processor includes components with predetermined functions integrated on a semiconductor chip based on SoC (System On a Chip), and there is also a processor called, for example, system LSI (Large Scale Integration) or the like. The components with predetermined functions may be a logic circuit (hardware configuration), may be a CPU, a ROM, a RAM, and a program executed by using them (software configuration), or may be a combination of them. For example, the processor may include the logic circuit as well as the CPU, the ROM, the RAM, and the like, and part of the functions may be realized by the logic circuit (hardware configuration). The other functions may be realized by the program executed by the CPU (software configuration).

An application processor 1331 of FIG. 88 is a processor that executes an application regarding image processing. The application executed by the application processor 1331 can not only execute a computing process, but can also control, for example, components inside and outside of the video module 1311, such as a video processor 1332, as necessary in order to realize a predetermined function.

The video processor 1332 is a processor with a function regarding encoding or decoding (one or both encoding and decoding) of an image.

The broadband modem 1333 performs digital modulation or the like of data (digital signal) to be transmitted in wired or wireless (or both wired and wireless) broadband communication performed through a broadband circuit, such as the Internet and a public phone network, to convert the data into an analog signal and demodulates an analog signal received in the broadband communication to convert the analog signal into data (digital signal). The broadband modem 1333 processes, for example, arbitrary information, such as image data to be processed by the video processor 1332, a stream including encoded image data, an application program, and configuration data.

The RF module 1334 is a module that applies frequency conversion, modulation and demodulation, amplification, a filtering process, and the like to an RF (Radio Frequency) signal transmitted and received through an antenna. For example, the RF module 1334 applies frequency conversion or the like to a baseband signal generated by the broadband modem 1333 to generate an RF signal. In addition, the RF module 1334 applies, for example, frequency conversion or the like to an RF signal received through the front-end module 1314 to generate a baseband signal.

Note that as indicated by a dotted line 1341 in FIG. 88, the application processor 1331 and the video processor 1332 may be integrated to provide one processor.

The external memory 1312 is a module provided outside of the video module 1311 and including a storage device used by the video module 1311. The storage device of the external memory 1312 may be realized by any physical configuration. However, the storage device is generally used to store high-capacity data, such as frame-based image data, in many cases. Therefore, it is desirable to realize the storage device by, for example, a relatively inexpensive high-capacity semiconductor memory, such as a DRAM (Dynamic Random Access Memory).

The power management module 1313 manages and controls power supplied to the video module 1311 (each component in the video module 1311).

The front-end module 1314 is a module that provides a front-end function (circuit at transmitting and receiving end of antenna side) to the RF module 1334. As illustrated in FIG. 88, the front-end module 1314 includes, for example, an antenna section 1351, a filter 1352, and an amplification section 1353.

The antenna section 1351 includes an antenna that transmits and receives wireless signals and further includes components around the antenna. The antenna section 1351 transmits a wireless signal of a signal supplied from the amplification section 1353 and supplies an electrical signal (RF signal) of a received wireless signal to the filter 1352. The filter 1352 applies a filtering process or the like to the RF signal received through the antenna section 1351 and supplies the RF signal after the process to the RF module 1334. The amplification section 1353 amplifies the RF signal supplied from the RF module 1334 and supplies the RF signal to the antenna section 1351.

The connectivity 1321 is a module with a function regarding connection to the outside. The physical configuration of the connectivity 1321 is arbitrary. For example, the connectivity 1321 includes a component with a communication function of a standard other than the communication standard corresponding to the broadband modem 1333 and further includes an external input-output terminal and the like.

For example, the connectivity 1321 may include: a module with a communication function in compliance with a wireless communication standard, such as Bluetooth (registered trademark), IEEE 802.11 (for example, Wi-Fi (Wireless Fidelity, registered trademark)), NFC (Near Field Communication), and IrDA (InfraRed Data Association); an antenna that transmits and receives a signal in compliance with the standard; and the like. The connectivity 1321 may also include, for example, a module with a communication function in compliance with a wired communication standard, such as USB (Universal Serial Bus) and HDMI (registered trademark) (High-Definition Multimedia Interface), and a terminal in compliance with the standard. The connectivity 1321 may further include, for example, other data (signal) transmission functions and the like, such as an analog input-output terminal.

Note that the connectivity 1321 may include a device of a transmission destination of data (signal). For example, the connectivity 1321 may include a drive (including not only a drive of a removable medium, but also a hard disk, an SSD (Solid State Drive), a NAS (Network Attached Storage), and the like) that reads and writes data to a recording medium, such as a magnetic disk, an optical disk, a magneto-optical disk, and a semiconductor memory. The connectivity 1321 may also include an output device (such as a monitor and a speaker) of images and sound.

The camera 1322 is a module with a function of imaging a subject to obtain image data of the subject. The image data obtained by the imaging of the camera 1322 is supplied to and encoded by, for example, the video processor 1332.

The sensor 1323 is, for example, a module with arbitrary sensor functions, such as an audio sensor, an ultrasonic sensor, an optical sensor, an illumination sensor, an infrared sensor, an image sensor, a rotation sensor, an angle sensor, an angular velocity sensor, a speed sensor, an acceleration sensor, a tilt sensor, a magnetic identification sensor, an impact sensor, and a temperature sensor. Data detected by the sensor 1323 is supplied to, for example, the application processor 1331 and used by an application or the like.

The configurations of the modules described above may be realized by processors, and conversely, the configurations of the processors described above may be realized by modules.

In the video set 1300 configured as described above, the present technique can be applied to the video processor 1332 as described later. Therefore, the video set 1300 can be carried out as a set according to the present technique.

<Configuration Example of Video Processor>

Figure 89:
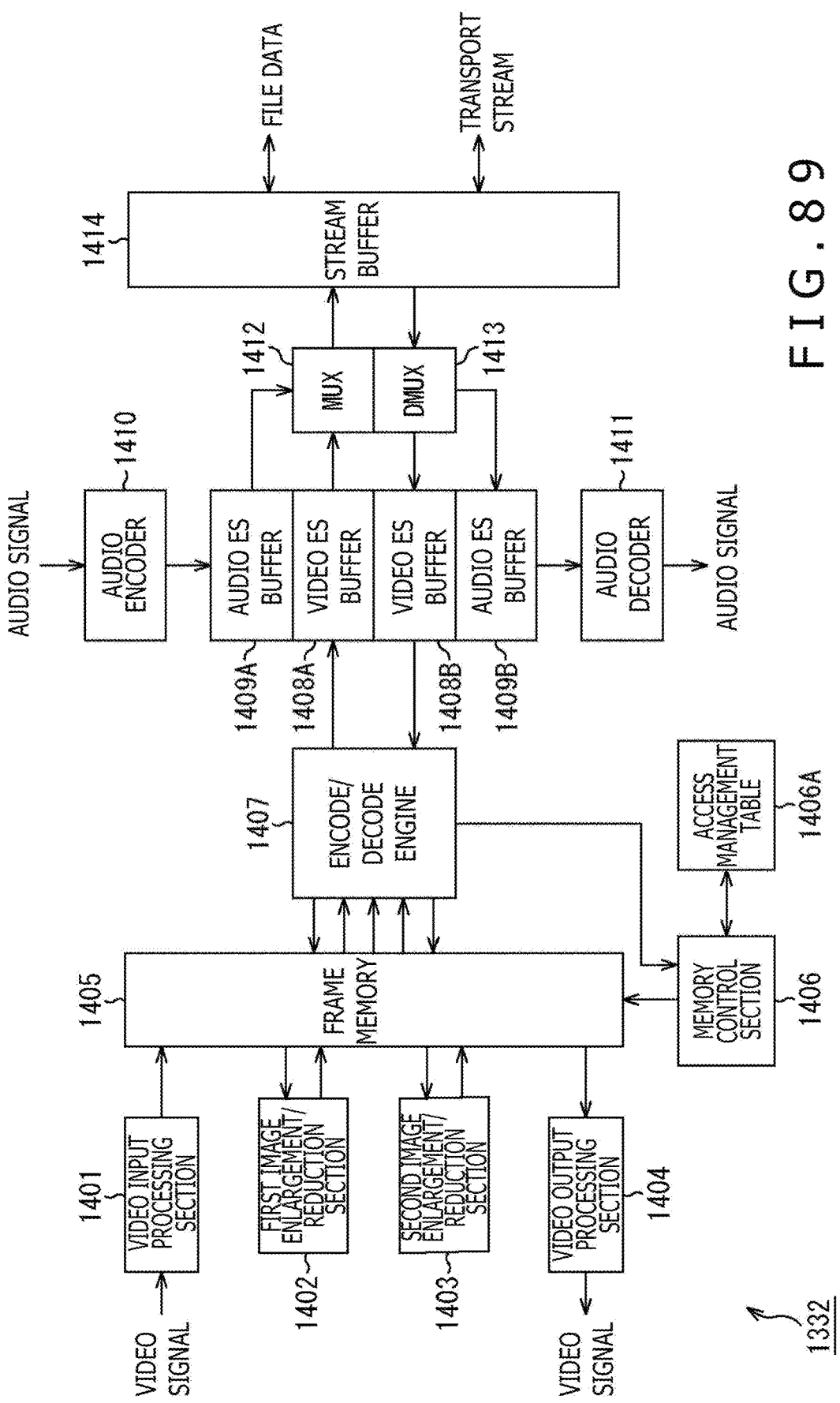
FIG. 89 is a block diagram illustrating an example of a schematic configuration of a video processor.

FIG. 89 illustrates an example of a schematic configuration of the video processor 1332 (FIG. 88) according to the present technique.

In the case of the example of FIG. 89, the video processor 1332 has a function of receiving an input of a video signal and an audio signal and using a predetermined system to encode the signals and has a function of decoding encoded video data and audio data and reproducing and outputting a video signal and an audio signal.

As illustrated in FIG. 89, the video processor 1332 includes a video input processing section 1401, a first image enlargement/reduction section 1402, a second image enlargement/reduction section 1403, a video output processing section 1404, a frame memory 1405, and a memory control section 1406. The video processor 1332 also includes an encode/decode engine 1407, video ES (Elementary Stream) buffers 1408A and 1408B, and audio ES buffers 1409A and 1409B. The video processor 1332 further includes an audio encoder 1410, an audio decoder 1411, a multiplexing section (MUX (Multiplexer)) 1412, a demultiplexing section (DMUX (Demultiplexer)) 1413, and a stream buffer 1414.

The video input processing section 1401 acquires, for example, a video signal input from the connectivity 1321 (FIG. 88) or the like and converts the video signal into digital image data. The first image enlargement/reduction section 1402 applies format conversion, enlargement/reduction processing of image, or the like to the image data. The second image enlargement/reduction section 1403 applies enlargement/reduction processing of image to the image data according to the format at the destination of the output through the video output processing section 1404 and applies format conversion, enlargement/reduction processing of image, or the like to the image data as in the first image enlargement/reduction section 1402. The video output processing section 1404 performs operations, such as converting the format of the image data and converting the image data into an analog signal, and outputs a reproduced video signal to, for example, the connectivity 1321 or the like.

The frame memory 1405 is a memory for image data shared by the video input processing section 1401, the first image enlargement/reduction section 1402, the second image enlargement/reduction section 1403, the video output processing section 1404, and the encode/decode engine 1407. The frame memory 1405 is realized as, for example, a semiconductor memory, such as a DRAM.

The memory control section 1406 receives a synchronization signal from the encode/decode engine 1407 to control the access for writing and reading to and from the frame memory 1405 according to a schedule for accessing the frame memory 1405 written in an access management table 1406A. The access management table 1406A is updated by the memory control section 1406 according to the process executed by the encode/decode engine 1407, the first image enlargement/reduction section 1402, the second image enlargement/reduction section 1403, or the like.

The encode/decode engine 1407 executes an encoding process of image data and a decoding process of a video stream in which image data is encoded data. For example, the encode/decode engine 1407 encodes image data read from the frame memory 1405 and sequentially writes video streams to the video ES buffer 1408A. In addition, for example, the encode/decode engine 1407 sequentially reads video streams from the video ES buffer 1408B to decode the video streams and sequentially writes image data to the frame memory 1405. The encode/decode engine 1407 uses the frame memory 1405 as a work area in the encoding and the decoding. The encode/decode engine 1407 also outputs a synchronization signal to the memory control section 1406 at a timing of, for example, the start of the process for each macroblock.

The video ES buffer 1408A buffers a video stream generated by the encode/decode engine 1407 and supplies the video stream to the multiplexing section (MUX) 1412. The video ES buffer 1408B buffers a video stream supplied from the demultiplexing section (DMUX) 1413 and supplies the video stream to the encode/decode engine 1407.

The audio ES buffer 1409A buffers an audio stream generated by the audio encoder 1410 and supplies the audio stream to the multiplexing section (MUX) 1412. The audio ES buffer 1409B buffers an audio stream supplied from the demultiplexing section (DMUX) 1413 and supplies the audio stream to the audio decoder 1411.

The audio encoder 1410 performs, for example, digital conversion of an audio signal input from, for example, the connectivity 1321 or the like and uses, for example, a predetermined system, such as an MPEG audio system and an AC3 (AudioCode number 3) system, to encode the audio signal. The audio encoder 1410 sequentially writes, to the audio ES buffer 1409A, audio streams that are data in which the audio signal is encoded. The audio decoder 1411 decodes the audio stream supplied from the audio ES buffer 1409B, performs an operation, such as, for example, converting the audio stream into an analog signal, and supplies a reproduced audio signal to, for example, the connectivity 1321 or the like.

The multiplexing section (MUX) 1412 multiplexes a video stream and an audio stream. The method of multiplexing (that is, the format of the bitstream generated by multiplexing) is arbitrary. In the multiplexing, the multiplexing section (MUX) 1412 can also add predetermined header information or the like to the bitstream. That is, the multiplexing section (MUX) 1412 can convert the format of the stream by multiplexing. For example, the multiplexing section (MUX) 1412 multiplexes the video stream and the audio stream to convert the streams into a transport stream that is a bitstream in a format for transfer. In addition, for example, the multiplexing section (MUX) 1412 multiplexes the video stream and the audio stream to convert the streams into data (file data) in a file format for recording.

The demultiplexing section (DMUX) 1413 uses a method corresponding to the multiplexing by the multiplexing section (MUX) 1412 to demultiplex a bitstream in which a video stream and an audio stream are multiplexed. That is, the demultiplexing section (DMUX) 1413 extracts the video stream and the audio stream (separates the video stream and the audio stream) from the bitstream read from the stream buffer 1414. That is, the demultiplexing section (DMUX) 1413 can demultiplex the stream to convert the format of the stream (inverse conversion of the conversion by the multiplexing section (MUX) 1412). For example, the demultiplexing section (DMUX) 1413 can acquire a transport stream supplied from, for example, the connectivity 1321, the broadband modem 1333, or the like through the stream buffer 1414 and demultiplex the transport stream to convert the transport stream into a video stream and an audio stream. In addition, for example, the demultiplexing section (DMUX) 1413 can acquire file data read from various recording media by, for example, the connectivity 1321 through the stream buffer 1414 and demultiplex the file data to convert the file data into a video stream and an audio stream.

The stream buffer 1414 buffers a bitstream. For example, the stream buffer 1414 buffers a transport stream supplied from the multiplexing section (MUX) 1412 and supplies the transport stream to, for example, the connectivity 1321, the broadband modem 1333, or the like at a predetermined timing or based on a request or the like from the outside.

In addition, for example, the stream buffer 1414 buffers file data supplied from the multiplexing section (MUX) 1412 and supplies the file data to, for example, the connectivity 1321 or the like at a predetermined timing or based on a request or the like from the outside to record the file data in various recording media.

The stream buffer 1414 further buffers a transport stream acquired through, for example, the connectivity 1321, the broadband modem 1333, or the like and supplies the transport stream to the demultiplexing section (DMUX) 1413 at a predetermined timing or based on a request or the like from the outside.

The stream buffer 1414 also buffers file data read from various recording media by, for example, the connectivity 1321 or the like and supplies the file data to the demultiplexing section (DMUX) 1413 at a predetermined timing or based on a request or the like from the outside.

Next, an example of an operation of the video processor 1332 configured in this way will be described. For example, the video input processing section 1401 converts the video signal input from the connectivity 1321 or the like to the video processor 1332 into digital image data of a predetermined system, such as a 4:2:2 Y/Cb/Cr system, and sequentially writes the digital image data to the frame memory 1405. The first image enlargement/reduction section 1402 or the second image enlargement/reduction section 1403 reads the digital image data to convert the format into a predetermined system, such as a 4:2:0 Y/Cb/Cr system, and execute enlargement/reduction processing. The digital image data is written again to the frame memory 1405. The encode/decode engine 1407 encodes the image data, and the video stream is written to the video ES buffer 1408A.

In addition, the audio encoder 1410 encodes the audio signal input from the connectivity 1321 or the like to the video processor 1332, and the audio stream is written to the audio ES buffer 1409A.

The video stream of the video ES buffer 1408A and the audio stream of the audio ES buffer 1409A are read and multiplexed by the multiplexing section (MUX) 1412 and converted into a transport stream, file data, or the like. The transport stream generated by the multiplexing section (MUX) 1412 is buffered by the stream buffer 1414 and then output to an external network through, for example, the connectivity 1321, the broadband modem 1333, or the like. In addition, the stream buffer 1414 buffers the file data generated by the multiplexing section (MUX) 1412, and the file data is then output to, for example, the connectivity 1321 or the like and recorded in various recording media.

In addition, for example, the transport stream input from the external network to the video processor 1332 through the connectivity 1321, the broadband modem 1333, or the like is buffered by the stream buffer 1414 and then demultiplexed by the demultiplexing section (DMUX) 1413. In addition, for example, the file data read from various recording media by the connectivity 1321 or the like and input to the video processor 1332 is buffered by the stream buffer 1414 and then demultiplexed by the demultiplexing section (DMUX) 1413. That is, the transport stream or the file data input to the video processor 1332 is separated into the video stream and the audio stream by the demultiplexing section (DMUX) 1413.

The audio stream is supplied to the audio decoder 1411 through the audio ES buffer 1409B and decoded to reproduce the audio signal. In addition, the video stream is written to the video ES buffer 1408B, and then the video stream is sequentially read and decoded by the encode/decode engine 1407 and written to the frame memory 1405. The decoded image data is enlarged or reduced by the second image enlargement/reduction section 1403 and written to the frame memory 1405. The decoded image data is then read by the video output processing section 1404, and the format is converted into a predetermined system, such as a 4:2:2 Y/Cb/Cr system. The decoded image data is further converted into an analog signal, and the video signal is reproduced and output.

In the case of applying the present technique to the video processor 1332 configured in this way, the present technique according to each of the embodiments can be applied to the encode/decode engine 1407. That is, for example, the encode/decode engine 1407 may have one or both the function of the image encoding apparatus 100 and the function of the image decoding apparatus 200. As a result, the video processor 1332 can obtain advantageous effects similar to the advantageous effects of the embodiments described with reference to FIGS. 1 to 82.

Note that in the encode/decode engine 1407, the present technique (that is, one or both the function of the image encoding apparatus 100 and the function of the image decoding apparatus 200) may be realized by hardware, such as a logic circuit, may be realized by software, such as an embedded program, or may be realized by both the hardware and the software.

<Another Configuration Example of Video Processor>

Figure 90:
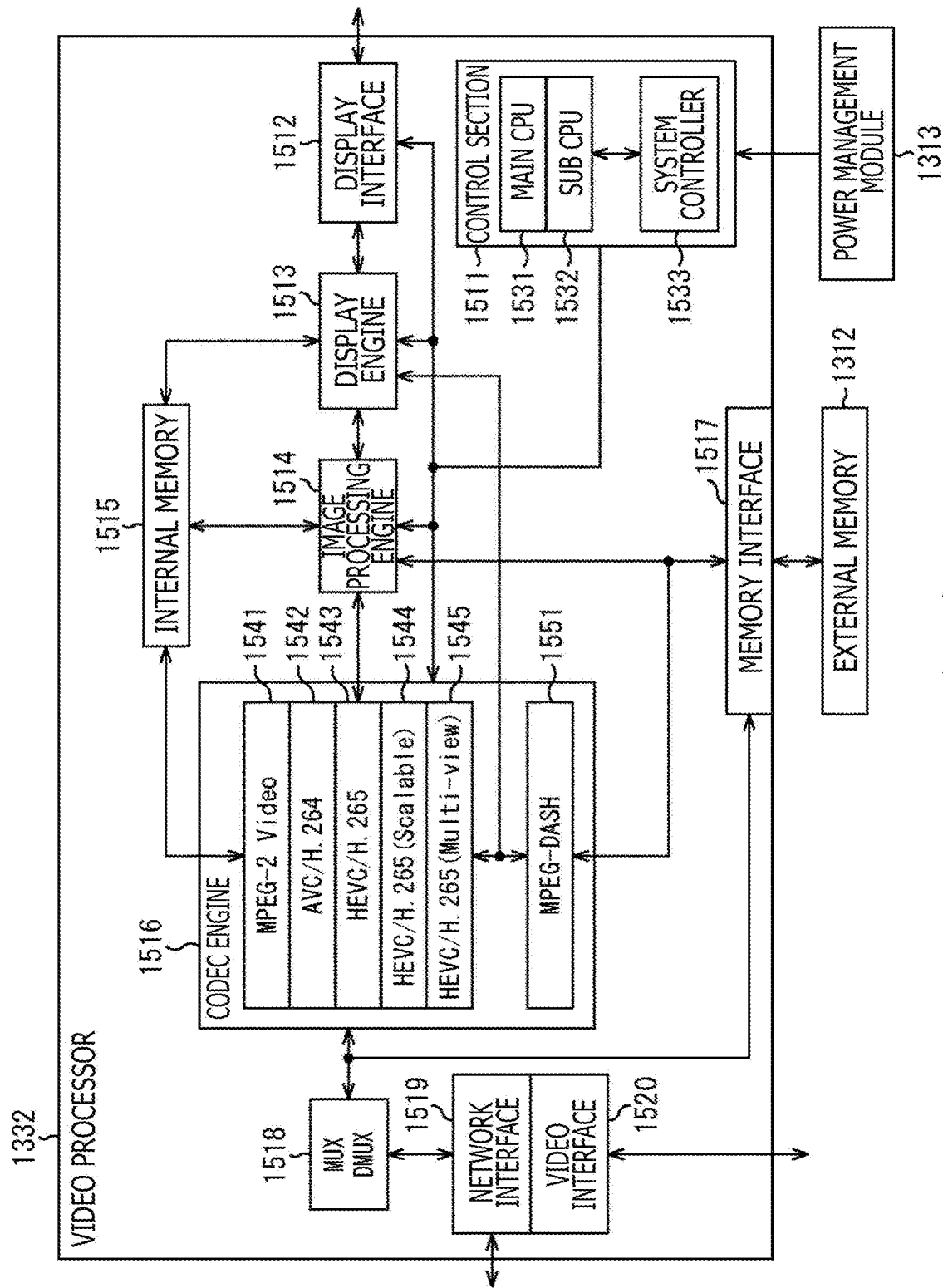
FIG. 90 is a block diagram illustrating another example of the schematic configuration of the video processor.

FIG. 90 illustrates another example of the schematic configuration of the video processor 1332 according to the present technique. In the case of the example of FIG. 90, the video processor 1332 has a function of using a predetermined system to encode and decode the video data.

More specifically, as illustrated in FIG. 90, the video processor 1332 includes a control section 1511, a display interface 1512, a display engine 1513, an image processing engine 1514, and an internal memory 1515. The video processor 1332 also includes a codec engine 1516, a memory interface 1517, a multiplexing/demultiplexing section (MUX DMUX) 1518, a network interface 1519, and a video interface 1520.

The control section 1511 controls the operation of each processing section in the video processor 1332, such as the display interface 1512, the display engine 1513, the image processing engine 1514, and the codec engine 1516.

As illustrated in FIG. 90, the control section 1511 includes, for example, a main CPU 1531, a sub CPU 1532, and a system controller 1533. The main CPU 1531 executes a program or the like for controlling the operation of each processing section in the video processor 1332. The main CPU 1531 generates a control signal according to the program or the like and supplies the control signal to each processing section (that is, controls the operation of each processing section). The sub CPU 1532 plays an auxiliary role of the main CPU 1531. For example, the sub CPU 1532 executes a child process, a subroutine, or the like of the program or the like executed by the main CPU 1531. The system controller 1533 controls the operations of the main CPU 1531 and the sub CPU 1532, such as designating the program executed by the main CPU 1531 and the sub CPU 1532.

The display interface 1512 outputs image data to, for example, the connectivity 1321 or the like under the control of the control section 1511. For example, the display interface 1512 converts image data of digital data into an analog signal and outputs a reproduced video signal or the image data of the digital data to a monitor apparatus or the like of the connectivity 1321.

Under the control of the control section 1511, the display engine 1513 applies various conversion processes, such as format conversion, size conversion, and color gamut conversion, to the image data according to hardware specifications of a monitor apparatus or the like that displays the image.

The image processing engine 1514 applies predetermined image processing, such as, for example, a filtering process for improving the image quality, to the image data under the control of the control section 1511.

The internal memory 1515 is a memory shared by the display engine 1513, the image processing engine 1514, and the codec engine 1516 and provided inside of the video processor 1332. The internal memory 1515 is used to transfer data between, for example, the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as necessary (for example, according to a request). Although the internal memory 1515 may be realized by any storage device, the internal memory 1515 is generally used to store low-capacity data, such as block-based image data and parameters, in many cases, and it is desirable to realize the internal memory 1515 by a relatively (for example, compared to the external memory 1312) low-capacity semiconductor memory with high response speed, such as, for example, an SRAM (Static Random Access Memory).

The codec engine 1516 executes a process regarding encoding and decoding of image data. The system of encoding and decoding corresponding to the codec engine 1516 is arbitrary, and there may be one system or a plurality of systems. For example, the codec engine 1516 may have codec functions of a plurality of encoding and decoding systems and may use selected one of the codec functions to encode image data or decode encoded data.

In the example illustrated in FIG. 90, the codec engine 1516 includes, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551 that are functional blocks of processes regarding the codec.

The MPEG-2 Video 1541 is a functional block that uses the MPEG-2 system to encode and decode image data. The AVC/H.264 1542 is a functional block that uses the AVC system to encode and decode image data. The HEVC/H.265 1543 is a functional block that uses the HEVC system to encode and decode image data. The HEVC/H.265 (Scalable) 1544 is a functional block that uses the HEVC system to apply scalable encoding and scalable decoding to image data. The HEVC/H.265 (Multi-view) 1545 is a functional block that uses the HEVC system to apply multi-view encoding and multi-view decoding to the image data.

The MPEG-DASH 1551 is a functional block that uses the MPEG-DASH (MPEG-Dynamic Adaptive Streaming over HTTP) system to transmit and receive image data. The MPEG-DASH is a technique of using the HTTP (HyperText Transfer Protocol) to stream a video, and one of the features is that appropriate encoded data is transmitted by selecting the encoded data on a segment-by-segment basis from a plurality of pieces of encoded data with different resolutions or the like prepared in advance. The MPEG-DASH 1551 performs operations, such as generating a stream in compliance with the standard and controlling the transmission of the stream, and uses the components from the MPEG-2 Video 1541 to the HEVC/H.265 (Multi-view) 1545 to encode and decode image data.

The memory interface 1517 is an interface for the external memory 1312. The data supplied from the image processing engine 1514 or the codec engine 1516 is supplied to the external memory 1312 through the memory interface 1517. In addition, the data read from the external memory 1312 is supplied to the video processor 1332 (image processing engine 1514 or codec engine 1516) through the memory interface 1517.

The multiplexing/demultiplexing section (MUX DMUX) 1518 multiplexes and demultiplexes various types of data regarding the image, such as a bitstream of encoded data, image data, and a video signal. The method of multiplexing and demultiplexing is arbitrary. For example, the multiplexing/demultiplexing section (MUX DMUX) 1518 can not only group together a plurality of pieces of data in multiplexing, but can also add predetermined header information or the like to the data. In addition, the multiplexing/demultiplexing section (MUX DMUX) 1518 can not only partition one piece of data into a plurality of pieces of data in demultiplexing, but can also add predetermined header information or the like to each of the partitioned pieces of data. That is, the multiplexing/demultiplexing section (MUX DMUX) 1518 can multiplex and demultiplex data to convert the format of the data. For example, the multiplexing/demultiplexing section (MUX DMUX) 1518 can multiplex a bitstream to convert the bitstream into a transport stream that is a bitstream in the format of transfer or into data (file data) in the file format for recording. Obviously, the inverse conversion of the data can also be performed by demultiplexing.

The network interface 1519 is, for example, an interface for the broadband modem 1333, the connectivity 1321, and the like. The video interface 1520 is, for example, an interface for the connectivity 1321, the camera 1322, and the like.

Next, an example of the operation of the video processor 1332 will be described. For example, when a transport stream is received from an external network through the connectivity 1321, the broadband modem 1333, or the like, the transport stream is supplied to the multiplexing/demultiplexing section (MUX DMUX) 1518 through the network interface 1519 and demultiplexed, and the codec engine 1516 decodes the transport stream. The image processing engine 1514 applies, for example, predetermined image processing to the image data obtained by the decoding of the codec engine 1516, and the display engine 1513 performs predetermined conversion. The image data is supplied to, for example, the connectivity 1321 or the like through the display interface 1512, and the image is displayed on the monitor. In addition, for example, the codec engine 1516 encodes again the image data obtained by the decoding of the codec engine 1516, and the multiplexing/demultiplexing section (MUX DMUX) 1518 multiplexes the image data and converts the image data into file data. The file data is output to, for example, the connectivity 1321 or the like through the video interface 1520 and recorded in various recording media.

Furthermore, for example, the file data of the encoded data including the encoded image data read by the connectivity 1321 or the like from a recording medium not illustrated is supplied to the multiplexing/demultiplexing section (MUX DMUX) 1518 through the video interface 1520 and demultiplexed, and the file data is decoded by the codec engine 1516. The image processing engine 1514 applies predetermined image processing to the image data obtained by the decoding of the codec engine 1516, and the display engine 1513 performs predetermined conversion of the image data. The image data is supplied to, for example, the connectivity 1321 or the like through the display interface 1512, and the image is displayed on the monitor. In addition, for example, the codec engine 1516 encodes again the image data obtained by the decoding of the codec engine 1516, and the multiplexing/demultiplexing section (MUX DMUX) 1518 multiplexes the image data and converts the image data into a transport stream. The transport stream is supplied to, for example, the connectivity 1321, the broadband modem 1333, or the like through the network interface 1519 and transmitted to another apparatus not illustrated.

Note that the transfer of the image data and other data between processing sections in the video processor 1332 is performed by using, for example, the internal memory 1515 or the external memory 1312. In addition, the power management module 1313 controls power supplied to, for example, the control section 1511.

In the case where the present technique is applied to the video processor 1332 configured in this way, the present technique according to each of the embodiments can be applied to the codec engine 1516. That is, for example, the codec engine 1516 can include one or both the function of the image encoding apparatus 100 and the function of the image decoding apparatus 200. As a result, the video processor 1332 can obtain advantageous effects similar to the advantageous effects of the embodiments described with reference to FIGS. 1 to 82.

Note that in the codec engine 1516, the present technique (that is, the function of the image encoding apparatus 100) may be realized by hardware, such as a logic circuit, may be realized by software, such as an embedded program, or may be realized by both the hardware and the software.

Although two configurations of the video processor 1332 have been illustrated, the configuration of the video processor 1332 is arbitrary, and the configuration may be other than the configurations of the two examples. In addition, the video processor 1332 may be provided as one semiconductor chip or may be provided as a plurality of semiconductor chips. For example, the video processor 1332 may be a three-dimensional stacked LSI including a plurality of stacked semiconductors. The video processor 1332 may also be realized by a plurality of LSIs.

<Example of Application to Apparatus>

The video set 1300 can be incorporated into various apparatuses that process image data. For example, the video set 1300 can be incorporated into the television apparatus 900 (FIG. 84), the mobile phone 920 (FIG. 85), the recording/reproducing apparatus 940 (FIG. 86), the imaging apparatus 960 (FIG. 87), and the like. The incorporation of the video set 1300 allows the apparatus to obtain advantageous effects similar to the advantageous effects of the embodiments described with reference to FIGS. 1 to 82.

Note that part of each configuration of the video set 1300 can be carried out as a configuration according to the present technique as long as the part includes the video processor 1332. For example, the video processor 1332 alone can be carried out as a video processor according to the present technique. In addition, for example, the processor indicated by the dotted line 1341, the video module 1311, or the like can be carried out as a processor, a module, or the like according to the present technique as described above. Furthermore, for example, the video module 1311, the external memory 1312, the power management module 1313, and the front-end module 1314 can be combined to carry out a video unit 1361 according to the present technique. In any of the configurations, advantageous effects similar to the advantageous effects of the embodiments described with reference to FIGS. 1 to 82 can be obtained.

That is, any configuration including the video processor 1332 can be incorporated into various apparatuses that process image data as in the case of the video set 1300. For example, the video processor 1332, the processor indicated by the dotted line 1341, the video module 1311, or the video unit 1361 can be incorporated into the television apparatus 900 (FIG. 84), the mobile phone 920 (FIG. 85), the recording/reproducing apparatus 940 (FIG. 86), the imaging apparatus 960 (FIG. 87), or the like. In addition, the incorporation of one of the configurations according to the present technique allows the apparatus to obtain advantageous effects similar to the advantageous effects of the embodiments described with reference to FIGS. 1 to 82 as in the case of the video set 1300.

Sixth Application Example: Network System

In addition, the present technique can also be applied to a network system including a plurality of apparatuses. FIG. 91 illustrates an example of a schematic configuration of the network system according to the present technique.

A network system 1600 illustrated in FIG. 91 is a system in which equipment transfers information regarding images (moving images) through a network. A cloud service 1601 of the network system 1600 is a system that provides services regarding images (moving images) to terminals, such as a computer 1611, AV (Audio Visual) equipment 1612, a portable information processing terminal 1613, and an IoT (Internet of Things) device 1614, connected to and capable of communicating with the cloud service 1601. For example, the cloud service 1601 provides the terminals with supply services of content of images (moving images) such as so-called video distribution (on-demand or live broadcasting). In addition, the cloud service 1601 provides, for example, a backup service for receiving and storing content of images (moving images) from the terminals. In addition, the cloud service 1601 provides, for example, a service for mediating transfer of content of images (moving images) between the terminals.

The physical configuration of the cloud service 1601 is arbitrary. For example, the cloud service 1601 may include various servers, such as a server that saves and manages moving images, a server that distributes moving images to the terminals, a server that acquires moving images from the terminals, and a server that manages users (terminals) and charges, and an arbitrary network, such as the Internet and a LAN.

The computer 1611 includes, for example, an information processing apparatus, such as a personal computer, a server, and a workstation. The AV equipment 1612 includes, for example, an image processing apparatus, such as a television receiver, a hard disk recorder, a gaming machine, and a camera. The portable information processing terminal 1613 includes, for example, a portable information processing apparatus, such as a notebook personal computer, a tablet terminal, a mobile phone, and a smartphone. The IoT device 1614 includes an arbitrary object that executes a process regarding images, such as a machine, home equipment, furniture, other objects, an IC tag, and a card-type device.

The terminals have communication functions, and the terminals can connect to (establish sessions with) the cloud service 1601 to transfer information (that is, communicate) with the cloud service 1601. In addition, each terminal can also communicate with the other terminals. The terminals may communicate through the cloud service 1601 or may communicate without the cloud service 1601.

The present technique may be applied to the network system 1600, and in the transfer of data of images (moving images) between the terminals or between a terminal and the cloud service 1601, the image data may be encoded and decoded as described in each embodiment. That is, each of the terminals (from the computer 1611 to the IoT device 1614) and the cloud service 1601 may have the functions of the image encoding apparatus 100 and the image decoding apparatus 200 described above. In this way, the terminals (from the computer 1611 to the IoT device 1614) and the cloud service 1601 that transfer the image data can obtain advantageous effects similar to the advantageous effects of the embodiments described with reference to FIGS. 1 to 82.

<Etc.>

Note that various types of information regarding encoded data (bitstream) may be transmitted or recorded after multiplexing the information with the encoded data, or the information may be transmitted or recorded as separate data associated with the encoded data without multiplexing the information with the encoded data. Here, the term "associated" means, for example, that one piece of data can be used (can be linked) during processing of another piece of data. That is, the data associated with each other may be integrated as one piece of data or may be provided as separate pieces of data. For example, the information associated with the encoded data (image) may be transmitted on a transmission path different from the encoded data (image). In addition, for example, the information associated with the encoded data (image) may be recorded in a recording medium separate from the encoded data (image) (or in a separate recording area of the same recording medium). Note that part of the data may be "associated," instead of the entire data. For example, the image and the information corresponding to the image may be associated with each other in an arbitrary unit, such as a plurality of frames, one frame, and part of the frame.

In addition, as described above, the terms, such as "combine," "multiplex," "add," "integrate," "include," "store," "put in," "place into," and "insert," in the present specification denote grouping of a plurality of things, such as grouping of encoded data and metadata, and each term denotes one method of "associating" described above.

In addition, the embodiments of the present technique are not limited to the embodiments described above, and various changes can be made without departing from the scope of the present technique.

For example, the system in the present specification denotes a set of a plurality of constituent elements (apparatuses, modules (components), and the like), and whether all of the constituent elements are in the same housing does not matter. Therefore, a plurality of apparatuses stored in separate housings and connected through a network and one apparatus storing a plurality of modules in one housing are both systems.

Furthermore, for example, the configuration of one apparatus (or processing section) described above may be divided to provide a plurality of apparatuses (or processing sections). Conversely, the configurations of a plurality of apparatuses (or processing sections) described above may be put together to provide one apparatus (or processing section). In addition, configurations other than the configurations described above may be obviously added to the configuration of each apparatus (or each processing section). Furthermore, part of the configuration of an apparatus (or processing section) may be included in the configuration of another apparatus (or another processing section) as long as the configuration and the operation of the entire system are substantially the same.

In addition, the present technique can be provided as, for example, cloud computing in which a plurality of apparatuses share one function and cooperate to execute a process through a network.

In addition, the program described above can be executed by, for example, an arbitrary apparatus. In that case, the apparatus can have necessary functions (such as functional blocks) and obtain necessary information.

In addition, for example, one apparatus can execute each step described in the flow charts, or a plurality of apparatuses can take charge and execute each step. Furthermore, in the case where one step includes a plurality of processes, one apparatus can execute the plurality of processes included in one step, or a plurality of apparatuses can take charge and execute the processes.

Note that the program executed by the computer may be a program in which the processes of the steps describing the program are executed in chronological order described in the present specification, or the program may be a program for executing the processes in parallel or for executing the processes separately at a necessary timing such as when the processes are invoked. Furthermore, the processes of the steps describing the program may be executed in parallel with processes of other programs or may be executed in combination with processes of other programs.

Note that the plurality of present techniques described in the present specification can be independently and separately carried out as long as there is no contradiction. Obviously, a plurality of arbitrary present techniques can be combined and carried out. For example, the present technique described in one of the embodiments can also be carried out in combination with the present technique described in another embodiment. In addition, an arbitrary present technique described above can also be carried out in combination with another technique not described above.

Note that the present technique can also be configured as follows.

(1)

An image processing apparatus including a clip processing section that uses one or both a predetermined upper limit and a predetermined lower limit to clip transformation coefficients obtained by applying a transformation process to a predicted residual that is a difference between an image and a predicted image of the image.

(2)

The image processing apparatus according to (1), further including:

a primary transformation section that performs a primary transformation that is a transformation process for the predicted residual; and a secondary transformation section that performs a secondary transformation that is a transformation process for primary transformation coefficients obtained by the primary transformation of the predicted residual performed by the primary transformation section, in which the clip processing section is configured to clip secondary transformation coefficients obtained by the secondary transformation of the primary transformation coefficients performed by the secondary transformation section.

(3)

The image processing apparatus according to (1) or (2), in which the primary transformation is an orthogonal transformation, the secondary transformation is a transformation process including:

transforming the primary transformation coefficients into a one-dimensional vector;

performing matrix computation of the one-dimensional vector;

scaling the one-dimensional vector subjected to the matrix computation; and forming a matrix of the scaled one-dimensional vector.

(4)

The image processing apparatus according to any one of (1) to (3), further including:

a rasterization section that transforms the transformation coefficients into a one-dimensional vector;

a matrix computation section that performs matrix computation of the one-dimensional vector;

a scaling section that scales the one-dimensional vector subjected to the matrix computation; and a matrix formation section that forms a matrix of the scaled one-dimensional vector, in which the clip processing section is configured to clip the one-dimensional vector scaled by the scaling section, and the matrix formation section is configured to form a matrix of the one-dimensional vector clipped by the clip processing section.

(5)

The image processing apparatus according to any one of (1) to (4), in which the transformation process is applied to the predicted residual in each sub-block of a transformation block, and the clip processing section clips the transformation coefficients in each sub-block.

(6)

The image processing apparatus according to any one of (1) to (5), in which the sub-block includes 4×4 transformation coefficients.

(7)

The image processing apparatus according to any one of (1) to (6), in which the upper limit is $2^{15}-1$, and the lower limit is $-2^{15}$.

(8)

The image processing apparatus according to any one of (1) to (7), further including:

a quantization section that quantizes the transformation coefficients clipped by the clip processing section; and an encoding section that encodes a quantized transformation coefficient level obtained by the quantization of the variation coefficients performed by the quantization section.

(9)

The image processing apparatus according to any one of (1) to (8), further including a prediction section that generates the predicted image.

(10)

An image processing method including using one or both a predetermined upper limit and a predetermined lower limit to clip transformation coefficients obtained by applying a transformation process to a predicted residual that is a difference between an image and a predicted image of the image.

(11)

An image processing apparatus including a clip processing section that uses one or both a predetermined upper limit and a predetermined lower limit to clip transformation coefficients that are subjected to an inverse transformation process to obtain a predicted residual that is a difference between an image and a predicted image of the image.

(12)

The image processing apparatus according to (11), further including:

an inverse secondary transformation section that performs an inverse secondary transformation of the transformation coefficients; and an inverse primary transformation section that performs an inverse primary transformation of primary transformation coefficients obtained by the inverse secondary transformation of the transformation coefficients, in which the clip processing section is configured to clip the primary transformation coefficients obtained by the inverse secondary transformation of the transformation coefficients performed by the inverse secondary transformation section, and the primary transformation section is configured to perform the inverse primary transformation of the primary transformation coefficients clipped by the clip processing section.

(13)

The image processing apparatus according to (11) or (12), in which the inverse secondary transformation is a transformation process including:

transforming the transformation coefficients into a one-dimensional vector;

performing matrix computation of the one-dimensional vector;

scaling the one-dimensional vector subjected to the matrix computation; and forming a matrix of the scaled one-dimensional vector, and the inverse primary transformation is an inverse orthogonal transformation.

(14)

The image processing apparatus according to any one of (11) to (13), further including:

a rasterization section that transforms the transformation coefficients into a one-dimensional vector;

a matrix computation section that performs matrix computation of the one-dimensional vector;

a scaling section that scales the one-dimensional vector subjected to the matrix computation; and a matrix formation section that forms a matrix of the scaled one-dimensional vector, in which the clip processing section is configured to clip the one-dimensional vector scaled by the scaling section, and the matrix formation section is configured to form a matrix of the one-dimensional vector clipped by the clip processing section.

(15)

The image processing apparatus according to any one of (11) to (14), in which the clip processing section clips the transformation coefficients in each sub-block of a transformation block.

(16)

The image processing apparatus according to any one of (11) to (15), in which the sub-block includes 4×4 transformation coefficients.

(17)
The image processing apparatus according to any one of (11) to (16), in which
the upper limit is $2^{15}-1$, and
the lower limit is $-2^{15}$.
(18)
The image processing apparatus according to any one of (11) to (17), further including:
a decoding section that decodes encoded data; and
an inverse quantization section that obtains the transformation coefficients by performing inverse quantization of a quantized transformation coefficient level obtained by the decoding of the encoded data by the decoding section.
(19)
The image processing apparatus according to any one of (11) to (18), further including
a prediction section that generates the predicted image.
(20)
An image processing method including
using one or both a predetermined upper limit and a predetermined lower limit to clip transformation coefficients that are subjected to an inverse transformation process to obtain a predicted residual that is a difference between an image and a predicted image of the image.
(21)
An image processing apparatus including:
a rasterization section that transforms, into a one-dimensional vector, transformation coefficients obtained by applying a transformation process to a predicted residual that is a difference between an image and a predicted image of the image;
a shift amount derivation section that derives an amount of shift of the one-dimensional vector;
a matrix computation section that performs matrix computation of the one-dimensional vector;
a scaling section that scales the one-dimensional vector subjected to the matrix computation according to the amount of shift derived by the shift amount derivation section; and
a matrix formation section that forms a matrix of the scaled one-dimensional vector.
(22)
The image processing apparatus according to (21), in which
the shift amount derivation section derives the amount of shift based on a dynamic range width of the transformation coefficients and a matrix used by the matrix computation section in the matrix computation.
(23)
The image processing apparatus according to (21) or (22), in which
the dynamic range width of the transformation coefficients is 16.
(24)
The image processing apparatus according to any one of (21) to (23), in which
the shift amount derivation section derives an upper limit of a dynamic range of secondary transformation coefficients obtained by the formation of the matrix of the one-dimensional vector formed by the matrix formation section based on the dynamic range width of the transformation coefficients and the matrix.
(25)
The image processing apparatus according to any one of (21) to (24), in which
the shift amount derivation section derives the amount of shift by using a ceiling function for a difference between the upper limit of the dynamic range of the secondary transformation coefficients and an upper limit of a dynamic range of an intermediate buffer.
(26)
The image processing apparatus according to any one of (21) to (25), in which
the dynamic range width of the intermediate buffer is 16.
(27)
The image processing apparatus according to any one of (21) to (26), in which
the transformation coefficients are processed in each sub-block of a transformation block.
(28)
The image processing apparatus according to any one of (21) to (27), in which
the sub-block includes 4×4 transformation coefficients.
(29)
The image processing apparatus according to any one of (21) to (28), further including:
a primary transformation section that performs a primary transformation of the predicted residual;
a quantization section that quantizes the secondary transformation coefficients obtained by the formation of the matrix of the one-dimensional vector formed by the matrix formation section; and
an encoding section that encodes a quantized transformation coefficient level obtained by the quantization of the secondary variation coefficients performed by the quantization section, in which
the rasterization section is configured to transform, into the one-dimensional vector, primary transformation coefficients obtained by the primary transformation of the predicted residual performed by the primary transformation section.
(30)
An image processing method including:
transforming, into a one-dimensional vector, transformation coefficients obtained by applying a transformation process to a predicted residual that is a difference between an image and a predicted image of the image;
deriving an amount of shift of the one-dimensional vector;
performing matrix computation of the one-dimensional vector;
scaling the one-dimensional vector subjected to the matrix computation according to the derived amount of shift; and
forming a matrix of the scaled one-dimensional vector.
(31)
An image processing apparatus including:
a rasterization section that transforms, into a one-dimensional vector, transformation coefficients that are subjected to an inverse transformation process to obtain a predicted residual that is a difference between an image and a predicted image of the image;
a shift amount derivation section that derives an amount of shift of the one-dimensional vector;
a matrix computation section that performs matrix computation of the one-dimensional vector;
a scaling section that scales the one-dimensional vector subjected to the matrix computation according to the amount of shift derived by the shift amount derivation section; and
a matrix formation section that forms a matrix of the scaled one-dimensional vector.
(32)
The image processing apparatus according to (31), in which
the shift amount derivation section derives the amount of shift based on a dynamic range width of the transformation coefficients and a matrix used by the matrix computation section in the matrix computation.

(33)

The image processing apparatus according to (31) or (32), in which the dynamic range width of the transformation coefficients is 16.

(34)

The image processing apparatus according to any one of (31) to (33), in which the shift amount derivation section derives an upper limit of a dynamic range of primary transformation coefficients obtained by the formation of the matrix of the one-dimensional vector formed by the matrix formation section based on the dynamic range width of the transformation coefficients and the matrix.

(35)

The image processing apparatus according to any one of (31) to (34), in which the shift amount derivation section derives the amount of shift by using a ceiling function for a difference between the upper limit of the dynamic range of the primary transformation coefficients and an upper limit of a dynamic range of an intermediate buffer.

(36)

The image processing apparatus according to any one of (31) to (35), in which the dynamic range width of the intermediate buffer is 16.

(37)

The image processing apparatus according to any one of (31) to (36), in which the transformation coefficients are processed in each sub-block of a transformation block.

(38)

The image processing apparatus according to any one of (31) to (37), in which the sub-block includes 4×4 transformation coefficients.

(39)

The image processing apparatus according to any one of (31) to (38), further including:

a decoding section that decodes encoded data;

an inverse quantization section that performs inverse quantization of a quantized transformation coefficient level obtained by the decoding of the encoded data by the decoding section; and an inverse primary transformation section that performs an inverse primary transformation of the primary transformation coefficients obtained by the formation of the matrix of the one-dimensional vector formed by the matrix formation section, in which the rasterization section is configured to transform, into the one-dimensional vector, secondary transformation coefficients obtained by the inverse quantization of the quantized transformation coefficient level performed by the inverse quantization section.

(40)

An image processing method including:

transforming, into a one-dimensional vector, transformation coefficients that are subjected to an inverse transformation process to obtain a predicted residual that is a difference between an image and a predicted image of the image;

deriving an amount of shift of the one-dimensional vector;

performing matrix computation of the one-dimensional vector;

scaling the one-dimensional vector subjected to the matrix computation according to the derived amount of shift; and forming a matrix of the scaled one-dimensional vector.

(41)

An image processing apparatus including:

a rasterization section that transforms, into a one-dimensional vector, transformation coefficients obtained by applying a transformation process to a predicted residual that is a difference between an image and a predicted image of the image;

a matrix computation section that applies matrix computation including a plurality of times of matrix multiplication to the one-dimensional vector;

a scaling section that scales the one-dimensional vector subjected to the matrix computation; and a matrix formation section that forms a matrix of the scaled one-dimensional vector.

(42)

The image processing apparatus according to (41), in which the matrix computation section uses first to fourth orthogonal matrices and first to third permutation matrices to perform the matrix computation of a first row vector that is the one-dimensional vector obtained by the transformation of the transformation coefficients performed by the rasterization section to obtain a second row vector.

(43)

The image processing apparatus according to (41) or (42), in which the matrix computation section includes:

a first rotation operation section that obtains a first matrix product that is a matrix product of the first orthogonal matrix and the first row vector;

a first permutation operation section that obtains a second matrix product that is a matrix product of the first permutation matrix and the first matrix product;

a second rotation operation section that obtains a third matrix product that is a matrix product of the second orthogonal matrix and the second matrix product;

a second permutation operation section that obtains a fourth matrix product that is a matrix product of the second permutation matrix, a transposed matrix of the first permutation matrix, and the third matrix product;

a third rotation operation section that obtains a fifth matrix product that is a matrix product of the third orthogonal matrix and the fourth matrix product;

a third permutation operation section that obtains a sixth matrix product that is a matrix product of the third permutation matrix, a transposed matrix of the second permutation matrix, and the fifth matrix product;

a fourth rotation operation section that obtains a seventh matrix product that is a matrix product of the fourth orthogonal matrix and the sixth matrix product; and a fourth permutation operation section that obtains a matrix product of a transposed matrix of the third permutation matrix and the seventh matrix product to obtain the second row vector.

(44)

The image processing apparatus according to any one of (41) to (43), in which each of the first to fourth orthogonal matrices is a sparse matrix, where eight 2×2 rotation matrices different from each other are provided as diagonal components, and other elements are 0.

(45)

The image processing apparatus according to any one of (41) to (44), in which the first to third permutation matrices are permutation matrices for rearranging elements to be permuted in orders different from each other.

(46)

The image processing apparatus according to any one of (41) to (45), in which the first permutation matrix rearranges zeroth to fifteenth elements to be permuted in order of the zeroth element, the second element, the first element, the third element, the fourth element, the sixth element, the fifth element, the seventh element, the eighth element, the tenth element, the ninth element, the eleventh element, the twelfth element, the fourteenth element, the thirteenth element, and the fifteenth element, the second permutation matrix rearranges the zeroth to fifteenth elements to be permuted in order of the zeroth element, the fourth element, the second element, the sixth element, the first element, the fifth element, the third element, the seventh element, the eighth element, the twelfth element, the tenth element, the fourteenth element, the ninth element, the thirteenth element, the eleventh element, and the fifteenth element, and the third permutation matrix rearranges the zeroth to fifteenth elements to be permuted in order of the zeroth element, the eighth element, the second element, the tenth element, the fourth element, the twelfth element, the sixth element, the fourteenth element, the first element, the ninth element, the third element, the eleventh element, the fifth element, the thirteenth element, the seventh element, and the fifteenth element.

(47)

The image processing apparatus according to any one of (41) to (46), further including a primary transformation section that performs a primary transformation of the predicted residual, in which the rasterization section is configured to transform, into the one-dimensional vector, primary transformation coefficients obtained by the primary transformation of the predicted residual performed by the primary transformation section.

(48)

An image processing apparatus according to any one of (41) to (47), further including:

a quantization section that quantizes secondary transformation coefficients obtained by the formation of the matrix of the one-dimensional vector formed by the matrix formation section; and an encoding section that encodes a quantized transformation coefficient level obtained by the quantization of the secondary variation coefficients performed by the quantization section.

(49)

The image processing apparatus according to any one of (41) to (48), further including a prediction section that generates the predicted image.

(50)

An image processing method including:

transforming, into a one-dimensional vector, transformation coefficients obtained by applying a transformation process to a predicted residual that is a difference between an image and a predicted image of the image;

applying matrix computation including a plurality of times of matrix multiplication to the one-dimensional vector;

scaling the one-dimensional vector subjected to the matrix computation; and forming a matrix of the scaled one-dimensional vector.

(51)

An image processing apparatus including:

a rasterization section that transforms, into a one-dimensional vector, transformation coefficients that are subjected to an inverse transformation process to obtain a predicted residual that is a difference between an image and a predicted image of the image;

a matrix computation section that applies matrix computation including a plurality of times of matrix multiplication to the one-dimensional vector;

a scaling section that scales the one-dimensional vector subjected to the matrix computation; and a matrix formation section that forms a matrix of the scaled one-dimensional vector.

(52)

The image processing apparatus according to (51), in which the matrix computation section uses first to fourth orthogonal matrices and first to third permutation matrices to perform the matrix computation of a first row vector that is the one-dimensional vector obtained by the transformation of the transformation coefficients performed by the rasterization section to obtain a second row vector.

(53)

The image processing apparatus according to (51) or (52), in which the matrix computation section includes:

a first rotation operation section that obtains a first matrix product that is a matrix product of a transposed matrix of the fourth orthogonal matrix and the first row vector;

a first permutation operation section that obtains a second matrix product that is a matrix product of the second permutation matrix, a transposed matrix of the third permutation matrix, and the first matrix product;

a second rotation operation section that obtains a third matrix product that is a matrix product of a transposed matrix of the third orthogonal matrix and the second matrix product;

a second permutation operation section that obtains a fourth matrix product that is a matrix product of the first permutation matrix, a transposed matrix of the second permutation matrix, and the third matrix product;

a third rotation operation section that obtains a fifth matrix product that is a matrix product of a transposed matrix of the second orthogonal matrix and the fourth matrix product;

a third permutation operation section that obtains a sixth matrix product that is a matrix product of a transposed matrix of the first permutation matrix and the fifth matrix product; and a fourth rotation operation section that obtains a matrix product of a transposed matrix of the first orthogonal matrix and the sixth matrix product to obtain the second row vector.

(54)

The image processing apparatus according to any one of (51) to (53), in which each of the first to fourth orthogonal matrices is a sparse matrix, where eight 2×2 rotation matrices different from each other are provided as diagonal components, and other elements are 0.

(55)

The image processing apparatus according to any one of (51) to (54), in which the first to third permutation matrices are permutation matrices for rearranging elements to be permuted in orders different from each other.

(56)
The image processing apparatus according to any one of (51) to (55), in which
the first permutation matrix rearranges zeroth to fifteenth elements to be permuted in order of the zeroth element, the second element, the first element, the third element, the fourth element, the sixth element, the fifth element, the seventh element, the eighth element, the tenth element, the ninth element, the eleventh element, the twelfth element, the fourteenth element, the thirteenth element, and the fifteenth element, the second permutation matrix rearranges the zeroth to fifteenth elements to be permuted in order of the zeroth element, the fourth element, the second element, the sixth element, the first element, the fifth element, the third element, the seventh element, the eighth element, the twelfth element, the tenth element, the fourteenth element, the ninth element, the thirteenth element, the eleventh element, and the fifteenth element, and
the third permutation matrix rearranges the zeroth to fifteenth elements to be permuted in order of the zeroth element, the eighth element, the second element, the tenth element, the fourth element, the twelfth element, the sixth element, the fourteenth element, the first element, the ninth element, the third element, the eleventh element, the fifth element, the thirteenth element, the seventh element, and the fifteenth element.

(57)
The image processing apparatus according to any one of (51) to (56), further including:
a decoding section that decodes encoded data; and
an inverse quantization section that performs inverse quantization of a quantized transformation coefficient level obtained by the decoding of the encoded data by the decoding section, in which
the rasterization section is configured to transform, into the one-dimensional vector, secondary transformation coefficients obtained by the inverse quantization of the quantized transformation coefficient level performed by the inverse quantization section.

(58)
The image processing apparatus according to any one of (51) to (57), further including
an inverse primary transformation section that performs an inverse primary transformation of the primary transformation coefficients obtained by the formation of the matrix of the one-dimensional vector formed by the matrix formation section.

(59)
The image processing apparatus according to any one of (51) to (58), further including
a prediction section that generates the predicted image.

(60)
An image processing method including:
transforming, into a one-dimensional vector, transformation coefficients that are subjected to an inverse transformation process to obtain a predicted residual that is a difference between an image and a predicted image of the image;
applying matrix computation including a plurality of times of matrix multiplication to the one-dimensional vector;
scaling the one-dimensional vector subjected to the matrix computation; and
forming a matrix of the scaled one-dimensional vector.

(61)
An image processing apparatus including
a transformation section that derives a matrix product of a row vector $X_0$ with $2^N$ elements (N is a natural number) and an orthogonal matrix R including N $2^N \times 2^N$ orthogonal matrices $T_i$ (i=1, 2, ..., N) to transform the row vector $X_0$ into a row vector $X_n$ with $2^N$ elements.

(62)
The image processing apparatus according to (61), in which
the orthogonal matrix $T_i$ includes a matrix product $(P_i^T \cdot F_i \cdot P_i)$ of a transposed matrix $P_i^T$ of an ith permutation matrix $P_i$, an ith orthogonal matrix $F_i$, and the ith permutation matrix $P_i$.

(63)
The image processing apparatus according to (62), in which
the transformation section derives a matrix product $X_i$ of the ith orthogonal matrix $T_i$ and a transposed matrix $X_{i-1}^T$ of an (i−1)th (i>0) row vector $X_{i-1}$.

(64)
The image processing apparatus according to (62) or (63), in which
the orthogonal matrix $F_i$ is a sparse matrix, where $2^{N-1}$ 2×2 rotation matrices different from each other are provided as diagonal components, and other elements are 0.

(65)
The image processing apparatus according to any one of (62) to (64), in which
the permutation matrix $P_i$ is a matrix derived by partitioning elements into N−i+1 subsets including $2^i$ elements in a forward direction, setting an element group on a left half of each subset j as a first class, setting an element group on a right half as a second class, and switching an odd-numbered element K of the first class with an even-numbered element M to the right of a corresponding odd-numbered element L of the second class.

(66)
The image processing apparatus according to any one of (61) to (65), in which
the N is 4.

(67)
The image processing apparatus according to any one of (61) to (66), in which
the N is 6.

(68)
The image processing apparatus according to any one of (61) to (67), further including
a rasterization section that generates the row vector $X_0$ including a one-dimensional vector with $2^N$ elements, in which
the transformation section derives a matrix product of the row vector $X_0$ obtained by the rasterization section and the orthogonal matrix R to transform the row vector $X_0$ into the row vector $X_n$.

(69)
The image processing apparatus according to (68), in which
the rasterization section transforms transformation coefficients obtained by applying a transformation process to a predicted residual that is a difference between an image and a predicted image of the image into the row vector $X_0$ including the one-dimensional vector with $2^N$ elements.

(70)
The image processing apparatus according to (68) or (69), in which
the rasterization section transforms the predicted residual that is the difference between the image and the predicted image of the image into the row vector X0 including the one-dimensional vector with $2^N$ elements.

(71)

The image processing apparatus according to (70), further including an orthogonal matrix derivation section that uses a training sample including a set of residuals between reference images and a predicted image of a current block to derive the orthogonal matrix R, in which the transformation section derives a matrix product of the row vector X0 obtained by the rasterization section and the orthogonal matrix R derived by the orthogonal matrix derivation section to transform the row vector $X_0$ into the row vector $X_n$.

(72)

The image processing apparatus according to (71), further including a training sample derivation section that derives the training sample, in which the orthogonal matrix derivation section uses the training sample derived by the training sample derivation section to derive the orthogonal matrix R.

(73)

The image processing apparatus according to (72), in which the training sample derivation section compares, in each template in a predetermined size, the predicted image of the current block and the reference images and obtains a residual between the reference image determined to be similar to the predicted image of the current block in the comparison and the predicted image of the current block to derive the training sample.

(74)

The image processing apparatus according to any one of (61) to (73), in which the transformation section transforms the row vector $X_0$ into the row vector $X_n$ only for part of sub-blocks of a transformation block.

(75)

The image processing apparatus according to (74), in which the transformation section transforms the row vector $X_0$ into the row vector $X_n$ only for part of sub-blocks on a low-frequency side.

(76)

The image processing apparatus according to (75), in which the transformation section transforms the row vector $X_0$ into the row vector $X_n$ only for part of sub-blocks continuous from the top of a scan order.

(77)

The image processing apparatus according to (76), in which in a case where the scan order is a diagonal direction, the transformation section transforms the row vector $X_0$ into the row vector $X_n$ in order of a 4×4 sub-block at the upper left end of the transformation block, a 4×4 sub-block at the left end of a second stage from the top, a second 4×4 sub-block from the left of an uppermost stage, and a 4×4 sub-block at the left end of a third stage from the top.

(78)

The image processing apparatus according to (76) or (77), in which in a case where the scan order is a horizontal direction, the transformation section transforms the row vector $X_0$ into the row vector $X_n$ in order of a 4×4 sub-block at the upper left end of the transformation block, a second 4×4 sub-block from the left of an uppermost stage, a third 4×4 sub-block from the left of the uppermost stage, and a fourth 4×4 sub-block from the left of the uppermost stage.

(79)

The image processing apparatus according to any one of (76) to (78), in which in a case where the scan order is a vertical direction, the transformation section transforms the row vector $X_0$ into the row vector X in order of a 4×4 sub-block at the upper left end of the transformation block, a 4×4 sub-block at the left end of a second stage from the top, a 4×4 sub-block at the left end of a third stage from the top, and a 4×4 sub-block at the left end of a fourth stage from the top.

(80)

An image processing method including deriving a matrix product of a row vector $X_0$ with $2^N$ elements (N is a natural number) and an orthogonal matrix R including $N_2 4 \times 2^N$ orthogonal matrices $T_i$ (i=1, 2, ..., N) to transform the row vector $X_0$ into a row vector X with $2^N$ elements.

(81)

An image processing apparatus including an inverse transformation section that derives a matrix product of a row vector $X_0$ with $2^N$ elements (N is a natural number) and an orthogonal matrix IR that is an inverse matrix of an orthogonal matrix R including N $2^N \times 2^N$ orthogonal matrices $T_i$ (i=1, 2, ..., N) to perform an inverse transformation of the row vector $X_0$ into a row vector $X_n$ with $2^N$ elements.

(82)

The image processing apparatus according to (81), in which the orthogonal matrix IR includes a transposed matrix $T_i^T$ of the orthogonal matrix $T_i$, and the orthogonal matrix $T_i^T$ includes a matrix product $(P_i^T \cdot F_i^T \cdot P_i)$ of a transposed matrix $P_i^T$ of an ith permutation matrix $P_i$, a transposed matrix $F_i^T$ of an ith orthogonal matrix $F_i$, and the ith permutation matrix $P_1$.

(83)

The image processing apparatus according to (82), in which the inverse transformation section derives a matrix product $X_i$ of the transposed matrix $T_i^T$ of the ith orthogonal matrix $T_i$ and a transposed matrix $X_{i-1}^T$ of an (i-1)th (i>0) row vector $X_{i-1}$.

(84)

The image processing apparatus according to (82) or (83), in which the orthogonal matrix $F_i$ is a sparse matrix, where $2^{N-1}$ 2×2 rotation matrices different from each other are provided as diagonal components, and other elements are 0.

(85)

The image processing apparatus according to (82) to (84), in which the permutation matrix $P_i$ is a matrix derived by partitioning elements into N−i+1 subsets including 2 elements in a forward direction, setting an element group on a left half of each subset j as a first class, setting an element group on a right half as a second class, and switching an odd-numbered element K of the first class with an even-numbered element M to the right of a corresponding odd-numbered element L of the second class.

(86)

The image processing apparatus according to any one of (81) to (85), in which the N is 4.

(87)

The image processing apparatus according to any one of (81) to (86), in which
the N is 6.

(88)

The image processing apparatus according to any one of (81) to (87), in which
the inverse transformation section performs an inverse transformation of the row vector $X_0$ into the row vector $X_n$ with $2^N$ elements in an inverse secondary transformation.

(89)

The image processing apparatus according to any one of (81) to (88), in which
the inverse transformation section performs an inverse transformation of the row vector $X_0$ into the row vector $X_n$ with $2^N$ elements in an SDT (Signal Dependent Transform).

(90)

The image processing apparatus according to (89), further including
an orthogonal matrix derivation section that uses a training sample including a set of residuals between reference images and a predicted image of a current block to derive the orthogonal matrix IR, in which
the inverse transformation section derives a matrix product of the row vector $X_0$ and the orthogonal matrix IR derived by the orthogonal matrix derivation section to transform the row vector $X_0$ into the row vector $X_n$.

(91)

The image processing apparatus according to (90), further including
a training sample derivation section that derives the training sample, in which
the orthogonal matrix derivation section uses the training sample derived by the training sample derivation section to derive the orthogonal matrix IR.

(92)

The image processing apparatus according to (91), in which
the training sample derivation section compares, in each template in a predetermined size, the predicted image of the current block and the reference images and obtains a residual between the reference image determined to be similar to the predicted image of the current block in the comparison and the predicted image of the current block to derive the training sample.

(93)

The image processing apparatus according to any one of (90) to (92), in which
the orthogonal matrix derivation section uses the orthogonal matrix R to derive the orthogonal matrix IR.

(94)

The image processing apparatus according to any one of (81) to (93), in which
the inverse transformation section transforms the row vector $X_0$ into the row vector $X_n$ only for part of sub-blocks of a transformation block.

(95)

The image processing apparatus according to (94), in which
the inverse transformation section transforms the row vector $X_0$ into the row vector $X_n$ only for part of sub-blocks on a low-frequency side.

(96)

The image processing apparatus according to (95), in which
the inverse transformation section transforms the row vector $X_0$ into the row vector $X_n$ only for part of sub-blocks continuous from the top of a scan order.

(97)

The image processing apparatus according to (96), in which
in a case where the scan order is a diagonal direction, the inverse transformation section transforms the row vector $X_0$ into the row vector $X_n$ in order of a 4×4 sub-block at the upper left end of the transformation block, a 4×4 sub-block at the left end of a second stage from the top, a second 4×4 sub-block from the left of an uppermost stage, and a 4×4 sub-block at the left end of a third stage from the top.

(98)

The image processing apparatus according to (96) or (97), in which
in a case where the scan order is a horizontal direction, the inverse transformation section transforms the row vector $X_0$ into the row vector X in order of a 4×4 sub-block at the upper left end of the transformation block, a second 4×4 sub-block from the left of an uppermost stage, a third 4×4 sub-block from the left of the uppermost stage, and a fourth 4×4 sub-block from the left of the uppermost stage.

(99)

The image processing apparatus according to any one of (96) to (98), in which
in a case where the scan order is a vertical direction, the inverse transformation section transforms the row vector $X_0$ into the row vector $X_n$ in order of a 4×4 sub-block at the upper left end of the transformation block, a 4×4 sub-block at the left end of a second stage from the top, a 4×4 sub-block at the left end of a third stage from the top, and a 4×4 sub-block at the left end of a fourth stage from the top.

(100)

An image processing method including
deriving a matrix product of a row vector $X_0$ with $2^N$ elements (N is a natural number) and an orthogonal matrix IR that is an inverse matrix of an orthogonal matrix R including N $2^N \times 2^N$ orthogonal matrices $T_i$ (i=1, 2, . . . , N) to perform an inverse transformation of the row vector $X_0$ into a row vector $X_n$ with $2^N$ elements.

REFERENCE SIGNS LIST

100 Image encoding apparatus, 101 Control section, 111 Computation section, 112 Transformation section, 113 Quantization section, 114 Encoding section, 115 Inverse quantization section, 116 Inverse transformation section, 117 Computation section, 118 Frame memory, 119 Prediction section, 131 Primary transformation section, 132 Secondary transformation section, 141 Rasterization section, 142 Matrix computation section, 143 Scaling section, 144 Matrix formation section, 145 Clip processing section, 146 Secondary transformation selection section, 200 Image decoding apparatus, 211 Decoding section, 212 Inverse quantization section, 213 Inverse transformation section, 214 Computation section, 215 Frame memory, 216 Prediction section, 231 Inverse secondary transformation section, 232 Inverse primary transformation section, 241 Rasterization section, 242 Matrix computation section, 243 Scaling section, 244 Matrix formation section, 245 Clip processing section, 246 Inverse secondary transformation selection section, 301 Shift amount derivation section, 302 Scaling section, 311 Shift amount derivation section, 312 Scaling section, 421 Matrix computation section, 431 Rotation operation section, 432 Permutation operation section, 433 Rotation operation section, 434 Permutation operation section, 435 Rotation operation section, 436 Permutation operation section, 437 Rotation operation section, 438 Permutation operation section, 451 Matrix computation section, 461 Permutation operation section, 462 Rotation operation section, 463 Permutation operation section, 464 Rotation operation section, 465 Permutation operation section, 466 Rotation operation section, 467 Permutation operation section, 468 Rotation operation section, 501 Rotation operation section, 511 Rotation operation section, 521 Pseudo code, 522 Subset, 523 First class, 524 Second class, 530 $2^N$-points HyGT section, 531 Rotation operation section, 540 Inverse $2^N$-points HyGT section, 541 Rotation operation section, 561 Secondary transformation selection section, 562 Matrix computation section, 563 64-points HyGT section, 564 Rotation operation section, 571 Inverse secondary transformation selection section, 572 Matrix computation section, 573 Inverse 64-points HyGT section, 574 Rotation operation section, 601 Switch, 602 Switch, 603 SDT section, 611 Training sample derivation section, 612 $2^N$-points HyGT derivation section, 613 Rasterization section, 614 $2^N$-points HyGT section, 615 Scaling section, 616 Matrix formation section, 621 Template matching section, 622 Residual derivation section, 651 Switch, 652 Switch, 653 Inverse SDT section, 661 Training sample derivation section, 662 Inverse $2^N$-points HyGT derivation section, 663 Rasterization section, 664 Inverse $2^N$-points HyGT section, 665 Scaling section, 666 Matrix formation section, 671 Template matching section, 672 Residual derivation section, 681 Inverse $2^N$-points HyGT derivation section

The invention claimed is:

1. An image processing apparatus comprising:
   a clip processing section configured to use one or both a predetermined upper limit and a predetermined lower limit to clip transformation coefficients obtained by applying a transformation process to a predicted residual that is a difference between an image and a predicted image of the image,
   wherein the predetermined upper limit and the predetermined lower limit are each decided based on a bit depth of an input signal including the transformation coefficients,
   wherein the predetermined upper limit and the predetermined lower limit are each further decided based on an extended computation precision flag of the input signal, and
   wherein the clip processing section is implemented via at least one processor.

2. The image processing apparatus according to claim 1, further comprising:
   a primary transformation section configured to perform a primary transformation that is a transformation process for the predicted residual; and
   a secondary transformation section configured to perform a secondary transformation that is a transformation process for primary transformation coefficients obtained by the primary transformation of the predicted residual performed by the primary transformation section,
   wherein the clip processing section is further configured to clip secondary transformation coefficients obtained by the secondary transformation of the primary transformation coefficients performed by the secondary transformation section, and
   wherein the primary transformation section and the secondary transformation section are each implemented via at least one processor.

3. The image processing apparatus according to claim 1, further comprising:
   a rasterization section configured to transform the transformation coefficients into a one-dimensional vector;
   a matrix computation section configured to perform matrix computation of the one-dimensional vector;
   a scaling section configured to scale the one-dimensional vector subjected to the matrix computation; and
   a matrix formation section configured to form a matrix of the scaled one-dimensional vector,
   wherein the clip processing section is further configured to clip the one-dimensional vector scaled by the scaling section,
   wherein the matrix formation section is further configured to form a matrix of the one-dimensional vector clipped by the clip processing section, and
   wherein the rasterization section, the matrix computation section, the scaling section, and the matrix formation section are each implemented via at least one processor.

4. An image processing method comprising:
   using one or both a predetermined upper limit and a predetermined lower limit to clip transformation coefficients obtained by applying a transformation process to a predicted residual that is a difference between an image and a predicted image of the image,
   wherein the predetermined upper limit and the predetermined lower limit are each decided based on a bit depth of an input signal including the transformation coefficients, and
   wherein the predetermined upper limit and the predetermined lower limit are each further decided based on an extended computation precision flag of the input signal.

* * * * *